(12) United States Patent
Belanger et al.

(10) Patent No.: US 11,157,954 B1
(45) Date of Patent: Oct. 26, 2021

(54) FORMING AND USING MASTER RECORDS BASED ON CONSUMER TRANSACTION DATA

(71) Applicant: COUPONS.COM INCORPORATED, Mountain View, CA (US)

(72) Inventors: John Neumann Belanger, Santa Cruz, CA (US); Yasha Avshalumov, Dallas, TX (US); Marvin Renaud, Atlanta, GA (US); Ivan Michael Chalif, Half Moon Bay, CA (US); Justin Mahen Mehta, Belmont, CA (US); Seth Marlatt, Belmont, CA (US)

(73) Assignee: Quotient Technology Inc., Mountain View, CA (US)

( * ) Notice: Subject to any disclaimer, the term of this patent is extended or adjusted under 35 U.S.C. 154(b) by 1401 days.

(21) Appl. No.: 14/492,924

(22) Filed: Sep. 22, 2014

Related U.S. Application Data

(63) Continuation-in-part of application No. 13/944,558, filed on Jul. 17, 2013, now abandoned.

(60) Provisional application No. 61/745,566, filed on Dec. 22, 2012, provisional application No. 61/788,009, filed on Mar. 15, 2013.

(51) Int. Cl.
    G06Q 30/00    (2012.01)
    G06Q 30/02    (2012.01)

(52) U.S. Cl.
    CPC ..... *G06Q 30/0255* (2013.01); *G06Q 30/0201* (2013.01); *G06Q 30/0269* (2013.01)

(58) Field of Classification Search
    None
    See application file for complete search history.

(56) References Cited

U.S. PATENT DOCUMENTS

| 5,687,322 | A | 11/1997 | Deaton et al. |
| 5,855,007 | A | 12/1998 | Jovicic et al. |
| 6,839,680 | B1 | 1/2005 | Liu |
| 7,076,444 | B1 | 7/2006 | Baron et al. |

(Continued)

FOREIGN PATENT DOCUMENTS

KR    20040040253 A    5/2004

OTHER PUBLICATIONS

U.S. Appl. No. 13/831,716, filed Mar. 15, 2013, Advisory Action, dated Mar. 23, 2015.

(Continued)

*Primary Examiner* — Michael W Schmucker
(74) *Attorney, Agent, or Firm* — Baker Botts L.L.P.

(57) ABSTRACT

According to an embodiment, a data processing method comprises obtaining a first record associated with a first computer and a second record associated with a second computer that is different than the first computer; in response to determining that the first record has been obtained from a primary source, determining that at least a first set of key information in the first record matches a second set of key information in the second record, and in response thereto: creating and storing a master record comprising a union of the first record and the second record; storing, in a database, a third set of key information in the first record that does not match the second set, and a fourth set of key information in the second record that does not match the first set; using the master record to determine one or more electronic offers to present to any of a user, a computing device, or an account that is associated with the master record.

18 Claims, 42 Drawing Sheets

(56) References Cited

U.S. PATENT DOCUMENTS

| | | |
|---|---|---|
| 7,318,041 B2 | 1/2008 | Walker et al. |
| 7,640,240 B2 | 12/2009 | Boal et al. |
| 8,671,018 B2 | 3/2014 | Thomas |
| 2001/0032128 A1 | 10/2001 | Kepecs |
| 2004/0078282 A1 | 4/2004 | Robinson |
| 2004/0167818 A1 | 8/2004 | Iwahashi |
| 2004/0230485 A1 | 11/2004 | Barnett et al. |
| 2005/0144066 A1 | 6/2005 | Cope et al. |
| 2005/0171845 A1 | 8/2005 | Halfman et al. |
| 2006/0080312 A1 | 4/2006 | Friedlander |
| 2007/0073580 A1 | 3/2007 | Perry |
| 2007/0208635 A1 | 9/2007 | Van Luchene et al. |
| 2008/0154676 A1 | 6/2008 | Suk |
| 2008/0319846 A1 | 12/2008 | Leming et al. |
| 2009/0099929 A1 | 4/2009 | Thibedeau |
| 2009/0265228 A1 | 10/2009 | Sterling et al. |
| 2009/0271265 A1 | 10/2009 | Lay et al. |
| 2009/0313101 A1 | 12/2009 | McKenna et al. |
| 2010/0100434 A1 | 4/2010 | Sock |
| 2010/0121708 A1 | 5/2010 | Schultz |
| 2011/0029382 A1 | 2/2011 | Narasimhan |
| 2011/0106600 A1 | 5/2011 | Malik et al. |
| 2011/0191180 A1 | 8/2011 | Blackhurst et al. |
| 2012/0022956 A1 | 1/2012 | Payne et al. |
| 2012/0136712 A1 | 5/2012 | Chang et al. |
| 2013/0046626 A1 | 2/2013 | Grigg et al. |
| 2013/0073363 A1 | 3/2013 | Boal |
| 2014/0180790 A1 | 6/2014 | Boal |
| 2014/0180793 A1 | 6/2014 | Boal |
| 2014/0180802 A1 | 6/2014 | Boal |
| 2014/0180807 A1 | 6/2014 | Boal |
| 2014/0180808 A1 | 6/2014 | Boal |
| 2014/0180809 A1 | 6/2014 | Boal |
| 2014/0180810 A1 | 6/2014 | Boal |
| 2014/0180826 A1 | 6/2014 | Boal |

OTHER PUBLICATIONS

Boal, U.S. Appl. No. 13/944,558, filed Jul. 17, 2013, Final Office Action, dated Jun. 28, 2017.
Boal, U.S. Appl. No. 13/831,716, filed Mar. 15, 2013, Examiners Answers, Apr. 21, 2017.
U.S. Appl. No. 13/831,716, filed Mar. 15, 2013, Office Action, dated Mar. 9, 2016.
U.S. Appl. No. 13/831,716, filed Mar. 15, 2013, Final Office Action, dated Jan. 13, 2015.
U.S. Appl. No. 13/944,558, filed Jul. 17, 2013, Interview Summary, dated Nov. 17, 2016.
Boal, U.S. Appl. No. 13/944,486, filed Jul. 17, 2013, Final Office Action, dated Jul. 13, 2017.
Korean Intellectual Property Office, Office Action in application No. PCT/US20112/055810 dated Mar. 15, 2013, 11 pages.
Korean Intellectual Property Office, "Search Report", in application No. PCT/US2013/076926, dated Apr. 19, 2014, 19 pages.
Current Korean Claims in application No. PCTUS2012/055810 dated Mar. 2013, 5 pages.
Current Claims in Korean application No. PCT/US2013/076926, dated Apr. 2014, 27 pages.
Boal, U.S. Appl. No. 13/944,558, filed Jul. 17, 2013, Interview Summary, dated Dec. 20, 2017.
U.S. Appl. No. 13/944,486, filed Jul. 17, 2013, Office Action, dated Aug. 25, 2016.
Boal, U.S. Appl. No. 13/944,486, filed Jul. 17, 2013, Final Office Action, dated May 3, 2018.
Boal, U.S. Appl. No. 13/831,716, filed Mar. 15, 2013, Office Action, dated Dec. 20, 2018.
Boal, U.S. Appl. No. 13/831,716, filed Mar. 15, 2013, Decision on Appeal, Sep. 26, 2018.
Boal, U.S. Appl. No. 13/831,716, filed Mar. 15, 2013, Notice of Allowance, dated Mar. 22, 2019.
Boal, U.S. Appl. No. 13/831,716, filed Mar. 15, 2013, Interview Summary, dated Mar. 14, 2019.
Boal, U.S. Appl. No. 13/944,558, filed Jul. 17, 2013, Decision on Appeal, Jul. 14, 2020.

From: Superstore Receipts (receipts@superstore.com)
To: Johnny Johnson (johnny@johnson.net)
Sent: August 15, 2011, 9:45 A.M. —111
Subject: Your Superstore Receipt (#000293861)

*110*

Johnny,

Thank your recent shopping trip to Superstore. Here is your electronic receipt.

*120*

Transaction: #000293861   Terminal: 0313019
Date/Time: 08-15-2011, 09:36:12   Sales Rep: Miller, L.
Superstore Location: Mountain View, CA (#313)

*130*
*135*

| Quantity | Item | Price | Total |
|---|---|---|---|
| 2 | Brand X Cereal  —141 | 2.99 | 5.98 |
|   | *Coupon: Buy 1 Get 1 Free* |  | -2.99 |
| 1 | Brand Y Dish Soap  —170 | 5.33 | 5.33 |
|   | Special Offers:  —142 |  |  |
|   | *Save $2.00+ on Lunch Meat*  —151 |  |  |
| 1 | Funny Movie (DVD) | 10.00 | 10.00 |
|   | *Sneak Peak: Funny Movie II*  —143, 160 |  |  |
| 4 | Chocolate Candy | 0.49 | 1.96 |
| 1 | 1 ga. Brand Z Ice Cream - Rocky Road  —144 | 4.24 | 4.24 |
|   | Special Offer:  —145 |  |  |
|   | *Try New Super Medicine, 2 for 1*  —152 |  |  |
|   | Tax (8.25%) |  | 2.02 |
|   | Total |  | 26.54 |
|   | Payment: Cash |  | -6.54 |
|   | Payment: Credit Card XXXX-XXXX-XXXX-0001 |  | -20.00 |
|   | Special Offer: |  |  |
|   | *Pay with Mobile Wallet and save*  —153 |  |  |

*140*
*180*
*190*

Bonus Offer:
*$5 off next Purchase*  —154

Your Coupons

Save $2.00 on Brand A Salami
*Valid:* August 12, 2011 - August 31, 2010
*Participating Retailers:* Superstore, Store A
*Additional Details:* 1 box per purchase only.

*211*

*221* [Print] [Save to Card] *231*

2 For 1 Super Medicine 12 Pack
*Valid:* August 20, 2011
*Participating Retailers:* Superstore
*Additional Details:* Prescription only.

*212*

*222* [Print] [Save to Card] *232*

$1 off with Mobile Wallet
*Valid:* August 12, 2011 - August 19, 2011
*Participating Retailers:* Any
*Additional Details:* Must pay for entire transaction with mobile wallet.

*213*

Already Clipped *243*

$5 off next Superstore purchase
*Valid:* July 28, 2011 - August 31, 2011
*Participating Retailers:* Superstore
*Additional Details:* Must spend $25 or more. Gift cards excluded.

*214*

Limit Reached *244*

FIG. 36

FORMING AND USING MASTER RECORDS BASED ON CONSUMER TRANSACTION DATA

BENEFIT CLAIM

This application claims the benefit under 35 U.S.C. § 120 as a continuation-in-part of application Ser. No. 13/944,558, filed Jul. 17, 2013, which claims the benefit under 35 U.S.C. § 119(e) of provisional application 61/745,566, filed Dec. 22, 2012 and provisional application 61/788,009, filed Mar. 15, 2013, the entire contents of which are hereby incorporated by reference for all purposes as if fully set forth herein.

TECHNICAL FIELD

Embodiments relate generally to the generation, processing, storage, management, usage, distribution and/or delivery of digital offers, including digital coupons and other digital promotional vehicles. The disclosure relates more specifically of data processing methods useful in entity resolution and/or in unifying a plurality of records obtained from multiple sources and all relating to the same user or customer.

BACKGROUND

Approaches described in this Background section may include approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Targeted marketing techniques assist a variety of entities, such as product manufacturers, service providers, and retailers, in efficiently persuading consumers to purchase certain products and service. A marketing entity may include, without limitation, product manufacturers, service providers, retailers, third-party marketing firms acting on behalf of another entity, non-profit organizations, and so forth. The marketing entity may identify characteristics of people to which the entity wishes to "market" a product or service. For example, an entity that sells product X may determine that it wants to market to persons that have purchased a complimentary product Y within a timeframe of Z. Of course, one problem with targeted marketing is that it is sometimes difficult to ascertain exactly what characteristics to target.

Once targeted characteristics have been identified, the entity may then attempt to "market" to persons who have those characteristics. Unfortunately, it is also generally difficult to ascertain whether a given person actually has the targeted characteristics and/or how to actually reach specific persons that have those specific characteristics. For example, a particular retailer may have no idea that a potential consumer recently purchased product Y from another store, and thus be unable to specifically target marketing for Product X to that potential consumer. Large-scale targeted marketing is therefore typically difficult to achieve with a high degree of efficiency. Rather, a marketing entity is typically limited to less efficient targeting techniques, such as targeting specific zip codes or web sites, thus resulting in the marketing entity wasting marketing resources on many persons who do not have the targeted characteristics.

One common marketing technique involves incentivizing costumer behavior through targeted promotional offers. An "offer" may be construed to be a promise by an offer provider, which may be any entity engaged in targeted marketing, to provide a consumer with a benefit under a certain set of implicit or explicit conditions known as terms. Example benefits include, without limitation, a monetary gift, a discount applied to the purchase of one or more products or services, free products and/or services, access to additional offers, and so forth. Example terms may include any one or more of, without limitation, actions that the consumer must perform, a specific set of item(s) that must be purchased by the consumer, a specific amount of money that must be spent by the consumer, a timeframe during which the offer is valid, and so forth. A customer benefit of an offer is realized during a process sometimes called "redemption," which typically takes place during a transaction between the consumer and a retailer. When the consumer wishes to engage in a transaction the retailer determines whether the conditions of the offer have been met. If so, the retailer, which may be any merchant or other entity that sells products or services, provides the benefit to the consumer on behalf of the offer provider.

In some embodiments, the retailer is in fact the offer provider. In other embodiments, the retailer may then seek compensation for providing the benefit from the offer provider by means of a process known as clearing. During the clearing process, the retailer provides evidence to a third-party clearinghouse, or directly to the offer provider, that the retailer provided the benefit. Assuming the evidence is sufficient, the third-party clearinghouse, or offer provider, provides compensation to the retailer. In embodiments involving a third-party clearinghouse, the offer provider may provide the third-party clearinghouse with funds in advance. The offer provider also sends to the third-party clearinghouse funds from which the compensation is provided, or reimburses the third-party clearinghouse for providing the compensation.

A frequent implicit or explicit term of an offer is that the retailer must be presented with a specific coupon during a transaction. In general, a coupon is a certificate, document, or other physical or electronic construct that entitles a consumer to accept an offer described or referenced by the coupon, thereby realizing the benefit of the offer. A coupon sometimes takes a "hard copy" form, such as a paper certificate, with printed images and/or text describing terms of the offer. The process of the consumer accepting an offer by presenting, referencing, or otherwise providing a coupon while purchasing, contracting, or otherwise transacting with another party involves "redeeming" the coupon. For example, a consumer may redeem a hard copy of a coupon by handing the copy to a clerk during a purchase at a retail store. The clerk may then provide the consumer with the subject of the offer, such as a discounted price, item, service or gift.

One technique for distributing coupons is to include printed coupons with newspapers, magazines, or other items that are distributed to consumers. One example of an item with which coupons are distributed is a printed receipt. For example, some retailers print receipts at a point of sale on register paper on which coupons have been pre-printed. As another example, some retailers print coupon(s) on a receipt at the time of the transaction for which the receipt is printed, thereby allowing the retailers to dynamically select which coupon(s) appear on the receipt based on the product(s) that were purchased during the transaction.

Recent distribution techniques now provide consumers with opportunities to print their own coupons. For example, a number of websites provide search engines or catalogs with which consumers may locate offers and then print coupons for the offers they find. The printed coupons may be used in the same manner as any other coupon.

Other recent distribution techniques involve creating digital coupons. One such technique involves creating unique digital coupons that are saved to an account associated with the consumer, such as a store loyalty account. The consumer may redeem such digital coupons during online or physical transactions by presenting an account identifier, such as a store loyalty card or an oral identification of the consumer's telephone number, for the associated account. Since many consumer accounts are tied to card-based identifiers, such as store loyalty cards or credit cards, the process of storing a digital coupon identifier to an account may also be referred to as saving a coupon to a card. Some examples of such techniques are described in U.S. application Ser. No. 12/878,231, filed Sep. 9, 2010, the entire contents of which are hereby incorporated by reference for all purposes as if fully set forth herein.

Another digital coupon-based technique involves creating unique digital coupons that may be stored on a computing device. The digital coupons may be transmitted from the computing device to a point-of-sale during a transaction using any of a variety of mechanisms. For example, information about the digital coupon may be uploaded to the point-of-sale during an online transaction involving the computing device. As another example, information about the digital coupon may be transmitted wirelessly from a smartphone to a receiving component coupled to a checkout register during a transaction at a brick-and-mortar store.

Considering the current state of the industry and market for digital offers (including digital coupons and other digital promotional discount vehicles), there is a need for improved systems, methods and technology platforms for generating, processing, storing, managing and delivering digital offers, for enhancing and customizing the digital offer experience of consumers in general, for increasing the value and benefits derived by consumers from digital offers, for improving the ability of offer providers, offer distributors and retailers to customize digital offer selection, delivery, utilization, management, monetization and redemption analysis, and for otherwise increasing the efficiency and financial return of the digital offer industry and market.

A variety of consumer merchants offer customer loyalty programs in which a customer or other end user may receive offers, awards or other benefits in exchange for enrolling with certain personal information and permitting the merchant to track the customer's purchases at the merchant. At enrollment, the end user provides at least minimal identifying information; the merchant assigns some form of identifier, such as a loyalty card ID number, and associates that identifier with the user's identifying information in a record, for example, in a database.

A particular customer or other user of such services may establish multiple records at several different merchants. Although all such records relate to the same individual or household, each of the records may contain different data so that an exact match of one record of one merchant to a second record of a second merchant typically is not possible. However, matching two or more records associated with the same end user is useful in a variety of contexts, such as in determining whether to offer coupons, discounts or other incentives or benefits to the end user.

A related problem involves linking user records for two different users for whom some identifying information, such as address, is the same. It may be beneficial to associate records of related persons or members of the same household; however, the use of identical address information does not always mean that two records should be so related.

As distribution methods expand and users access a variety of distribution points with more than one access device (e.g., desktop computer, PIN pad, tablet, mobile phone, etc.), there is a need to be able to identify the user during use of any such device to manage restrictions on the use of data, such as whether a particular user is allowed to see or use a particular coupon. There is also a need to determine whether a coupon which has already been assigned to a user via one device can be used by that same user via another device.

SUMMARY OF THE INVENTION

The appended claims may serve to summarize the invention.

BRIEF DESCRIPTION OF THE DRAWINGS

In the drawings:

FIG. 1 illustrates an email comprising an electronic receipt with offer information that has been provided to an electronic address of a consumer, in accordance with an embodiment;

FIG. 2 depicts an example graphical user interface with which a consumer may view and select offers, in accordance with an embodiment;

FIG. 36 illustrates a webpage comprising an interactive list of a consumer's receipts, in accordance with an embodiment.

DESCRIPTION OF EXAMPLE EMBODIMENTS

Figure 3:
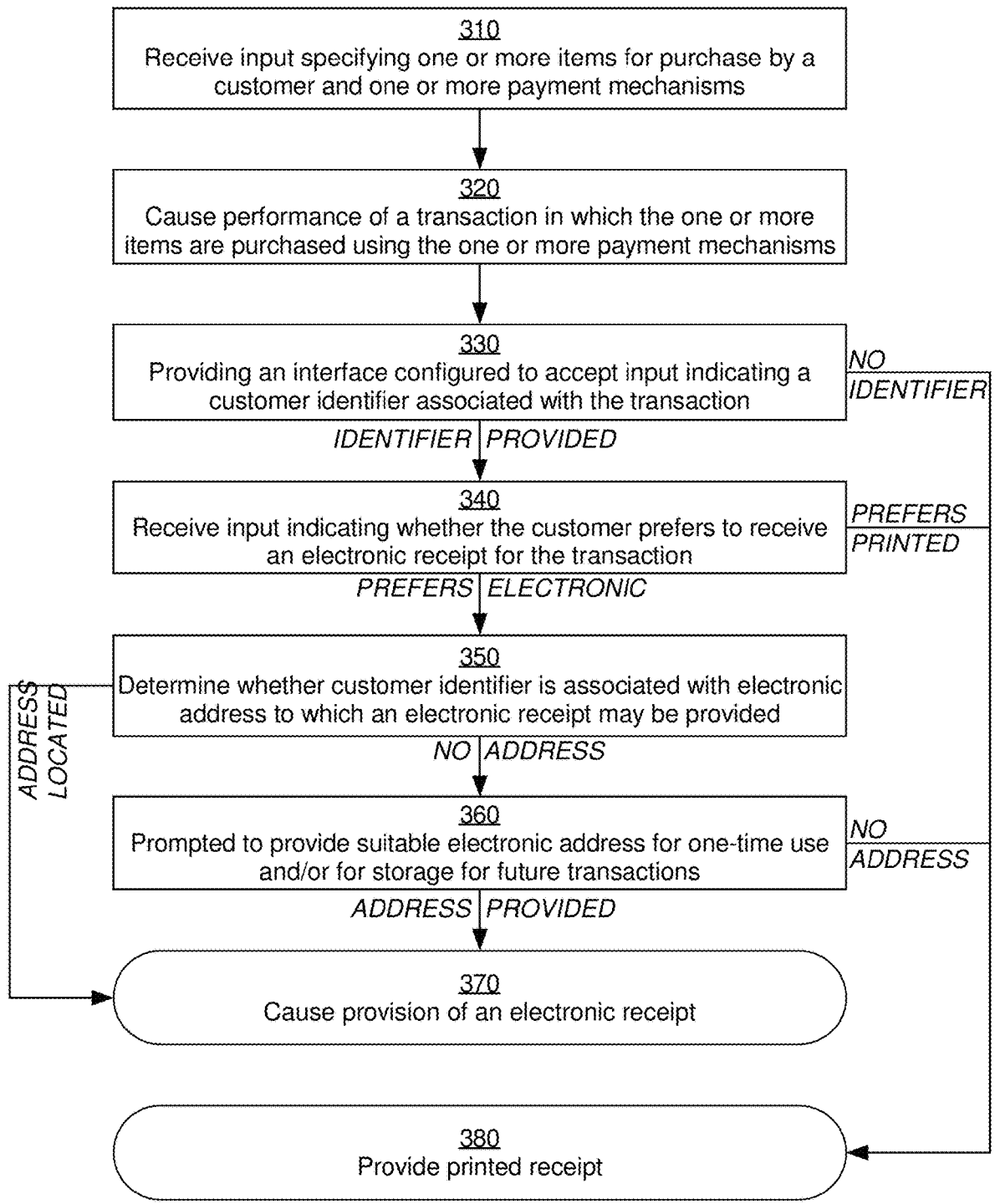
FIG. 3 illustrates a method flow for conducting a transaction in which an electronic receipt may be provided, in accordance with an embodiment.

In the following description, for the purposes of explanation, numerous details are set forth in order to provide a thorough understanding of various embodiments of the present invention. It will be apparent, however, that various embodiments of the present invention may be practiced without these specific details. In other instances, well-known structures and devices are shown in block diagram form in order to avoid unnecessarily obscuring the present invention.

1.0. General Overview

The following describes systems and methods for addressing needs such as described above, among other needs, by integrating and processing transaction data from a plurality of retailers in connection with digital offers, including digital coupons and other digital promotional discount vehicles, in accordance with various embodiments.

Across the different platforms, there are a variety of methods of authentication, but no single method works everywhere. The combination of a variety of validated and/or inferred identifiers form a "thumbprint" for the consumer. This thumbprint can be used with varying degrees of confidence, based on weighted, confirmed, or inferred data points, to determine whether a user on one device is materially the same as a user on another device. In cases where confidence falls below a certain threshold, the consumer is either not authenticated or prompted to provide additional data to aid in increasing confidence or validating/authenticating the users. As the thumbprint increases in completeness for a particular consumer, they will have more options to validate themselves in the system and will have to provide less information at any one point of authentication.

Additionally, the consumer will have the ability, through the platform, of authenticating themselves across coupons.com properties, as well as properties that we provide/manage on behalf of clients and/or partners, and properties on which we are authorized by the owner to enable authentication.

According to an embodiment, a data processing system for facilitating consumer identity resolution comprises: a first logic module adapted to receive at least two collections of consumer records from at least two different sources, the first collection including a set of first data fields and the second collection including a set of second data fields; a second logic module adapted to compute a set of first trust scores for the first data fields and a set of second trust scores for the second data fields; a third logic module adapted to generate a master collection of consumer records comprising at least one master consumer record that is correlated to at least one record from the first collection and to at least one record from the second collection, the correlation being based on at least one of the first trust scores and at least one of the second trust scores; and a fourth logic module adapted to receive a set of contextual transaction data. The data processing system is adapted to identify a consumer based on the contextual transaction data and the master collection of consumer records.

In an embodiment, the system is adapted to select at least one electronic offer based on the identification of the consumer. In an embodiment, the electronic offer is selected in response to a request for a receipt. In an embodiment, the electronic offer is included in a transaction receipt transmitted to a customer data processing system. In an embodiment, the customer data processing system is a desktop computer, laptop computer, netbook, electronic notebook, ultra mobile personal computer (UMPC), electronic tablet, client computing device, client terminal, client console, mobile telephone, smartphone, wearable computer, head-mounted computer, or personal digital assistant.

In an embodiment, the selection of the electronic offer is based on an activity associated with a particular master consumer record, or on a consumer attribute associated with a particular master consumer record. In an embodiment, the selection of the electronic offer is based on determining whether an offer has previously been activated in connection with a particular master consumer record. In an embodiment, the selection of the electronic offer is based on a transaction log. In an embodiment, the selection of the electronic offer comprises selecting multiple master records and scoring a likelihood that the contextual transaction data relates to a particular record included in the multiple master records. In an embodiment, the selection of the electronic offer is further based on confidence scores that indicate the frequency with which a particular value occurs in a data field of correlated records. In an embodiment, the system is further adapted to transmit a list of offers that have been activated for a particular master consumer record, the transmission being in response to a request from a retailer, and wherein the contextual transaction data includes a credential supplied by the consumer during a transaction.

In an embodiment, the contextual transaction data includes information regarding a universal product code, a quantity of product purchased, a number of items purchased, a transaction amount, at least a portion of a credit card number used, a payment identifier used, a secure payment hash key, a data processing system or facility, time, date, one or more offers activated or redeemed, customer name, phone number, pin number, password, code, loyalty card number, RFID data, a device identifier, one or more items that were purchased in a previous or concurrent transaction, or a transaction number. In an embodiment, the at least one trust score is modified subsequently based on an update from at least one of the two sources, new transaction data, or a confidence score that indicates the frequency with which a particular value occurs in a data field of correlated records.

In an embodiment, the fourth logic module is further adapted to correlate transactions from a plurality of different retail stores with the at least one master consumer record. In an embodiment, the first logic module is further adapted to receive updates to the at least two collections from the at least two different sources over time, and the third logic module is further adapted to revise the correlations based thereon. In an embodiment, the third logic module is further adapted to link each value of the at least one master consumer record to a particular collection, of the at least two collections, from which the value originated. In an embodiment, the first data fields include aggregated transaction data.

In an embodiment, the system further comprises a fifth logic module adapted to identify one or more values for a particular data field of the at least one master consumer record in response to a query that requests the one or more values for the particular field, by querying a first consumer record of the first collection for a first value pertaining to a first data field, querying a second consumer record of the second collection for a second value pertaining to a second data field, and deciding which one or more values of the first value and the second value to return based at least on different trust scores assigned to the first data field and the second data field. In an embodiment, the third logic module is configured to determine which one or more values of a first value, pertaining to a first data field of the first collection, and a second value, pertaining to a second data field of the second collection, to store in the at least one master consumer record based at least on the different trust scores. In an embodiment, the fourth logic module is adapted to receive particular contextual transaction data in a query that selects for a first value in a particular data field of the master collection, and, responsive to the first value being assigned to the particular data field in a plurality of master consumer records identify one or more master consumer records from which to return information based on trust scores assigned to different data fields of the at least two collections from which the plurality of master consumer records were generated. In an embodiment, the first source is a first retailer and the second source is a second retailer.

In other aspects, the invention encompasses data processing systems comprising logic modules implemented at least partially by one or more processors, as well as memories and other computer-readable media configured to carry out the foregoing steps.

Figure 13A:
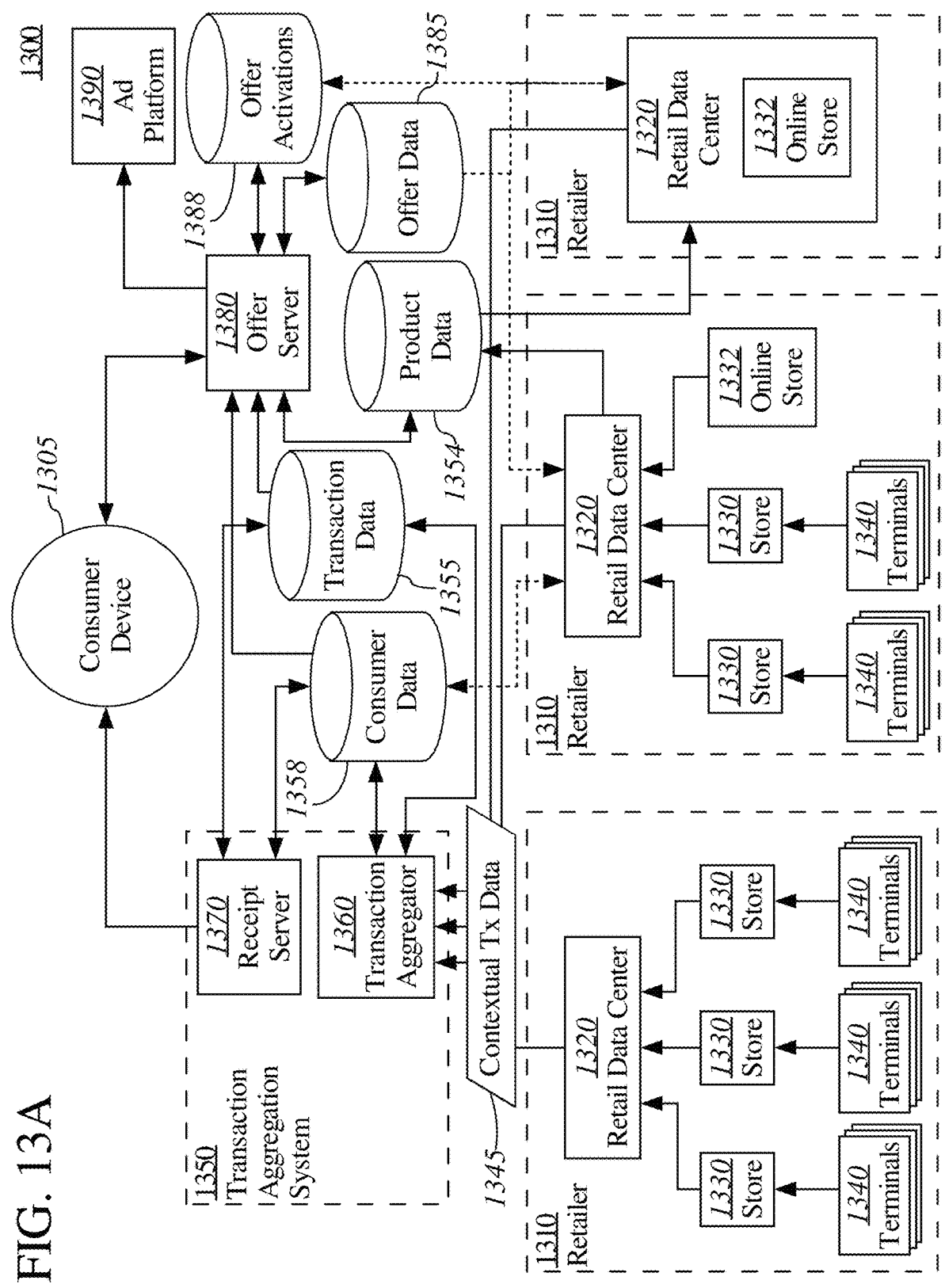
FIG. 13A illustrates a system for providing offers based on transactional data gathered from multiple different retailers, in accordance with an embodiment.

2.0. Structural Overview 2.1. Architecture for Reporting of Transaction Data by Retailer FIG. 13A illustrates a system 1300 for providing offers based on transactional data gathered from multiple different retailers 1310, according to an embodiment. System 1300 may be used in connection with various embodiments described herein.

Retailers

System 1300 is used by multiple retailers 1310, each of which operates a different retail data center 1320. Each retail data center 1320 comprises one or more computing devices and one or more databases that collectively operate as a retail server. Each retail data center 1320 is communicatively coupled to one or more brick-and-mortar stores 1330 and/or online stores 1332 via wired, wireless, or any other type or combination of communication channels, networks or lines.

Each retail data center 1320, among other aspects, receives transaction data from stores 1330 and/or 1332. The transaction data may be generated by payment terminals 1340 at stores 1330, or by websites or web-based applications at online stores 1332. Payment terminals 1340 may be any data processing system or logic module capable of interfacing with a consumer (e.g., a person purchasing an item in a grocery store), or with an individual assisting a consumer (e.g., a checkout cashier), for the purpose of conducting a transaction, as described herein. For example, payment terminals 1340 may be specialized point-of-sale registers or self-checkout stands. Payment terminals 1340 may also or instead be add-on devices that interface with existing point-of-sale registers or self-checkout stands.

Each store 1330 may further optionally operate a store controller system that interfaces with the various terminals 1340. The store controller may, in concert with retail data center 1320, assist the terminals 1340 in conducting transactions, including by providing information about items and offers, as well as by providing payment processing services.

These payment processing services may themselves interact with third party payment systems, such as provided by credit card processing services or banks. Such communications may take place via one or more application programming interfaces (APIs), and may use one or more networks or communication channels.

The store controller may collect transaction-related data 1345 from the terminals 1340 and forward it in real time, near real time, or at a later time to a respective data center 1320. This information is sometimes denoted contextual transaction data. In various embodiments, contextual transaction data 1345 may include any of a variety of information related to one or more consumer transactions conducted directly or indirectly by a retailer. Examples of contextual transaction data 1345 include data originating directly or indirectly from any transaction conducted electronically or physically, over an electronic medium or in a facility owned, controlled or operated by retailer, such as retailer 1310, including without limitation basket-level transaction details such as universal product codes and quantities purchased, total number of items purchased, transaction amounts, payment details (e.g., a credit card number, a payment identifier, a secure payment hash key), information about a data processing system, logic module or facility where the transaction takes place (e.g., terminal 1340 or store 1330), time, date, offers applied during the transactions, information relating to the customer conducting the transaction (e.g., a name, a phone number, a pin number, a password, a code, a loyalty card number, other biometric or personal identification data, etc.), RFID data, a device identifier, items that were purchased in a previous or concurrent transaction, a transaction number, and any other type or class of similar data.

In one embodiment, the contextual transaction data 1345 is received via an application programming interface (API) from a retailer POS or other facility. In one embodiment, the contextual transaction data 1345 is received in connection with a request for an offer recommendation. In one embodiment, the contextual transaction data 1345 is received independent of a request for an offer recommendation.

Transaction Aggregation

In one embodiment, each retail data center 1320 is also communicatively coupled to a transaction aggregation system 1350 via wide area networks and/or direct lines. The retail data centers 1320 forward some or all of the contextual transaction data 1345 received from their respectively corresponding stores to the transaction aggregation system 1350. In various embodiments, contextual transaction data 1345 may be transmitted directly or indirectly to any other data processing system, such as a receipt server (e.g., receipt server 1370), an offer server (e.g., offer server 1380), an advertisement server or platform (e.g., ad platform 1390), or other data processing system or platform adapted to process or transmit transaction-related information. The contextual transaction data 1345 may be processed at the retail data center 1320, or may be unprocessed. The contextual transaction data 1345 may be forwarded in real time as it is received, in near-real time, or batched and forwarded at regular intervals.

Transaction aggregation system 1350 is a data processing system, which may comprise one or more data processing systems and/or logic modules, and which implements a transaction aggregator 1360 for processing a variety of transaction data as the data arrives and/or causing such transaction data to be stored in transaction data store 1355. Transaction aggregation system 1350 may be operated by an offer distributor, a payment provider, a retailer, a third-party service provider, or any other entity that is involved in the process of generating, storing, processing or distributing offers.

In general, the data processed and/or stored by the transaction aggregation system 1350 or by another data processing system involved in offer generation, storage, processing or distribution may include various transaction attributes that are associated with historical transactions that occurred in the past (sometimes denoted "historical transaction attributes" or "historical transaction records"). Historical transaction records may include various classes of information that relate to users, transactions, vendors, payment processing, and any other aspects of electronic or physical commerce. As an example, historical transaction records may be, or may include contextual transaction data 1345 that was generated in connection with previous transactions, has been stored in a memory, may have been further processed and refined, and which can now be retrieved and used as a basis for further data processing and decision making. As another example, historical transaction records may be, or may include transaction data 1355, consumer data 1358, product data 1354, and offer data 1385. Historical transaction records may include contextual transaction data 1345 or any associated data or derivative data that has been generated up to a current moment in time.

Over one or more network interfaces, transaction aggregator 1360 may provide one or more application programming interfaces (APIs). In one embodiment, an API used to receive historical transaction records is denoted a transaction reporting application programming interfaces (APIs). The data centers 1320 may use transaction reporting application programming interfaces to report transaction logs, which may include transaction records associated with historical transactions, to transaction aggregator 1360. The stored transaction data may comprise transaction logs and other aggregated transaction data from the multiple retailers 1310. In some embodiments, transaction aggregation system 1350 functions as a coordinating server within the meaning described in other sections.

In various embodiments, the transaction records associated with historical transactions may include transaction data 1355, consumer data 1358, product data 1354, and/or any other types of data relating to historical transactions. These classes of data may be stored in one or more databases, or in the same database, which may be physically stored one or more memories. Examples of memories that could be used to store such historical transaction records are discussed in connection with the embodiment of FIG. 9.

Transaction aggregator 1360 causes various transaction data in transaction data store 1355 to be stored in association with consumer entities described by consumer data in consumer data store 1358. It will be noted that for simplicity, with respect to customer data store 1358 and other data stores described herein, that the same label is used herein to refer to both the data store and the data stored therein. Consumer data store 1358 includes records such as consumer records by which transaction data in transaction data store 1355 may be matched to specific consumer entities. Examples of such transaction records that relate to consumer records include account identifiers, credit card numbers, names, pin numbers, passwords, personal codes, loyalty card numbers, email addresses, phone numbers, location information, and so forth.

Consumer data store 1358 may further include identifying data by which consumer devices 1305 may become associated with specific consumer entities, including without limitation IP addresses or other device identifiers, user names, passwords, phone numbers, and location information. Transaction aggregator 1360 may further update consumer entity definitions in consumer data store 1358 based on the transaction data. Consumer data store 1358 and transaction data store 1355 may be stored in a same or different database system.

In an embodiment, consumer data store 1358 may be periodically seeded with account data collected directly from retailers 1310 or other partners, including social media networks and other websites. For example, a retailer 1310 may send the transaction aggregation system 1350 consumer records based on its loyalty card account program on a weekly basis. In an embodiment, consumer data 1358 may also or instead include registration information from consumer interactions with receipt server 1370, offer server 1380, or a payment system. For example, offer server 1380 may feature a registration process during which consumers optionally enter information such as names, loyalty card identifiers, addresses, and so forth. In other embodiments, consumer data 1358 merely includes information collected from the transaction data.

Product data store 1354 may include information about a plurality of different items, including both goods and services, that may be found in receipts or that may be the subject of an offer. The information may include identifiers such as Universal Product Codes (UPCs) and/or stockkeeping unit (SKU) numbers, taxonomical categorizations, names, descriptions, nutritional information, product specifications, price histories, inventory levels, and/or any other suitable metadata. The product information may be populated and maintained using any suitable data collection technique. For example, the product information may be collected from and/or updated by retailers 1310 in periodic batch synchronizations of retailer product databases. As another example, product information may be collected from data mining of retailer or manufacturer websites. The product information may also or instead be updated by transaction aggregation system 1350 as part of analyzing transaction data 1355. Information from product data store 1354 may be utilized to enhance receipts presented by receipt server 1370. For example, a line item for a particular UPC in a receipt may include or link to nutritional information or price history comparisons collected in association with that UPC in product data store 1354. Similar information may be provided in association with offer recommendations from offer server 1380 or advertisements presented by ad platform 1390.

In various embodiments, the consumer data 1358 and/or product data 1354 may or may not be obtained from actual historical transactions in whole or in part (e.g., at least part of the consumer data may have been retrieved from a separate commercial or governmental consumer identification database), but could nevertheless be considered to be transaction records associated with historical transactions, or may be used similarly and along with other transaction records associated with historical transactions.

Receipt Server

Transaction aggregation system 1350 further comprises a data processing system or logic module, which may provide various receipt-related functionality, and which is denoted in FIG. 13A as receipt server 1370. Receipt server 1370 has one or more network interfaces (which may or may not be the same as those that belong to the transaction aggregator 1360) over which receipt server 1370 may transmit or otherwise make available to consumer devices 1305 receipts from one or more of the retailers 1310 based on various transaction records associated with historical transactions, including the transaction data in transaction data store 1355 and the consumer entity data in consumer data store 1358. Receipts may be provided using any of the techniques described herein.

Offer Server

System 1300 further comprises a data processing system or logic module, which may provide various offer-related functionality, and which is denoted in FIG. 13A as offer server 1380. Offer server 1380 may transmit or otherwise make available offers to consumer devices 1305. Offer server 1380 may be operated by offer distributor, a payment provider, a retailer, a third-party service provider, or any other entity that is involved in the process of generating, storing, processing or distributing offers. Consumer devices 1305 need not necessarily belong to a specific consumer, and may in fact be any device with which a consumer interacts. Consumer devices 1305 may include, for instance, desktop computers, laptop computers, ultrabooks, tablets, smartphones, personal wearable data processing systems, virtual reality augmentation devices (e.g., wearable glasses with electronic data processing functionality), checkout or other kiosks at retail stores or gas stations, automated teller machines ("ATM"), parking meters, receipt or ticket printers, drive-through menu boards, free-standing interactive displays in public areas or at public events, and so forth.

The act of providing an offer may include providing offer data describing an offer and/or providing a mechanism by which a consumer may redeem the offer, such as a mechanism for printing a coupon, displaying a coupon in a digital format, or saving information identifying the offer to an account associated with the consumer. Offer server 1380 may be, for example, one or more computing devices that collectively function as a server. Offer server 1380 includes one or more network interfaces (which may be the same as or different from those of transaction aggregation system 1350) over which it receives requests for offer(s) from consumer devices 1305 and/or other servers. In an embodiment, offer server 1380 provides or uses an offer recommendation application programming interface by which it receives the requests along with, optionally, context information for identifying a consumer entity that corresponds to the request. For example, each request may include information provided by a corresponding consumer device 1305, such as user login credentials, phone numbers, device identifying information such as an Internet Protocol ("IP") address or Near Field Communication ("NFC") tag, biometric data, basket data, shopping list data, or request metadata, by which the offer server 1380 may identify, or guess, a consumer entity for which offer server 1380 is to provide an offer. In an embodiment, offer server 1380 is a web server that provides offers embedded within web pages, images, or other containers suitable for presentation at a web client. In an embodiment, offer server 1380 provides raw offer data in formats or protocols that are not intended to be presented directly by the requestor, such as XML, SOAP, JSON, and so forth. The requestor then processes this raw offer data and generates its own presentation of the offers identified by offer server 1380.

Offer server 1380 accesses records describing offers within an offer data store 1385, which may have been populated with data from offer providers and/or offer aggregation services. For example, offer server 1380 may provide an offer aggregation component that interfaces with or collects data from offer providers describing specific offer campaigns. Offer server 1380 compares data from offer data store 1385, transaction data store 1355, and consumer data store 1358 to match one or more offers to specific requests for offers. Depending on where offer server 1380 is deployed, offer server 1380 may communicate directly with consumer data store 1358 and/or transaction data store 1355, or offer server 1380 may request data via the transaction aggregation system 1350. In an embodiment, when providing a consumer with an offer, offer server 1380 bases the selection of the offer on transaction data from transactions by the consumer at two or more different more different retailers 1310.

Offer server 1380 may receive requests for offer recommendations directly from consumer devices 1305. Offer server 1380 may also or instead receive requests from other servers that are interfacing with devices operated by consumers 1305, including receipt server 1370 and/or ad platform 1390. In an embodiment, offer server 1380 may not necessarily return any information to consumer device 1305, but rather simply activate the offer(s) selected in response to the request. For example, if the consumer device is a public kiosk that generated the request in response to detecting the swipe of an NFC-bearing device, the offer server 1305 may simply generate a digital coupon for the consumer entity most likely to be in possession of the NFC-bearing device without providing any information about the selected offer to the kiosk.

In some embodiments, a coupon server such as described herein may function as an offer server 1380. In other embodiments, a coupon server distributes coupons separately from the offer server 1380. That is, offer server 1380 simply identifies and provides information about offers in response to requests for offers. A consumer device 1305 separately accesses a coupon server if the consumer device 1305 is to obtain a coupon for an offer recommended by offer server 1380.

Offer server 1380 and/or a separate coupon server also generate and access records in an offer activation data store 1388. The records in offer activation data store 1388 indicate which offers described in offer data store 1385 have been "activated" for which consumer entities described in consumer data 1358. An "activated" offer for a particular consumer entity is an offer that a consumer entity may be specifically eligible to redeem at one or more of retailers 1310. An offer may be activated for a specific set of one or more retailers 1310, or for all retailers 1310 in general. An activated offer can be mapped directly to a consumer entity in consumer data store 1358, or to one or more specific data elements associated with that consumer entity, such as loyalty card identifiers, store account numbers, or household identifiers.

An offer can become activated in response to a number of triggering events, including upon recommendation by the offer recommendation component of offer server 1380, upon a consumer device 1305 requesting activation of an offer provided by offer server 1380, upon a consumer device 1305 printing or digitally clipping an offer, in response to a specific request to the offer server 1380 from an offer provider or other entity, in response to an automated activation process such as schedule or event-based triggers, and so forth. Since the act of activating an offer often involves a coupon, the acts of "activating a coupon" and "generating a coupon" for a consumer should be understood to refer to or imply the activation of the corresponding offer for that consumer. In fact, in an embodiment, a record describing an activated offer is considered to be equivalent to a digital coupon for that offer. In an embodiment, a record describing an activated offer is used to validate a printed coupon. In an embodiment, a digital coupon is generated on-demand, upon a retailer 1310 determining that a transaction involving the corresponding consumer entity record matches the conditions for an offer that has been activated for the consumer entity. In some embodiments, certain offers are "globally activated" for all consumers, in that a consumer may redeem the offer without the offer having been specifically activated for the consumer entity.

In one embodiment, in addition to information relating to offer activations, a data processing system also utilizes other information regarding offers, including information relating to offer impressions and offer redemptions. Offer activations, impressions and redemptions, together with associated types of data and data attributes and records, are further discussed in connection with various embodiments.

In an embodiment, offer server 1380 and receipt server 1370 are in fact the same server. In other embodiments offer server 1380 and receipt server 1370 are separate and distinct servers, and may even be operated by different providers. In an embodiment, multiple different offer servers 1380 may make use of the transaction data in transaction data store 1355.

In an embodiment, the data in offer data store 1385 and/or offer activation data store 1388 is accessible by or shared with retail data centers 1320 or other components of retailers 1310. For example, offer server 1380 may provide or may use an API by which stores 1330 may request offer data for offers identified by consumers in real-time. As another example, offer server 1380 may periodically send offer data describing available offers to retail data centers 1320, which in turn may synchronize the offer data with their own local repositories of offer data. The retailers 1310 may further be provided with offer activation data from offer activation data 1388, either on demand or in periodic batches, to assist the retailers 1310 in determining whether a particular consumer is eligible for particular offers. Retailers 1310 may further remove activated offers from offer activation data store 1388 upon a consumer redeeming an activated offer. The removal may be accomplished by a direct communication with offer server 1380, offer data store 1385, or other suitable component, or indirectly as a result of providing transaction data to transaction aggregation system 1350. In an embodiment, activated offers are not deleted from offer activation data 1388, but rather simply marked as redeemed for tracking and other purposes. In other embodiments, offer tracking data is stored separately from offer activation data.

Ad platform 1390 is a set of one or more data processing systems or logic components that deliver ads to consumers via, for instance, websites or mobile applications. Offer server 1380 may be part of ad platform 1390, or may be entirely separate from offer server 1380. Offer server 1380 and ad platform 1390 may be operated by the same entity, or by different providers.

In various embodiments, one or more data processing systems or logic modules may be adapted to generate, select, modify, store, process and/or distribute receipts and/or offers to consumers and/or retailers based on various transaction records associated with historical transactions.

For example, with reference to the embodiment of FIG. 13A, the receipt server 1370 may generate, select, modify, store, process and/or distribute receipts based on consumer data 1358, transaction data 1355, and product data 1354. Such receipts may also include offer information that is produced based on offer data 1385. Further, the generation, storage, modification, selection, processing and/or distribution of such receipts may also be based on offer data 1385 (e.g., depending on which offers are available, the content, availably, manner of distribution or other aspects of the receipt may be adjusted). As another example, with reference to the embodiment of FIG. 13A, the offer server 1380 may generate, select, modify, store, process and/or distribute offers based on consumer data 1358, transaction data 1355, product data 1354, and offer data 1385.

Offer server 1380 may further have access to a number of data sources for various uses, including offer targeting and offer recommendation. One example of such a data source is the optional product data store 1354. Other examples of such data sources may include, without limitation, an offer tracking data store, a shopping list data store comprising shopping list data collected from shopping list applications on consumer devices 1305, a web history data store, an event log data store as described in other sections, a location history data store, a weather data store, and so forth.

In various embodiments, one or more data processing systems or logic modules, such as offer server 1380, receipt server 1370 or ad platform 1390, may be adapted to generate, select, modify, store, process and/or distribute receipts and/or offers to consumers and/or retailers based on both (a) contextual transaction data 1345 and (b) historical transaction records.

Figure 13B:
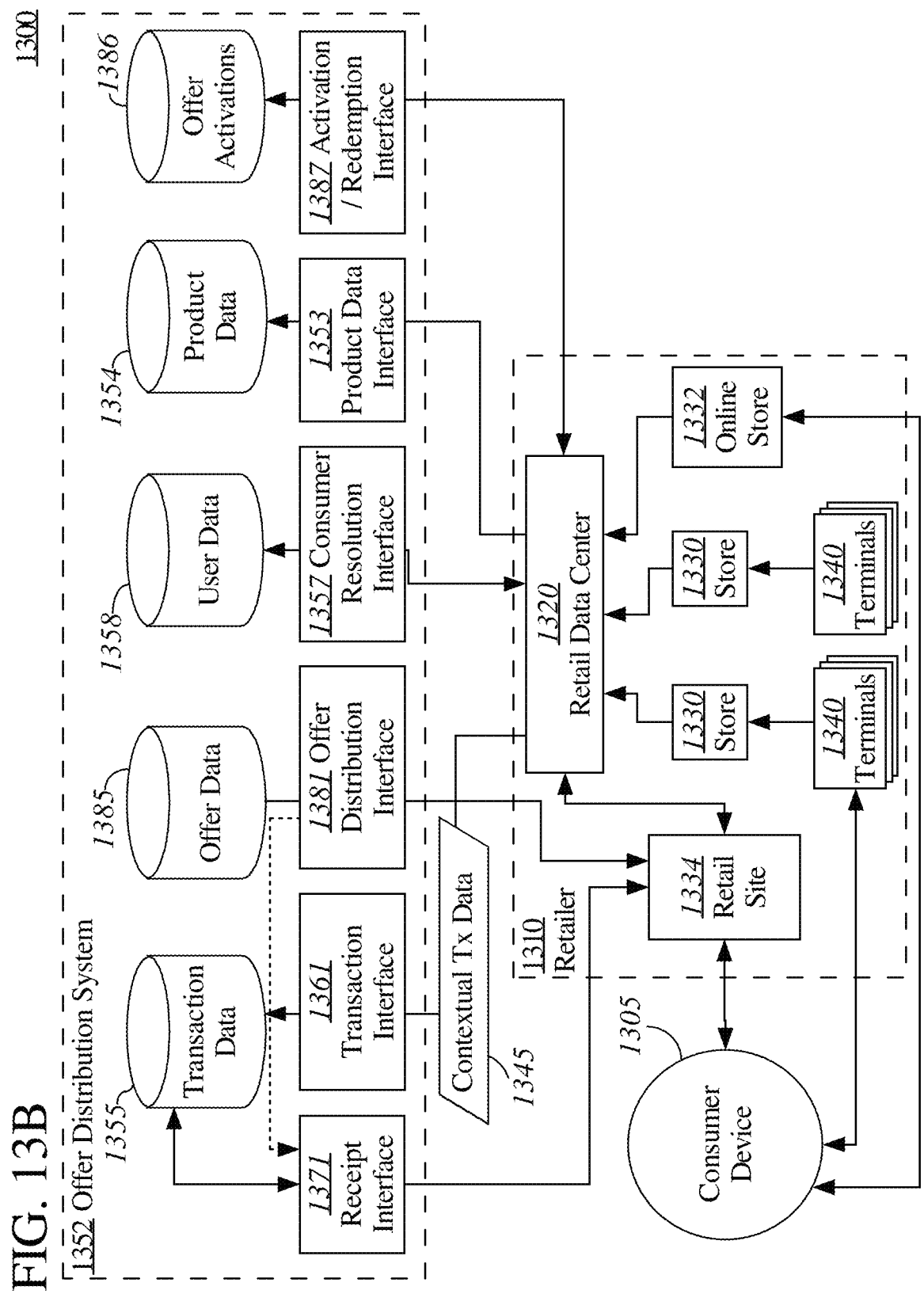
FIG. 13B is a different view of system for providing offers based on transactional data gathered from multiple different retailers, in accordance with an embodiment.

FIG. 13B is a different view of system 1300 for providing offers based on transactional data gathered from multiple different retailers 1310, according to an embodiment.

As depicted in FIG. 13B, a retailer 1310 features retail data center 1320, stores 1330, online store 1332, and terminals 1340. Retailer 1310 further implements a retailer site 1334. Retailer site 1334 is a web site operated by the retailer, potentially in association with online store 1332, for distributing offers. Retailer 1310 may utilize site 1334 to distribute offers from offer distribution system 1352. Optionally, retailer 1310 may distribute offers from other sources utilizing site 1334. Retailer 1310 may further utilize site 1334 to distribute receipts stored in transaction data 1355. The receipts distributed at site 1334 may or may not include embedded offers from offer data 1385. Retailer 1310 may rely upon offer distribution system 1352 to provide code and/or templates for presenting offers, or site 1334 may arrange its own presentations of offers and/or receipts.

Consumers interact with the retailer 1310 for various purposes at site 1334, terminals 1340, or online store 1332. The interactions may involve a consumer device 1305 that functions, among other purposes, as an endpoint for receiving offers. Or, the consumers may interact directly with terminals 1340, or personnel operating terminals 1340.

As depicted in FIG. 13B, system 1300 comprises an offer distribution system 1352. The offer distribution system 1352 is a set of one or more server computing devices and data repositories that implement the depicted components. For example, the offer distribution system may further comprise offer server 1380 and receipt server 1370 illustrated in the embodiment of FIG. 13A. The server computer devices may be co-located in a single data center, or the components may be distributed across multiple locations. In either case, the offer distribution system 1352 may be operated under the control of an offer distributor that is different from a retailer 1310 or provider 1395. Offer distribution system 1352 comprises, among other elements, transaction data 1355, offer data 1385, user data 1358, product data 1354, and offer activation data 1386.

Retailer 1310 uses various interfaces of offer distribution system 1352 to distribute offers and receipts, upload transaction data, and redeem activated offers. These interfaces include a receipt interface 1371 to receipt server 1370, a transaction interface 1361 to transaction data 1355, an offer distribution interface 1381 to offer data 1385, a consumer resolution interface 1357 to user data 1358, a product data interface 1353 to product data 1354, and an activation/redemption interface 1387 to activation data 1386. The interfaces may comprise any suitable combination of APIs, ports, protocol handlers, server-side logic, and network components.

The retailer 1310 accesses the interfaces of offer distribution system 1352 over a network for various interactions between retailer 1310 and components such as offer server 1380, receipt server 1370, and transaction aggregator 1360. For example, retail data center 1320 and/or other components of retailer 1310 may utilize consumer resolution interface 1357 to upload consumer data collections, resolve the identity of a consumer that is operating a consumer device 1305 or transacting with a terminal 1340, and/or request data associated with a consumer entity. Retail data center 1320 may further upload product data for offer distribution systems 1352's records through product data interface 1353. Retail data center 1320 may further upload transaction data through transaction interface 1361. Retail data center 1320 may communicate through offer distribution interface 1381 to learn offer terms. Retail data center 1320 may communicate through activation/redemption interface 1387 to identify offers for which a consumer is eligible and/or to report redeemed offers. Retail site 1334 or other components of retail data center 1320 may communicate via receipt interface 1371 and offer distribution interface 1381 to obtain receipts and offers respectively. Offer distribution system 1352 may feature yet other interfaces for other purposes. Other example interactions are described through this application.

Again, system 1300 is but one example of system for practicing the techniques described herein. Other systems may include additional or fewer elements in potentially varying arrangements. For example, the offer distribution system 1352 may not necessarily comprise components of transaction aggregation system 1350. As another example, some or all of the retailers 1310 may not necessarily utilize the same architecture as depicted in FIG. 13B. For instance, some retailers 1310 may lack a retail site 1334 or online store 1332, while others may lack terminals 1340. As another example, the offer distribution system 1352 need not provide each and every interface depicted in FIG. 13B. Moreover, in some embodiments, FIGS. 13A and 13B are actually views of different systems. Also, the logical division of functions between the interfaces described above need not be exactly the same as depicted.

Variations

System 1300 is but one example system for providing offers based on cross-retailer transactional data. Other systems may involve fewer, additional, and/or different elements in potentially varying arrangements. For example, other systems may involve many more retailers 1310 having many more stores 1330 and/or additional online stores 1332. Additional consumers 1305 may access offer server 1380 and/or receipt server 1370 with additional devices. As another example, in an embodiment, payment terminals 1340 are configured to communicate directly with transaction aggregator 1360 over a wide area network. For instance, payment terminals 1340 may be specialized terminals deployed by, and potentially even subsidized by, the operator of transaction aggregation system 1350. In an embodiment, some or all retailers 1310 may not have a retail data center 1320. Rather, individual stores 1330 and/or 1332 communicate directly with transaction aggregation system 1350.

In an embodiment, offer server 1380 communicates with retailer data centers 1320 to recommend offers that retailers 1310 may make available to certain consumers. For example, retailers 1310 may deploy informational kiosks throughout a store with which consumers may interact. Retailers 1310 may send information collected from consumers by these kiosks to offer server 1380, which in turn may then provide offer data describing one or more recommended offers to the kiosk. The offer data may then be displayed at the kiosk. Similarly, recommended offer data may be returned to a store clerk or other employee based on information that the consumer has provided. The employee may then recommend an offer to the consumer. Such a technique could be used for a variety of purposes—for example, offers may be recommended at a checkout stand to encourage additional purchases, or an offer may be suggested by a salesperson to "close" a deal on an item that the consumer appears hesitant to purchase. Similar techniques may also be used to recommend offers on a store website.

In an embodiment, retailers 1310 or another entity, such as a payment system, may include a website that delivers receipts and/or offers to consumer devices 1305. For example, the website may include a receipt generation application that retrieves receipt data from receipt server 1370 via a suitable API, and then formats the receipt data to fit a retailer-specific template. Similarly, the website may include an offer provision application that requests offer data for certain consumers from offer server 1380, and then reformats those offers to be embedded within a retailer's website. Offers from offer server 1380 may co-exist within such a website along with offers from other sources, including retailer-specific offers that are not distributed by offer server 1380. In an embodiment, similar levels of customization may be achieved by a retailer or other entity providing receipt server 1370 or offer server 1380 with template data that instructs the receipt server 1370 or offer server 1380 how to present receipts and offers that are specific to that entity.

2.2. Architecture for Reporting of Transaction Data by Payment Provider

Figure 14:
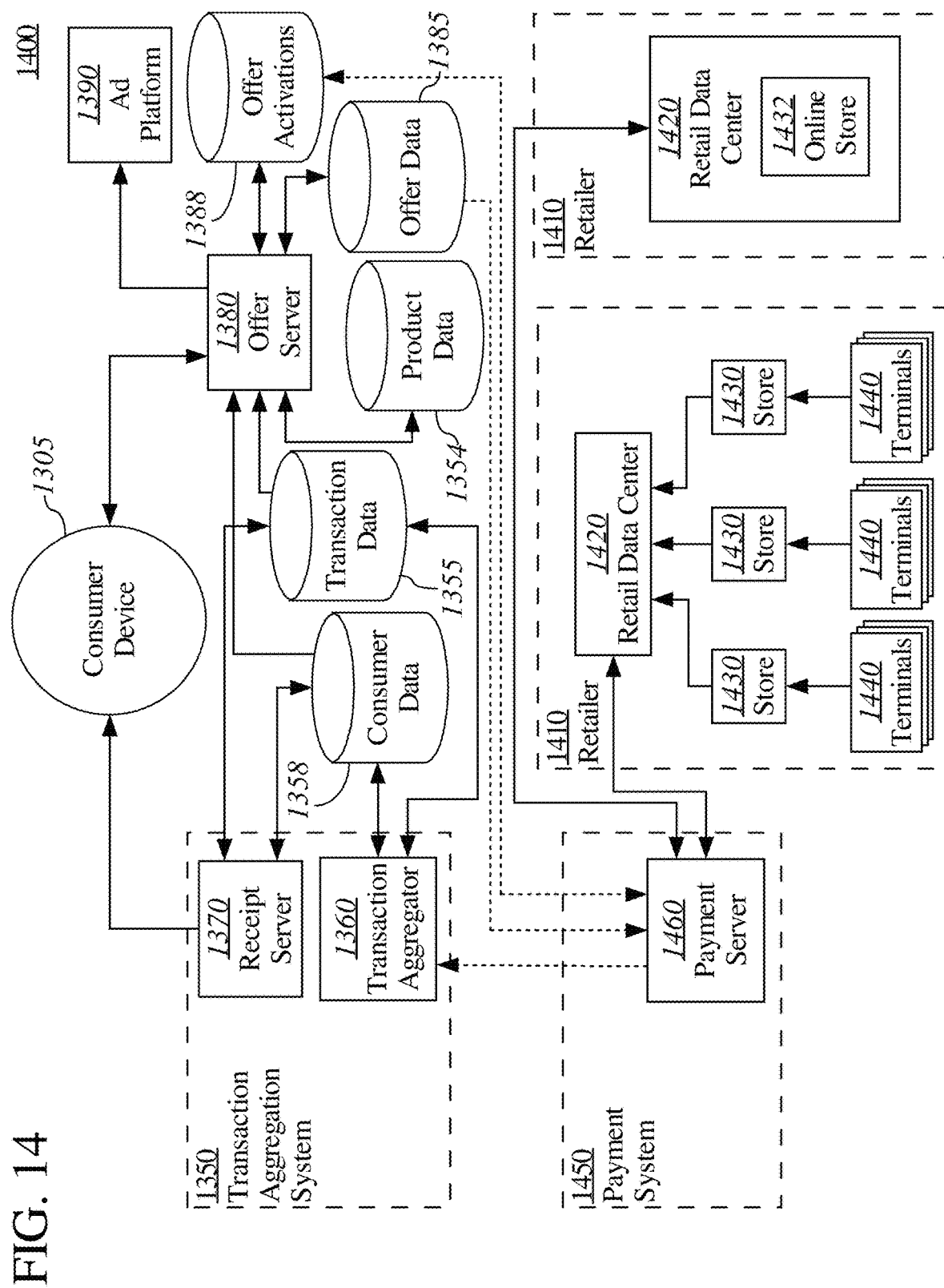
FIG. 14 illustrates a system for providing offers based on transactional data gathered by a payment system from multiple different retailers, in accordance with an embodiment.

FIG. 14 illustrates a system 1400 for providing offers based on transactional data gathered by a payment system 1450 from multiple different retailers 1410, according to an embodiment. System 1400 comprises many of the same components as system 1300. However, while system 1400 may certainly also be utilized by the retailers 1310 of FIG. 13A, FIG. 14 depicts retailers 1410 instead of retailers 1310. Retailers 1410 are similar to retailers 1310, in that they may deploy retail data centers 1420, stores 1430, online stores 1432, and/or terminals 1440. However, retailers 1410 do not communicate directly with transaction aggregation system 1350. Rather, retailers 1410 communicate only with payment server 1460 of payment system 1450.

Payment system 1450 may be a system of one or more server-based computing systems that execute services for authorizing and processing payments to retailers 1410 for transactions between retailers 1410 and consumers. Payment system 1450 may be operated by a third-party payment During transactions with consumers at stores 1430 or 1432, consumers may attempt to pay by credit card, debit card, or other electronic payment mechanism. Terminals 1440 or online stores 1432 are configured to receive input from a consumer identifying the payment mechanism. The input may include credentials such as a credit card number and verification code, a phone number and personal identification number (PIN), information collected from a magnetically swiped credit card, information collected from a NFC transmitter on the consumer's device 1305, and so forth. Along with transaction data such as described with respect to system 1300, the credentials are transmitted over an appropriate communications network to payment server 1460. The credentials may be transmitted by any of terminals 1440, store 1430, or retail data center 1430, depending on the embodiment. The payment server 1460 authenticates the credentials and then determines whether an account associated with the credentials has sufficient funds or credit for the transaction indicated by the transmitted transaction details. The payment server 1460 returns data to retailer 1410 indicating whether the transaction is authorized. If the transaction is authorized, payment server 1460 also takes steps to transfer appropriate payment to retailer 1410, bill the consumer account corresponding to the credentials, and so forth.

System 1400 may include a number of different payment systems 1450, each configured to authorize and process payments using different payment mechanisms. For example, system 1400 may include payment systems 1450 from different credit and/or debit card processors, online payment processors, banks, retailers, and so forth. Transactions in system 1300 of FIG. 13A may likewise have involved one or more payment systems that, like payment system 1450, are configured to authorize and process payments. However, payment system 1450 is additionally configured as an intermediary between retailers 1410 and transaction aggregation system 1350 and/or offer server 1380.

In an embodiment, payment system 1450 collects basket data from the transactions conducted by retailers 1410. Whereas conventional payment systems are typically ambivalent as to the basket-level details of the transactions for which they process payments, the various payment authorization protocols and interfaces utilized by payment server 1460 may be configured to allow for the receipt of basket-level details in association with a payment authorization request. Payment system 1450 may then send all of the transaction details for a transaction, including the basket-level details, to transaction aggregation system 1350.

In an embodiment, payment system 1450 additionally facilitates the redemption of offers based on transaction details received from retailer 1410. For example, payment system 1450 may identify a consumer entity associated with a transaction and access offer activation data for that consumer entity. Prior to authorizing and processing payment, payment system 1450 may automatically apply to the transaction any activated offers for items being purchased in the transaction. If payment is authorized, payment system 1450 then returns offer redemption information to the retailer 1410 so that the retailer 1410 may request reimbursement for the redeemed offer and, if necessary, provide the consumer with any additional items to which the consumer may be entitled as a result of redeeming the offer.

In an embodiment, retailer 1410 may receive full payment for a transaction as if no offer had been applied, and payment system 1450 may instead request reimbursement for a redeemed offer itself. In one such embodiment, the retailer may not even be unaware that an offer was redeemed. In another such embodiment, the payment system 1450 may include data indicating both how much the retailer is receiving for the transaction (the transaction total before applying the offer), and how much the consumer actually paid (the transaction total after applying the offer). Thus, the retailer 1410 may indicate to the consumer that an offer was applied, even though retailer 1410 did not apply the offer.

In an embodiment, payment system 1450 does not apply the offer at the time of the transaction. Rather, payment system 1450 subsequently applies the offer by reducing the amount billed to the consumer in a statement, making other adjustments to a statement, and/or providing a reward such as credit card points or additional offers. The payment system 1450 may notify the consumer when the offer has been applied by email, text, or the statement itself. Since the offer is not being redeemed as part of the transaction, payment system 1450 may thus delay application of an offer until an arbitrary time after conclusion of the transaction. For example, the payment system 1450 may periodically analyze transactions to determine whether any offers should be applied. Or, payment system 1450 may allow an issuing bank, offer provider, or other third-party to analyze transactions and inform payment system 1450 when an offer should be applied.

In an embodiment, payment system 1450 may be configured only to collect transaction details. If offers from offer server 1380 are to be applied to a transaction, a retailer 1410 is configured to access offer data independently of payment server 1450. In an embodiment, the reverse is true. That is, payment system 1450 is configured only to apply offers from offer server 1380, and retailers 1410 communicate transaction details to transaction aggregation system separately from payment system 1450. In an embodiment, both payment system 1450 and retailers 1410 may be configured to apply offers from offer server 1380. For example, certain types of offer may be applied at the time of a transaction by retail data center 1420, while other types of offers may subsequently be applied to a credit card statement by payment system 1450.

In an embodiment, payment system 1450 does not receive basket data from retailers 1410. Payment system 1450 may still be configured to report aggregate transaction details to transaction aggregation system 1350 and/or apply offers from offer server 1380 that are conditioned upon aggregate transaction details rather than basket-level transaction details.

In an embodiment, mobile payment techniques may be employed by the consumer. Such techniques may involve the consumer device 1305 communicating certain credentials and/or transaction details to the payment system 1450. The consumer device 1305 may also interact with terminals 1440. In an embodiment, consumer device 1305 may provide payment server 1460 or terminals 1440 an indication of which activated offers the consumer wishes to apply to a transaction. For example, the consumer device 1305 may include a mobile payment application that interfaces with offer server 1380, from which the consumer may select digital offers that the consumer wishes to apply the transaction.

In an embodiment, transaction aggregation system 1350 may in fact be part of payment system 1450. In an embodiment, offer server 1380 may be configured to access data from transaction data stores 1350 and/or multiple consumer data stores 1358 from multiple transaction aggregation systems 1350. Offer server 1380 may further be configured to cache copies of this data locally. In an embodiment, a receipt server 1370 may be part of the payment system 1450, instead of or in addition to transaction aggregation system 1350.

In some embodiments, systems 1300 and 1400 may in fact be the same system, having different retailers 1310 and 1410 for which transaction data is collected and/or offers are redeemed in different manners. Thus, the collection of transaction data as described herein is not limited to any specific technique, but rather may take varying forms depending on the specific embodiment. Similarly, the process of applying and redeeming an offer may occur in a variety of ways depending on the specific embodiment. For simplification, the techniques described herein will often describe the sending of transactional data or the application of an offer as being performed by the retailer. However, unless otherwise noted, these techniques are equally applicable when the transactional data is sent by the payment provider or other third party, and/or when an offer is applied by a payment provider or other third party.

2.3. Consumer Entity Resolution Architecture

Figure 34:
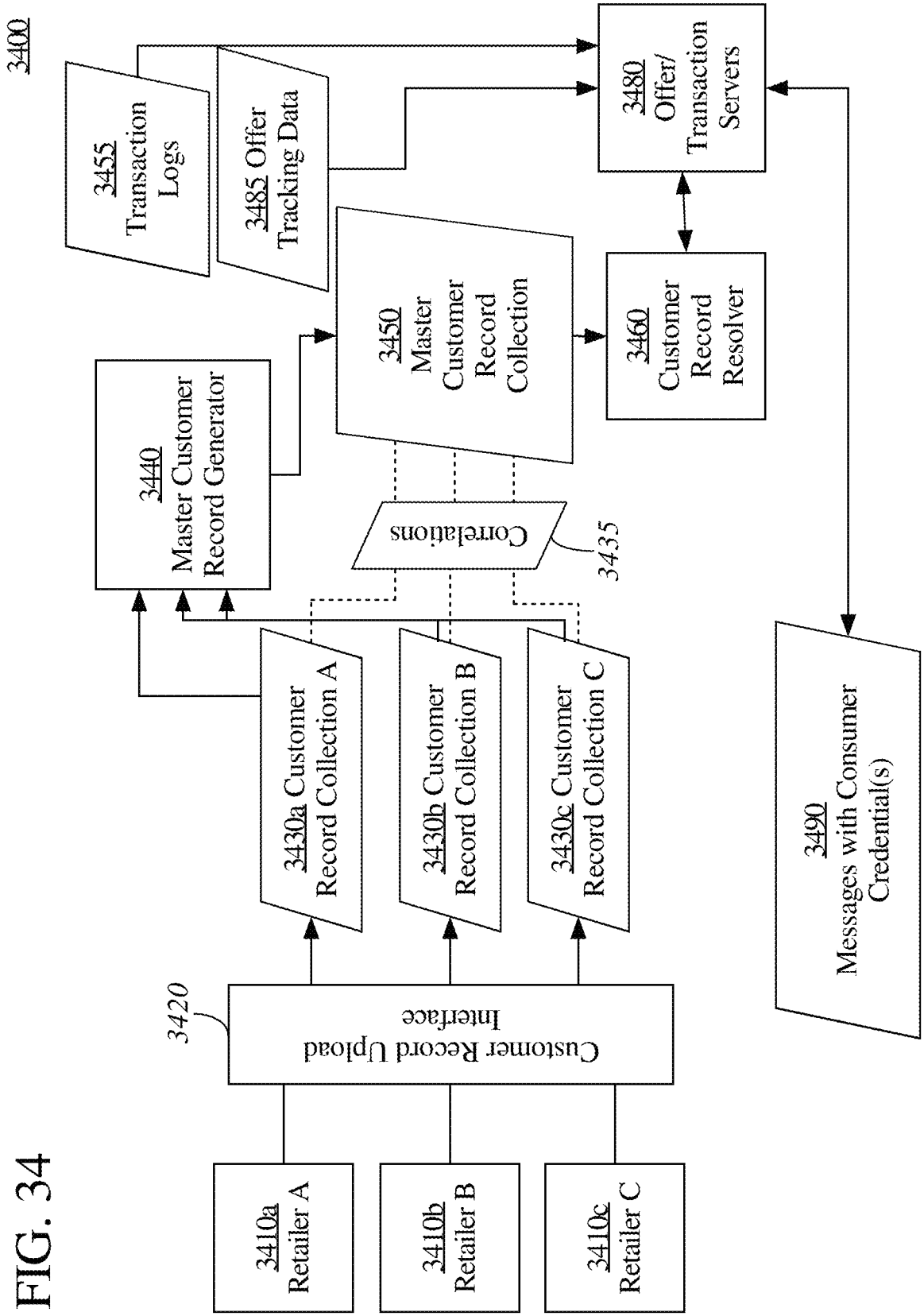
FIG. 34 illustrates a system for distinguishing between consumers to resolve consumers to unique consumer identities that span records from multiple sources, in accordance with an embodiment.

FIG. 34 illustrates a system 3400 for distinguishing between consumers to resolve consumers to unique consumer identities that span records from multiple sources, according to an embodiment. System 3400 is but one example of a system for differentiating between consumers and mapping different consumers to unique identities. Other systems may include additional or fewer elements in potentially varying arrangements.

The embodiment illustrated in FIG. 34 shows entities 3410*a-c*, such as retailers 1310 or other suitable sources of consumer data as described herein. Retailers 3410*a-c* maintain, produce and/or transmit customer record collections 3430*a-c*, respectively. Each customer record collection comprises a set of customer records. Each customer record collection comprises a set of data fields, including one or more fields for customer identifiers or other credentials. In one embodiment, each data field of a customer record collection applies to each customer record in that collection. In one embodiment, one or more customer records in a collection may not have a particular data field otherwise present in that collection. The fields of data may also include a variety of other data, such as demographic information. The retailers 3410 upload a set of consumer records, such as the record collections 3430, or portions thereof, to an offer server and/or a transaction server via a customer record upload interface 3420 of system 3400. In some embodiments, the customer record upload interface 3420 may require that the collections 3430 be converted to a certain format before upload. In other embodiments, a customer record normalization component may perform any needed conversions after the upload.

In general, a data field used in a consumer record collection may include any type of information that directly or indirectly relates to the consumer. Examples of such information that could be stored in a memory and associated with a consumer record or data field include including biographical data, past transactions, past offers activated or redeemed, relationships with other consumers, and so on. In general, a data field used in a consumer record collection may include any of the historical transaction records discussed in connection with the embodiment of FIG. 13A, to the extent such historical transaction records relate directly or indirectly to consumers or transactions conducted by consumers, and any other similar types of information.

System 3400 further comprises a master customer record generator 3440 that analyzes the sets of customer records for correlations 3435 between customer records, using any suitable technique. For example, records having certain common values for certain similar fields may be correlated. More complicated correlations 3435 are described in subsequent sections. The master customer record generator 3440 uses the correlations to create a refined set of customer records, denoted as master customer record collection 3450. In one embodiment, in master customer record collection 3450 there is a single master record for each correlation 3435 that is linked to the correlation 3435 and source records from which it was derived. Each master customer record comprises a value for each field in the customer records of collections 3430. For fields that are similar between collections, a master customer record may only have one field. If the values of the similar field are different between correlated records in different collections, trust scores and/or confidence scores associated with the fields and/or collections, as described herein, are used to select the value(s) associated with the master customer record. Master customer records may also be generated for customer records in collections 3430 that were not correlated. Collections 3430 may be updated and/or re-uploaded over time. Consequently, the master customer record generator 3440 may update correlations 3435 and master customer record collection 3450 in response to any changes in collections 3430.

System 3400 further comprises a customer record resolver 3460 that analyzes the master customer record collection 3450 to match credentials to particular master customer records. The customer record resolver 3460 may do so at the request of, among other components, servers 3480, such as offer servers or transaction servers. The servers 3480 may obtain the credentials from messages 3490 that contain or are associated with credentials. A variety of such messages are described herein, including requests for offer recommendations or targeted offers, requests to access activated offers for a consumer, transaction logs, event logs, and so forth.

By matching a master customer record to a set of customer contextual data (e.g., user credentials), the customer record resolver 3460 may determine a consumer entity that is associated with a message 3490. The customer record resolver 3460 identifies this entity to servers 3480, and servers 3480 then access information associated with the entity, such as values from fields of the master customer record, transaction data aggregated from transaction logs 3455 that have also been resolved to the same customer entity, and/or offer activation data and other information from offer tracking data 3485 that is associated with the same customer entity. The servers 3480 may then take action upon the message 3490 based on the data associated with the entity.

In various embodiments, a logic module, such as the customer record resolver 3460, compares a set of customer contextual data received from a remote source (e.g., from a retailer) or retrieved from a memory (e.g., from a database) against one or more of the master customer records stored in the master collection of customer records to uniquely identify the respective consumer. In one embodiment, the customer contextual data is received as part of a message 3490. Examples of suitable customer contextual data that may be used to facilitate identification of customer identities were discussed in connection with other embodiments, including, including, for example, the contextual transaction data 1345 discussed in connection with the embodiment of FIG. 13. In various embodiments, such suitable customer contextual data may include basket-level transaction details such as universal product codes and quantities purchased (e.g., an older male consumer may tend to purchase different types of products than a younger female consumer), total number of items purchased, transaction amounts, payment details (e.g., a credit card number, a payment identifier, a secure payment hash key), information about a data processing system, logic module or facility where the transaction takes place, time, date, offers applied during the transactions, other information relating to the customer conducting the transaction (e.g., a name, a phone number, a pin number, a password, a code, a loyalty card number, other biometric or personal identification data, etc.), RFID data, a device identifier, items that were purchased in a previous or concurrent transaction, a transaction number, and other similar types of information.

Figure 21:
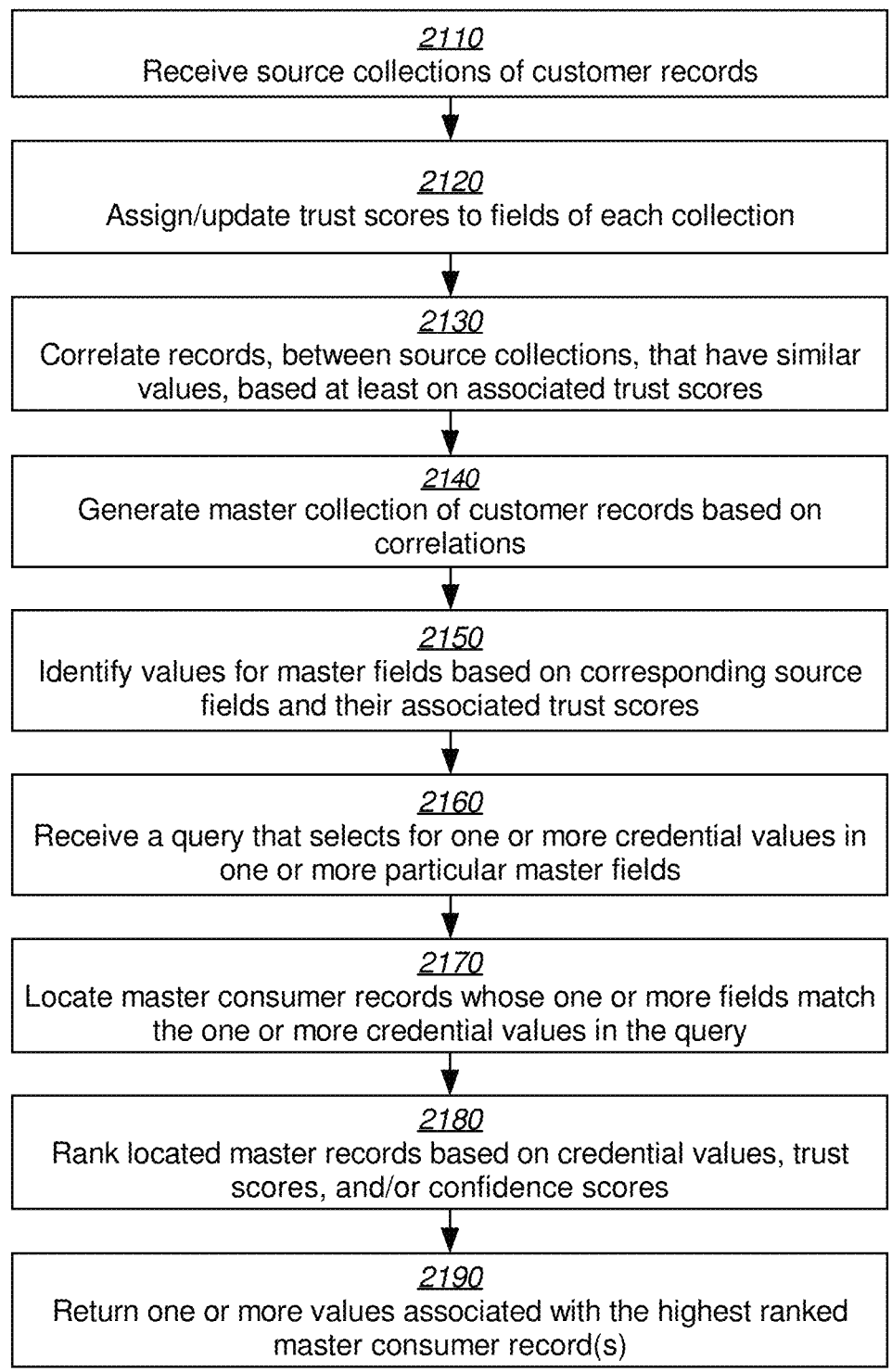
FIG. 21 illustrates an example flow of storing and accessing consumer records for differentiating between consumers by resolving credentials to consumer entities, in accordance with an embodiment.

Additional examples of the functionality and operation of embodiments similar to the embodiment of FIG. 34 are provided in connection with FIG. 21.

2.4. Offer Definition Architecture

Figure 15:
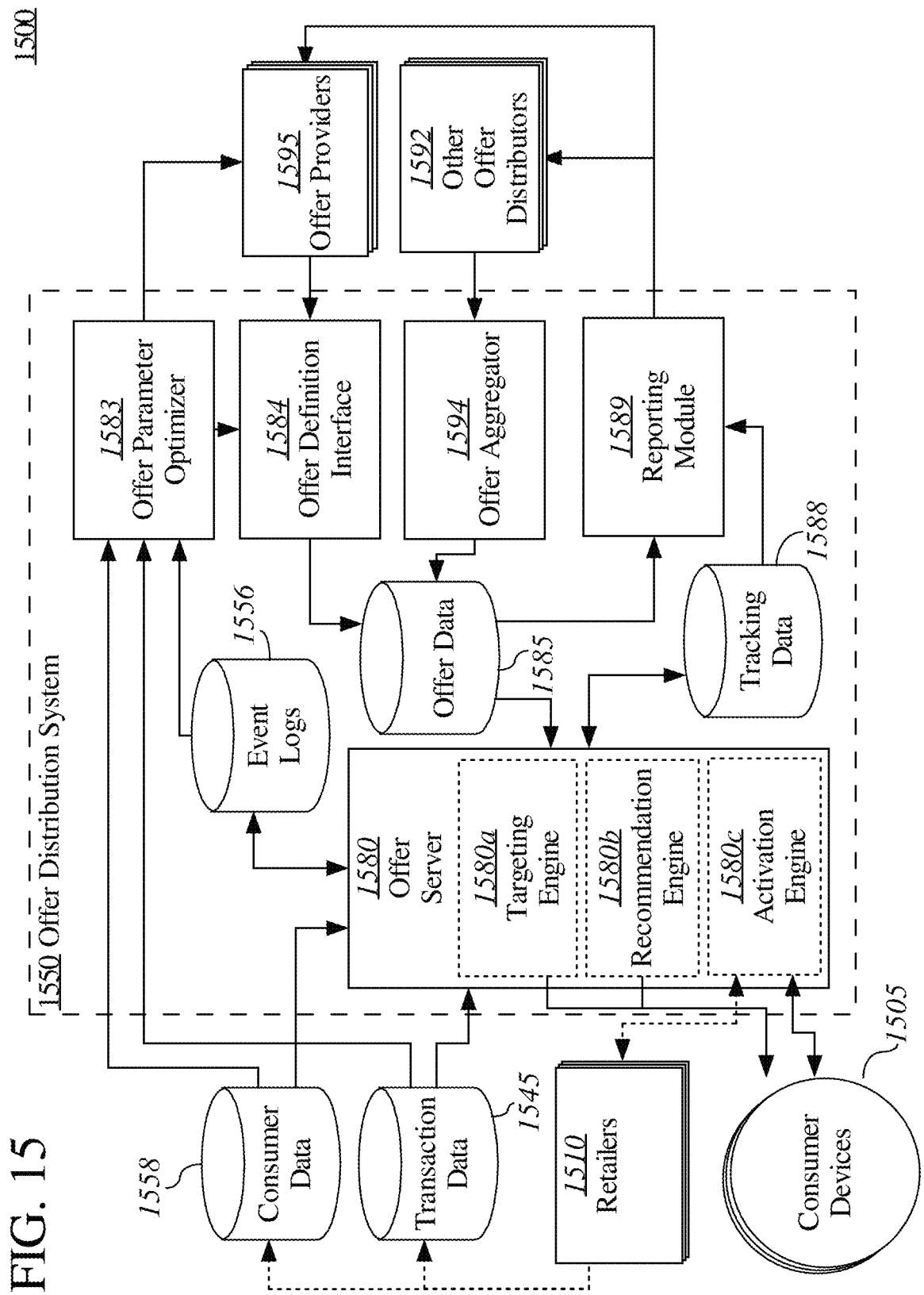
FIG. 15 illustrates an example system for defining offers, in accordance with an embodiment.

FIG. 15 illustrates an example system 1500 for defining offers, according to an embodiment. Other systems may include fewer or different components in varying arrangements. In an embodiment, other techniques described herein may be practiced with any suitable offer definition system. In an embodiment, system 1500 is the same system as system 1300 and/or system 1400. In other embodiments, system 1500 is different from system 1300 and/or system 1400.

System 1500 comprises an offer distribution system 1550 operated by an offer distributor. Offer distribution system 1550 is a system of one or more computing devices that, among other aspects, facilitate the creation of offer data as described herein, and further facilitate the distribution of offers based upon that offer data. System 1500 is but one example of a system for creating offer data for use in the other techniques described herein.

Offer Definition Interface

Offer distribution system comprises an offer definition interface component 1584, also known as an offer creation interface, with which offer providers 1595 may communicate over one or more networks. Offer definition interface component 1584 presents an interface comprising controls by which offer providers may create and edit offer data defining offers that offer providers 1595 wish to provide to consumers operating consumer devices 1505. The controls presented by offer definition interface 1584 allow offer providers 1595 to define any of a number of offer parameters, including an offer title, an offer description, offer terms, and so forth. Offer definition interface 1584 may be a web interface hosted by a web server, an API accessed by a thick-client, interface for receiving and processing data feeds, or any other suitable interface.

In one embodiment, offer definition interface 1584 is a simple interface in which an offer provider inputs a title, description, a set of UPC codes or family codes, an expiration date, distribution limits, and an optional list of eligible retailers. In some embodiments, offer definition interface 1584 may support the creation of offers having terms of varying complexity. For example, in one embodiment, offer definition interface 1584 may support the creation of "dynamic" offers, whose terms vary for different consumers or products in accordance with rules or formulas defined through the offer definition interface 1584. In some embodiments, offer definition interface 1584 includes a targeting component that accepts as input one or more triggering contexts or events in response to which the offer should be provided. Optionally, offer definition interface 1584 supports the input of a "bid" indicating how much the offer provider 1595 is willing to compensate the offer distributor for recommending, presenting, and/or activating an offer. In some embodiments, the bid may differ depending on the context in which the offer is presented.

When an offer provider 1595 has finished creating or editing an offer, offer definition interface component 1584 stores the offer in offer data store 1585. Offer data store 1585 may include a repository of records describing the parameters of the offers that are to be or have been distributed by offer distribution system 1550. Offer data store 1585 may be similar to offer data store 1385.

Offer Server

The offer distribution system 1550 further comprises an offer server 1580 which, for example, may be similar to the offer server 1380 described in connection with the embodiment of FIG. 13A. Offer server 1380 comprises one or both of a targeting engine 1580a and a recommendation engine 1580b. Targeting engine 1580a matches targeted offers described in offer data store 1585 to triggering events or contexts, and provides the matching offers to the corresponding consumer devices 1505. Recommendation engine 1580b ranks offers described in offer data store 1585 by various scoring mechanisms, and then recommends the offers to corresponding consumer devices 1505. When targeting engine 1580a and recommendation engine 1580b co-exist in the same offer server 1580, they may provide offers by the same distribution channels, or by separate distribution channels. For example, targeted offers may be provided in one section of a website, while recommended offers may be provided in a different section of the website. Examples of suitable targeting engines 1580a and recommendation engines 1580b are described in subsequent sections. In an embodiment, a universal scoring engine may function as both targeting engines 1580a and recommendation engines 1580b.

Offer server 1550 may further comprise an activation engine 1580c. Activation engine 1580c receives requests from consumer devices 1505 to activate offers. For example, a consumer at consumer device 1505 may see an offer that was recommended by recommendation engine 1580b and click on the offer to issue such a request. Responsive to these requests, activation engine 1580c activates offers, using one of the offer activation techniques described herein. In an embodiment, activation engine 1580c may further be configured to automatically activate certain offers for certain consumers, without the consumers explicitly requesting activation. For example, automatic activation may be triggered by requests from offer providers and/or retailers, or in response to various rules such as described elsewhere in this disclosure. Activation engine 1580c may further communicate information about activated offers to retailers 1510, and/or receive redemption information indicating when an activated offer has been accepted.

Activation engine 1580c may record activations and redemptions in tracking data store 1588, which may be similar to the offer activation store 1388 discussed in connection with the embodiment of FIG. 13A. Offer server 1580 may further store a variety of other offer tracking information in tracking data store 1588, such as the number of times an offer has been presented, which is also referred to herein as the number of offer impressions, or the number of times an offer has been clicked on, which in some embodiments may be different from the number of times an offer has been activated. Offer server 1580 may utilize the tracking data 1588 to derive signals for scoring functions, categorize consumers and/or events for offer targeting, enforce distribution limits, and so forth.

Reporting

Offer distribution system 1550 further comprises a reporting module 1589 that analyzes the tracking data 1588, and optionally other data such as transaction data 1545, and provides reports based thereon to offer providers 1595. For example, reporting module 1589 may periodically deliver reports indicating how many times certain offers have been viewed, activated, or redeemed. As another example, offer providers 1595 may log into reporting module 1589 and utilize a web-based interface to drill-down into aggregated transaction information that has been correlated with activations or redemptions of certain offers. Reporting module 1589 may also provide reports derived from transaction data or any logged events. In an embodiment, since the transaction data, offer data, and events can be correlated to specific consumers having known characteristics, reporting module 1589 may feature various controls for allowing offer providers 1595 to generate customized reports for provider-defined consumer segmentations of both macro-level and micro-level granularity. Performance of products and offers may be graphed for various time periods with respect to various consumer groupings and/or locations, to allow for quick comparison.

Data Stores

System 1500 may further comprise a transaction data store 1545 and a consumer data store 1558, either of which may be stored internal or external to offer distribution system 1150, depending on the embodiment. Transaction data store 1545 comprises transaction records from transactions conducted by multiple retailers 1510. Consumer data 1558 comprises consumer records populated by account data and other information received from retailers 1510, and/or data collected from other entities, including public records, personal data providers, or even consumers themselves. Transaction data store 1350 and consumer data store 1358 are examples of transaction data store 1545 and consumer data store 1558, respectively.

Offer distribution system 1550 may further comprise any number of event logs 1556. Event logs 1556 may record any of a variety of events that were logged by offer distribution system 1550, or submitted to offer distribution system 1550, including without limitation web-related requests, location tracking data, shopping list changes, device interactions, and notifications of inventory changes by refrigerators and other personal inventory tracking mechanisms. The events may further include transaction events, as well as offer impressions, activations, or redemptions. Hence, event logs 1556 may actually comprise transaction data store 1545 and tracking data 1588, or a copy of at least a subset thereof. Event logs 1556 record events that were potentially performed by consumers described in consumer data 1558. Based on identifiers recorded within the event records, offer distribution system 1550 may attempt to resolve the recorded events to specific consumer entities descried in consumer data 1558. Targeting engine 1580a may then use event logs 1556 to recognize when a consumer matches a target associated with an offer. Recommendation engine 1580b may then utilize event logs 1556 to derive signals for scoring functions.

External Offer Aggregator

Offer distribution system 1550 may comprise an offer aggregator 1594 that imports certain offers from other offer distributors 1592. For example, offer aggregator 1594 may receive submissions from or monitor feeds, from other offer distributors 1592, that describe offers being distributed at those systems. Or, offer aggregator may data mine or "screen-scrape" offer distribution websites for other offers. The offer information from these sources may then be translated into structures suitable for storage in offer data store 1585. In an embodiment, offer distribution system 1550 may then distribute some or all of these imported offers. Optionally, offer distribution system 1550 may even report distributions back to the other offer distributors 1592. In an embodiment, offer distribution system 1550 does not distribute some or all of the imported offers, but rather simply utilizes the offer information from these sources as a comparison point for offers created by offer providers 1595 and/or to interpret transaction data 1545.

For example, offer distribution system 1550 may recognize in certain transactions a redeemed offer that had been distributed by another offer distributor 1592. The offer distribution system 1550 may be configured with logic for gauging the effectiveness of the imported offer. The offer distribution system 1550 may further use the information for purposes such as suggesting offers for offer providers 1595 and/or determining whether to recommend future offers that are similar to the imported offer to a particular consumer device 1505. In an embodiment, offer distribution system 1550 may be configured to learn about outside offers from transaction data 1545 rather than importing directly from other offer distributors 1592.

Offer Parameter Optimizer

Offer distribution system 1550 may comprise an offer parameter optimizer 1583 that proposes parameters for possible offers that offer providers 1595 may wish to provide. For example, in an embodiment, an offer provider 1595 may log into offer definition interface 1584 and select an option to create a new offer. As the offer provider enters various parameters of the offer, such as identifiers of items eligible for the offer, the offer definition interface may query the offer parameter optimizer 1583 for suggested or default parameters based on what the offer provider has entered so far. For example, offer parameter optimizer 1583 may suggest a discount amount, regions in which the offer should be provided, a timeframe for the discount, an amount to compensate the offer distributor for offer impressions or activations, and so forth.

Offer parameter optimizer 1583 may analyze a variety of data sources to suggest offer parameters, including without limitation the transaction data store 1545, the consumer data store 1558, historical offer data 1585, offer activation and redemption tracking logs 1588, web histories, and so forth.

In one embodiment, offer parameter optimizer 1583 may receive, and may analyze, contextual transaction data received directly or indirectly from a retailer or other terminal that is facilitating a consumer electronic transaction, such as the contextual transaction data 1345 discussed in connection with the embodiment of FIG. 13A. In various embodiments, contextual transaction data may include any of a variety of information related to one or more consumer transactions conducted within a facility owned, controlled or operated by a retailer, including without limitation basket-level transaction details such as universal product codes and quantities purchased, total number of items purchased, transaction amounts, payment details (e.g., a credit card number, a payment identifier, a secure payment hash key), information about a data processing system, logic module or facility where the transaction takes place (e.g., terminal 1340 or store 1330), time, date, offers applied during the transactions, information relating to the customer conducting the transaction (e.g., a name, a phone number, a pin number, a password, a code, a loyalty card number, other biometric or personal identification data, etc.), RFID data, a device identifier, items that were purchased in a previous or concurrent transaction, a transaction number, and so forth.

In one embodiment, offer parameter optimizer 1583 may receive, and may analyze, historical transaction records retrieved from a memory or received from a remote retailer or other entity, such as the historical transaction records discussed in connection with the embodiment of FIG. 13A. Historical transaction records may include various classes of information that relate to users, transactions, vendors, payment processing, and any other aspects of electronic or physical commerce. As an example, historical transaction records may be, or may include contextual transaction data that was generated in connection with previous transactions. In various embodiments, historical transaction records may include any of a variety of information related to one or more past consumer transactions conducted within a facility owned, controlled or operated by a retailer, including without limitation basket-level transaction details such as universal product codes and quantities purchased, total number of items purchased, transaction amounts, payment details (e.g., a credit card number, a payment identifier, a secure payment hash key), information about a data processing system, logic module or facility where the transaction takes place (e.g., terminal 1340 or store 1330), time, date, offers applied during the transactions, information relating to the customer who conducted the transaction (e.g., a name, a phone number, a pin number, a password, a code, a loyalty card number, other biometric or personal identification data, etc.), RFID data, a device identifier, items that were purchased in a previous, concurrent or subsequent transaction, a transaction number, and so forth.

Offer parameter optimizer 1583 may be configured to determine or project, based on historical transaction records from these sources, an impact of an offer on sales of certain items, redemption rates, profit per impression (e.g. based on transaction data, click-through rate, offer tracking, etc.), profit margins, and other metrics of interest to the offer provider 1595. Offer parameter optimizer 1583 may use these projections to propose offer parameters to the offer provider 1595. Offer parameter optimizer 1583 may further or instead allow the offer provider 1595 to visualize the projected impact of the offer on these metrics as the offer provider 1595 defines or changes the offer parameters. For example, the offer definition interface 1584 may include graphs, charts, or tables illustrating the projected impacts. In an embodiment, the offer provider 1595 may instruct the offer definition interface 1584 to define an offer that optimizes for certain projected metric(s) or that even meets defined projected metric value(s). The offer definition interface 1584 in turn requests that the offer parameter optimizer 1583 define an offer that is best performing with respect to the metric(s) and/or closest to meeting the projected metric value(s).

In an embodiment, offer parameter optimizer 1583 may proactively suggest new offers that one or more of the offer providers 1595 may wish to create. To achieve this, offer parameter optimizer 1583 may process various historical transaction records, may evaluate various offer data associated with the one or more of the offer providers 1595, and/or may take into consideration contextual transaction data received from consumer transactions that are taking place simultaneously, substantially simultaneously, or took place recently.

Examples of offer data that may be used to suggest an offer include an offer provider identity, a historical or projected impact of the offer on sales of an item, a historical or projected offer redemption rate, a historical or projected profit per offer impression, a historical or projected profit margin, a historical trend in offers made available by the offer provider, and so on. In various embodiments, offer data may include, may be, or may be included in the data stored in offer data 1585.

As another example of offer data that may be used to suggest an offer, offer parameter optimizer 1583 may recognize a trend in how often offer provider 1595 creates an offer for a certain category of items. Around the time frame when the offer provider 1595 is next expected to create an offer for that category of items, offer parameter optimizer 1595 may suggest to offer provider 1595 a new offer with parameters based on the previous offers. As another example, offer parameter optimizer 1583 may periodically analyze the sales of items sold by an offer provider 1595 to identify parameters for possible offers that would be projected to increase sales and/or profits for the offer provider 1595. The projections may, for instance, be based on similar offers for similar categories of items sold by any of offer providers 1595.

New offer(s) may be suggested using a variety of mechanisms, including an email or an alert when the offer provider 1595 logs into the offer definition interface 1584. The offer provider may then create the offer simply by clicking on a button that accepts the suggestion. In an embodiment, the offer parameter optimizer 1583 may be configured to automatically create new offers for an offer provider 1595 without the offer provider 1595 explicitly being involved in generating the offer. For example, an offer provider 1595 may have provided standing instructions to create a new offer each month for a particular item, and pre-authorized the offer distribution system 1550 to dynamically determine certain parameters, within certain constraints. In an embodiment, the offer provider 1595 will be notified of automatically created offers in advance of the offer start date, and thus have an opportunity to remove or modify the offer before it can be distributed by offer distribution system 1550.

2.5. Offer Targeting Architecture

Figure 16:
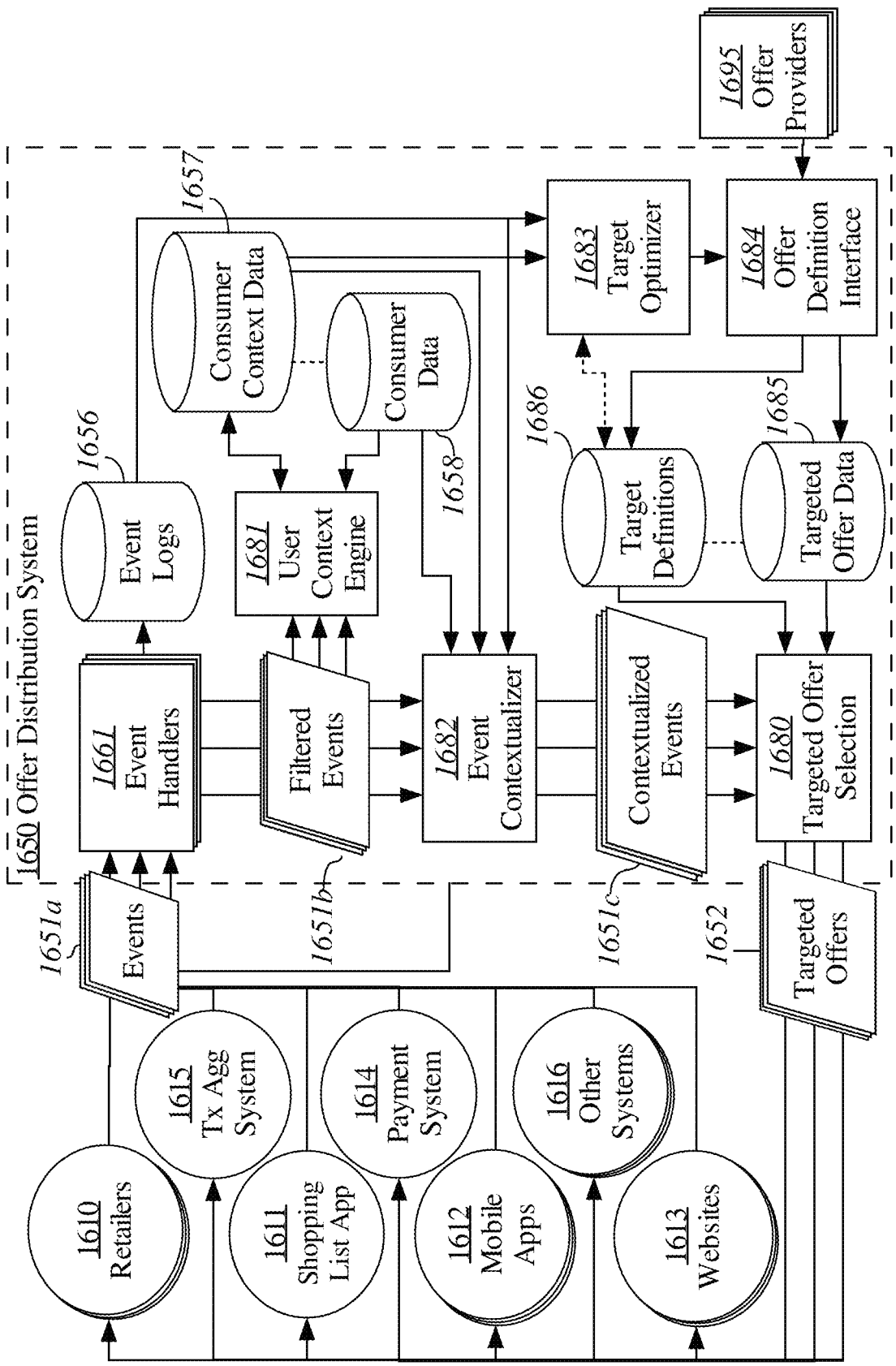
FIG. 16 illustrates an example system for distributing targeted offers, in accordance with an embodiment.

FIG. 16 illustrates an example system 1600 for distributing targeted offers, according to an embodiment. System 1600 is but one example of a system for targeting offers. Other systems may include fewer or different components in varying arrangements. In an embodiment, other techniques described herein may be practiced with any suitable offer targeting system. In an embodiment, system 1600 is similar to systems 1300, 1400, and/or 1500. In other embodiments, system 1600 is different from systems 1300, 1400, and/or 1500.

System 1600 comprises an offer distribution system 1650 operated by an offer distributor. Offer distribution system 1650, which may similar to or different from offer distribution system 1550, is a system of one or more data processing systems that, among other aspects, deliver information about targeted offers 1652 to a variety of endpoints 1610-1616. Each targeted offer 1652 has been matched to a specific consumer or group of consumers in response to the detection of certain events 1651*a-c* that have been correlated to the specific consumer of group of consumers. In an embodiment, events 1651*a-c* may be any arbitrary type of event. The ability to identify a consumer's context based on these arbitrary events renders offer distribution system 1650 more flexible in targeting offers than other targeting systems, which are limited to few targeted context types.

Endpoints 1610-1616 are examples of some of a variety of data processing systems or logic modules that a consumer may use to interact with offer distribution system 1650. Endpoints 1610-1616 may include retail devices 1610 such as terminals 1340 or online stores 1332, devices executing shopping list management applications 1611 or shopping list management servers, smartphones or other consumer devices 1305 that execute mobile applications 1612, application servers 1613 that execute websites such as social networks or media portals, payment servers 1614 such as those of payment system 1450, transaction aggregation devices 1615 such as those of transaction aggregation system 1350, and/or devices within any of a variety of other systems 1616 operated by other entities.

Events 1651 may be data structures that represent any of a variety of consumer actions observed by these devices. Events 1651 may reflect, for example, item purchases, transactions, offer redemptions, offer activations, offer viewing, web requests, shopping list additions, shopping list removals, application access, media consumption, location tracks, messages, social media sharing activities or "likes", and so forth. Each event 1651 may include, among other elements, consumer identifying information such as email addresses or PANs, action identifying information such as an action type or request metadata, contextual information such as a location or time or date, and/or other data as relevant. In one embodiment, events 1651 may be, or may include historical transaction records retrieved from a memory or received from a remote retailer or other entity, such as the historical transaction records discussed in connection with the embodiments of FIG. 13A or FIG. 15. In one embodiment, events 1651 may be, or may include contextual transaction data retrieved from a memory or received from a remote retailer or other entity, such as the contextual transaction data 1345 discussed in connection with the embodiments of FIG. 13A or FIG. 15.

Events 1651 from endpoints 1610-1616 may be communicated as raw events 1651*a* to event handlers 1661 of offer distribution system 1650. Raw events 1651*a* may be proactively pushed to event handlers 1661, polled from endpoints 1610-1616, and are data mined from endpoints 1610-1616. Raw events 1651*a* may be received in real-time or in periodic batches. Raw events 1651*a* may not necessarily have been formulated by the sending endpoint 1610-1616 as an event construct. Instead, events 1651*a* may be web requests or other routine messages from endpoints 1610-1616 that event handlers 1661 interpret as events.

Event handlers 1661 include one or more server components, each of which reacts to certain types of raw events 1651*a*. For example, event handlers 1661 may include any or all of web servers that react to web requests, web log analyzers that react to web logs, messaging servers that react to request to send messages, receipt servers, offer servers, advertisement servers, transaction aggregation systems, payment servers, and so forth. In addition to responding to their respective types of raw events 1651*a*, event handlers 1661 may store event records in event logs 1656. Event handlers 1661 may include normalization components for translating raw events 1651*a* into normalized constructs, aggregators for grouping certain types of events together into an aggregated event comprising multiple raw events 1651*a*, and an event gateway for relaying events to other appropriate event handlers 1661.

In one embodiment, event handlers send an optionally filtered set of events 1651*b* to an event contextualizer 1682. Event contextualizer 1682 may generate contextualized events 1651*c* that include both data describing one or more consumer actions and data describing a context in which those one or more actions occurred. The context may be derived, in part, by correlating a consumer entity to the event using consumer data 1658. In an embodiment, offer distribution system 1650 further includes a consumer context engine 1681 that generates consumer context data 1657 based on filtered events 1651*b*. For example, consumer context data 1657 may record a current consumer's location, recent shopping list items, recent web behaviors, and so forth. Event contextualizer 1682 may utilize the consumer context data 1657 (or communicate with consumer context engine 1681 to obtain suitable context data) when generating contextualized events 1651*c*.

In one embodiment, offer distribution system 1650 further includes an offer definition interface component 1684, also denoted an offer definition interface, which may be similar to or the same as offer definition interface component 1584. Via offer definition interface 1684, offer providers 1695 may generate targeted offers that are stored in targeted offer data store 1685, which may be the same as offer data store 1385 or 1585. These targeted offers are associated by offer associations with targets defined in target definition data 1686. A target may be a data construct that defines a context and/or an event in response to which an offer provider wishes to display an offer.

Offer providers may define their own targets using offer definition interface 1684, and/or may be assisted in defining targets based on an optional target optimizer 1683. Target optimizer 1683, in similar manner to offer parameter optimizer 1583, analyzes a variety of data sources to suggest targets that may be of interest to offer provider 1695. These data sources may include, for example, event logs 1656 (including transaction data) and consumer context data 1657.

In one embodiment, an offer provider, such as offer providers 1695, and an offer distributor, such as an offer distributor operating the offer distribution system 1650, may engage in an express or implied commercial negotiation with respect to the selection and distribution of offers. For example, the offer distribution may have the option to choose to distribute various offers provided by an offer provider and/or may be able to choose to distribute various offers provided by different offer providers. In such cases, the offer distributor may compute different metrics for the various offers available for distribution, and then based on those metrics, may select one or more offers for distribution.

In one embodiment, an offer distributor may analyze various contextual transaction data, historical transaction records and/or offer data associated with two or more offers, and may decide which of those offers to distribute. In one embodiment, an offer distributor receives a set of offer data associated with each offer, such as, for example, an offer provider identity, a historical or projected impact of the offer on sales of an item, a historical or projected offer redemption rate, a historical or projected profit per offer impression, a historical or projected profit margin, a historical or projected offer volume (e.g., the total number of offer activations, offer impressions, offer redemptions and/or products sold), a historical or projected offer yield (e.g., a total profit figure associated with an offer after taking into account the total number of sold products corresponding to that offer, offer activations, offer impressions and/or offer redemptions), a historical trend in offers made available by the offer provider, a historical or projected profit margin for the offer distributor and/or for the offer provider, a historical or projected impact of the offer on other offers, a historical or projected impact of the offer on consumer behavior, etc.

In one embodiment, one or more offer providers may choose to incentivize the offer distributor to influence the offer distributor's selection of offers to be distributed. For example, an offer provider may seek to improve a metric computed by an offer distributor for a particular offer, and therefore make it more probable that the offer provider chooses that particular offer for distribution. For instance, an offer provider may pay the offer distributor more to distribute one or more particular offers.

In one embodiment, one or more other offer distributors may influence a particular offer distributor's selection of offers for distribution. For example, a particular offer distributor may receive commercial incentives from other offer distributors to distribute or not distribute a particular offer, or to distribute a particular offer through a specific distribution channel (e.g., through another offer distributor, to a particular retailer, etc.).

In an embodiment, offer definition interface 1684 further allows an offer provider 1695 to specify a "bid" amount that the offer provider 1695 is willing to compensate the offer distributor for presenting an offer for a particular target. Target optimizer 1683 may analyze contextual transaction data, historical transaction records, offer data (such as the offer data discussed in connection with the embodiment of FIG. 15), and any other transaction data or offer tracking data to suggest an optimal bid for the targeted offer. For example, if an offer provider 1695 sees that an offer is not being presented frequently by the various algorithms of offer distribution system 1650, the offer provider 1695 may request that the target optimizer 1683 run various "what-if" scenarios to determine how much more frequently an offer would be presented with different bids. In one embodiment, the target optimizer 1683 may predict how much more profitable the offer would be at each corresponding bid. In some embodiments, a similar system may be utilized for assisting the offer provider in determining a suitable compensation amount for non-targeted offers presented by a recommendation engine as described herein.

Offer distribution system 1650 further includes a target offer selection component 1680, which may be an offer server 1380 or 1580. In fact, target offer selection component 1680 may be an event handler 1661. Target offer selection component 1680 compares contextualized events 1651*c* to target definitions 1686. It then provides to endpoints 1610-1616 targeted offers 1652 from data store 1685 that are associated with matching targets. In some target offer selection component 1680 may select all offers that match. In other embodiments, target offer selection component 1680 rank the matching offers by any suitable means, and only present the highest ranked offer(s). In an embodiment, an exact match is required. In other embodiments, offers may be ranked by how closely they match a target.

Targeted offers 1652 may be provided to any or all of endpoints 1610-1616. When triggering event 1651 is a direct request for offers from a particular end point, targeted offers 1652 may be provided in response to the direct request. Targeted offers 1652 may also be "pushed" to end points 1610-1616 in response to various triggering events 1651 without endpoints 1610-1616 having directly requested an offer.

In an embodiment, some or all target definitions are agnostic as to events, and merely reflect consumer contexts. Hence, any event 1651 will match the target as long as the context of the event matches the context defined in the target. In other embodiments, offer distribution system may not feature event contextualizer 1682 at all.

In an embodiment, some or all of the event records stored in event logs 1656 may be correlated to consumer entities, aggregated, and/or otherwise contextualized.

2.6. Offer Recommendation Architecture

Figure 17:
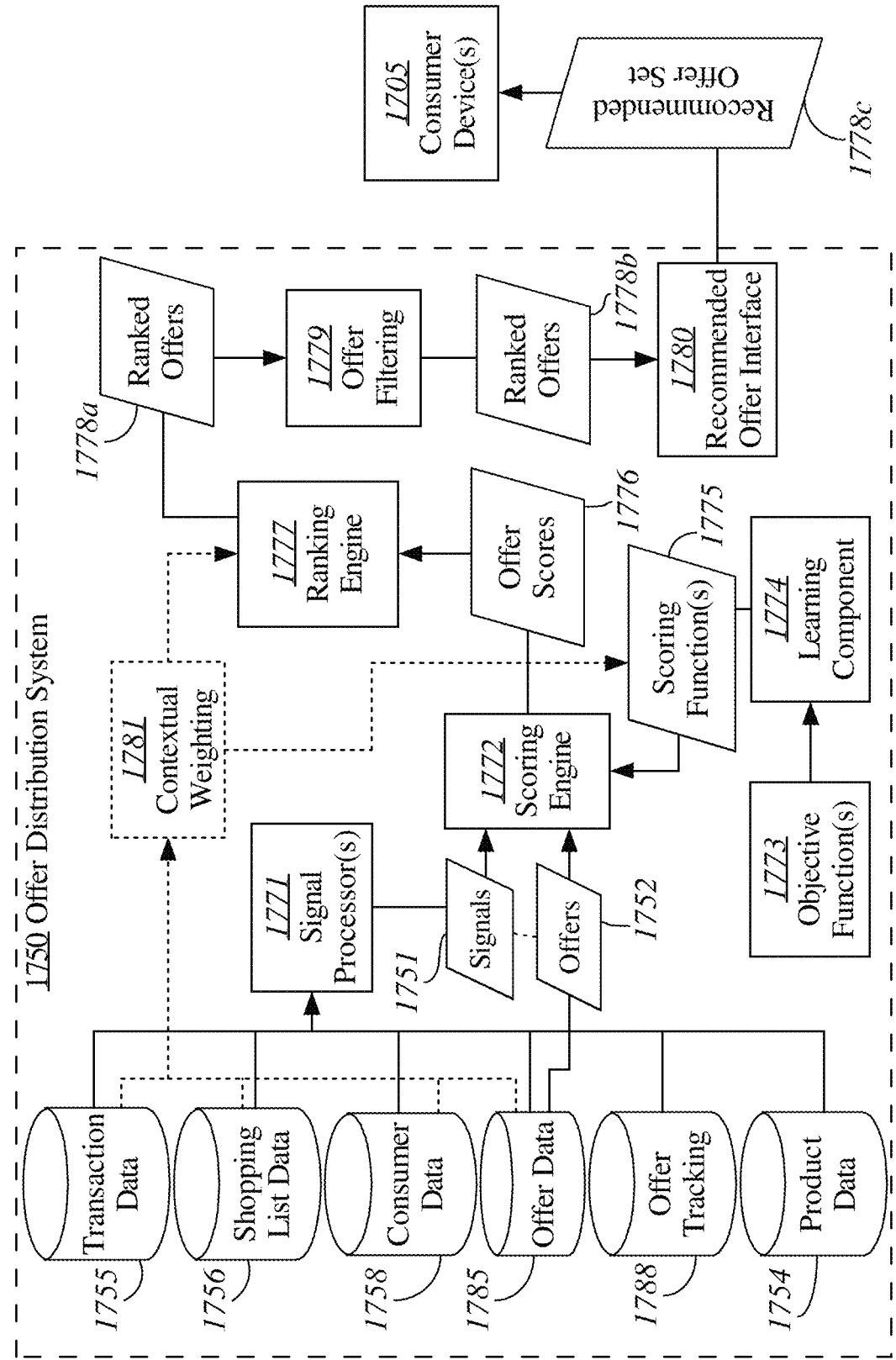
FIG. 17 illustrates an example system for recommending offers, in accordance with an embodiment.

FIG. 17 illustrates an example system 1700 for recommending offers, according to an embodiment. System 1700 is but one example of a system for recommending offers. Other systems may include fewer or different components in varying arrangements. In an embodiment, other techniques described herein may be practiced with any suitable offer targeting system. In an embodiment, system 1700 is the same system as system 1300, 1400, 1500, and/or 1600. In other embodiments, system 1700 is different from systems 1300, 1400, 1500, and/or 1600.

Example system 1700 comprises an offer distribution system 1750, similar to other offer distributions described herein. A signal processor 1771 inputs data from a variety of sources, which, without limitation, may include any or all of transaction data 1755, shopping list data 1756, consumer data 1758, offer data 1785, offer tracking data 1788, or product data 1754. Shopping list data 1756 may be, for example, current or historical lists of items that a consumer has saved using a shopping list server. Signal processor 1771 generates signals 1751 based on these data sources. The signals 1751 and associated offer data 1752 are fed to a scoring engine 1772.

Scoring engine 1772 executes one or more scoring functions 1775. For example one type of scoring function 1775 utilizes the input signals to generate various association score(s) between various context items and the offer being scored. The association score(s) are then used, along with various weights, to generate offer score(s) 1776 for each offer. These scoring functions 1775 may have been derived in full or in part manually, or may have been learned by a learning component 1774 using any suitable machine learning techniques. The scoring functions may be optimized for different objective functions, also referred to herein as key performance indexes (KPIs). Different objective functions may be suitable for different recommendation contexts. Hence, different scoring functions 1775 may be executed by scoring engine 1772 for different recommendation contexts.

The scores may optionally be weighted by a contextual weighting component 1781. Contextual weighting component 1781 may assign different weights depending on the recommendation context. The offer scores 1776 are used to compute universal scores and ranked offer sets 1778a for the offers by universal scoring and ranking component 1777. Optionally, the ranked offers 1778a may be filtered by an offer filtering component 1779, which executes business rules. The optionally filtered set of ranked offers 1778b is then fed to a recommended offer interface 1780, which may be the same as, for instance, offer servers 1380 and 1580. Recommended offer interface 1780 provides some or all of these recommended offers as recommended offer set 1778c to consumer devices 1705. Recommended offer set 1778c may be provided directly via interface 1780, or indirectly by one or more intermediate websites or other servers.

While targeted offers and recommended offers are described in the above examples as being delivered separately to consumer devices, offer distribution system 1750 may also be modified to include targeted offers in a ranked offer set 1778a. In such an offer set, a universal score is assigned to each targeted offer based on factors such as an offer provider's bid and so forth. The targeted offer(s) may then be ranked along with the recommended offers. In an embodiment, the highest ranked targeted offer(s) are always presented first (i.e. assigned an arbitrarily high universal score). However, this is not the case in other embodiments.

2.7. Integrated Recommendation and Targeting Architecture

Figure 31:
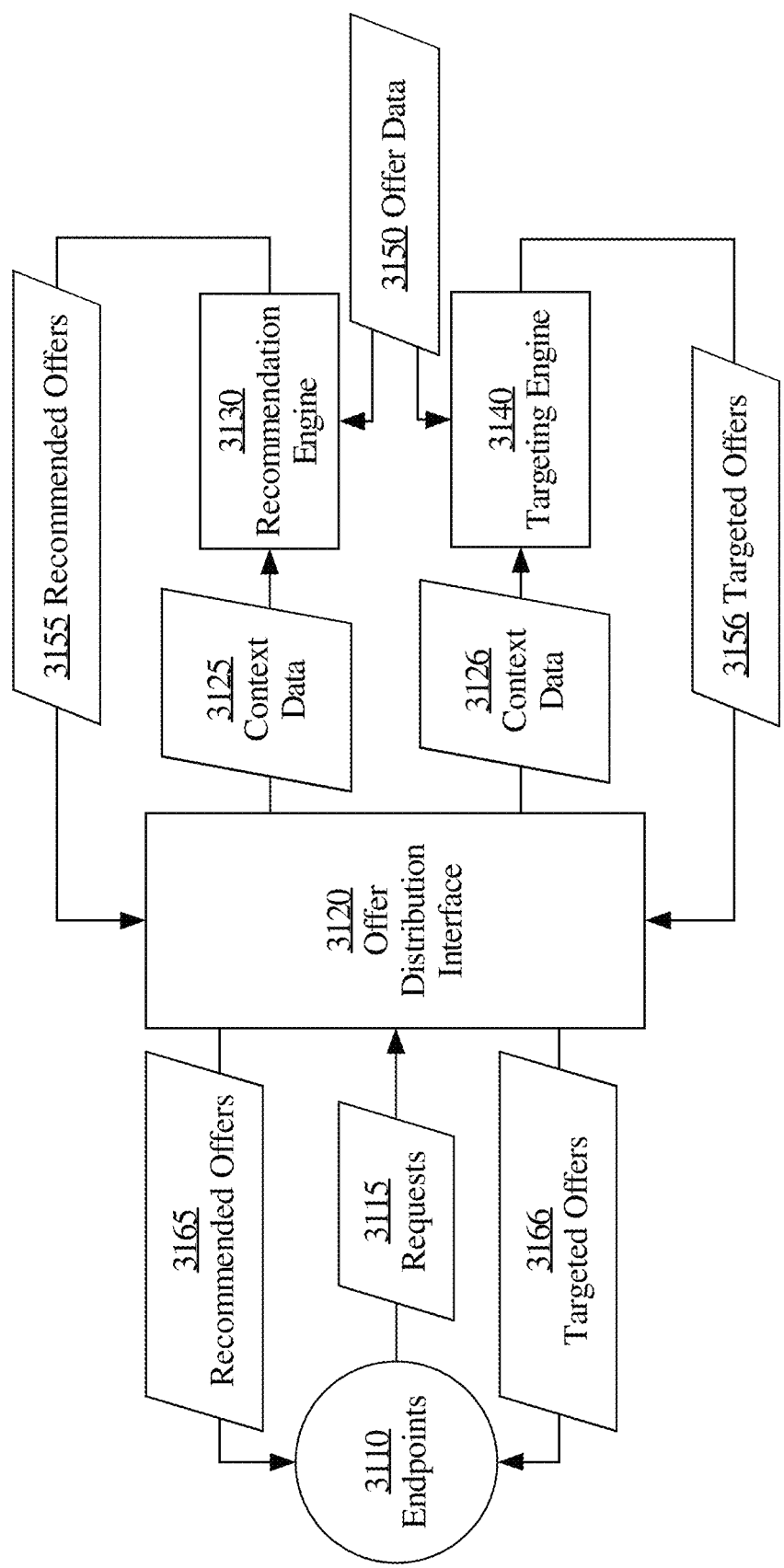
FIG. 31 illustrates a system for integrating offer recommendations and targeted offers, in accordance with an embodiment.

FIG. 31 illustrates a system 3100 for integrating offer recommendations and targeted offers, according to an embodiment. System 3100 is but one example of a system for integrating offer recommendations and targeted offers. Other systems may include additional or fewer elements in potentially varying arrangements.

System 3100 comprises endpoints 3110, including smartphones, personal computers, retailer terminals, ATMs, microsites, and other endpoints described herein. Endpoints 3110 send requests 3115 to an offer distribution interface 3120. For example, a suitable offer distribution interface 3120 may be provided by an offer server or receipt server. Context data 3125 and 3126, such as credentials, associated items, location data, and other contextual data described herein, are located in or derived from data associated with the requests 3115. Context data 3125 and 3126 may be overlapping or even the same sets of data, or context data 3125 and 3126 may be different sets of data selected specifically for making recommendations and for targeting offers, respectively.

System 3100 comprises a recommendation engine 3130 to which context data 3125 is sent. Based at least on context data 3125 that can be resolved to a particular consumer entity, which may or may not span multiple requests 3115, the recommendation engine 3130 derives various signals and/or weights for various ranking algorithms. For example, context data 3125 indicating historical trends for a consumer may be used to generate one signal, while a recent set of context data for the consumer may be used to generate another signal. The recommendation engine 3130 applies the ranking algorithms to a repository of offer data 3150 to select sets of recommended offers 3155 from a plurality of offers described in a repository of offer data 3150 in system 3100.

System 3100 also comprises a targeting engine 3140 to which context data 3126 is sent. The offer data 3150 includes data associating certain offers with certain predefined target contexts. The targeting engine 3140 determines whether context data that can be resolved to a particular consumer entity matches any of the target contexts, using techniques such as described herein. When any of the target contexts are matched, one or more offers associated with the matched target context(s) are selected from the plurality of offers described in the offer data 3150. The selected offers are targeted offers 3156.

Recommended offers 3155 and targeted offers 3156 are identified to the offer distribution interface 3120. Based thereon, the offer distribution interface 3120 may then generate recommended offer information 3165, describing some or all recommended offers in a particular set of recommended offers 3155, and send it to endpoints 3110 associated with the context data 3125 based upon which the sets of recommended offers 3155 were respectively chosen. The offer distribution interface 3120 may also generate targeted offer information 3165, describing some or all targeted offers in a particular set of targeted offers 3156, and send it to endpoints 3110 associated with the context data 3126 based upon which the sets of targeted offers 3156 were respectively chosen. The recommended offer information 3165 and targeted offer information 3166 may be presented in any suitable manner, including those described in other sections.

The recommended offer information 3165 and targeted offer information 3166 may be sent in response to particular requests 3115 based upon which the recommended offer information 3165 and targeted offer information 3166 were generated, or at times independent of such particular requests 3115. Not all of requests 3115 are used to generate recommended offer information 3165 and targeted offer information 3166. For example, some requests 3115 may not match any target context, and may not be associated with an opportunity to make recommendations.

In an embodiment, recommended offer information 3165 and targeted offer information 3166 are sent separately to endpoints 3110, at potentially different times relative to each other. For example, recommended offer information 3165 may be sent in a web page responsive to a particular request 3115, while targeted offer information 3166 may be sent in an email or other message whenever targeted offers 3156 are identified based on event logs. In an embodiment, some targeted offer information 3166 and recommended offer information 3165 are sent to endpoints 3110 at the same time, within a web page or application interface. The targeted offer information 3166 and recommended offer information 3165 may be displayed within different sections of the web page. Or, the targeted offer information 3166 and recommended offer information 3165 may be intermingled in a single listing. For example, a targeted offer 3156 may always be the first offer in a list that is otherwise comprised of recommendations 3155. Or scoring techniques may be utilized to sort a merged list of recommended offers 3155 and targeted offers 3156.

2.8. Miscellaneous

For simplicity, various steps are described herein as being performed by entities such as the "retailer," "payment provider," "offer distributor," and so forth. However, many of these steps are in fact performed by data processing systems, such as described above, that have been configured by or on behalf of the entities said to perform the steps. The exact configurations of these data processing systems may vary depending on a number of factors known in the art. Unless otherwise stated, the techniques described herein are thus not limited to any particular configurations of these data processing systems.

3.0. Functional Overview 3.1. Cross-Retailer Transactional Data

As described in other sections, multiple different retailers may communicate transaction data to a coordinating computer, such as a server operated by an offer provider, offer distributor, payment provider, shopping incentive provider, or dedicated receipt provider. This data may be collected in consumer purchase histories, which, as explained herein, may be used for purposes ranging from creating a "digital locker" of consumer receipts to selecting offers to present to the consumer. In some embodiments, transaction data from multiple retailers, or cross-retailer transactional data, can thus be utilized to provide offers to consumers. For example, in an embodiment, offer selection can be based on both purchase history and a retailer identity. In such cases, offer selection may or may not be filtered to just those offers that pertain to a given retailer. In another described embodiment, only a purchase history is utilized for offer selection, and thus offer selection is necessarily based on transaction data indiscriminately of the identity of the retailer that provided the transaction data. In yet other embodiments, cross-retailer transactional data may be used to various degrees—for instance, transactional data from certain retailers may be weighted more strongly based on the consumer's location.

Various specific implementations involving the provision of offers based partly or entirely on cross-retailer transactional data are described in this section. However, the use of cross-retailer transactional data is not limited to these specific implementations, but rather is also compatible with the other systems and other techniques in addition to those described herein.

Figure 12:
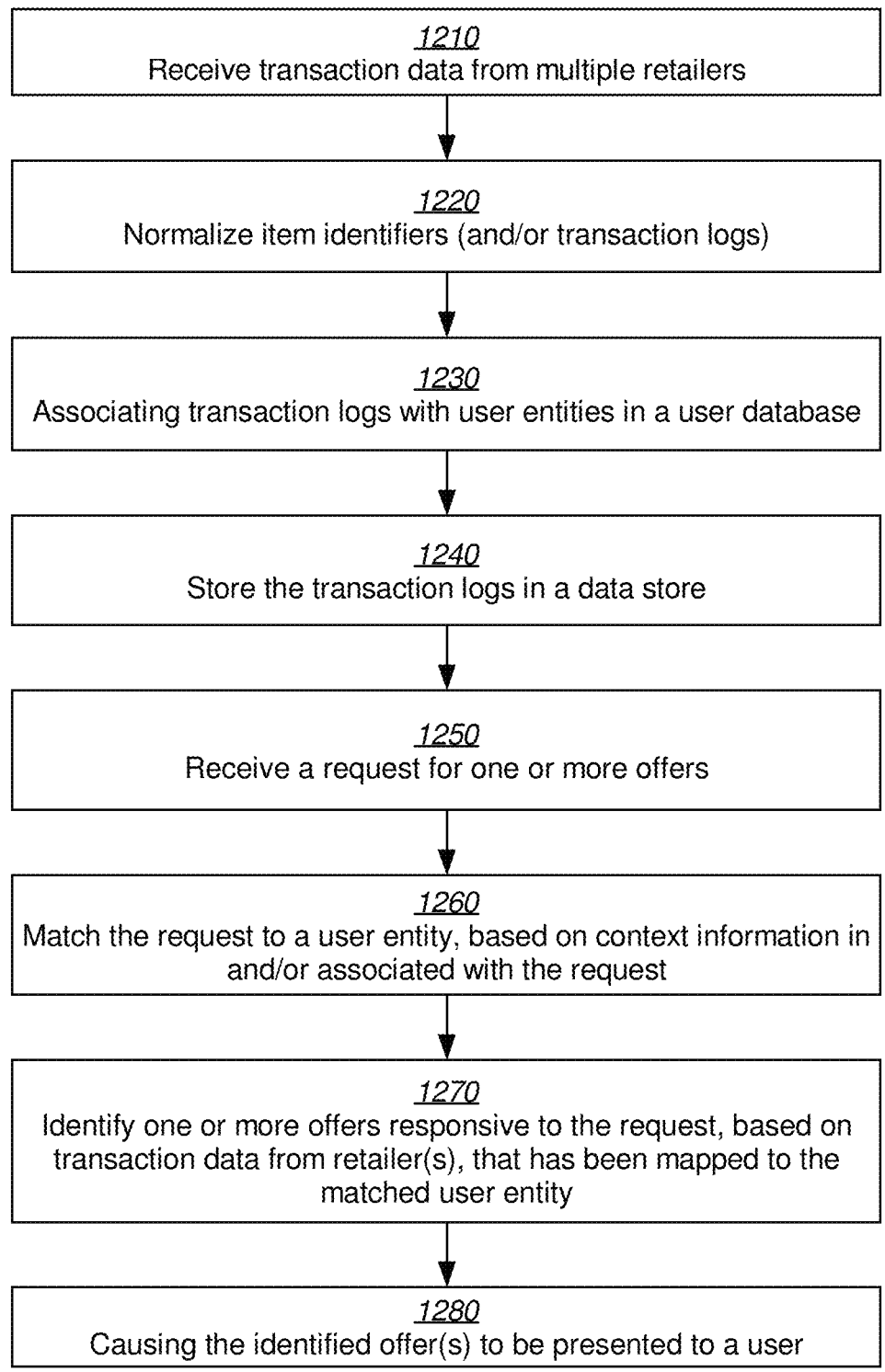
FIG. 12 illustrates a flow for providing offers based on transactional data gathered from multiple different retailers, in accordance with an embodiment.

FIG. 12 illustrates a flow 1200 for providing offers based on transactional data gathered from multiple different retailers, according to an embodiment.

Block 1210 comprises receiving, from multiple retailers, transaction data. The transaction data comprises transaction logs from the retailers, each log recording details of a different transaction at a corresponding one of the retailers. Each transaction log comprises basket-level information, including one or more item identifiers for items purchased in the transaction. The items may include products and/or services. Each transaction log further comprises one or more consumer identifiers, such as a loyalty card identifier, credit card number, account number, name, phone number, email address, IP address, mobile device identifier, and so forth. Each transaction log optionally comprises other transactional informational, including a time, date, retailer identifier, store identifier, geo-location data, and so forth. Block 1210 may be performed, for instance, by a coordinating server as described in other sections, operated as a service for the multiple retailers by a third-party service provider.

Block 1220 comprises optionally normalizing the item identifiers. Different retailers may utilize different proprietary identification schemes to identify various items. For example, one retailer may refer to a specific type of apple as "item A108" while another retailer may refer the specific type of apple as "item 78923." The coordinating server may resolve the discrepancy by normalizing both identifiers to a canonical representation such as "item APPLE10923." The coordinating server may maintain item mapping data that normalizes proprietary item identifiers for specific retailers to canonical item identifiers. Such item mapping data may be provided by each specific retailer, and/or produced by an analysis of the retailer's inventory.

In an embodiment, some or all of the item identifiers already conform to a common identification scheme. For example, the majority of item identifiers may all be Uniform Product Codes (UPCs). Thus, block 1220 is not necessary. In an embodiment, even though some items may have inconsistent identifiers at certain retailers, most items are identified by a consistent identifier at most retailers. Only the items having inconsistent identifiers need be normalized in block 1220. Or, block 1220 may be skipped altogether, and items with inconsistent identifiers are treated as different items for the purposes of the described techniques.

In an embodiment, block 1220 may be part of a larger transaction log normalization process. That is, transaction logs themselves may conform to different formats depending on the retailer. The coordinating server may include one or more transaction log normalization components, to which transaction logs are submitted as they are received. As a result of normalization, the transaction logs all conform to a common format. However, in an embodiment, retailers format transaction logs in the common format before sending the transaction logs to the retailer, and thus the logs do not require normalization.

Block 1230 comprises associating the transaction logs with consumer entities in a consumer database. The consumer database comprises a plurality of consumer entity objects, each corresponding to a different consumer entity. Each consumer entity is mapped to one or more credentials.

The credentials may include, without limitation, unique identifiers or unique combinations of identifiers, passwords, contact information, and/or demographic data. The credentials belonging to a specific consumer entity may have been provided by a consumer, for example, during an account registration process with an offer distributor or retailer. Alternatively or additionally, the credentials belonging to a consumer entity may have been learned from the transaction logs over time. Credentials may also be submitted from a variety of other sources.

Because many of the consumer credentials provided during a transaction may not in fact uniquely or even accurately identify real-world consumers, consumer entities may or may not actually correspond to real-world consumers. For example, several different consumers in a household may share loyalty card information, and thus a consumer entity based solely on loyalty card information would correspond to multiple real-world consumers. As another example, a phone number given during a checkout process may have once belonged to a different consumer with a different transaction history than the consumer that is currently using the phone number. A consumer entity based solely on phone numbers thus would not accurately reflect the real-world consumer that is providing the phone number.

In some embodiments, the techniques practiced herein nonetheless produce sufficient results by making assumptions that each of certain types of credentials, such as credit card identifiers, loyalty card identifiers, or phone numbers, uniquely correspond to a consumer entity. Thus, block 1230 in these embodiments simply comprises looking up consumer entities by querying the database using one or more consumer identifiers provided in each transaction.

In other embodiments, various data-mining techniques may be utilized to refine the consumer database to better reflect real-world consumers. Thus, for example, different consumer entities modeling different members of a household may be associated with the same loyalty card identifier. In such environments, various pattern matching and/or machine learning mechanisms may be used to compute likelihoods that certain transaction logs belong to certain consumer entities. Consumer entities are then matched to transaction logs based on the computed likelihoods.

Once the consumer entity that is associated with a transaction log is identified, a unique consumer entity identifier is then mapped to the correlated transaction log and/or a unique transaction identifier is mapped to the associated consumer entity. Correlations between transaction logs and consumer entities may be revaluated over time, if necessary, to reflect any more accurate information about the consumer entities that may be received.

Block 1240 comprises storing the transaction logs in a data store, thereby forming transaction/purchase histories for a plurality of different consumer entities across a plurality of different retailers. Optionally, block 1240 comprises aggregating data from the transaction logs into summary information that is stored for quicker analysis. For example, such summary information might indicate, without limitation, the number of times a consumer has purchased an item, a last time the consumer purchased the item, purchase patterns for the consumer with respect to the item over time, and correlations between the consumer's purchase of an item with the consumer's purchase(s) of other item(s). The transaction data store may be used for a variety of purposes described herein, including performance of the subsequent steps.

In an embodiment, block 1210 to block 1240 inclusive are performed in real time with respect to each transaction. In this context, "real time" means in general that, as soon as a transaction is performed, the retailer uploads a transaction log to the coordinating server, which then performs blocks 1220 to 1240; however, "real time" performance does not require an instantaneous or concurrent response and some time lag may occur. In an embodiment, various stages of blocks 1210-1240 are performed asynchronously relative to transactions. For example, a retailer may batch transaction logs from multiple transactions, and upload those transactions to the coordinating server periodically. The coordinating server may also, in some embodiments, comprise various components that perform blocks 1220-1240 asynchronously with respect to each other, with unprocessed transaction logs being stored in various pools or caches until a next component is ready to process the transaction logs.

Block 1250 comprises receiving a request for one or more offers. The request may be received at an offer server that has access to the transaction data store, which may or may not be the same as the coordinating server that performed blocks 1210 to 1240. The request may originate from any suitable source, including end-user based client applications communicating over a wide area network and/or other servers communicating via any type of network. For example, as described in other sections, the request may originate from a web-based or mobile receipt-viewing application. Or, the request may originate from a coupon application or a shopping list management application executing on a mobile device. Or, the request may originate from a server that is communicating with a client device operated by a consumer. Or, as yet another example, the request may originate from an ad platform.

Block 1260 comprises matching the request to a consumer entity, based on context information in and/or associated with the request. The request may, in some embodiments, comprise data that explicitly specifies the consumer entity associated with the request. For example, if each consumer entity is presumed to have a separate loyalty card identifier, the request may simply specify a loyalty card identifier. Or if the request originates from an application that requires the consumer to login to an account that is uniquely associated with a consumer entity, the request may simply specify account credentials. In other embodiments, the request includes various context signals, including consumer identifiers, geolocation data, device identifiers, and so forth. The request may be matched to a consumer entity in similar manner to the likelihood-based consumer entity matching technique described with respect to block 1230. In yet other embodiments, context signals for consumer entity matching are mined from data outside of the request, such as geolocation data and/or items listed in shopping list data previously uploaded from the device issuing the request.

Block 1270 comprises identifying one or more offers responsive to the request. The identifying is based on transaction data, from one or multiple retailers, that has been mapped to the matched consumer entity in the transaction data store. A variety of techniques for utilizing the cross-retailer transactional data are possible. For example, the cross-retailer transactional data may be mined for purchase patterns. If a purchase pattern reveals that a consumer entity frequently buys milk on Tuesday, for instance, and the request is received on a Tuesday, an offer associated with milk may be offered to the consumer. The use of cross-retailer transactional data may allow for better pattern recognition than would be conventionally possible. For example, if the consumer frequently buys milk from different retailers on Tuesday, it would not have been apparent to any particular one of those retailers, or to any single producer of milk, that a pattern existed for the consumer.

As another example, recent transaction logs can be utilized to identify items that are not likely to be purchased by the consumer in the near future. For example, if the consumer does proceed to buy milk, and then sends another request for an offer, offers for milk may be suppressed. Similarly, recent transaction logs may be used to identify complimentary items in which the consumer may be interested. For example, if the consumer has recently bought milk, the offer server may determine to provide the consumer with an offer for cookies. Complimentary items may be suggested based on correlations identified in transaction logs associated with the current consumer entity, similar consumer entities, or even an entire consumer base as a whole. Complimentary items may also be specified by offer providers or retailers.

The use of cross-retailer transactional data may increase the timeliness of offers. For example, a retailer A would not conventionally have known that a consumer just bought milk at retailer B, and thus could have inadvertently provided the consumer with a milk offer that would be of no interest to the consumer. By contrast, by participating in the system described herein, the offer server may provide retailer A with an indication of which offer(s) would be of most use to a particular consumer entity. Retailer A may then proceed to provide the identified offer(s) to the consumer in, for instance, a receipt, via an offer-distributing web-based or mobile application, or via any other offer distribution mechanism. Similarly, a third-party distributor of offers and other offers to end-users may leverage the techniques described herein to increase the value of its services to both Retailer A and Retailer B, thus increasing the amount the distributor is able to charge for its services.

In some embodiments, other suitable factors described elsewhere in this disclosure may be utilized in conjunction with the cross-retailer transactional data to identify offers responsive to a request, including shopping list data, offer redemption history, consumer preferences, and so forth.

Block 1280 comprises causing the identified offer(s) to be presented to a consumer. The offers are often presented at a client device in an interface displayed by a web-based or mobile application. The interface may be a receipt-viewing interface, as described herein. Or, the interface may be any other suitable interface, including without limitation a coupon-clipping web page on a desktop computer, a shopping list management application on a mobile phone, a contextual ad-delivery interface, a self-checkout interface on a website or on an in-store kiosk, an automated teller interface on an ATM, and so forth. The offer server performs block 1280 at least partly by sending data describing the identified offer to a client device or web server.

In at least one embodiment, the offers presented to a consumer, whether on a receipt or in any other form, may have been selected based on transaction data from multiple retailers. In an embodiment, at least one offer that is presented on a receipt was selected based on transaction data from a retailer other than the retailer that engaged in the transaction for which the receipt was generated.

Flow 1200 is but one example technique for providing offers based on cross-retailer transactional data. Other techniques may involve fewer, additional, and/or different elements in potentially varying arrangements.

3.2. Providing Offers

A variety of techniques for providing offers and/or coupons based thereon are described in, for example, U.S. application Ser. No. 12/878,231, U.S. application Ser. No. 12/896,206, and U.S. application Ser. No. 13/396,553, the contents of each of which are hereby incorporated by reference for all purposes, as if set forth in their entirely herein. Example techniques for providing offers are further described below.

General Flow

Figure 18:
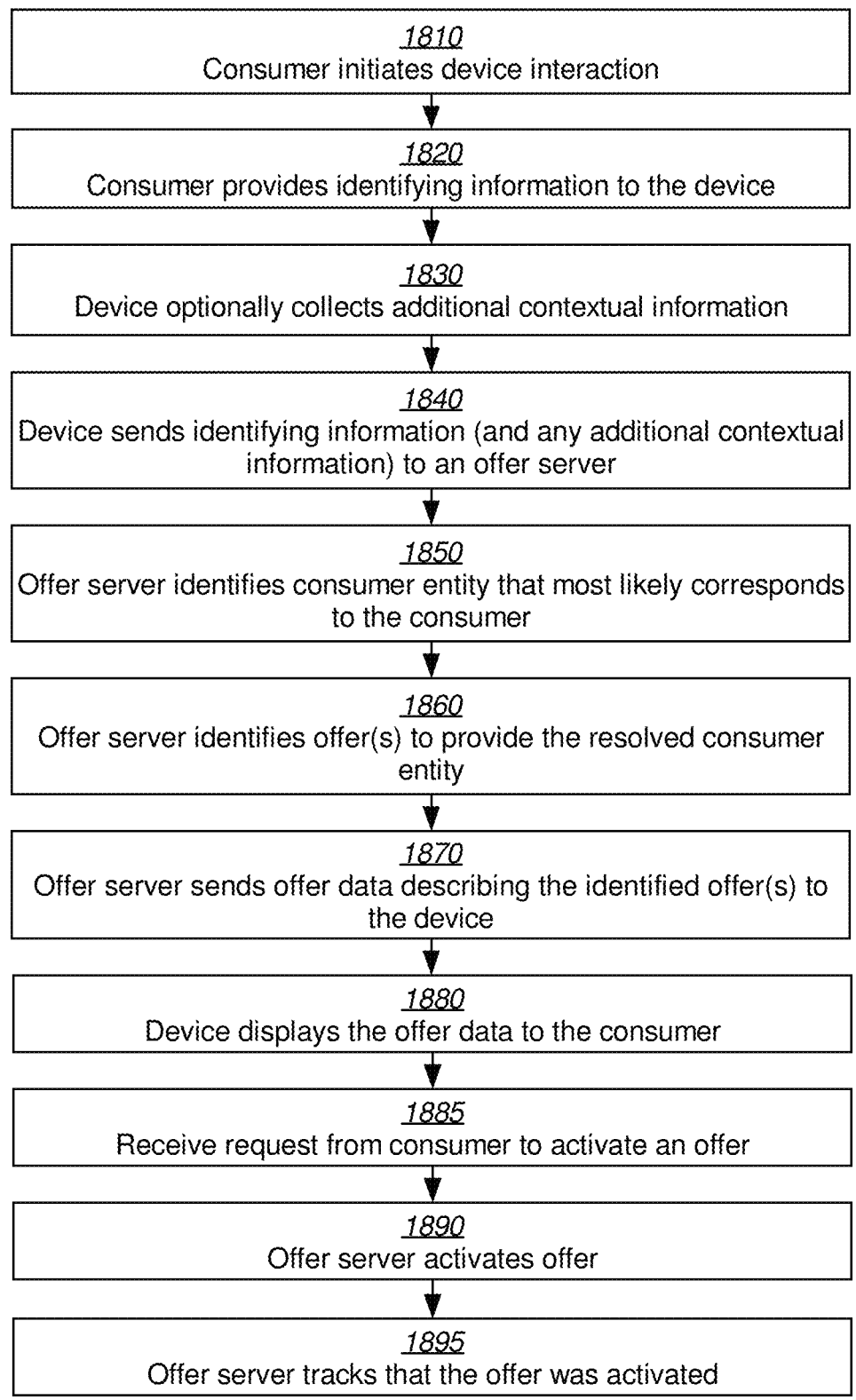
FIG. 18 is a flow illustrating a method of providing offers at a consumer-operated device, in accordance with an embodiment.

FIG. 18 is a process flow 1800 illustrating a method of providing offers at a consumer-operated device, such as consumer device 1305, according to an embodiment.

Block 1810 comprises the consumer initiating interaction with a device by engaging in a task that triggers execution of particular application functionality, such as launching a mobile application, visiting a web page, pressing a button on a kiosk, swiping a phone in front of an NFC reader, swiping a card, entering the vicinity of one or more sensors configured to detect the presence of the consumer device via information shared in signals transmitted from the consumer device, or entering in the vicinity of one or more biometric or facial recognition sensors for detecting the consumer's presence.

Block 1820 comprises the consumer providing identifying information to the device. In an embodiment, block 1820 comprises logging in to the device by presenting credentials such as a consumer identifier, email address, phone number, pin number, password, biometric data, an oral passphrase, and so forth. The consumer information may be collected explicitly from consumer input, derived from consumer input based on records associated with that input, or collected from various sensors without the consumer's explicit input. The identifying information may be provided at any time relative to the remaining blocks of flow 1800, including immediately after block 1810, after other blocks of flow 1800, or at some time much previous to block 1820, as in the case as remembered credential information. Block 1810 may in fact be the same as block 1820.

Block 1830 optionally comprises the device collecting additional contextual information, including without limitation: the device's current location; information about the device's current interactions with the consumer, such as information currently being displayed by the device or items currently being purchased by the consumer; information about any other recent interactions between the device and the consumer, such as applications the consumer may have been using at the device just prior to block 1810; or sensor data collected from some or all of the device's sensors, including radios, cameras, and/or microphones.

Block 1840 comprises the device sending the identifying information and, if collected, the additional contextual information to an offer server, such as offer server 1380. All of the data may be sent at the same time, or the data may be sent separately, as it is collected. The device may be connected to the offer server via any suitable means, including via intermediary systems, such as retail data centers or ad platforms, which may or may not further process the data before sending the data to an offer server. The data may, in some cases, be sent indirectly to the offer server. For example, some or all of the data may be stored as records in a database of recent state information for consumer entities, from which the offer server may be configured to retrieve the data.

Block 1850 comprises the offer server identifying a consumer entity that most likely corresponds to the consumer. For example, the offer server may attempt to match various aspects of the consumer identifying information, or even the contextual information, to consumer entity records stored in a consumer data store such as data store 1358. Various techniques for resolving consumer entities are described herein. The offer server may be configured to only match a consumer entity to the consumer if a matching score surpasses a certain threshold. If no matching score surpasses a threshold, the consumer may be asked to provide further identifying information, flow 1800 may terminate, or the consumer may be provided an offer using a more general algorithm that does not rely upon consumer specific data.

Block 1860 comprises the offer server identifying one or more offers to provide the resolved consumer entity, using any of the recommendation or targeting techniques described herein. Block 1870 comprises the offer server sending offer data describing the identified offer(s) to the device, as described in other sections.

Block 1880 comprises the device displaying the offer data to the consumer. In some embodiments, the device may reformat and/or pre-process the offer data. For example, the device may display the offer data in a series of navigable screens. The device may display the offer information within a window that interrupts the consumer's workflow with the application function of block 1810, or in a separate window or display that does not interrupt the consumer's workflow. In an embodiment, the offer information is displayed only while the device is processing the consumer's main request so as not to interfere too much with the consumer's workflow. For example, the offer information may only be displayed while the device is processing payment of a transaction. The offer information disappears within a certain time of concluding the processing.

In some embodiments, the display of the offer data will optionally include interface controls for the consumer to express an interest in obtaining a coupon for the offer or in otherwise activating the offer for possible future redemption. Block 1885, which is also optional, accordingly comprises receiving a request from the consumer to activate the offer. In an embodiment, the request, or a lack of the request, is implied after a predefined timeout period, such as within a certain time after the device has finished processing the consumer's main request.

Block 1890 comprises the offer server "activating" the offer. In an embodiment, block 1890 may more specifically comprise sending coupon data to the device so that the device may print a coupon. For example, if the device is an ATM or store register, a coupon might be printed on or along-side a transaction receipt. In an embodiment, block 1890 may more specifically comprise the offer server storing offer activation data that indicates that the offer is available for use by the consumer. In an embodiment, block 1890 is responsive to the offer server receiving a message from the device to which the consumer provided the input of block 1885. In an embodiment, block 1890 is further responsive to an optional intermediary step of sending an offer activation mechanism to an electronic address associated with the resolved consumer entity. For example, in response to block 1885, a link to an address at an offer server for obtaining a coupon for the offer may be emailed to the consumer. Or a link may be texted to the consumer, posted on a social network, included in a statement in association with a transaction, and so forth. The consumer may then select the link to activate the offer.

Block 1895, which is optional, comprises the offer server tracking that the offer was activated distributed by storing various tracking data as described herein.

Pre-Activated Offers

In an embodiment, in response to certain triggers like receipts, and so forth, certain offers are automatically activated for a consumer. Automatically activated offers are offers that become activated for a consumer without the consumer explicitly requesting activation of the offer. Various auto-activation rules may be defined on a global scale, and/or auto-activation may be an offer parameter definable by an offer provider. Such auto-activation rules may be associated with, among other contexts, a consumer's device, the device's location, a specific offer, items in a consumer's basket, and so forth. In an embodiment, all targeted offers are auto-activated. In an embodiment, the highest n recommended offers are pre-activated.

In an embodiment, blocks 1870, 1880, and 1885 of flow 1800 are optional. In this embodiment, the offer is activated for the consumer entity automatically, per auto-activation rules.

In an embodiment, an offer distributor keeps track of how many times each offer is activated for various purposes. For example, the offer distributor may charge offer providers fees based on how often their offers are activated. An offer distributor might also use revenue per activation as a metric for purposes such as tuning recommendation engines and targeting engines, or advertising of how successful the offer distributor is to potential providers. It is therefore in the offer distributor's interest to ensure that auto-activation rules are employed cautiously. For example, in one embodiment, auto-activation rules may be used only for consumers highly likely to redeem an activated offer, or for relatively rare promotions, where the provider is willing to pay for a large number of potentially unredeemed activations of an offer with the hope that the auto-activation of the offer might make consumers more aware of a product than would the mere existence of the offer.

Ambiguous Consumer Identifiers

In some embodiments, the offer server may determine that the consumer is almost equally likely to be one of several entities. Block 1850 may, in such embodiments, allow the consumer to be resolved to multiple consumer entities. Offer(s) may be selected based on combined criteria from the multiple consumer entities. In an embodiment, the consumer may only be resolved to multiple entities if a coupon is going to be printed at the device.

In other embodiments, the offers are selected based on combined criteria regardless of how the offer will ultimately be activated, but the consumer is expected to provide unambiguously identifying information upon specifically selecting to activate the offer. For example, the consumer-operated device may be a device that interacts with many consumers, such as a touch-screen kiosk in a public area. Block 1420 comprises sensing the consumer identifying information in a manner that is largely passive with respect to the consumer. For example, the consumer may simply walk by the kiosk without expressing an intent to interact with the kiosk, but signals from a nearby device or a facial recognition algorithm may nonetheless provide a hint as to identities of consumers within the vicinity of the kiosk. The kiosk then displays the offer data, per block 1480. Upon the consumer expressing interest in a specific offer by, for example, touching the screen of the kiosk, the kiosk solicits more unambiguous information about the consumer, such as an email address or phone number. In an embodiment, the kiosk may list possible matching consumer identifiers, such as a portion of an email address, on the screen, and the consumer may quickly identify herself by selecting one of these possible identifiers.

In yet other embodiments, the offer may be activated for each of the multiple consumer entities. In an embodiment, the offer is activated for both consumer entities only if those multiple entities are related entities, such as entities belonging to the same household or who live at the same address. In an embodiment, an offer server may further be configured to allow only one of the entities to actually redeem the offer.

Retailer-Based Offer Distribution

Figure 22:
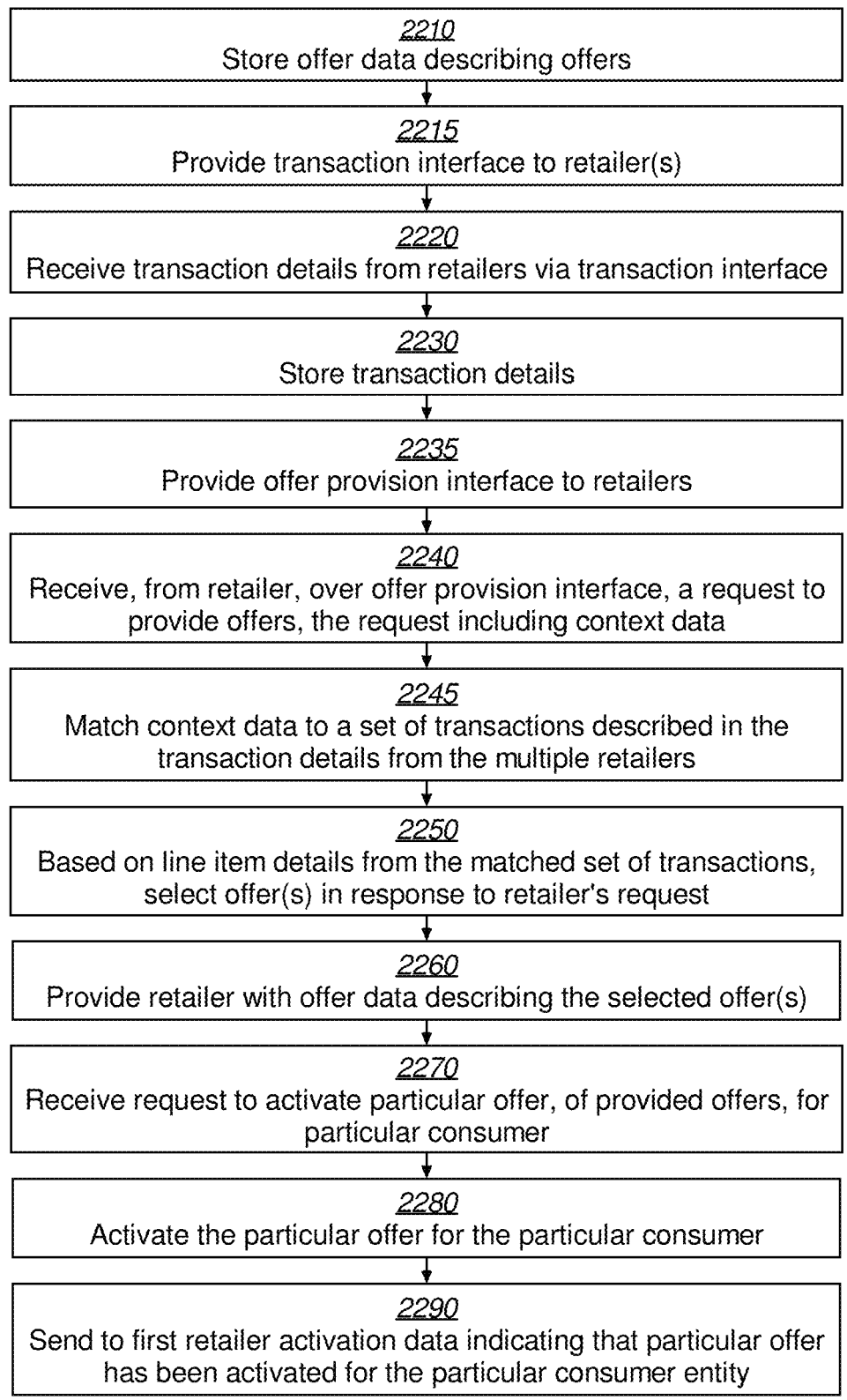
FIG. 22 illustrates an example flow for providing offers at endpoints operated by retailers, in accordance with an embodiment.

FIG. 22 illustrates an example flow 2200 for providing offers at endpoints operated by retailers, according to an embodiment. While flow 2200 is described in terms of the architecture described for system 1300 of FIG. 13A, flow 2200 is but one example of a flow that may be used for providing offers in the system 1300. Other flows may comprise additional or fewer elements, in potentially varying orders. Also, flow 2200 is applicable to variations of system 1300 as well, with little or no modification.

Block 2210 comprises storing offer data describing a plurality of offers for a plurality of different items. For example, offer server 1380 may store in offer data repository 1385 data describing offers created by various offer providers.

Block 2215 comprises providing, over a first network, to each retailer of a plurality of retailers, a transaction interface. For example, transaction aggregation system 1350 may expose an API for retailers 1310 to submit transaction logs over the Internet.

Block 2220 comprises receiving transaction details for a plurality of transactions from the plurality of retailers via the transaction interface. For example, retail data centers 1320 may be configured to periodically submit transaction logs via the API of transaction aggregation system 1350. The transaction details include, for each transaction of the plurality of transactions, at least line item details for each item of a plurality of items purchased in the transaction.

Block 2230 comprises storing the transaction details. For example, transaction aggregation system 1350 may create, in transaction data store 1355, a new record comprising the transaction details for each log received from retailers 1310.

Block 2235 comprises providing, over a second network, to at least a first retailer of the plurality of retailers, an offer provision interface. For example, offer server 1380 may expose one or more APIs for receiving requests to provide offers over a network, such as the Internet. The APIs may be accessible to terminals and other endpoints at some or even all of retailers 1310. The first network may be the same as, or different from the second network.

Block 2240 comprises receiving, via the offer provision interface, from the first retailer, a request to provide offers, the request including contextual data. The contextual data may be, for instance, a name, phone number, RFID, a device identifier, a loyalty card number, a credit card number, items that were recently purchased in a transaction, the location of the particular endpoint, the time and date, a transaction number, and so forth. For example, a checkout terminal at a first retailer 1310 may submit credentials provided in a recent or pending transaction to offer server 1380. Or a kiosk at a point-of-sale may allow a consumer to swipe his or her phone, and then send credentials from the phone, such as a device identifier or shopping list, to offer server 1380. In an embodiment, the contextual data includes a unique consumer entity identifier, which may have previously been provided to the requester over a consumer entity resolution API of offer server 1380.

Block 2245 comprises matching the contextual data to a set of transactions described in the transaction details for the plurality of transactions. For example, offer server 1380 may resolve the contextual data to a consumer entity in consumer data store 1358, as described herein, and then retrieve all transaction logs in transaction repository 1355 that are mapped to that consumer entity. Or, offer server 1380 may simply search the transaction data store 1355 for all transaction logs with matching or similar contextual data. In one embodiment, the matched transactions are filtered for those that occurred at the first retailer. In another embodiment, the matched transactions include those that occurred at other retailers. In yet another embodiment, whether the transactions include those that occurred at other retailers may differ from retailer to retailer. For example, the offer distributor may require that a first retailer allow other retailers to receive offers based on the first retailer's transactions in order for the first retailer to receive offers based on the other retailers' transactions.

Block 2250 comprises, based at least on line item details from the matched set of transactions, selecting one or more offers from the plurality of offers in response to the request. For example, offer server 1380 may select offers for items that appear in the most recent matched transactions, or are complimentary to the items that appear in the most recent matched transactions. Or offer server 1380 may analyze the transactions for purchasing trends revealed by the matching transactions, and select offers based on those trends. Or offer server 1380 may select offers for items that are purchased most frequently. In an embodiment, the line item details include redeemed offers. Offer sever 1380 may thus also base the selection on which offers the consumer previously redeemed. A variety of other offer selection techniques may also or instead be utilized, including targeting the offers to the contextual data and/or generating a recommendation using a ranking function that is based at least on signals derived from the contextual data.

In an embodiment, the selection comprises, based at least on line item details, calculating an estimated retailer profit metric, specific to the first retailer, for showing the offer within a context described by the contextual data. The one or more offers are then selected based thereon. For example, the estimated retailer profit metric may be a score from a scoring function optimized for maximizing estimated retailer profit. In an embodiment, the selection comprises, based at least on the line item details, calculating an estimated revenue per impression or revenue per activation metric for showing the offer within a context described by the contextual data and selecting the one or more offers based thereon. That is, depending on the embodiment, the potential revenue for selecting an offer may be calculated relative to impressions, which are the number of times consumers view information about an offer, or activations, which are the number of times an offer is specifically activated for future use by a consumer. A yet third alternative would be to estimate revenue per unique impressions, or the number of unique consumer entities to whom offer information has been provided. In all cases, revenue may be calculated from the offer provider perspective, retailer perspective, and/or offer distributor perspective, depending on the embodiment. In an embodiment, the estimated revenue per impression or revenue per activation is a score from a scoring function optimized for maximizing revenue per impression or revenue per activation.

Block 2260 comprises, responsive to the request, providing the first retailer with offer data describing the selected one or more offers. For example, offer server 1380 may provide XML formatted offer details. Retail data center may then reformat and display this data at a corresponding end point. As another example, offer server 1380 may provide HTML or JavaScript code containing the offer details for online store 1332 to embed within its own web site. In an embodiment, the request of block 2240 is for a receipt that includes embedded offers, and the response of block 2260 is therefore formatted as a receipt. The receipt may be formatted in accordance to a pre-defined receipt format, or based on a template previously uploaded by the requestor. In any event, any suitable technique of formatting or transmitting the offer data may be used.

Block 2270 comprises receiving a request to activate a particular offer, of the selected offers, for a particular consumer entity that matches the context data. The request may come from the first retailer itself, or it may come directly from a consumer's device. For example, a retailer 1310 may prompt a consumer to select an offer, or may automatically select one of the offers on behalf of the consumer. Or, the retailer may send the consumer a presentation of offer details on the consumer's own device. The consumer may select a particular offer and the device may consequently transmit a request to activate the offer to offer sever 1380.

Block 2280 comprises activating the particular offer for the particular consumer entity. For example, offer server 1380 may create a new offer activation record for the particular offer in activation data 1388, and then map the offer activation record to the particular consumer entity.

Block 2290 comprises sending, to at least the first retailer, and potentially multiple other retailers, activation data indicating that the particular offer has been activated for the particular consumer entity. In accordance with other techniques described herein, the consumer is thus enabled to redeem the particular offer at any of the retailer(s) to whom thee activation data has been sent.

3.3. Offer Redemption

Retailer-Based Redemption

Figure 19:
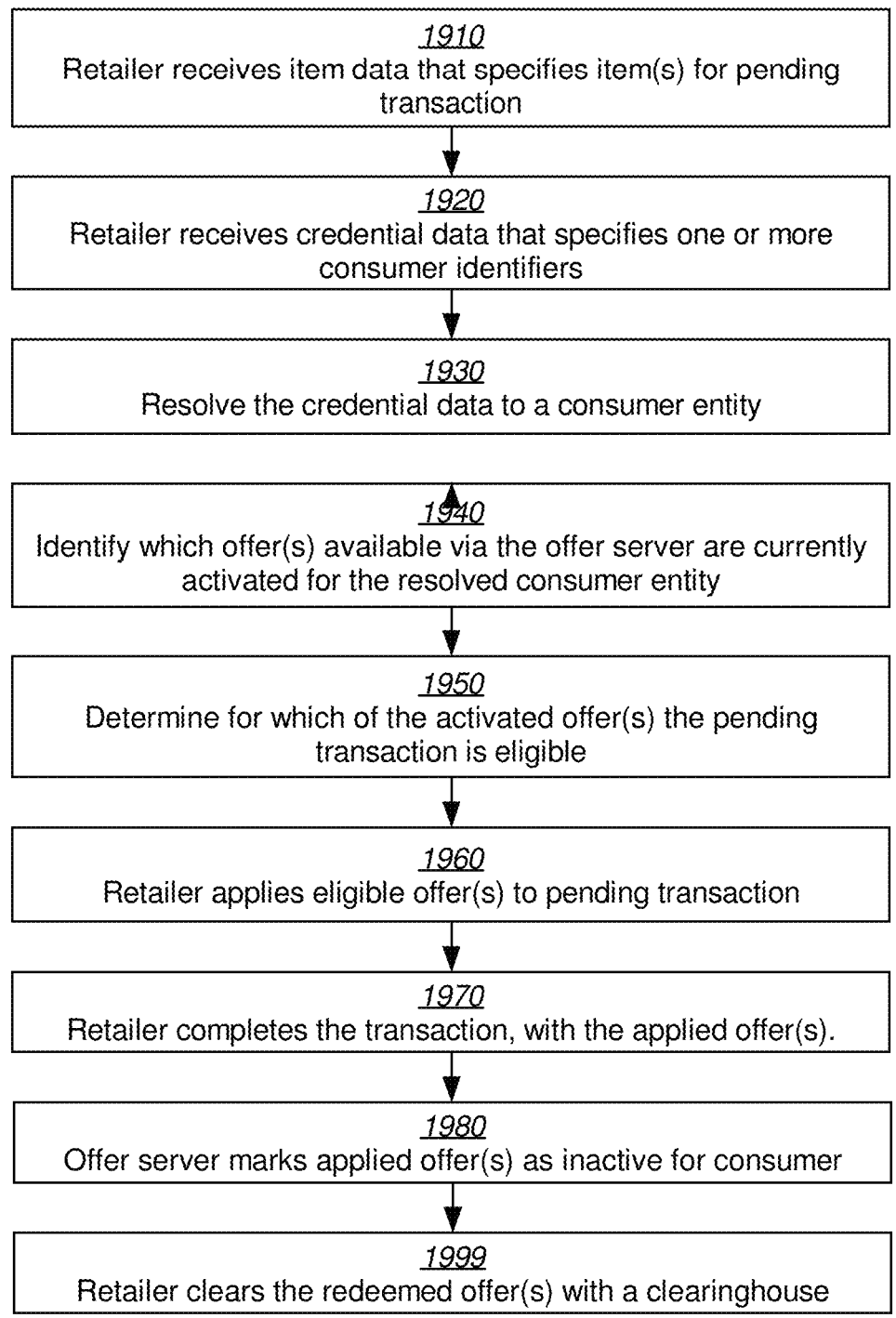
FIG. 19 illustrates another example process flow for offer redemption with a retailer, in accordance with an embodiment.

The applications already referenced describe example process flows for offer redemption. FIG. 19 illustrates another example process flow 1900 for offer redemption with a retailer.

Block 1910 comprises receiving, at the retailer, item data that specifies one or more items that a consumer intends to purchase in a pending transaction. The item data comprises basket-level details for the one or more items, including any suitable item identifiers. Item identifiers may include, without limitation, UPC symbols, RFIDs, NFC tokens, barcodes, part numbers, service codes, and so forth. As described herein, the item data may be received through a point-of-sale checkout terminal, retailer website, or other endpoint through which the retailer is capable of conducting a transaction.

Block 1920 comprises receiving, at the retailer, credential data that specifies one or more identifiers for the consumer. The credential data may include, without limitation, a credit card number or other payment-based identifier, a loyalty card identifier, a phone number, an address, biometric data, an email address, a user name, and/or a passphrase. Depending on architectural constraints, business rules, and/or other reasons, different retailers may collect different types of credential data. For example, one retailer may simply use a credit card number as an identifier, while another may request a loyalty card or a phone number. Credential data may be collected implicitly, in that it is collected passively from the consumer, or as part of the payment process.

Additionally, or alternatively, the retailer may explicitly prompt the consumer to provide credential data for the purpose of redeeming offers that have been activated for the consumer. Credential data may be collected via any suitable interface that is connected to the endpoint with which the consumer is interacting. Example interfaces include, without limitation, a card-swiper, NFC reader, smartphone, checkout register, and website.

Block 1930 comprises resolving the credential data to a consumer entity, as described elsewhere in the application. The resolution process may occur at the retailer, or the retailer may use a server-based API to submit the credential data to another server, such as an offer server, so that the server may perform the resolution process. The retailer may explicitly request that the server resolve the consumer entity for the consumer, or resolving the consumer entity may be a step performed by the server in response to other requests that include credential data. For example, the retailer may include the credential data in a request to the server to provide activated offer(s) or eligible activated offer(s), per blocks 1940 or 1950 below. In the former case, the server may then return an identifier for the resolved consumer entity to the retailer. In the latter cases, the server may not necessarily return a resolved consumer entity to the retailer. In either case, if the credential data does not unambiguously resolve to a single consumer entity, the retailer may solicit additional credential data from the consumer. Thus, block 1930 may to some extent be concurrent with block 1920.

In an embodiment, block 1930 may be a trivial step. There may, for instance, be a direct mapping of activated offers to loyalty accounts. Thus, if the consumer specified a loyalty card number in the credential data, there would be no need for an actual consumer entity resolution process, since the loyalty account is synonymous with the consumer's resolved entity.

Block 1940 comprises identifying which one or more offer(s) available via the offer server are currently activated for the resolved consumer entity. The offers may have become activated using any suitable technique described herein. The retailer may perform this step directly if it has a cached copy of a mapping between resolved consumer entities and activated offers. If not, the offer server may perform block 1940. In the latter case, identifying the activated offer(s) may comprise, for instance, the retailer sending an identifier for the resolved consumer entity or the credential data to an offer server, such as described herein.

The identification process may involve looking up all activated offers that are mapped to the resolved consumer entity, or the activated offers may be pre-filtered to eliminate certain offers that are guaranteed to be inapplicable to the transaction. For example, the offer server may eliminate those activated offers whose terms are clearly not met by context data associated with the retailer's request, such as time, date, location, retailer, retailer type, and so forth.

In an the embodiment, the offer server may respond to the retailer with a list of activated offer identifiers. Alternatively, the offer server may perform subsequent steps based on the identified activated offers, without providing the complete set of activated offers to the retailer.

Block 1950 comprises determining for which of the activated offer(s) the pending transaction is eligible. The determining includes comparing information about the items specified by the item data of block 1910 to eligibility criteria associated with the activated offer(s). For example, the retailer may periodically receive offer metadata describing item identifiers for which various offers may be redeemed. The retailer may compare the item identifiers for each particular activated offer to item identifiers in the item data of the pending transactions. Those offers whose item identifiers match those of the pending transaction may be applied to the pending transaction. Of course, a wide variety of other criteria may also or instead be utilized to identify for which activated offers the pending transaction is eligible.

In some embodiments, block 1950 may be performed by the retailer responsive to receiving a list of activated offer(s). Offer metadata describing various eligibility criteria may have been provided to the retailer in asynchronous batch operations prior to the pending transaction. Offer metadata may instead be provided with the list of activated offer(s) returned in block 1940, or in response to a subsequent request by the retailer to the offer server.

In other embodiments, block 1950 is performed by the offer server. Such embodiments may require that the retailer provide the item data to the offer server in one of blocks 1930 or 1940. In such embodiments, the offer server responds to the retailer's request of block 1930 or 1940 with a list of exactly which offers should be applied to the pending transaction.

Block 1960 comprises the retailer applying the offer(s) identified in block 1950 to the transaction, using any suitable technique.

Block 1970 comprises the retailer completing the transaction, with the applied offer(s). Block 1970 may comprise the retailer receiving payment details from the consumer, if such details were not already received with, for instance, the credential data. Depending on the payment type, block 1970 may further comprise the retailer communicating with a payment provider to authorize payment for the transaction.

Block 1980 comprises the offer server marking those offer(s) applied to the transaction as inactive for the consumer, if any relevant distribution limits have been reached with respect to the offer(s). If the retailer performs block 1950, block 1980 may comprise the retailer reporting which offer(s) were actually applied to the transaction. Otherwise, block 1980 may simply be responsive the retailer reporting that the transaction was completed, since the offer server would already know which offer(s) were identified as eligible in block 1950. In an embodiment, block 1980 is responsive to the offer server receiving a transaction log generated by the retailer for the completed transaction. In other embodiments, retailers may report offer redemptions to the offer server separately from transaction logs, to ensure that redeemed offers are marked inactive for the resolved consumer entity as quickly as possible.

Block 1999 comprises the retailer clearing the redeemed offer(s) with a clearinghouse, such as the digital clearinghouse described herein.

Flow 1900 is but one example of how a retailer may facilitate offer redemption. Other flows may involve fewer or additional elements in potentially various arrangements.

Payment Provider-Based Redemption

Figure 20:
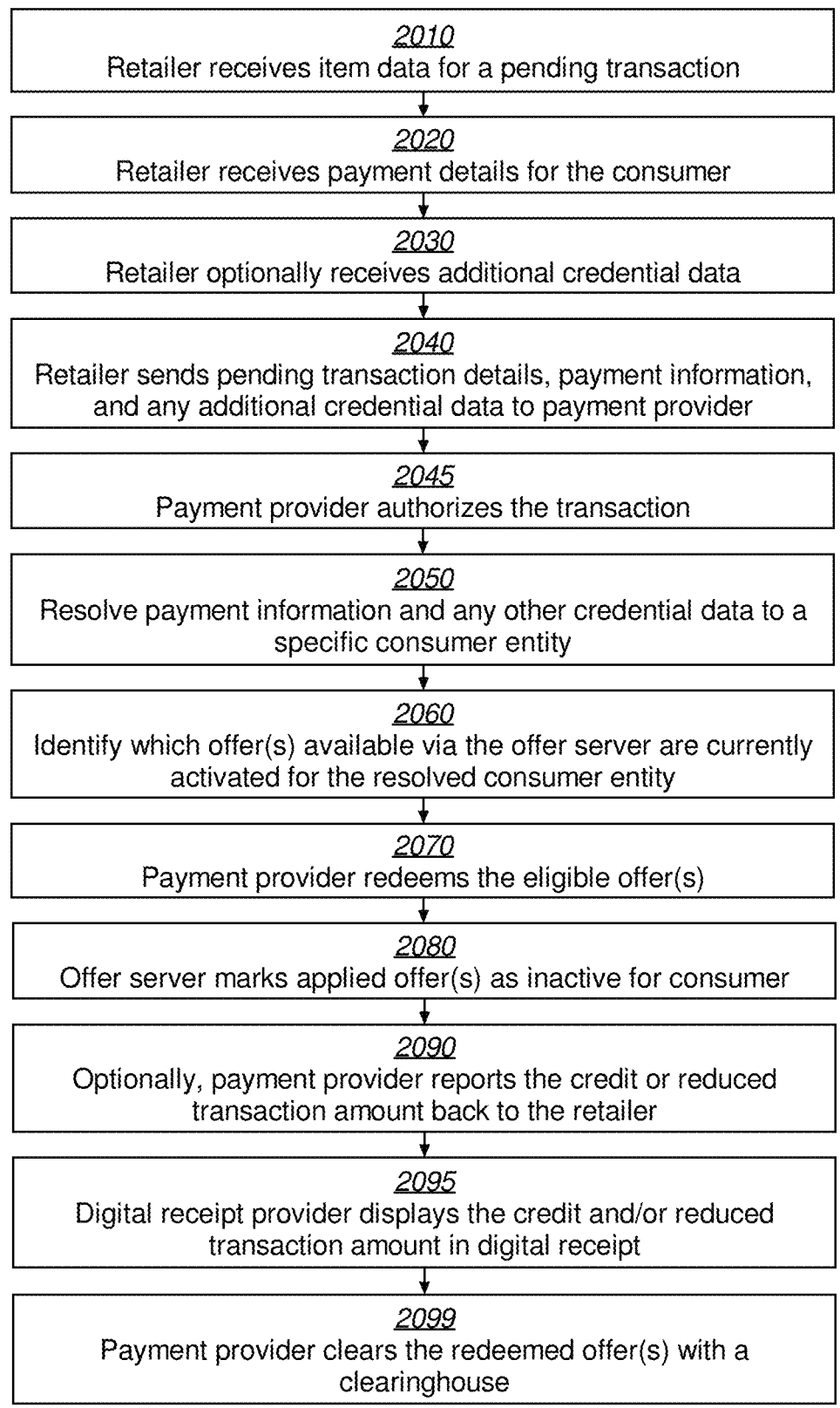
FIG. 20 illustrates an example process flow for offer redemption by a payment provider, in accordance with an embodiment.

FIG. 20 illustrates an example process flow 2000 for offer redemption by a payment provider, according to an embodiment. Block 2010 comprises the retailer receiving item data for a pending transaction with a consumer, as described with respect to block 1910 above.

Block 2020 comprises receiving, at the retailer, payment details for the consumer. Payment details include at least a payment provider identifier and credential(s) by which the payment provider may locate a payment account number for the consumer, such as an account identifier and/or passphrase. Receiving payment details as described here and in other flows may comprise, for instance, the consumer or an attendant swiping a credit card in a credit card reader coupled to a checkout terminal, the consumer bringing a smartphone or other NFC tag carrier in proximity of an NFC reader at the checkout terminal, the consumer or attendant entering identifiers such as those of a checking account or credit card into a checkout terminal, the consumer entering credit card information or other credentials into a website, the consumer instructing a smartphone to transmit payment information to the retailer, and so forth. Alternatively, block 2020 may comprise the consumer transmitting payment details directly to the payment provider, thus avoiding the need for the retailer to retransmit the payment information in block 2040 below.

Block 2030 optionally comprises receiving, at the retailer, additional credential data, as in block 1920. Block 2040 comprises the retailer sending pending transaction details, payment information, and optional additional credential data to the payment provider identified by the payment information. The pending transaction details include a total transaction payment amount being requested from the identified payment account. The pending transaction details may further include, depending on the embodiment and/or identified payment provider, some or all of the item data received in block 2010, and/or a variety of transaction context data, such as retailer name, location, time, and date.

Block 2045 comprises the payment provider authorizing the transaction using any suitable technique. For example, the payment provider may authorize the transaction upon verifying that the identified payment account has sufficient funds to pay for the pending transaction, and that the pending transaction passes various fraud prevention algorithms. The payment provider responds to the retailer with an indication of whether the transaction was authorized.

Block 2050 comprises resolving the payment information and the optional credential data to a specific consumer entity. The payment provider may perform the resolution directly, or the payment provider may communicate with the offer server to effect the resolution process in the same manner as described with respect to the retailer in block 1930. In an embodiment, block 2050 may be a trivial step. There may, for instance, be a direct mapping of activated offers to payment accounts, and thus there would be no need for an actual consumer entity resolution process. Rather, the identified payment account is synonymous with the consumer's resolved entity.

Block 2060 comprises identifying which one or more offer(s) available via the offer server are currently activated for the resolved consumer entity. Block 2065 comprises determining for which offer(s) the transaction is eligible. These blocks proceed in similar manner to blocks 1940-1950 above. If the actual item data was not communicated to the payment provider, block 2065 is performed based on transaction details other than the actual items purchased, such as the total transaction amount or purchase frequency.

Block 2070 comprises the payment provider redeeming the offer(s) identified in block 2065. Block 2070 may comprise, for instance, the payment provider reducing the amount that the consumer will be billed for the transaction by amount(s) specified by the identified offer(s), or by adding the amount(s) as credits to the consumer's payment account.

Block 2080 comprises the offer server marking redeemed offer(s) as inactive. The offer server will perform block 2080 in response to an indication that the payment provider redeemed the offer(s) in block 2070. The indication may be, for instance, a direct redemption message sent by the payment provider, a transaction log generated by the payment provider, or a transaction log generated by the retailer.

Depending on when block 2045 is performed relative to block 2070, block 2090 may optionally be performed. Block 2090 comprises the payment provider reporting the credit or reduced transaction amount back to the retailer, so that the retailer can advise the consumer as to which offers were redeemed. For example, a point-of-sale register may prompt an attendant to advise the consumer that an offer was redeemed. Or, the retailer may print information about the redemption on a screen or a receipt.

Alternatively, or in addition, block 2095 may be performed. In block 2095, a digital receipt provider displays the credit and/or reduced transaction amount in a digital receipt, as described herein. Yet another alternative or additional step is for the payment provider to report the redeemed offer in a billing statement.

Block 2099 comprises the payment provider clearing the redeemed offer(s) with a clearinghouse, such as the digital clearinghouse described herein.

Flow 2000 is but one example of how a payment provider may facilitate offer redemption. Other flows may involve fewer or additional elements in potentially varying arrangements. Some or all of blocks 2050-2095 need not be performed synchronously with blocks 2010-2040. For example, some or all of blocks 2050-2095 may be performed in a subsequent transaction log analysis phase, such as at the end of a billing cycle or at the end of a business day.

Cross-Transactional Offers

The techniques described herein allow for retailers or payment providers to apply offers whose terms are not limited to the transaction details of a single transaction. Such offers are possible when retailers and payment providers have access to transaction details for multiple transactions. For example, a retailer or payment provider may wait to apply offers for some time after transactions have been completed, such as at the end of the business day, or during periodic statement windows. Thus, multiple transactions may be examined to determine if any offer conditions have been met.

As another example, a retailer or payment provider may be provided with live access to transactional data collected by a transaction aggregation system. For instance, a transaction aggregation system may feature an interface by which a retailer or payment provider may query the system for a list of items recently purchased items and/or other aggregate or even line-item transaction details. The retailer may use this information determine whether the terms of any cross-transactional offers have been met. As another example, an offer server may feature an interface by which a retailer or payment provider may query the offer server as to whether the purchase of certain items would complete the terms of any offers activated for a certain consumer. The offer server may respond with a list of any activated offers whose terms would be met, even if those terms are only met in conjunction with transaction details from previous transactions.

Consequently, offers may be conditioned upon details from multiple transactions, even if those transactions occur at different retailers. For example, an offer may require that a consumer purchase a certain movie at an online store, and then purchase a certain entrée from a certain restaurant. Or, as another example, an offer may require that a consumer purchase a certain combination of grocery items within a particular time period, without regard to where those items were purchased. Or, as another example, an offer may require that a consumer use a certain credit card to purchase a certain total amount of merchandise from a certain retailer within a particular billing period.

For example, when responding to a retailer with available offers, the offer server may advise the retailer that in view of what the consumer has already purchased, an additional purchase of grocery item x will trigger a discount y. If that grocery item x is not in the consumer's shopping cart, the retailer may even advise the consumer that they have an activated offer that can be triggered by purchasing item x.

Since certain cross-transactional offers may involve purchases at multiple retailers, when a retailer applies a cross-transactional offer, the retailer may be provided with reference data by which a clearinghouse may validate the fact that all terms of an offer were indeed met. For example, the retailer may be provided with a validation code that it may forward to the clearinghouse. The clearinghouse may then communicate with the transaction aggregation system or offer server to ensure the validity of the validation code.

In an embodiment, most offers are implicitly presumed to require that all items are purchased in a single transaction. However, an offer's terms may instead specify that the items are to be purchased in a certain time period, regardless of how many transactions are involved in the purchase of those items. In an embodiment, depending on the offer terms, the offer must have been activated prior to the entire time period. In an embodiment, depending on the offer terms, the offer must have been activated before the final transaction involved. In an embodiment, depending on the offer terms, the offer may be activated retroactively. It should be noted that retroactive activation may be possible for both regular and cross-transactional offers.

3.4. Consumer Entity Resolution

As mentioned in other sections, various consumer entity resolution techniques may be utilized to disambiguate consumer identities within transactional, offer distribution, and event tracking contexts. In some embodiments, simple consumer identification schemes may be used, such as a one-to-one mapping between consumer entities and certain identifiers, or combinations of identifiers, such as loyalty card numbers in combination with a retailer identifier, or credit card number. In such embodiments, customer records may be stored in any combination of tables, such as a single master customer table that combines records from multiple retailers or entities, or separate tables for each retailer/entity that provides customer data.

In an embodiment, a hierarchy of consumer records from different partners is analyzed to form a plurality of master consumer records. The master consumer records may have multiple values for each of several fields, each of which is associated with trust scores and/or confidence scores. For example, some credentials, such as social security numbers, or combinations of credentials, may be much more reliable indicators of a consumer's identity than other credentials, such as phone numbers. Moreover, some credentials may be ambiguous because they actually belong to two or more people. Examples of such ambiguous credentials may include, without limitation, certain household identifiers, phone numbers and credit card numbers. Thus, the more reliable and/or unique the credential, or combination of credentials, the higher its trust score. As another example, some identifiers may appear in many different entity records, and thus the system may assign a higher confidence score to those identifiers than other identifiers that appear only in one or two entity records. These trust scores and/or confidence scores allow the system to figure out how likely it is that two different records from two different sources belong to the same person. The system, in essence, dynamically learns who consumers are and creates greater precision as it obtains more incremental trusted data points. The system is constantly updating its master consumer records as new data becomes available.

FIG. 21 illustrates an example flow 2100 of storing and accessing consumer records for differentiating between consumers by resolving credentials to consumer entities, according to an embodiment.

Block 2110 comprises receiving multiple sets of consumer records from multiple sources, sometimes also denoted collections of records. These collections may also be referred to as "source collections." The multiple sources may include a variety of source types, depending on the embodiment, including public records and financial institutions. In one embodiment, the sources include at least a first retailer and a second retailer that is different from the first retailer, and consequently the multiple source collections include a first collection from the first retailer and a second collection from the second retailer. For example, different retailers may configure their respective data centers to periodically upload their consumer records, or a portion thereof, to the offer server. Retailers also may source data from third parties in an attempt to create greater precisions in records.

Each particular collection of the multiple source collections has a corresponding particular consumer record structure, and each particular consumer record structure has particular fields for which one or more of the consumer records in the particular collection have values. Some sources may maintain different data about their consumer records in different formats. For example, the first collection may have a first consumer record structure and the second collection may have a second consumer record structure, wherein the first consumer record structure has first fields that differ from second fields of the second consumer record structure. This may occur in many circumstances—for example, one source may collect driver's license numbers and demographic information for their consumers, but nothing else, whereas another source may collect social security data and credit card numbers, but nothing else.

In an embodiment, once received, the consumer records in each source collection may be subject to various normalization processes to ensure that similar field types, such as phone numbers or names, are similarly formatted. The offer distributor may store the source collections using a common normalized structure, even if the source collections are structured differently upon receipt from the sources. However, in an embodiment, a common normalized structure is not necessary.

Block 2120 comprises, for one or more particular collection of the multiple source collections, assigning trust scores to the particular fields of the particular collection. The trust scores quantify how accurate the different fields of the different collections are perceived to be. For example, a first phone number field in a first source's collection may be known to be generally inaccurate, while a second phone number field in a second source's collection may be highly accurate. The first phone number field may thus be assigned a lower trust score than the second phone number field. Thus, for example, a first field of the first source collection has a different trust score than a similar second field of a second source collection.

In an embodiment, the assignment of trust scores may be a dynamic and ongoing process, in which the trust scores are repeatedly "re-learned" through machine learning techniques, based on factors such as how much agreement there is, on average, between the similar fields of different sources, as well as other feedback mechanisms such as consumer input into the offer distribution system. Consumer opt-in information that is actively corrected also could influence a trust score. In an embodiment, trust scores may be set manually by the offer distributor as needed. In some embodiments, trust scores may be assigned for entire source collections, such that all fields in a collection have the same trust score. In an embodiment, an entire source collection may be assigned an initial trust score, but the trust scores for its fields may change over time via the above-described techniques.

Block 2130 comprises establishing correlations between different consumer records in different collections of the multiple source collections. Establishing the correlations may comprise, for instance, correlating consumer records that have similar values for one or more similar fields in two or more records. Correlation metadata identifying the correlations is stored separately, or in a master consumer record as described below. Correlations may be reevaluated on an ongoing basis. For example, correlations may be reevaluated periodically and/or whenever an updated source collection is received from a source, per block 2110.

Groups of similar fields are identified manually or by various matching techniques. Each group comprises a similar field from each of at least two of the source collections. The values of each similar field for each consumer record in each source collection are compared to the values of corresponding similar fields for each consumer record in each other source collection. Records from different collections whose similar fields have values that match to a certain degree of confidence, are found to be similar to each other. Matching values in certain fields, such as fields with highly unique numbers, may be weighted higher in identifying a correlation than matching values in less unique fields, such as name, gender, or age. In some embodiments, the values for certain unique fields such as social security numbers or driver license numbers must match in order for a correlation to be established. However, the absence of a value in one of the consumer records for the certain unique fields can be ignored if other designated fields match with a high degree of confidence.

The number of fields that must match in order to establish a correlation may vary, depending on the types of collections that are received from the sources. Depending on the field, a match may require exactly the same values, such as with identification numbers or phone numbers, or a match may require highly similar values, such as with names and demographic data.

In an embodiment, the correlations are established, in part, based upon the trust scores. For example, a match, or lack thereof, may be ignored if a corresponding source field has a low trust score. In an embodiment, past purchase behavior is also used to establish correlations, such as items purchased, where purchased, and frequency of purchase.

Block 2140 comprises generating a master collection of consumer records by generating master consumer records based on the correlations. Each master consumer record describes a different consumer entity. A master consumer record may represent an individual, or a household or other aggregate of more than one individual. Each of a plurality of master consumer records are linked to at least two different correlated consumer records from at least two different sources. Master consumer records are also generated for each record that was not correlated to any other record, though these master consumer records may also later be linked to two or more correlated records, as additional information is added to the system and additional correlations are discovered.

Each master consumer record includes fields from a master set of fields. The master set of fields may comprise one master field for each group of similar fields identified in the source collections, as well as a master field for each source collection field that is not in a group of similar fields. In an embodiment, however, the master fields may only correspond to a subset of the source collection fields. Additionally, the master fields may or may not contain other fields that do not directly correspond to any source collection fields.

Block 2150 comprises identifying values for master fields based on corresponding source fields and their associated trust scores. The identifying may more specifically comprise identifying one or more values for at least one particular master field of a particular master consumer record based at least on: a first value for the first field in a first consumer record of the first collection, a second value for the second field in a second consumer record of the second collection, and the different trust scores assigned to the first field and the second field. In an embodiment, identifying the one or more values comprises, deciding which one or more values of the first value and the second value to store in the master consumer record based at least on the different trust scores. In an embodiment, identifying the one or more values comprises, in response to a query that requests the one or more values for the particular field, querying the first consumer record from the first collection for the first value, querying the second consumer record from the second collection for the second value, and deciding which one or more values of the first value and the second value to return based at least on the different trust scores.

In an embodiment, each master consumer record field is assigned multiple values. The multiple values are each assigned a trust score and/or confidence score based on the source(s) from which each value originated. In other embodiments, some or all master consumer record fields comprise a single value selected from the different source collections. The source collection field(s) that correspond to a particular master consumer record field are ranked using a function of the trust scores and/or confidence scores. The particular master consumer record field is then assigned the value of the highest ranking source collection field. In an embodiment, each field of the master consumer record is linked to the field of the source collection(s) from which the value of the master consumer record field originated, thereby allowing for easy updates to the master consumer record if the source collections and/or trust scores change.

Block 2160 comprises receiving a query that selects for one or more credential values in one or more particular master fields. Such a query may be issued by a number of entities in a number of contexts. For example, the query may be issued by a retailer or offer distributor in response to a consumer presenting the one or more credentials at the time of checkout. As another example, the query may be issued by a payment provider upon detecting the one or more credentials in a transaction log. As another example, the query may be issued by a receipt server in response to a consumer, having the one or more credentials, requesting access to his or her receipts. As yet another example, the query may be issued by an advertiser or offer distributor in response to detecting an offer distribution opportunity involving the one or more credentials.

Block 2170 comprises locating master consumer records whose one or more fields match the one or more credential values in the query. Again, a match as described herein may require exact matches, or similar values, depending on the type of data represented by the field. In an embodiment, certain fields, such as unique fields, must match the corresponding credential value(s) specified in the query, whereas other fields need not necessarily match. These fields may nonetheless impact the ranking process in block 2180 below.

Block 2180 comprises ranking the master consumer records located in block 2170 based on at least one or more of: the extent to which the master consumer records match the specified one or more credential values, the trust score(s) associated with the values from the one or more master fields that are subject to the query, and/or the confidence score(s) associated with the values from the one or more master fields that are subject to the query. In an embodiment, these and other factors may be weighted within a ranking function to score each of the located master consumer records.

For example, multiple master consumer records may be located for the same credential values. However, based on the trust scores associated with these credential values in the respective master consumer records, one of the master consumer records may be a significantly more trustworthy match, and thus ranked higher. Or, based on the confidence scores, it may be apparent that a particular credential value appears much more frequently in the source consumer records correlated to a first master consumer record than in the source consumer records correlated to a second master record. Thus, the first master record is ranked higher.

Block 2190 comprises returning one or more values associated with the highest ranked master consumer record(s). The exact values returned may include any values stored in or mapped to the master consumer record, and will depend upon the query of block 2160. For example, one type of query may request that a unique master consumer record identifier is returned, so that the requestor may subsequently query for receipt or offer records associated with the master consumer record. Another type of query may request source collection identifiers correlated to the master consumer record. Yet another type of query may request the full master consumer record. In an embodiment, the first value is assigned to the particular field for a plurality of master consumer records; and the method comprises further receiving a query that selects for the first value; and identifying one or more master consumer records from which to return information based on trust scores assigned to different fields of different source collections from which the plurality of master consumer records were generated.

When multiple master consumer records are ranked equally, or within a threshold score of each other, an ambiguous response may be returned. The ambiguous response may vary depending on the embodiment. For example, a designated error code may be returned, or values from more than one of the multiple master consumer records may be returned.

Variations

Flow 2100 illustrates but one example flow for resolving consumer entities. Other flows may feature additional or fewer elements, in potentially varying orders. For example, the sources from block 2110 may include only one retailer, but also include registration information from the offer provider itself and/or historical data. The sources might also or instead include data purchased from data brokers. As another example variation, master consumer records may further include or be mapped to a variety of data fields that are collected by the offer distributor as consumers interact with the offer server. For example, some such fields that may be used to resolve the consumer entity include historical location data, and correlations of the historical location data (or the lack thereof) to other consumer activities within a same time frame. In an embodiment, the master fields include aggregated transaction data. Hence, a consumer entity may be resolved in part by matching items in a consumer's basket to items historically purchased by the consumer.

In an embodiment, a method comprises: storing consumer records comprising data collected from different sources, wherein each of the consumer records includes a plurality of values for a plurality of attributes, including one or more consumer credentials; storing logs of previous actions taken by consumers in association with the different sources, wherein the logs include credentials by which the logs are mapped to the consumer records; receiving a request to provide access to particular content, wherein the request includes one or more particular credentials and metadata associated with the request; wherein a first consumer record and a second consumer record share the same one or more particular credentials; selecting a particular consumer record, of the first consumer record and the second consumer record, based on comparing the metadata associated with the request to information stored in or derived from the logs of previous actions taken by consumers; and responding to the request based on consumer access data specific to the selected particular consumer record.

For example, the master consumer records as described above may be used to enforce access control rules with respect to digital content or digital offers. Each master consumer record is associated with one or more activated offer records. Each of the activated offer records specifies an offer or content item to which the master consumer record has been granted access. Moreover, each activated offer record may be marked with status indicators such as redeemed, available, expired, and so forth, to enforce distribution limits on the digital offers and/or digital content. In an embodiment, on account of the various consumer record correlations described herein, an offer previously marked as redeemed in response to a request that presented a first credential associated with a particular consumer record is not provided in response to the request even though the request contains a different credential, because the different credential also resolves to the particular consumer record.

In an embodiment, the first consumer record and the second consumer record include, in addition to the one or more particular credentials, one or more other credentials that are not equivalent. The one or more other credentials were not included in the request, however, and thus could not be used to disambiguate the consumers.

In an embodiment, the method comprises matching potentially ambiguous transaction logs to consumer records, based on comparing transaction details from the potentially ambiguous logs to those of logs that present unambiguous credentials. In an embodiment, the compared details include any or all of a location associated with the transaction, basket data, and/or time or day of week.

Figure 30:
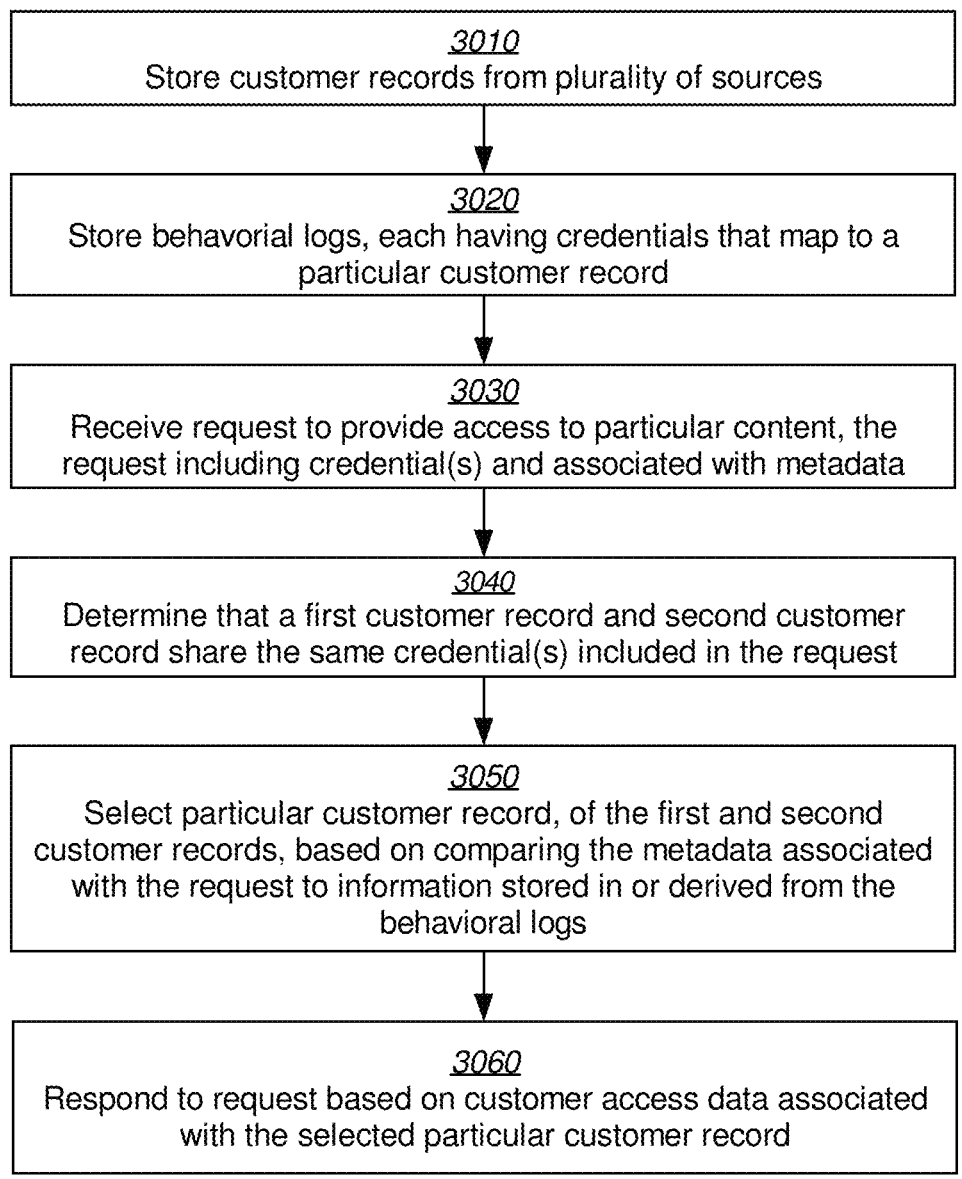
FIG. 30 illustrates a flow for differentiating between consumers who provide ambiguous credentials, in accordance with an embodiment.

FIG. 30 illustrates a flow 3000 for differentiating between consumers who provide ambiguous credentials based on historical transaction records relating to those consumers, such as items in which a consumer has previously expressed an interest, according to an embodiment. Flow 3000 may be useful, for example, in providing targeted offers to members of a family who present the same loyalty card at a store, or in any other situation where the credentials presented by a user do not unambiguously resolve to a single customer record unambiguously. Flow 3000 is but an example of a flow that can be used to differentiate between consumers. Other flows may include additional or fewer elements in potentially varying arrangements.

Block 3010 comprises storing customer records from a plurality of sources, as described in connection with the embodiments of FIG. 21 and FIG. 34. Block 3020 comprises storing various types of historical transaction records. In general, the customer records stored in block 3010 may include any of the historical transaction records discussed in connection with the embodiment of FIG. 13A, to the extent such historical transaction records relate directly or indirectly to consumers or transactions conducted by consumers. Another example of such historical transaction records include behavioral logs, each having credentials that map to a particular customer record. The behavioral logs may include, for instance, transaction logs, event logs, offer tracking logs, location tracking logs, shopping list logs, or any other type of behavioral logs described herein.

Other examples of historical transaction records that may be stored in block 3010 include, with respect to one or more electronic transactions that were conducted in the past by one or more consumers, information regarding a universal product code, a quantity of product purchased, a number of items purchased, a transaction amount, at least a portion of a credit card number used, a payment identifier used, a secure payment hash key, a data processing system, a merchant or retailer facility, time or date when a transaction took place, one or more offers activated or redeemed, customer name, phone number, pin number, password, code, loyalty card number, RFID data, a device identifier, one or more items that were purchased in a previous or concurrent transaction, or a transaction number.

Block 3030 comprises receiving a request to provide access to particular content. The request may occur at any suitable endpoint to which an offer server or general purpose content server provides offers or content. The request includes credential(s), and may be associated with contextual transaction data, possibly in the form of metadata, describing one or more behavioral characteristics of a consumer. The particular content may be, for example, an offer that a consumer wishes to activate, an activated offer that a consumer wishes to redeem, a receipt, a list of offer recommendations or targeted offers, downloadable digital content, and so forth. As described in other sections, the credentials associated with a request will vary depending on the nature of the request. For example, the credentials may be without limitation, any combination of one or more of an email address, phone number, loyalty card number, device identifier, IP address, user identifier, system identifier, biometric data, and so forth. In general, the credentials may include any of the contextual transaction data 1345 discussed in connection with the embodiment of FIG. 13A, to the extent that such contextual transaction data can be used to directly or indirectly, fully or partially identify a consumer.

The associated contextual transaction data or metadata may include a list of one or more items, such as shopping cart items or an item for which the requestor has recently accessed information. The associated contextual transaction data or metadata may include any other tracked behaviors, including recent location(s) of the consumer, applications or websites recently accessed on a device from which the request was sent, and other recent events that can be attributed to the consumer. The contextual transaction data or associated metadata may be included directly in the request, or the request may include information such as a session identifier that would allow a server to locate suitable behavioral information may be located in particular server-side logs or other records.

Block 3040 comprises determining that a first customer record and second customer record match the same credential(s) included in the request. In other words, the identity of the customer is ambiguous at this point.

Block 3050 comprises selecting a particular customer record, of the first and second customer records, based on comparing the metadata associated with the request to information stored in or derived from the behavioral logs. Thus, behavioral logs are used to resolve the consumer to a specific identity. For example, an offer server may differentiate between a husband and wife based on comparing items that they are currently interested in to items that they are historically interested in. Or the offer server may differentiate between the husband and wife based on comparing historical device usage and/or location patterns to recent behavioral data.

Block 3060 comprises responding to the request based on customer access data associated with the selected particular customer record.

In various embodiments, the approach described in connection with the embodiment of FIG. 30 may be used to map a set of ambiguous consumer credential information that potentially relate to two or more consumer records to a single consumer record, and therefore uniquely identify one consumer with a certain degree of confidence. For example, if a larger family is associated with a single phone number, or if a group of employees of a company are all associated with a single customer ID number, a particular individual may be uniquely identified with a sufficiently high degree of confidence based on contextual transaction data and historical transaction records corresponding to those family members, or respectively, employees.

In one embodiment, even if a particular person is identified based on a set of ambiguous consumer credential information that potentially relate to two or more consumer records, the transaction conducted with that person may nevertheless be customized based on a different consumer record profile (i.e., a consumer record that is not associated with that person). For example, in one embodiment, if a husband and wife are using the same phone number or customer loyalty identifier at a retailer, and if the husband is identified as the person most likely making a transaction at a particular time, the husband may still be issued an offer that would otherwise be available only to the wife (e.g., an offer that is associated with the consumer record of the wife, an offer for a product that is normally purchased by the wife, etc.).

Many of the systems and methods described herein provide useful results even without the specific resolution techniques described above. Hence, the phrase "resolve a consumer entity" and like phrases as used herein should be understood to refer any of the resolution techniques described above, or to any other suitable technique for determining the identity of a consumer.

In an embodiment, some retailers may not keep or may decline to upload consumer records. Some or all of the retailers' transactions may nonetheless be resolved to specific customer records based on comparing information in the contextual transaction data or other transaction log to information in master customer records that was provided by retailers or other entities besides the retailer at which the transaction occurred.

Figure 37:
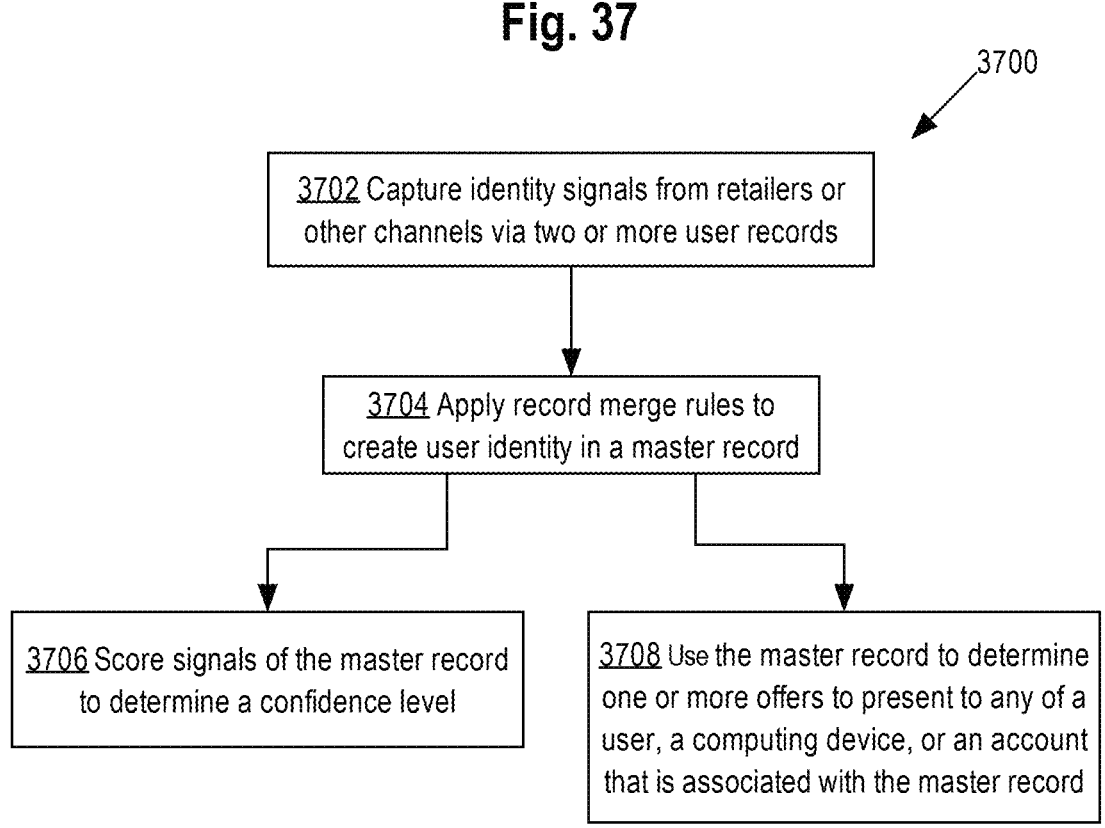
FIG. 37 illustrates an example process of generating a master record based upon two user records.

FIG. 37 illustrates an example process of generating a master record based upon two user records. In an embodiment, a data processing method is provided for generating a master user record from a first user record and a second user record, comprising: determining that there is an overlap between at least some key information contained in the first user record and the second user record; and creating a master record that includes a union of the first user record and the second user record. In various embodiments, the key information comprises at least one of: credit card number; one or more payment network credentials; phone number; address; one or more login credentials; home address; driver's license number or other personally identifying information; store membership number.

An embodiment may include updating the master record, in response to obtaining an update to one or more of the first user record and the second user record. An embodiment may include obtaining a third user record; determining that the third user record comprises second key information that overlaps with at least some data in one or more of the first user record and the second user record; an updating the master record by merging the third user record into the master record.

In an embodiment, a data processing method is provided for generating a parent record for at least a first user record that is associated with a first entity and a second user record that is associated with a second entity, comprising: determining that there is an overlap between at least a first set of information in the first user record and the second user record; determining a match of at least a second set of information in the first user record and the second user record; creating and storing the parent record using a union of the first user record and the second user record.

In an embodiment, the first user record is a first master record of the first entity and the second user record is a second master record of the second entity.

In an embodiment, the second set of information is uniquely associated with each of the first user and the second user. For example, the second set of information may indicate that the first user printed, activated or downloaded an offer, and that the second user redeemed the offer.

Any of the foregoing embodiments may include, in related embodiments, other processing steps based on uses of the master record. For example, in one embodiment, the process is configured to target particular offers based upon data in the master record. As another example, in an embodiment the process is configured to refrain from repeating offers that have been previously offered in connection with either the first user record or the second user record. As another example, in an embodiment the process is configured to present timely offers to one or more users who are associated with the master record.

In some embodiments, the process is configured to validate a master record, after forming the master record, by communicating one or more messages to a particular user who is associated with the user record and providing one or more challenges to the particular user that call for the particular user to verify that the particular user is correctly associated with the master record.

For purposes of illustrating a clear example, certain parts of the disclosure describe records obtained from merchant loyalty card programs. However, integration with a loyalty card program is not required and embodiments may omit interaction with a loyalty card program.

Referring now to FIG. 37, in one embodiment, a flow 3700 includes block 3702 at which the flow captures identity signals from retailers or other channels via two or more user records. Block 3702 serves as a way of obtaining a first record associated with a first computer and a second record associated with a second computer that is different than the first computer. In general, embodiments are useful in the context of computer systems that obtain or receive user records from a plurality of different sources, including but not limited to different retailers or merchants, as well as non-retailer services such as coupon printing services. An example is the coupon printing services that are commercially available at the time of this writing from Coupons.com Incorporated via the website COUPONS.COM.

In this context, a single user may have multiple user records established at the different sources and a computer system may receive all the user records at various times from the different sources. Each record includes some subset of at least partly identifying information, for example: one or more user identifiers; user biometric information; a loyalty card identifier; credit card number; name; phone number; e-mail address; network identifier such as IP address; mobile device identifier; offers shown to users; coupons activated; coupons redeemed; or other transactional data such as items purchased, time, date, retailer identifier, store identifier, geo-location data of a location at which a transaction occurred. For example, the architecture of FIG. 34 may be used to obtain two or more records relating to transactions with any of the retailers or from other services, such as coupon printing services. For example there could be two records received from Retailer A or one record received from each of Retailer A, B, C, etc. Further, in some contexts a single record is received from one of the retailers for comparison with master records that have already been created in the system. Each of the records typically includes one or more identity signals in the form of field values in the records that identify a user or customer or comprise metadata relating to a user.

At block 3704, a set of record merge rules are applied to the identity signals to create a user identity. For example, the field values of two records may be compared, and a master record may be created or updated based upon whether the values match. Further information about applying merge rules is described herein. In general, block 3704 may involve, in response to determining that the first record has been obtained from a primary source, determining that at least a first set of key information in the first record matches a second set of key information in the second record, and in response thereto: creating and storing a master record comprising a union of the first record and the second record; storing, in a database, a third set of key information in the first record that does not match the second set, and a fourth set of key information in the second record that does not match the first set.

At block 3706, the flow scores signals of the master record to determine a total score of the master record, which may be associated with a confidence level or confidence value, as further described herein. Additionally or alternatively, as seen at block 3708, the master record may be used to determine one or more offers to present to any of a user, a computing device, or an account that is associated with the master record.

In an embodiment, the merging referenced in block 3704 is performed using logic that implements, by programming or circuitry as appropriate, a plurality of test operations or rules that specify whether to merge first and second user data records based upon features of the user data records, conditions precedent to merging, and other factors. The merging logic may be used for batch processing of historic datasets or databases of records that were created using one or more computer systems of two or more different retailers, merchants or other entities. In some cases, merging may include related operations relating to storing conflicting field values, setting flag values, etc. In one embodiment, different sets of merge rules are applied depending upon the context in which the merging rules are applied. For example, different rules may be applied in the following contexts:

1. As part of an initial load of data, obtained from existing merchant records, at the time that a computer system implementing these techniques is first integrated with the merchant. This context may be termed "initial data load."

2. To process additional data obtained from transactions of users with the merchant and using digital receipts, after the initial data load.

3. To match and merge users during a batch process intended to remove duplicate entries. In one embodiment, a nightly batch process may be implemented to implement record consolidation in the event that new records of new users have been created in the second context above.

For the initial data load context, TABLE 1 states example test operations or rules for one embodiment:

TABLE 1

EXAMPLE RECORD MERGE RULES

| Identifier | Rule | Condition | Action |
| --- | --- | --- | --- |
| 1 | Records contain the same e-mail address | At least one record is from a primary source; if not, merging is not performed. | Merge the records into a master record. Store conflicting field values in database. Set primary flag for the conflicting fields based on source hierarchy. |
| 2 | Records contain the same phone number and last name | At least one record is from a primary source | Merge the records into a master record. Store conflicting field values in database. Set primary flag for the conflicting fields based on source hierarchy. |
| 3 | Records contain the same first name, last name, and primary account number (PAN) | At least one record is from a primary source | Merge the records into a master record. Store conflicting field values in database. Set primary flag for the conflicting fields based on source hierarchy. |
| 4 | Records contain the same loyalty program number, but different addresses, OR no addresses | At least one record is from a primary source | Used when rules 1, 2, 3 do not match on the records. Merge the records into a master record, omitting the address (or selecting the most recent address if the records both include timestamps indicating time of creating the records). Store the addresses in the database. |
| 5 | Records contain the same loyalty program number and the same address | At least one record is from a primary source | Do not merge the records. Assign a particular household identifier to both records and store in database. |

Figure 38A:
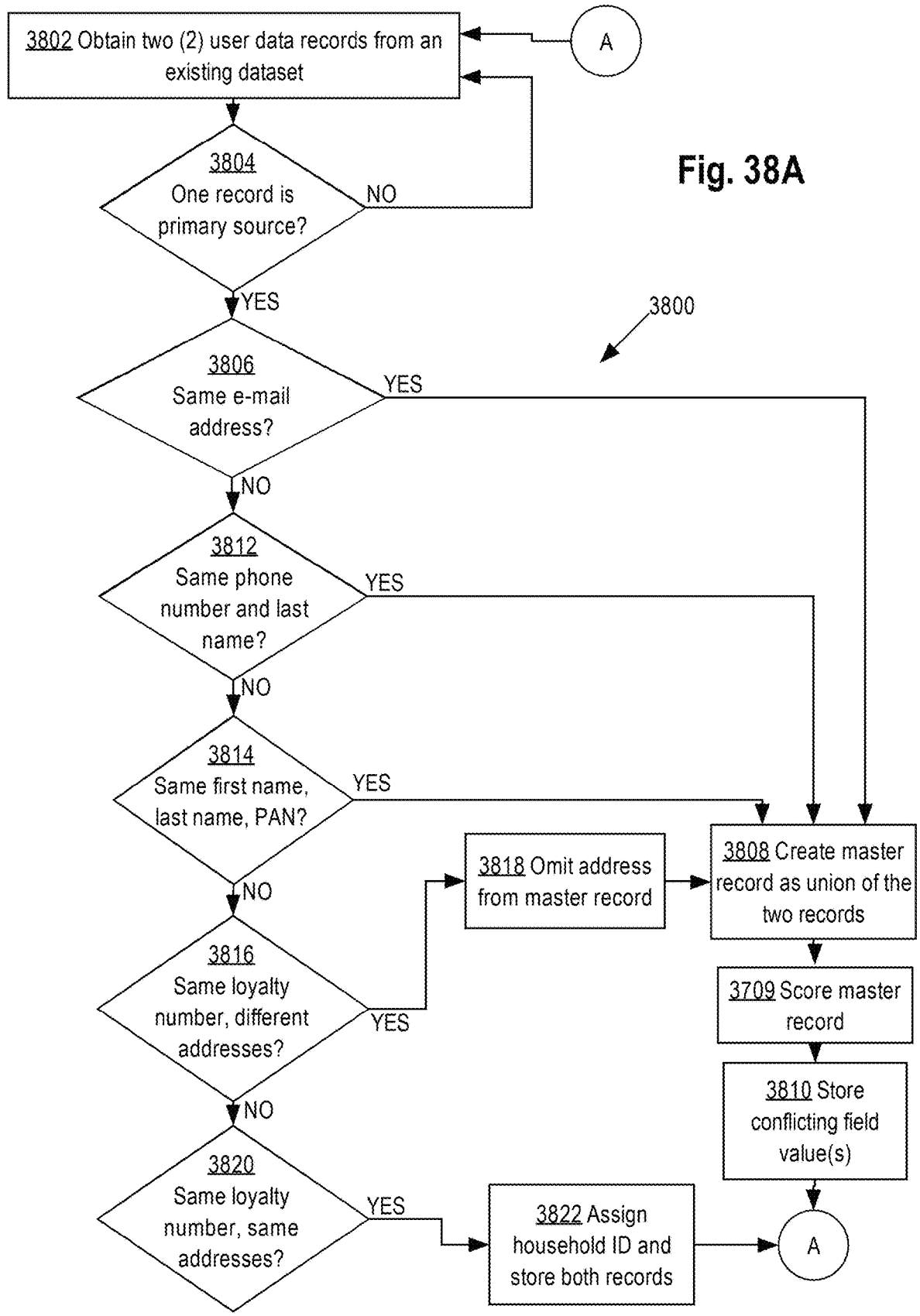
FIG. 38A illustrates a flow that can implement certain record merging rules.

FIG. 38A illustrates a flow that can implement the rules of TABLE 1 for one embodiment. Referring now to FIG. 38A, in a flow 3800 at block 3802, two (2) user data records are obtained from an existing dataset, for example, from a dataset that one of the Retailers (FIG. 34) has developed for other purposes as a result of interacting with customers. As tested at block 3804, one record in the comparison must have come from a primary source and if not, control returns to block 3802 to consider a different pair of records. If at least one record has come from a primary source, then at block 3806 the flow tests whether the records have the same e-mail address.

If so, then control transfers to block 3808 where a master record is created with data values formed as a union of the data values that are available in the two records, which may vary for different pairs of records.

Optionally, forming a master record with a union of data may include forming the master record with not just the key information values that have been used to determine a match, but also data about a particular consumer transaction that is reflected in the first data record and the second data record. Or, consumer transaction data indicated in the first data record and the second data record may be stored in a separate database and the master record may comprise pointers or other references to the transaction data. The particular data structures that are used are not critical provided that a particular master record relating to a particular user can be matched to transaction data that was obtained from retailers as a basis for forming or updating the master record.

At block 3809, a score may be generated for the master record and/or the input signals for use in determining a confidence level in the manner described previously for block 3706. At block 3810, any values of conflicting fields are stored separately in the database. Control then transfers to block 3802 to address another pair of records.

If e-mail addresses do not match, then at block 3812, the process tests whether the phone number and last name are the same in the two records. If so, then control transfers to block 3808, 3810, 3802 as above. If not, then control moves to block 3814 and the flow tests whether the same first name, last name, and PAN are indicated in the record. If so, then control transfers to block 3808, 3810, 3802 as above.

If not, then in block 3816 the flow tests whether the same loyal number but different addresses are in the records. If so, then control transfers to block 3808, 3810, 3802 as above, except that the address is omitted from the master record as seen at block 3818. If the same addresses are in the records, as seen at block 3820, then a common household identifier is assigned to the two records, which necessarily represent different uses of the same loyalty card number of the same household at different times, and both records are stored as master records with the household identifier available for use as a special-purpose flag. In this case both records are stored without merging into a common master record because the data suggests that two different persons are using the same loyalty card number for different purposes, and therefore the data should not be merged.

As an example of rule 1 above, if a user records received from COUPONS.COM (which is a primary source) and from Alpha Merchant Loyalty have the same e-mail address, then the records are associated with each other in the same master record, since the e-mail addresses match and COUPONS.COM is a primary source. In this context, a primary source may be: a credit card number source or debit card number source such as the end user or a trusted merchant point-of-sale terminal or card reader; a digital receipt source; a service provider website such as COUPONS.COM; a loyalty data source. Secondary sources may include loyalty data and third-party data. The processes herein may be configured to treat specified data fields from primary sources and secondary sources as trusted, as set forth in TABLE 1A:

| PRIMARY SOURCES | TRUSTED FIELDS |
|---|---|
| Credit card source or debit card source | First name, last name, card number, mailing address, birthdate |
| Digital receipt source | E-mail address, mobile number, PAN |
| COUPONS.COM | Name, e-mail address, address, phone number, loyalty number |
| Loyalty source | Loyalty number |
| SECONDARY SOURCES | TRUSTED FIELDS |
| Loyalty data | First name, last name, e-mail address, address, phone number |
| Third-party data | None |

If two records are received and the e-mail address does not match, then as seen in rule 2, the records are compared using mobile phone number or other phone number and last name or surname of the user. If both records contain mobile phone numbers and other phone numbers, then mobile phone number is given precedence as the field for matching. If the records match on the phone number, then the records are merged and considered as representing one user.

If both rules 1 and 2 do not result in a match of the two user records, then the records are compared against an available PAN number along with the first name and last name of the user, as seen in rule 3.

In applying these rules and others, fields that are blank cannot serve as the basis of a match.

Updates of the loyalty data that was received in the context of the initial load may be obtained periodically by the system. When an update to existing loyalty data is received, the loyalty number in the update may be used as a lookup key to locate an existing master record that has the same loyalty number. If the loyalty number is not found, then in response, the process creates a new record for a user with the loyalty number.

For the second context, in an embodiment, the system further comprises logic that is configured to determine, at a point in time close to a retail transaction, whether to create a new master record based upon data just received from a retailer, merchant or other entity and representing or associated with a transaction that recently occurred for a particular individual. TABLE 2 specifies example rules that may be used in this context.

TABLE 2

EXAMPLE RULES FOR ADDITIONAL DATA

| Rule | Description | Actions |
|---|---|---|
| 2.1.1 | Receive loyalty card identifier from user. If the user requests to receive an electronic receipt for the transaction, obtain the mobile phone number or e-mail address to which the receipt is to be sent. If the user tenders payment using a card, obtain the card number for use as the primary account number. | Query database for loyalty card identifier. If found, do not create a new master record. Optionally update the master record with the mobile phone number, e-mail address, and/or primary account number. If the loyalty card identifier is not found in the database, create a new master record. |
| 2.1.2 | Loyalty card identifier is not received; merchant does not use a loyalty system but maintains records based upon other forms of primary account number. Receive a primary account number, phone number or | Query database for key value. If found, do not create a new master record. Optionally update the master record with the mobile phone number, e-mail address, and/or primary |

TABLE 2-continued

EXAMPLE RULES FOR ADDITIONAL DATA

| Rule | Description | Actions |
|---|---|---|
| | e-mail address for use as key value. | account number. If the key value is not found in the database, create a new master record. |
| 2.1.3 | User requests a digital receipt without using a loyalty card or account number. | Create record based upon either e-mail address or mobile phone number, and PAN. |
| 2.1.5 | User did not use loyalty card, and did not request a digital receipt | Any user data that might be obtained is not associated with a master record. |

Other embodiments may implement a flow similar to FIG. 38A but including data elements other than those specifically addressed in FIG. 38A such as name, phone, loyalty number, etc. For example, additional entities may serve as sources of signals that might enrich the user record or household relationships. Examples include social signals from social graphs; geo-location data; behavioral patterns. Collectively these additional patterns and data elements could be inferentially relevant or extensive to the master record and confidence. Further, iterative confidence scoring may be performed using variable levels of frequency or repetition; for example, re-performing the confidence scoring described herein at different times may lead to changes in confidence values. In general, many signatures other than those specifically described herein may be used within the scope and spirit of the present disclosure and claims.

Figure 38B:
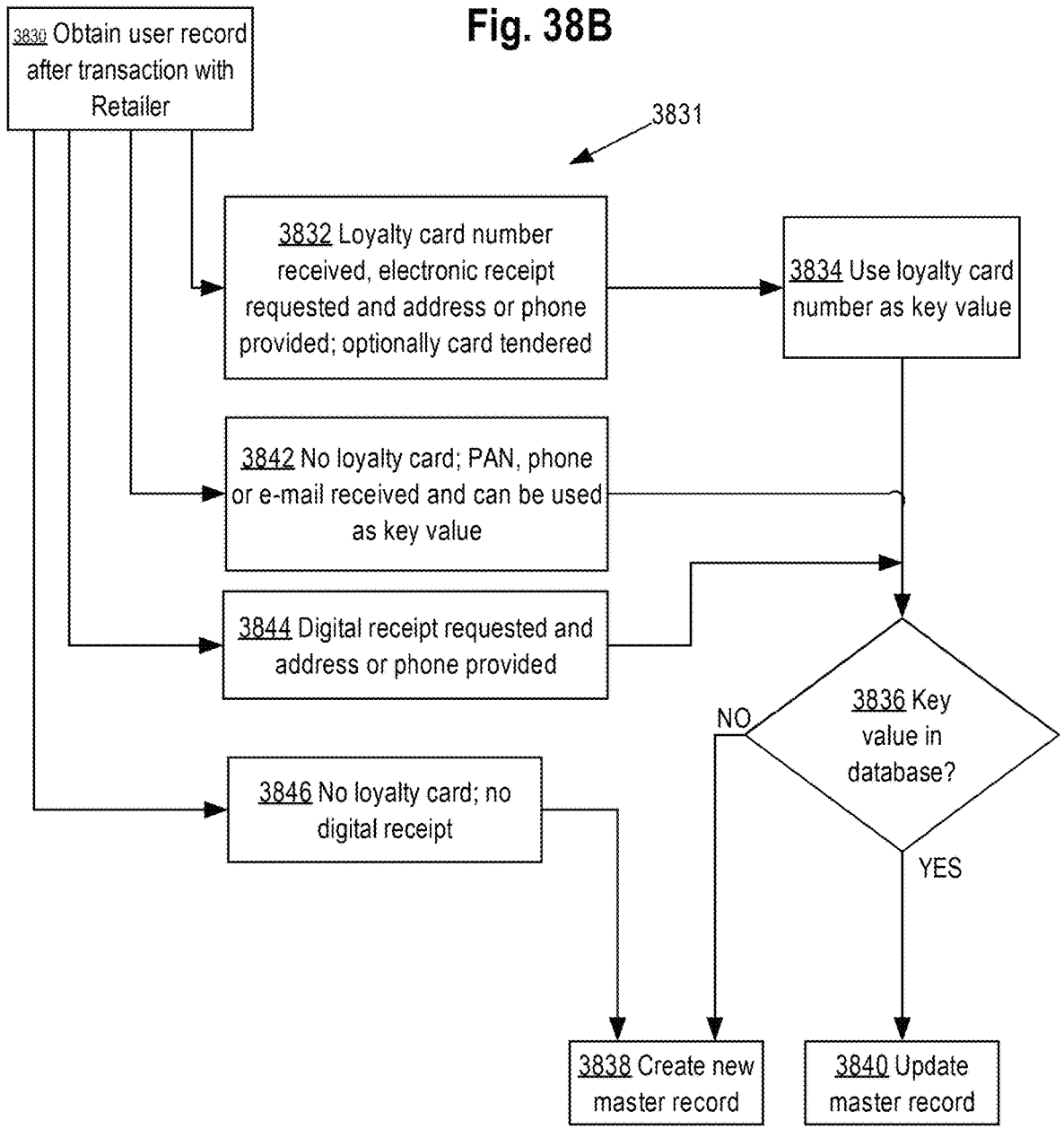
FIG. 38B illustrates an implementation of the foregoing rules as a process flow that can be executed by the computer systems that have been previously described.

FIG. 38B illustrates an implementation of the foregoing rules as a process flow that can be executed by the computer systems that have been previously described. At block 3830, the flow 3831 receives a user record after a particular user has completed a transaction with a Retailer. The record may be obtained at any time, including during a transaction, immediately after a transaction, or a considerable time after. At block 3832, the flow determines whether the user record includes a loyalty card number, an indication that an electronic receipt was requested and an address or phone number for the receipt, and optionally a card number for card payment. If so, then as seen at block 3834, the loyalty card number is used as a key value. In block 3836, a query to the master record database is performed using the key value; if the key value matches an existing record, then the record is updated at block 3840. If the key value does not match any existing record, then a new master record is created at block 3838 and updated with values based on available fields in the user record.

Block 3842 indicates logic when the user record of block 3830 does not include a loyal card identifier, but a PAN, phone number or e-mail address have been received and one of them can be used as the key value. The logic of block 3836, 3838, 3840 is then performed for that key value.

Block 3844 is reached when the user record indicates that a digital receipt was requested and an address or phone number was provided. In this case, a new master record may be created because there are no key values to support a query to the database for an existing master record. The same logic is performed when no loyalty card identifier is present and no digital receipt was requested; a new master record is created using any data values that are available in the user record.

Rule 2.1.1 can, in some cases, result in associating the data of two or more users with one master record and loyalty card number. For example, if the user presents a loyalty card of another person during the transaction, but sends a digital receipt to themselves, then the loyalty card identifier of one person and the e-mail address of a second person could be placed in the same master record.

In an embodiment, after the rules of Table 2 are used for a set of transactions to create new user records, the merging process described above may be used to determine if the newly created user records should be merged into existing master records that are already in the database. For example, the rules of Table 2 may be used during the opening hours of a merchant or retailer, and after hours or in a batch process initiated at a different time, the merge processing may be performed.

In an embodiment, for the third context described above, the logic is further configured to implement a plurality of batch process matching and merging rules that may be used when new records from loyalty programs or other sources have been obtained and need to be matched and merged into master records to avoid potential duplication. In one embodiment, essentially the same logic as in FIG. 38A may be used. For example, assume that during use of the system in the second context above, a user requests a digital receipt without having a loyalty account. In response, a new record is created (FIG. 38B, block 3844, 3838) and a receipt will be sent to the user's email address. Then, in the third context, the processes herein attempt to determine if other records with the same e-mail address exist and match the newly created record, and to merge any matching records; this can be performed because the digital receipt request mandates that the new record came from a primary source, namely the system herein which created the new record.

Assume that a dataset is received from the second context above and includes a first user record having a particular e-mail address and a second user record with the same particular e-mail address, and one of the records has been obtained from a primary source; in response, the records are merged into a master record comprising a union of the data of both records. If neither of the records has been obtained from a primary source, then merging is not performed. For example, assume that a user requests a digital receipt during a merchant transaction, but does not have a loyalty account with the merchant; in response, a record is created and the digital receipt is communicated to the e-mail address that the user specifies, and the process attempts to find other records with the same e-mail address and merge the records because an e-mail address provided as part of a request for a digital receipt is considered a primary source.

If one of the records has been obtained from a primary source but the e-mail address does not match other records, then in response, the records are compared against the mobile phone number or other phone number and the user's last name. If both records contain mobile and phone numbers, then the mobile number takes precedence as the field to be used in the comparison. If the records match on number and last name, then the records are merged and considered as associated with a single user.

If the foregoing tests fail, then the records are compared using a primary account number, if available, and the user's first name and last name.

The result of a match is that data is merged into a master record having a single record identifier.

Scoring a record's signals to determine identity confidence occurs at block 3706 of FIG. 37. In one approach, a process involving scoring generally involves obtaining a first record associated with a first computer source and a second record associated with a second computer source; in response to determining that the first record has been obtained from a primary source, determining that at least a first set of key information in the first record matches a second set of key information in the second record, and in response thereto: creating and storing a master record comprising a union of the first record and the second record and a plurality of master record key values; creating and storing a score value for the master record based upon a plurality of score values that are assigned to each of the master record key values, wherein the score value indicates a level of confidence that the first set of key information and the second set of key information refer to a particular consumer; using the master record to determine one or more electronic offers to present to any of a user, a computing device, or an account that is associated with the master record. Within this general framework, the score value may be modified, typically by increasing it, in response to several different trigger conditions. For example, in one approach, the process involves obtaining a third record from any of the first computer source, the second computer source, or a third computer source; determining that a third set of key information in the third record matches master record key information in the master record; and increasing the score value of the master record based upon a nature of the third set of key information to the fourth set of key information.

In one aspect, the first set of key information comprises a first identifier that matches a second identifier in the second set of key information, and the score value of the master record is increased based upon determining that both the first identifier and the second identifier are in the third record. This aspect reflects scoring enhancements in response to detecting consistent use and pairing of key values.

In yet another aspect, user validation triggers score increases. For example, in one approach, the score value of the master record is increased in response to receiving a validation signal indicating that a consumer has validated the first key information or the second key information. In still another aspect, signal ownership via pairing of one signal with a validated signal results in a further increase in scoring.

In an embodiment, individual signals are scored in response to any of three (3) events. Scoring may occur when a signal is observed for the first time, when the system receives the signal from a partner entity or from its own channels. Scoring may occur when a signal is paired such that two signals are observed from a trusted source. Or, scoring may occur when a signal is validated, for example, when a user confirms the ownership of a particular signal. In general, the scoring techniques herein address the fact that merely matching identical e-mail addresses in two user records received from one or more retailers cannot provide complete confidence that the records refer to the same individual; for example, in one record the consumer may have typed an address incorrectly so that it is inadvertently matched to another record of a completely different person. To address the inherent uncertainty involved in matching two separately received records that have many data fields of which only one or a few appear to match, scoring permits increasing the trust, confidence in or value of the resulting master record as data values are used repeatedly or in pairs in different transactions or from different trusted sources.

In an embodiment, individual signal scores are combined to determine the score of a full user record. For example, if a first record from a first merchant includes Name, PAN, and Mobile Number, and a second record from a second merchant includes E-Mail, Mobile Number, and Loyalty Number, then the master record comprises a union of all the values or Name, PAN, E-Mail, Mobile Number, and Loyalty Number, and the score of the master record is the arithmetic average of individual scores of each of the values. Using an arithmetic average treats each value effectively as equal in weight, but in other embodiments, different signals or field values may have different weights that cause modifying the point values that would otherwise be applied.

In an embodiment, master records are scored using a minimum score of 0.0 and a maximum score of 1.0, in increments of 0.01. As an example, TABLE 3 illustrates score values that may be assigned when particular scoring events occur.

TABLE 3

SCORING EVENTS AND VALUES

| Scoring Event | Point Value |
| --- | --- |
| Signal observed | 0.02 |
| Signal paired | 0.05 |
| Signal validated | 0.80 |
| First signal paired with validated second signal | 0.10 |
| Validated pair of signals | 0.20 |

In an embodiment, if any of the matching techniques described herein result in identifying a conflict between two records, then point values may be deducted from the scores that would otherwise be determined for the individual two records in the process of determining a score for the resulting master record.

Figure 39:
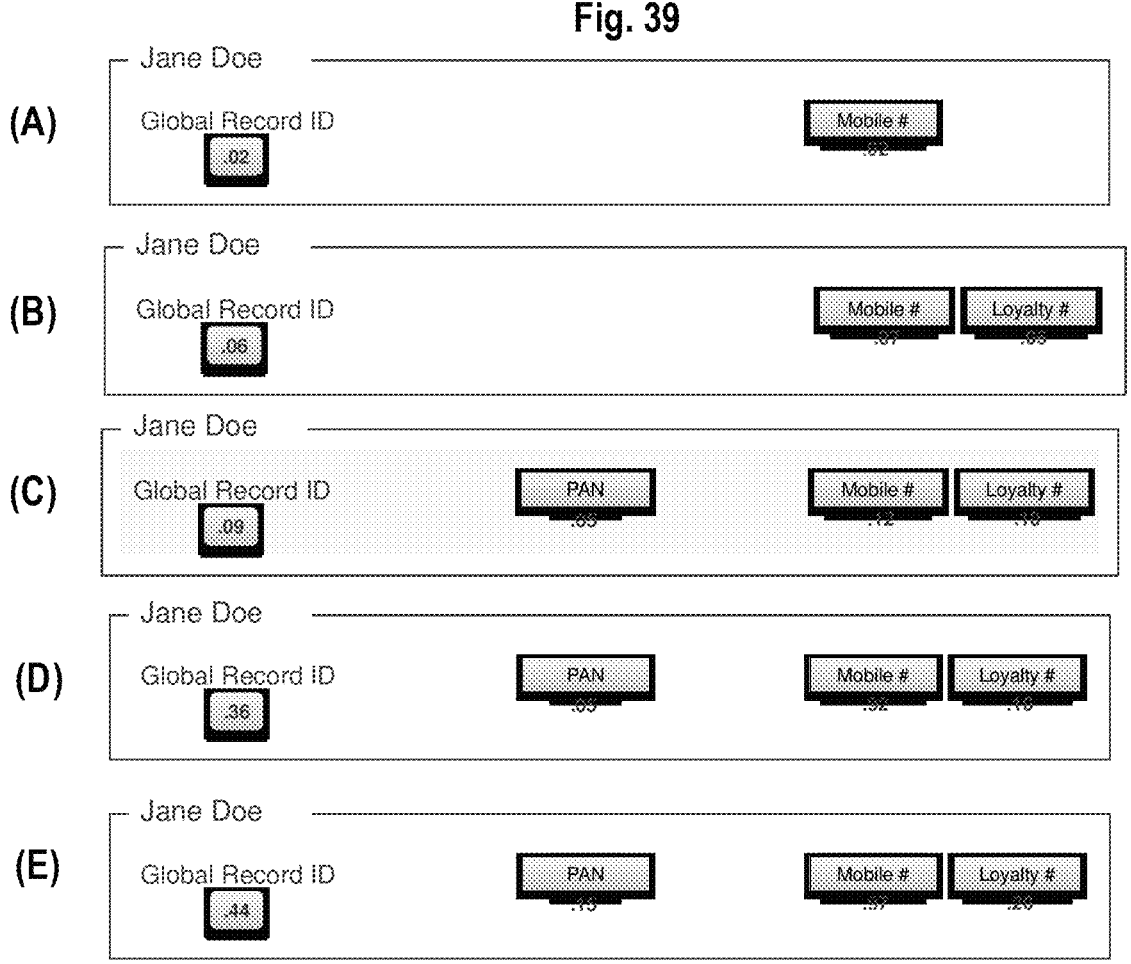
FIG. 39 is a five-part diagram that illustrates content and score values of a hypothetical single master record as it is updated after a series of transactions.

FIG. 39 is a five-part diagram that illustrates content and score values of a hypothetical single master record as it is updated after a series of transactions. As a hypothetical example of scoring, assume that an end user named Jane shops at Store for a set of items. She checks out with cash and elects to receive a digital receipt using her mobile phone. The Store's system generates a user record, which the processes herein obtain. In response, since a signal has been observed, the processes herein form a master record with a score (or "Global Record ID") of 0.02 resulting from receiving a user record with a mobile phone number. The content and score values associated with the master record are shown in FIG. 39 view (A).

Assume now that Jane returns to Store again to get a second set of items. This time Jane checks out with cash and uses her loyalty card to get a discount, and elects to receive a digital receipt using her mobile phone. Because her loyalty card number is used with her mobile phone number, paired signals are involved. Therefore, the mobile phone number is scored 0.07 and the loyalty number is scored 0.05. The master record is scored 0.06, which is the arithmetic average of the individual score values. The content and score values associated with the master record are shown in FIG. 39 view (B).

Assume further that Jane returns to Store on another day and purchases a third set of items. Jane checks out with her credit card and using her loyalty card; she again requests a digital receipt to be sent to her mobile device. A primary account number is present in the form of a credit card number, which is scored 0.05. The mobile phone number is scored 0.12 because it has been paired with the PAN. The loyalty number is scored 0.10 because it has been paired with the PAN. The master record is scored 0.09. The content and score values associated with the master record are shown in FIG. 39 view (C).

Now assume that Jane logs into Store.com for the first time to see a set of personalized offers. Jane requests reviewing her receipt history, so she is prompted and completes validation of her mobile phone number. In response, her PAN remains scored 0.05; the score associated with her mobile phone number is updated to 0.92; the score associated with her loyalty card number remains 0.10; and the score of her master record is updated to 0.36. The content and score values associated with the master record are shown in FIG. 39 view (D).

Finally assume that Jane returns to Store to get another set of items. She checks out with her credit card and uses her loyalty card for a discount and asks to get a digital receipt using her mobile phone. In response, her PAN is scored 0.15 since it has been paired with her loyalty card; the score associated with her mobile phone number is updated to 0.97 for the same reason; the score associated with her loyalty card number is updated to 0.20 for the same reason; and the score of her master record is updated to 0.44, which is the arithmetic mean of the other values. The content and score values associated with the master record are shown in FIG. 39 view (E). Using this approach, it will be seen that the score of a master record increases smoothly as different identifiers are used in combination with one another to increase system confidence in the association of values in the master record.

Figure 40:
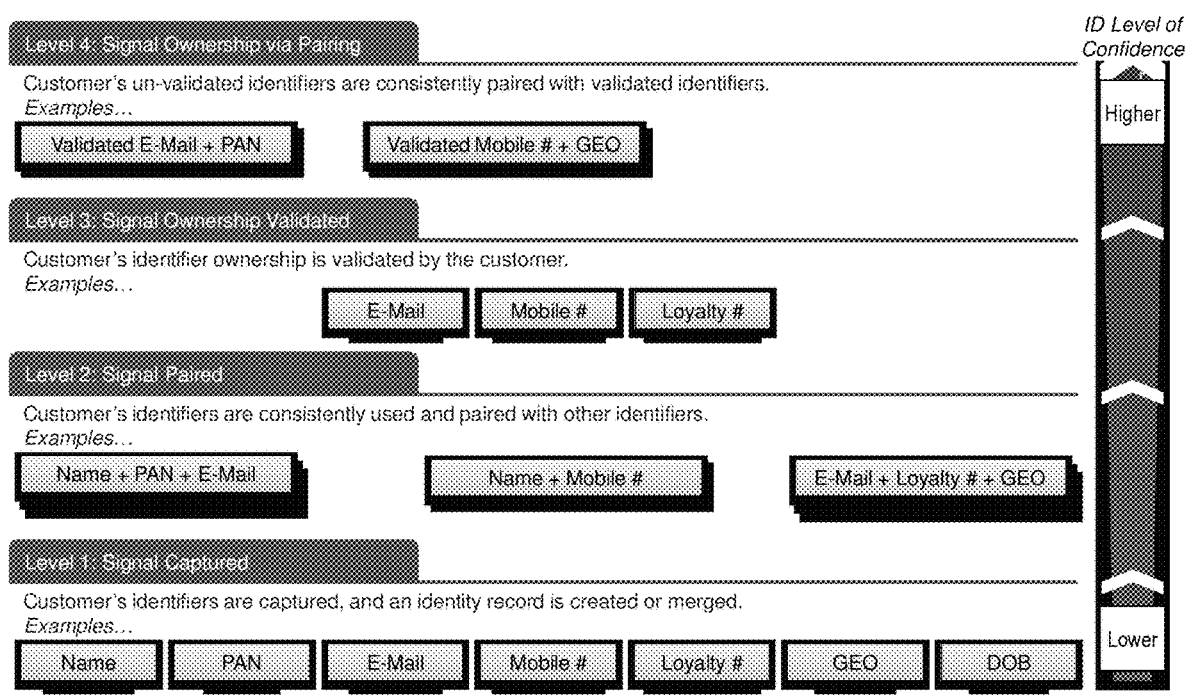
FIG. 40 provides a graphical illustration of levels of confidence in relation to master records and score values.

In one embodiment, merging is controlled in part by confidence values that are created for particular user records. Score values may be associated with confidence values at a plurality of levels. In one embodiment, each confidence value may have one of four (4) values indicating four (4) successively higher levels of confidence. FIG. 40 provides a graphical illustration of levels of confidence in relation to master records and score values. For purposes of illustrating a clear example, the description herein uses numeric values to represent confidence levels, but other discrete identifiers of different values may be used in other embodiments. For example, rather than increasing a confidence level based upon pairings or other explicit associations of data values as seen in FIG. 40, cookies set by the computer system herein as a user computer visits different partner websites associated with the computer system may be used as a basis for anonymous or implicit pairings. Thus, if the user 535 (FIG. 5) of a client 520 is connected to the coupon server 110 which is implemented in the manner shown for offer distribution system 1650 (FIG. 16), then the user's visits to websites 1613 can result in offer distribution system 1650 setting multiple cookies at different sites that are affiliated with the system. Data in the cookies can be used to associate a first user record from one site and a second user record from a second site to produce a correlated consumer online purchase history that is linked to the master records.

In one embodiment, when a signal is captured that includes one or more customer identifiers, and an identity record is created or merged, then the record is assigned a confidence value of "1". The customer identifiers may include one or more of: name; primary account number; e-mail address; mobile phone number; loyalty number; geolocation identifiers; date of birth.

In an embodiment, signal pairing may occur in which at least one identifier of a customer is consistently used and paired with one or more other identifiers, and in response, the identity record is assigned a confidence value of "2". Examples of paired signals that may result in a confidence value of "2" include: name, primary account number, and e-mail address; name and mobile phone number; e-mail address, loyalty number, and geolocation values.

In an embodiment, signal ownership may be validated by the customer. Examples include e-mail address, mobile phone number, and loyalty number. When such validation occurs, then in response, the identity record may be assigned a confidence value of "3".

In an embodiment, signal ownership via pairing may occur when a customer's un-validated identifiers are consistently used and paired with validated identifiers. Examples include a validated e-mail address that is paired with a primary account number, and a validated mobile phone number that is paired with geolocation values. When such signal ownership is indicated, the identity record may be assigned a confidence value of "4".

It will be apparent from FIG. 39 and the description in this entire section that the present techniques permit developing master records that combine or indicate purchasing behavior of consumers across a plurality of transactions at a single retailer or many retailers. Moreover, the present techniques permit developing master records that reflect consumer purchasing behavior across multiple merchants, at a third party computer, without requiring a first retailer to directly share its consumer purchase data with a second retailer, which could be a competitor. Instead, an independent service obtains the records separately, finds ways to merge records into master records, and then can enable each of the retailers to benefit opaquely from data that has been developed from other retailers, even competitors. Still another benefit is that the techniques herein enable developing a master record that reflects multiple different e-mail addresses that may be genuinely associated with a single individual when these different addresses are used as identifiers in different retailer transactions, for example, for receiving digital receipts or in association with loyalty cards or other retailer incentive programs.

The resulting master records may be used in various embodiments for various forms of targeting offers, as further described herein. The master record may be used to determine one or more offers to present to any of a user, a computing device, or an account that is associated with the master record. The may comprise offers of incentives based upon a purchase of consumer packaged goods, or any of coupons, rebates, and gift certificates, in various embodiments. Offer targeting may involve partner sites, refraining from repeating offers, and/or presenting timely offers. For example, targeting offers at partner sites may be based upon a master record that indicates that the user is interested in item A; therefore when the user visits a partner site, the user may be shown targeted offers to item A. Alternatively, a household record may indicate that users in the household are interested in item A; therefore when a user in the household visits a partner site, the process may show the user targeted offers to item A.

As another example, a master record may indicate that the user was shown an offer for item A, but the user did not display interest; therefore when the user visits a partner site, the process may not show the user targeted offers to item A. Timely offers also may be presented. For example, the master record may indicate that the user bought detergent about three (3) months ago; in response, the process may show the user coupons for detergent, especially when shopping history data indicates that the user buys detergent every three (3) months.

Still another use of the techniques herein is to enforce control of offers. With the techniques herein, a particular user is less likely to be able to obtain multiple instances of the same offer. For example, a particular user might establish loyalty accounts at different retailers using different identifiers as keys, such as different e-mail addresses or phone numbers. However, the number of such identifiers of a particular individual usually is finite and small, and the pairing of various combinations of the identifiers over time may allow the processes herein to cause different records of transactions from different retailers to merge into or update the same master record. Therefore, the likelihood that the same individual is given the same offer via two different e-mail addresses or other channels may be reduced significantly.

In any of the foregoing embodiments, both structured and non-structured data may be used in matching. For example, if any of the processes described above receive the last four (4) digits of a credit card number from a plurality of retailers, determining that all such records relate to the same individual may have a moderate to low confidence level. However, correlating the same data with geo-location data indicating the location of spending may result in increasing the confidence level because there is a low probability that two different people with cards having the same last four (4) digits would spend in the same geographic location.

3.5. Offer Targeting

Figure 23:
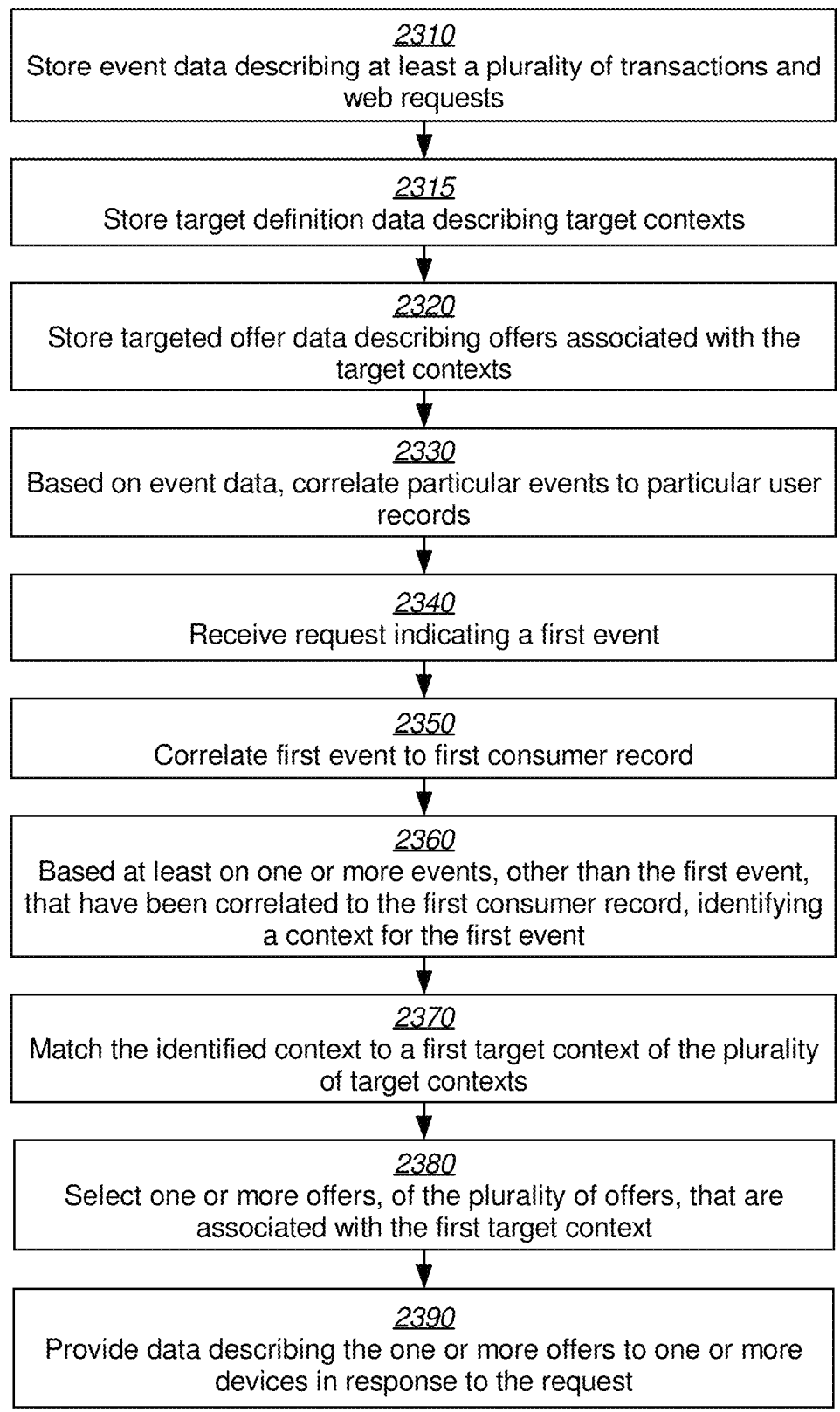
FIG. 23 illustrates a flow for targeting offers to specific consumer entities, in accordance with an embodiment.

FIG. 23 illustrates a flow 2300 for targeting offers to specific consumer entities, according to an embodiment. In various embodiments, the flow 2300 may illustrate in whole or in part the operation of the embodiments discussed in connection with FIGS. 15 and 16.

Block 2310 comprises storing event data describing a plurality of events. The events comprise at least a plurality of transactions and a plurality of web requests. However, a variety of other events may also be described, including offer redemptions, offer activations, visits by various consumers to specific locations, accessing certain smartphone applications, accessing a shopping list, ATM withdrawals, flights, prescriptions, and so forth. The event data may take a variety of forms, including collections of logs. For instance, the event data may comprise web logs and transaction logs. Or the event data may comprise a single collection of normalized events, in which some event records represent transactions and other event records represent web requests. In an embodiment, some or all events are detected by parsing web logs or transaction logs. In one embodiment, these events may be the events discussed in connection with the embodiment of FIG. 16. In one embodiment, a data processing system, possibly operated by an offer distributor, is adapted to select an offer from a plurality of offers based on one or more such events.

The events may have been received from a variety of different sources, including consumer devices and retailers. The offer distributor may deploy any number of event handlers to receive, process, and store the events. For example, an offer server may be responsible for handling any and all types of events, or one or more other servers or components may be responsible for handling various aspects of the events. System 1600 illustrates an example system for receiving and storing events, but a variety of alternative systems may be utilized.

There may be different types of event records for different types of web requests. For example, one type of web request event may be a visit to a manufacturer's website, another type of web request event may be adding an item to an online shopping cart, another type of web request event may be viewing or activating an offer on an offer distributor's website, another type of web request event may be viewing a digital receipt, another type of web request event may be accessing a shopping list through a smartphone application, another type of web request event may be a social networking message to a manufacturer or that references a product from the manufacturer, and so forth.

In an embodiment, multiple discrete events may be derived from a single received event. For example, related purchase events for each item purchased in a transaction may be derived from a transaction event involving the multiple products. In an embodiment, certain complex events may also be generated based on the received events. A complex event is a plurality of received events that, to simplify targeted event recognition, have been combined based on their respective event information and/or their resolved consumer entity. For example, multiple different transaction events might be used to generate a complex event that represents the purchases of multiple items within a certain time period by a particular consumer. Or a series of location events that are correlated to a certain consumer entity may be used to generate a complex event to represent a grocery shopping trip.

Block 2315 comprises storing target definition data describing a plurality of target contexts. For example, a context may include data such as demographic information about a consumer entity on whose behalf a request was likely made, a location associated with a request, information about a retailer associated with a request, past transactional and/or offer-related actions taken by the consumer entity, items in a shopping list or shopping cart belonging to the consumer entity, the time and/or day when the request was made, and so forth. In one embodiment, these contexts may be the contexts discussed in connection with the embodiments of FIGS. 15 and 16. In one embodiment, a data processing system, possibly operated by an offer distributor, is adapted to select an offer from a plurality of offers based on one or more such target contexts.

Each context may be a set of one or more events that occur within a specific time frame or sequence. Contexts may be arbitrarily simple or complex. For example, one context may be a purchase of a certain item within a day of consumer opening a shopping list application. As another example, a context may be a visit to an ATM machine within a few hours prior to a football game by a 25-30 year old male who has purchased tickets for the game. The contexts may be defined by offer providers, offer distributors, and/or automated processes that evaluate the event data for correlations, as described in other sections.

In an embodiment, a targeted context is a consumer that has purchased a product x in a last period of time. The purchase event is derived from a transaction at a first retailer. A second retailer, different from the first retailer, associates the targeted context with its own offer. In an embodiment, the targeted context is a consumer, in a particular location, opening a smartphone application for managing coupons or shopping lists.

In various embodiments, a targeted context may be, or may include historical transaction records and/or contextual transaction data retrieved from a memory or received from a remote retailer or other entity, such as the historical transaction records and contextual transaction data 1345 discussed in connection with the embodiments of FIG. 13A or FIG. 15. In one embodiment, a data processing system, possibly operated by an offer distributor, is adapted to select an offer from a plurality of offers based on one or more historical transaction records and/or contextual transaction data.

Block 2320 comprises storing targeted offer data describing a plurality of targeted offers. Each particular offer of the plurality of targeted offers is associated with one or more particular target contexts, of the plurality of target contexts, to which the particular offer is targeted. For example, when an offer provider defines an offer using offer creation techniques such as described herein, the offer provider may be given an option to link the offer to one or more of the target contexts. Additionally, or alternatively, the offer provider may be given the opportunity to define on or more new target contexts to which the offer is to be linked. In one embodiment, the offer distributor may charge an increased fee for this service. In another embodiment, the offer provider may associate a potentially different bid amount that the offer provider is willing to pay for targeting an offer with each specific context to which an offer is targeted. The offer distributor may later use the bid as a factor in determining which offer to target to a context.

Block 2330 comprises, based on the event data, correlating particular events of the plurality of events to particular consumer records. The correlation comprises resolving credentials associated with the particular events to particular consumer entities, using any suitable technique. For example, a web-based event may include a device identifier and/or consumer name that is resolvable to a particular consumer entity. As another example, a transaction event may include a loyalty card number, credit card number, and/or line item details that may be resolved to a particular consumer entity. In an embodiment, for the purposes of targeting offers, credentials that are ambiguous or otherwise resolve to a group of consumer entities with a certain degree of confidence, may be correlated to each member of the group. In an embodiment, correlating comprises determining probabilities that an event reflects activity by each of a plurality of consumers, and selecting a first consumer record because the first consumer record describes the consumer having the highest probability.

In an embodiment, correlations may be reevaluated on an ongoing basis. For instance, correlations may be reevaluated whenever consumer records are updated, or on a periodic basis. In an embodiment, to reduce system resource consumption, only events that could possibly match a defined target, or events that are used for reporting or other purposes, are actually correlated to a consumer entity.

Block 2340 comprises receiving, over a network, a request indicating a first event. For example, an event handler may receive a new event like those described with respect to block 2310.

Block 2350 comprises correlating the first event to at least a first consumer record, in the same manner as described above with respect to block 2330.

Block 2360 comprises, based at least on one or more events, other than the first event, that have been correlated to the first consumer record, identifying a context for the first event. For example, the first event may form a complex event in concert with the other event(s) that were correlated to the consumer entity, such as a complex event for adding a certain item to a shopping list within a certain amount of time of purchasing another item or visiting a certain website. The context may further include other information, such as demographic information for the consumer entity to whom the first event was resolved. In fact, in another embodiment, the context is determined based only on the first event along with the demographic information for the consumer entity. For example, one context might represent a web view of an offer by a female of a certain age.

Block 2370 comprises matching the identified context to at least a first target context of the plurality of target contexts stored in block 2315. It is possible that the identified context will match several target contexts. For example, one offer may target persons who purchased item X within 72 hours, and another offer may target persons who purchased item X at store A. If the identified context is purchasing item X at store A within the last 24 hours, both target contexts would match.

Block 2380 comprises selecting one or more offers, of the plurality of offers, that are associated with the first target context or any other target context matched in block 2370. The selecting may be performed based on the targeted offer data stored in block 2320. In some embodiments, providers are free to associate and/or disassociate their offers with any target contexts for which they wish to pay. Consequently, multiple offers may at times be associated with the same target context. All of these offers may be selected, one or more offers may be selected from these offers randomly, or one or more offers may be selected from these offers based on a variety of ranking criteria and/or rules. For example, a set of offers may be selected based on a revenue per targeted impression metric. Such a metric may take into consideration not only what each provider is willing to pay the distributor for presenting the targeted offer, but also the opportunity cost associated with not presenting other offers instead, given factors such as distribution limits, expiration dates, and the likelihood of a specific consumer entity actually activating the offer. As another example, a set of offers may be selected based on a universal scoring function, as described herein. As another example, if an offer is associated with multiple matching target contexts, the offer may be ranked more highly. In an embodiment, it is also possible that, at any given time, some of the target contexts may not be associated with any offers.

Block 2390 comprises providing data describing the one or more offers to one or more devices operated by the correlated consumer entity in response to the request. Any suitable offer distribution technique may be used for providing the information. In an embodiment block 2390 occurs responsive to a request for a receipt for a particular transaction. In an embodiment, the offer information in block 2390 may be provided to a device that did not necessarily trigger or send the first event. In an embodiment, rather than provide information about a targeted offer to a consumer, the targeted offer may be activated automatically for the correlated consumer entity.

Flow 2300 illustrates but one example flow for targeting offers. Other flows may feature additional or fewer elements, in potentially varying orders. For example, another method for targeting offers comprises maintaining defined targets, receiving events, matching the events to defined targets, identifying a set of mapped offers that corresponds to the matched targets, ranking the offers, and providing information about the offers to a consumer. A variety of other suitable techniques are also described elsewhere in this application.

Contextualized Events

In an embodiment, to assist in recognizing targeted event more rapidly, various contextualized events may also be generated. A contextualized event is an event, which may be simple or complex, that is generated to match a target context. The contextualized event represents, in essence, a predetermined context per 2360.

In an embodiment, a filtered set of events is passed to an event contextualizer. The filtered events may be passed as they are received, or during a subsequent analysis stage. For example, only those events that could possibly form part of a match to a target definition are passed to the event contextualizer. The event contextualizer examines other events and information associated with the consumer entity to which each filtered event has been correlated to determine if, in view of the filtered event, the conditions of any defined target have been met. If the conditions of a target have been met, a contextualized event is generated and stored for the consumer entity. A targeted offer selection process may then consider the contextualized event when providing targeted offers. For example, the targeted offer selection component may select a targeted offer based on the most recent or most common contextualized event.

In an embodiment, to further speed up the analysis of events, the event contextualizer may maintain consumer context data that tracks a "state" of each consumer entity. The consumer context data indicates events that may form a match to a defined target in the future if a certain type of event is received. The consumer context data may comprise one or more state machines or other appropriate data structures for tracking such information. For example, if a defined target requires the purchase of milk and cookies within a 24 hour time span, the consumer context data may indicate whether a transaction event has been received that shows the purchase of one of these two items within the last 24 hours.

3.6. Offer Recommendations

In addition to, or instead of, presenting consumers with specifically targeted offers, an offer server may also present consumers with recommended offers that have not been specifically targeted to consumer events. Any suitable recommendation engine may be used. Examples of suitable recommendation techniques are described in the referenced applications. Additional offer recommendation techniques are described in, for example, U.S. Ser. No. 13/612,848, the contents of which are hereby incorporated by reference for all purposes as if set forth in their entirety herein.

Offers may be scored within a recommendation engine using scoring functions dependent upon any of a variety of signals, including metrics derived from transaction data, offer tracking data, offer data itself, and consumer behavioral logs. Different scoring functions may weigh signals differently in accordance with different objectives. For example, some scoring functions may be optimized to perform well with respect to a metric that is favorable to an offer distributor, such as increasing revenue per impression, revenue per redemption rate or other offer-related revenue, while other scoring functions may be optimized to perform well with respect to metrics that are favorable to a consumer, such as increasing an offer discount per consumer, while yet other scoring functions may be optimized to perform well with respect to metrics that are favorable to a retailer or offer provider, such as profit per impression. Different scoring functions may be used for different contexts—for example, one scoring function may be used for a consumer on a mobile device that is within the vicinity of a certain store, while another scoring function may be used for a consumer browsing receipt data at home.

Figure 24:
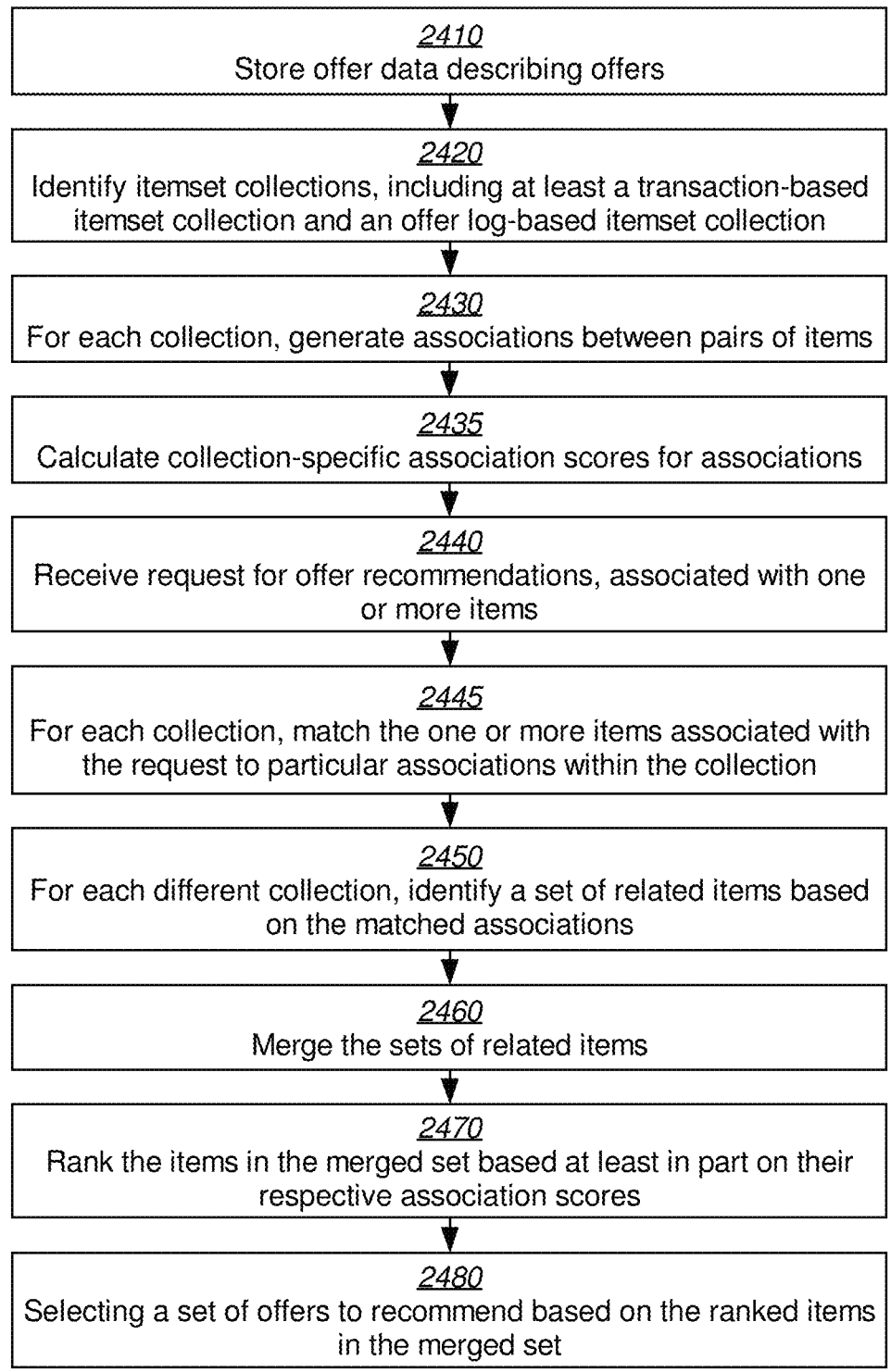
FIG. 24 illustrates an example flow for recommending offers, in accordance with an embodiment.

FIG. 24 illustrates an example flow 2400 for recommending offers, according to an embodiment. Block 2410 comprises storing offer data describing a plurality of offers, as described in other sections.

Block 2420 comprises identifying a plurality of collections of itemsets. An itemset is a set of two or more items. Within the context of these itemsets, the term items may refer to products, services, and/or offers. The collections may include, for example, at least a first collection of itemsets derived from transaction logs. Each itemset in the first collection comprises items indicated by the transaction logs as having been purchased or used together. The collections may further or instead include, for example, a second collection of itemsets derived from logs in one or more of: offer activation logs, offer redemption logs, or offer impression logs. Each itemset in the second collection comprises items that appear together within a same one of the offer activation logs, offer redemption logs, or offer impression logs. In an embodiment, each log in a collection is specific to a transaction. In an embodiment, each log in a collection may span multiple transactions, but be specific to a particular customer record.

In general, in various embodiments, a recommended offer may be ranked, identified, selected or otherwise analyzed based on a set of recommendation reference data. In various embodiments, the recommendation reference data may include virtually any type of data that can be used as a basis for recommending an offer. In one embodiment, the recommendation reference data includes contextual transaction data received directly or indirectly from a retailer or other terminal that is facilitating a consumer electronic transaction, such as the contextual transaction data 1345 discussed in connection with the embodiments of FIG. 13A and FIG. 27. In one embodiment, the recommendation reference data includes historical transaction records retrieved from a memory or received from a remote retailer or other entity, such as the historical transaction records discussed in connection with the embodiment of FIG. 13A or FIG. 27. In various embodiments, one or more of the items included in itemsets discussed in connection with the embodiment of FIG. 24 may be included in, or derived from, contextual transaction data and/or historical transaction records, or from any other suitable recommendation reference data.

While there may in fact be any number of different itemsets, in one embodiment, there are at least six collections of itemsets, containing co-occurring items found in the following types of data: transaction logs, shopping lists, web clickstreams for particular consumer entities, offer clickstreams for particular consumer entities, offer activation logs for particular consumer entities, and offer redemption logs for particular consumer entities. Depending on the embodiment, an itemset derived from the last three collections may comprise offers themselves, or one or more offers in the itemset may be replaced with products or services that are eligible for the respective offers. Other embodiments may feature various combinations of these six collections, and/or other collection types. In an embodiment, the combination of collections used varies depending on context. In an embodiment, the collections may be filtered for demographic groups to which the consumer may belong. For example, the collections may be different for consumers in different regions, of different ages, or in different social networking groups.

Block 2430 comprises, for each different collection, generating associations between pairs of items that co-occur within the itemsets. For example, if a single transaction involved products A, B, and C, the following associations would be established: (A,B), (B,C), (A,C). In one embodiment, one association may be counted for each possible combination of items, no matter how often they co-occur within the collection. In an embodiment, block 2430 may be performed as part of a step of generating associations between each possible pair of items in a collection, regardless of whether those items co-occur in any single itemset.

Block 2435 comprises, for each different collection, calculating association scores for one or more of the associations. The association scores reflect an actual or estimated frequency of co-occurrence of the different items within the association, relative to the collection. Association scores may be universal, specific to a social or demographic group to which a consumer belongs, or specific to a consumer. Association scores may be computed for all associations in advance of requests for recommendations, or may be calculated as needed in the blocks below. Examples of associations and association scores are described in subsequent sections. In a general embodiment, virtually any association may be made between two or more items, whether or not they belong to the same the collection, and whether or not they co-occur at any time, and the algorithms for computing association scores may be developed accordingly.

Block 2440 comprises receiving a request for offer recommendations. The request is associated with one or more items. For example, the request may be associated with items in a shopping list or in a receipt. The request may be from an entity seeking to embed offer recommendations with a same presentation as the shopping list or receipt, or the request may simply be associated with the shopping list or receipt because the request is within a same time period as the creation of the shopping list or the transaction for which the receipt was generated. An association between a request and one or more items may also exist for a variety of other reasons. For example, a consumer's device may have scanned a barcode or visited a web page for an item prior to sending the request.

Block 2445 comprises, for each different collection, matching the one or more items associated with the request to particular associations within the collection. The matching may comprise locating associations that include one or more of the items, locating associations that include one or more similar items, and/or locating associations that include an offer for the one or more items.

Block 2450 comprises, for each different collection, identifying a set of related items based on the matched associations. The related items are, in essence, items predicted to be of possible interest to the consumer based on items for which the consumer has already indicated an interest. In an embodiment, related items are identified only from associations having association scores above a threshold. In an embodiment, only a predefined number of related items belonging to associations with the highest association scores are identified in each collection. In an embodiment, the related items include any item in a matched association. Depending on the embodiment and/or business rules, the related items may also include the one or more items associated with the request of block 2440.

Block 2460 comprises merging the sets of related items, so that there is one set of related items regardless of the number of collections from which the related items are obtained. Hence, the merged set may include one or more items found in different sets of related items from different collections. Block 2460 is optional in some embodiments, where the recommendation engine has been asked to generate separate sets of recommendations for each collection.

Block 2470 comprises ranking the items in the merged set based at least in part on the association scores. For example, an aggregate score may be calculated for a related item based on a function of the association scores, in each collection, for the associations based upon which the related items had been selected. In an embodiment, if a particular collection contains no association between the related item and a particular item associated with the request, then the association score for that particular item in that particular collection is deemed to be zero.

The function may weigh the association scores in each collection differently. Each collection may be assigned a global weight, or a context-specific weight. For example, one collection may be weighted more highly when a consumer is at home, while another collection may be weighted more highly if the consumer is out shopping. As another example, each collection may have a different weight for different types of individuals. The function may further weight association scores differently based on how closely an item from block 2430 matches an association and/or other factors. For example, some items associated with the request may be deemed more important because of previous consumer transactions and other historical behavior.

In an embodiment, the items may additionally or instead be ranked by a universal scoring function, as described in other sections. For example, the aggregate association scores may also be a function of a universal score.

Block 2480 comprises selecting a set of offers to recommend based on the ranked items in the merged set. For example, offer(s) for a certain number of the highest ranked items may be returned by default, or the request may have specified a number of offers to return. Or, only those offers for items having above a threshold score are returned.

Offers may be identified for the items using any suitable technique. For example, block 2480 may comprise looking up which offer(s) are associated with an item and, if requested by the provider, applying business rules to determine which of the offer(s) associated with the item should be returned. As another example, offer-to-item association scores may be used to determine which offer to return. In an embodiment, some or all of the related items in the associations are offers as opposed to products or services. If any items in the set of ranked items are offers, then selecting offers for those items simply comprises selecting those items.

Flow 2400 is but one example technique for identifying offers to recommend to a consumer. Other techniques may comprise fewer or additional elements, in potentially varying orders. For example, in an embodiment, items may further include events. Thus, various collections may produce associations between offers, products, services, and consumer activities described in various behavioral logs. The request of block 2440 may thus be associated with events instead of or in addition to items. Another technique simply involves generating recommendations based on a collection of itemsets that indicates which offers are frequently redeemed together, or by the same consumer within a short space of time.

In some embodiments, the data involved in the recommendation process may include customer demographics and transaction data, for customer clustering and macro-personalization or recommendations to clusters based thereon, and/or for micro-personalization tailoring recommendations to users having very similar behavior using collaborative filtering techniques such as association scoring. Additional considerations based on the transaction data may include a time-effects component to weight recommendations based on seasonality and/or recency, and a predictive filtering component to anticipate future purchases and interests for uses based on historical purchases, using, for example, hidden Markov models. The data used in the recommendation process may further include product hierarchies, product attributes, inventory levels, and so forth. Business rules may be applied to the recommendations. A testing platform uses feedback from actual redemptions, activations, and/or purchases to assess and fine-tune the weights associated with the various data inputs.

In an embodiment, due to the computational cost of calculating recommendations in real-time, a ranked list of offer recommendations is computed for a consumer on a periodic basis. For example, such a ranked list may be calculated each night. Based on events that have happened since the list was last computed, delta changes may be detected in ranking calculations, and the ranked list may be adjusted in real-time. In an embodiment, the ranked list is nonetheless calculated from scratch for some or all consumers on demand, rather than on a periodic basis.

Association Scores

In an embodiment, one recommendation technique involves calculating association scores between items of interest to a consumer and offers or other items. Association scores, calculated by association scoring functions such as described herein (not to be confused with offer scoring functions), quantify the correlation between two of more elements. One category of association scores is item-to-item correlation scores, also referred to herein as ($item_i$,$item_j$) association scores. The ($item_i$,$item_j$) association scores indicate how likely it is that a consumer that is interested in $item_i$ is also interested in $item_j$. Different association scores may be a function of different type(s) of interest-indicating events. For example, separate association scores may be calculated for items that are frequently clicked on by the same consumer, items that are frequently purchased together, items that are frequently purchased by the same consumer regardless of when they are purchased, and so forth. If a consumer has recently expressed an interest in $item_j$, various ($item_i$,$item_j$) association scores may then be used as input to an offer scoring function for an offer related to $item_i$.

Another possible category of association score is offer-to-item correlation scores, also referred to herein as ($offer_i$, $item_j$) association scores. The ($offer_i$,$item_j$) association scores are similar to the ($item_i$,$item_j$) association scores, except that they indicate how likely it is that a consumer who is interested in $item_j$ is also interested in $offer_i$. Thus, for example, if a consumer has an $item_j$ in the consumer's shopping list, or if the $item_j$ is correlated to another item in the consumer's shopping list, an ($offer_i$,$item_j$) association score may be an input into an offer scoring function for $offer_i$.

A similar category of association scores involves per consumer correlations (also called a consumer-centric correlation score), denoted herein as ($consumer_i$,$offer_j$,$item_k$) association scores. These association scores measure how likely it is that a specific consumer—typically the consumer for which a recommendation is being calculated, or a consumer with similar characteristics—will be interested in both $offer_j$ and $item_k$.

In an embodiment, association scores may also quantify correlations between items and events (an item-to-event correlation score), events and events (an event-to-event correlation score), consumers and events (a consumer-to-event correlation score), and various other permutations thereof. In an embodiment, items may be recommended in addition to offers. For example, the offer distributor may suggest adding items to a shopping list based on previous transaction data, other consumers' interests, and/or current items in a shopping list.

In one embodiment, the scores correspond to an actual frequency of co-occurrence. In another embodiment, co-occurrence may be estimated by using a scoring function learned from a training subset of each collection. The scoring function may be optimized for different objective functions, such as revenue per impression, retailer profit, and so forth. Association scores may further be based on signals other than frequency of co-occurrence, including, without limitation, location, purchasing trends, and consumer demographics.

Universal Scoring

In some embodiments, any process of ranking offers may be based in whole or in part upon a universal scoring mechanism. The universal scoring mechanism is optimized to compute a universal score for each offer that reflects one or more of estimated revenue per offer activation, revenue per offer impression, or revenue per offer redemption. Revenue refers to an amount of compensation received by one or more of: the offer distributor, one or more retailers, the consumer, or the offer provider. The universal scores may be global for all consumers, relative to a particular consumer, or relative to a group of consumers. In an embodiment, the universal scores estimate revenue in a manner that is otherwise divorced from the context of a request, with the possible exception of artificially boosted scores to accommodate sponsorships or targeted offers. Thus, at any given time, the universal score for an offer is the same for all requests for recommendations by the same consumer(s), regardless of the context of those requests.

Figure 25:
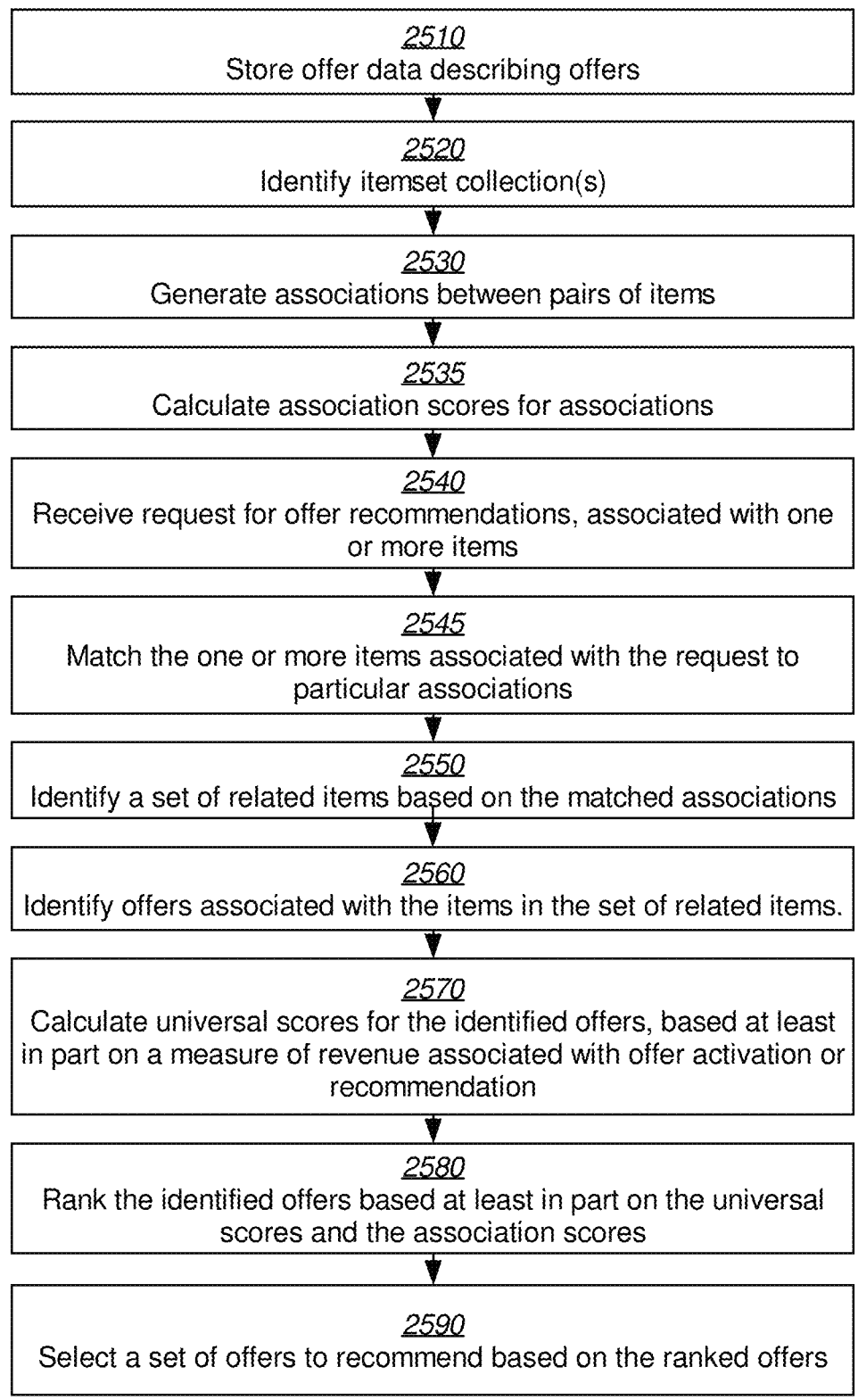
FIG. 25 depicts an example flow for generating a recommendation based on a universal scoring mechanism, in accordance with an embodiment.

FIG. 25 depicts an example flow 2500 for generating a recommendation based on a universal scoring mechanism, according to an embodiment. Block 2510 comprises storing offer data describing a plurality of offers, as described in other sections. Block 2520 comprises identifying a collection of itemsets, each itemset of the itemsets being a set of items that appear together in a particular context. For example, block 2520 may comprise identifying one or more of the collections described above with respect to block 2420. Block 2525 comprises receiving a request for offer recommendations, the request associated with one or more items, as described with respect to block 2440. Block 2530 comprises generating associations between pairs of items that co-occur within the itemsets, as described with respect to block 2430. Block 2535 comprises calculating association scores for one or more of the associations, as described with respect to block 2435. Block 2540 comprises receiving a request for offer recommendations, as described above with respect to block 2440. Block 2545 comprises matching the one or more items associated with the request to particular associations within the collection, as described with respect to block 2445. Block 2550 comprises identifying a set of related items based on the matched particular associations, as described with respect to block 2450.

Block 2560 comprises identifying offers associated with items in the set of related items. Offers may be identified for the items using any suitable technique. For example, block 2480 may comprise looking up which offer(s) are associated with an item and, if requested by the provider, applying business rules to determine which of the offer(s) associated with the item should be identified. As another example, offer-to-item association scores may be used to determine which offer to identify for an item. In an embodiment, some or all of the related items in the associations are offers as opposed to products or services. If any items in the set of ranked items are offers, then selecting offers for those items simply comprises selecting those items.

Block 2570 comprises calculating universal scores for the identified offers. The universal score for each offer is based at least in part on a measure of revenue associated with activation or recommendation of the offer. The universal scores may be calculated when the offers are identified, or the universal scores may have already been calculated in advance. For example, universal scores may be calculated for all offers based on input signal(s) on a nightly or hourly basis, and then updated as needed to reflect delta changes to the signal(s).

In an embodiment, calculating the universal score comprises comparing the historical performance of an offer to average offer performance across a plurality of offers. In an embodiment, the universal score is a function, at least in part, of one or more of the activations, impressions, or redemptions for an offer. In an embodiment, the universal score is based in part on a "burn rate" that ensures that an offer is distributed at a consistent rate throughout a campaign, so that the total number of offer impressions specified by the provider are not exhausted too quickly. Such a burn rate may consider, for instance, the period that the offer has been active, the remaining period an offer will be active, and the number of impressions that have thus far been incurred. The burn rate may thus be based on the start date of the offer, the initial inventory of impressions, activations, and/or redemptions that the provider made available for the offer, the end date, the revenue per impression, activation, and/or redemption, and the total number of impressions, activations, and/or redemptions thus far. Further examples of universal scores are described in subsequent sections.

In various embodiments, one or more universal scores may be computed based on a various types of data or metrics, including based on a historical or projected impact of the offer on sales of an item, a historical or projected offer redemption rate, a historical or projected profit per offer impression, a historical or projected profit margin, a historical or projected offer volume (e.g., the total number of offer activations, offer impressions, offer redemptions and/or products sold), a historical or projected offer yield (e.g., a total profit figure associated with an offer after taking into account the total number of sold products corresponding to that offer, offer activations, offer impressions and/or offer redemptions), a historical trend in offers made available by the offer provider, a historical or projected profit margin for the offer distributor and/or for the offer provider, a historical or projected impact of the offer on other offers, a historical or projected impact of the offer on consumer behavior, etc.

In an embodiment, a provider may pay to apply a "sponsorship boost" to a universal score to artificially increase the calculated score. The sponsorship may be general, or the sponsorship may be targeted, per the targeting techniques described herein. The boost may take the form of an added signal to a universal scoring function, an additional weight to the universal scoring function, and so forth. In some embodiments, the sponsorship boost is designed to artificially raise the universal score to score that is unattainable without a sponsorship boost, thus ensuring that a sponsored/targeted offer is the highest returned offer. In other embodiments, the sponsorship boost does not necessarily raise an offer's score higher than scores for non-sponsored offers. In an embodiment, when multiple targeted offers apply to a request, only a single offer or a handful of offers actually receive the sponsorship boost. The offers to which the sponsorship boost is applied may be selected at random, selected based on the association scores, or selected based on how much each provider has agreed to pay for the sponsorship boost.

Block 2580 comprises ranking the identified offers based at least in part on the universal scores and the association scores. In other words, in response to any given request for a recommendation, the offers are ranked based not only on a measure of how much revenue the recommendation is predicted to bring to a particular party, but also a measure of how much of an association there is between the request and the offers. For example, a universal ranking mechanism may comprise sorting each offer by the product of the offer's universal score and the association score, or average association score, of the item(s) based upon which the offer was identified in block 2560. Other universal ranking mechanisms may involve other functions of the universal scores and association scores.

In various embodiments, offers may be ranked based on one or more universal scores determined for a particular consumer, or for a plurality of consumers. In various embodiments, offers may be ranked based on one or more universal scores determined for a set of consumers, for a set of retailers, for a set of offer providers, or for a combination of one or more consumers, retailers and/or providers.

Block 2590 comprises selecting a set of offers to recommend based on the ranked offers. For example, offer(s) for a certain number of the highest ranked items may be returned by default, or the request may have specified a number of offers to return. Or, only those offers for items having above a threshold score are returned.

Flow 2500 is but one example technique for utilizing universal scores to recommend offers. Other techniques may comprise fewer or additional elements, in potentially varying orders. For example, in another technique, block 2580 involves a ranking function of the universal scores, but not the association scores.

Integration with Offer Targeting

In an embodiment, offer targeting and offer recommendation techniques are practiced separately from each other within the same system. Targeted offer data may be kept separate from recommended offer data, or all offers may be both targetable and recommendable, depending on parameters defined by the offer provider. However, the offer server delivers the targeted offers in a separate channel from the recommended offers, such as via different interfaces or in different sections of a website.

In an embodiment, offer targeting is integrated with offer recommendation, in that both targeted offers and recommended offers are ranked using a universal scoring system, as described above. In an embodiment, targeted offers and recommended offers are still defined separately. In another embodiment, there is no substantial difference. A single offer definition may include parameters describing how it is to be recommended and how it is to be targeted. Universal scoring is, in essence, the vehicle for allowing the ability to "Sponsor" or "Boost" the value and priority of an offer, and finally one of the techniques by which an alternative recommendation (e.g. manual target) may be integrated into the recommendation flow. In other words, offer providers may pay for a higher universal score for certain targets.

Figure 27:
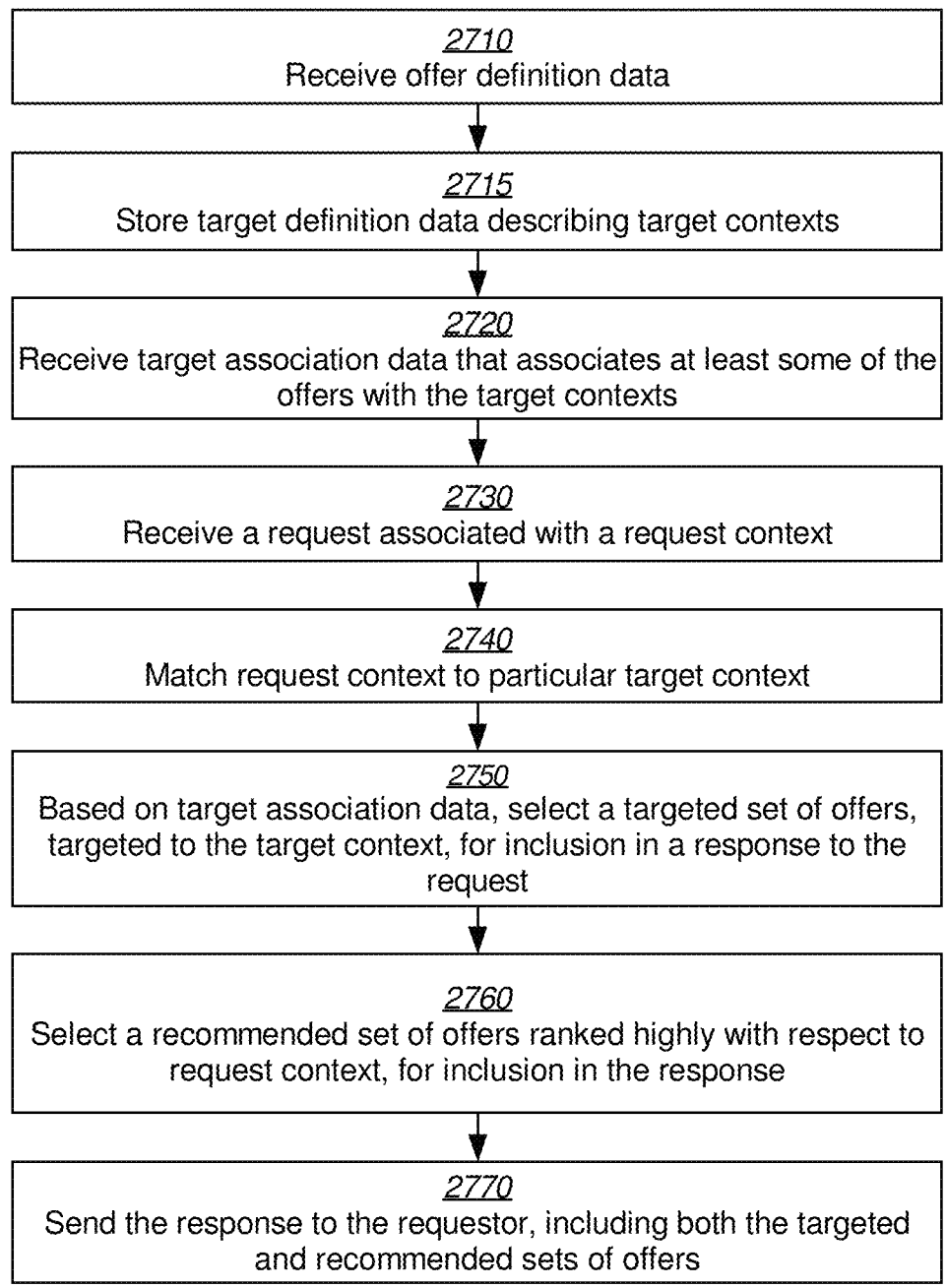
FIG. 27 illustrates an example flow for integrating offer recommendation and offer targeting within a single offer distribution system, in accordance with an embodiment.

FIG. 27 illustrates an example flow 2700 for integrating offer recommendation and offer targeting within a single offer distribution system, according to an embodiment.

Block 2710 comprises receiving, via an offer definition interface at a data processing system (e.g., an offer server computer), offer definition data describing a plurality of offers. For example, different offer providers may create different offers for distribution via an offer server using offer creation techniques such as described herein.

Block 2715 comprises storing target definition data describing a plurality of contexts under which requests to the offer server may occur. Block 2715 may be performed, for example, in similar manner to block 2315.

Block 2720 comprises receiving, via the offer definition interface, target association data. The target association data associates each particular targeted offer, of a plurality of targeted offers in the plurality of offers, with particular target definition data in the target definition data. The particular target definition data describes one or more particular contexts to which the particular targeted offer is targeted. The particular target definition data may be separate from the terms of each offer. For example, when a provider creates an offer, or anytime thereafter, the provider may be given the opportunity to select contexts the provider would like to target with the offer. In an embodiment, the provider further specifies a "bid" amount that the provider wishes to pay the distributor for providing the offer in the specified context.

Block 2730 receiving, at the offer definition server computer, from a requestor, a request associated with a request context. The request may be any request to which an offer server will respond with offers. For example, block 2730 may comprise receiving a request for a receipt, or a web page containing offers. The request may include one or more credentials by which a consumer entity is resolved. A context may be derived for this consumer entity based on data mapped to that consumer entity, such as previous events related to the consumer entity, transaction data, location data, shopping lists, web logs, activity logs, demographic information, and so forth. Additionally, or instead, the request may include similar information. In an embodiment, the context is specified explicitly by the requestor.

Block 2740 comprises matching the request context to at least a particular context described in the target definition data. Block 2740 may be performed in similar manner to block 2370.

Block 2750 comprises, based on the target association data, selecting, for inclusion in a response to the request, a targeted set of offers. The targeted set of offers is one or more offers, from the plurality of targeted offers, that the target association data associates with the particular context. Block 2750 may be performed in similar manner to block 2380.

Block 2760 comprises selecting, for inclusion in the response to the request, a recommended set of offers. The recommended set of offers comprises offers, from the plurality of offers, that are ranked highly by a recommendation engine, such as those described herein, with respect to the request context. The selection of recommended offers differs from the selection of targeted offers for at least the reason that the recommended offers are selected without taking into account the target association data. That is, the recommended offers are selected for reasons other than whether or not an offer provider associated the recommended offers with the request context. In fact, the providers may not have targeted the recommended offers to the request context at all. Rather, the recommended offers are offers that a recommendation has "learned" to be associated with the request context through various machine learning techniques, such as described herein.

In various embodiments, a recommended offer may be identified based on contextual transaction data received directly or indirectly from a retailer or other terminal that is facilitating a consumer electronic transaction, such as the contextual transaction data 1345 discussed in connection with the embodiment of FIG. 13A. In various embodiments, contextual transaction data may include any of a variety of information related to one or more consumer transactions conducted within a facility owned, controlled or operated by a retailer, including without limitation basket-level transaction details such as universal product codes and quantities purchased, total number of items purchased, transaction amounts, payment details (e.g., a credit card number, a payment identifier, a secure payment hash key), information about a data processing system, logic module or facility where the transaction takes place (e.g., terminal 1340 or store 1330), time, date, offers applied during the transactions, information relating to the customer conducting the transaction (e.g., a name, a phone number, a pin number, a password, a code, a loyalty card number, other biometric or personal identification data, etc.), RFID data, a device identifier, items that were purchased in a previous or concurrent transaction, a transaction number, and so forth.

In various embodiments, a recommended offer may be identified based on historical transaction records retrieved from a memory or received from a remote retailer or other entity, such as the historical transaction records discussed in connection with the embodiment of FIG. 13A. Historical transaction records may include various classes of information that relate to users, transactions, vendors, payment processing, and any other aspects of electronic or physical commerce. As an example, historical transaction records may be, or may include contextual transaction data that was generated in connection with previous transactions. In various embodiments, historical transaction records may include any of a variety of information related to one or more past consumer transactions conducted within a facility owned, controlled or operated by a retailer, including without limitation basket-level transaction details such as universal product codes and quantities purchased, total number of items purchased, transaction amounts, payment details (e.g., a credit card number, a payment identifier, a secure payment hash key), information about a data processing system, logic module or facility where the transaction takes place (e.g., terminal 1340 or store 1330), time, date, offers applied during the transactions, information relating to the customer who conducted the transaction (e.g., a name, a phone number, a pin number, a password, a code, a loyalty card number, other biometric or personal identification data, etc.), RFID data, a device identifier, items that were purchased in a previous, concurrent or subsequent transaction, a transaction number, and so forth.

In an embodiment, targeted offers differ from recommended offers in that the provider has specified different amounts to compensate the distributor for targeted offers versus recommended offers. In an embodiment, recommended offers are associated with a flat offer fee, regardless of the context in which they are distributed, whereas targeted offers may have different fees for different target contexts.

Block 2770 comprises sending the response to the requestor, including information about both the targeted set of offers and the recommended set of offers. The information about the targeted offers and recommended offers may be organized within the response in any suitable manner. For example, there may be separate distribution channels within the response for recommendations and targeted offers. For instance, recommended offers may be presented in a section labeled "recommendations," whereas targeted offers may be presented in a section labeled "you might also like." Or, the targeted offers may be intermingled with the recommendations in a same distribution channel. The response may, in some embodiments, contain a variety of other information, such as a receipt, a report of aggregated transaction data, a shopping list, an online shopping interface, a web page, and so forth. In an embodiment, the requestor will add the offer information to its own web page, containing other information such as described above.

Flow 2700 is but one example technique for integrating targeted offers and recommended offers. Other techniques may comprise fewer or additional elements, in potentially varying orders. For example, the request context includes a certain combination of events that occur in a timespan. Matching the request to a target context involves finding particular context(s) that include the combination of events. By contrast, recommendation involves generating signals based on the events, and inputting the signals into one or more scoring functions. As another example, in an embodiment, the targeted offers are auto-activated, per the techniques described herein, but the recommended offers are not.

3.7. Offer Creation

As described in other sections, potential offer providers may log into an offer definition interface to define offers that they wish for an offer distributor to distribute. Through the interface, the providers may define any of a variety of offer terms, offer targets, and campaign parameters. In an embodiment, a distributor may simplify the process of defining offers by utilizing transaction data and historical offer tracking data to propose offers, terms, targets, and/or campaign parameters to a provider. The distributor may propose the offers via automated emails and/or in various areas of the offer definition interface.

Figure 28:
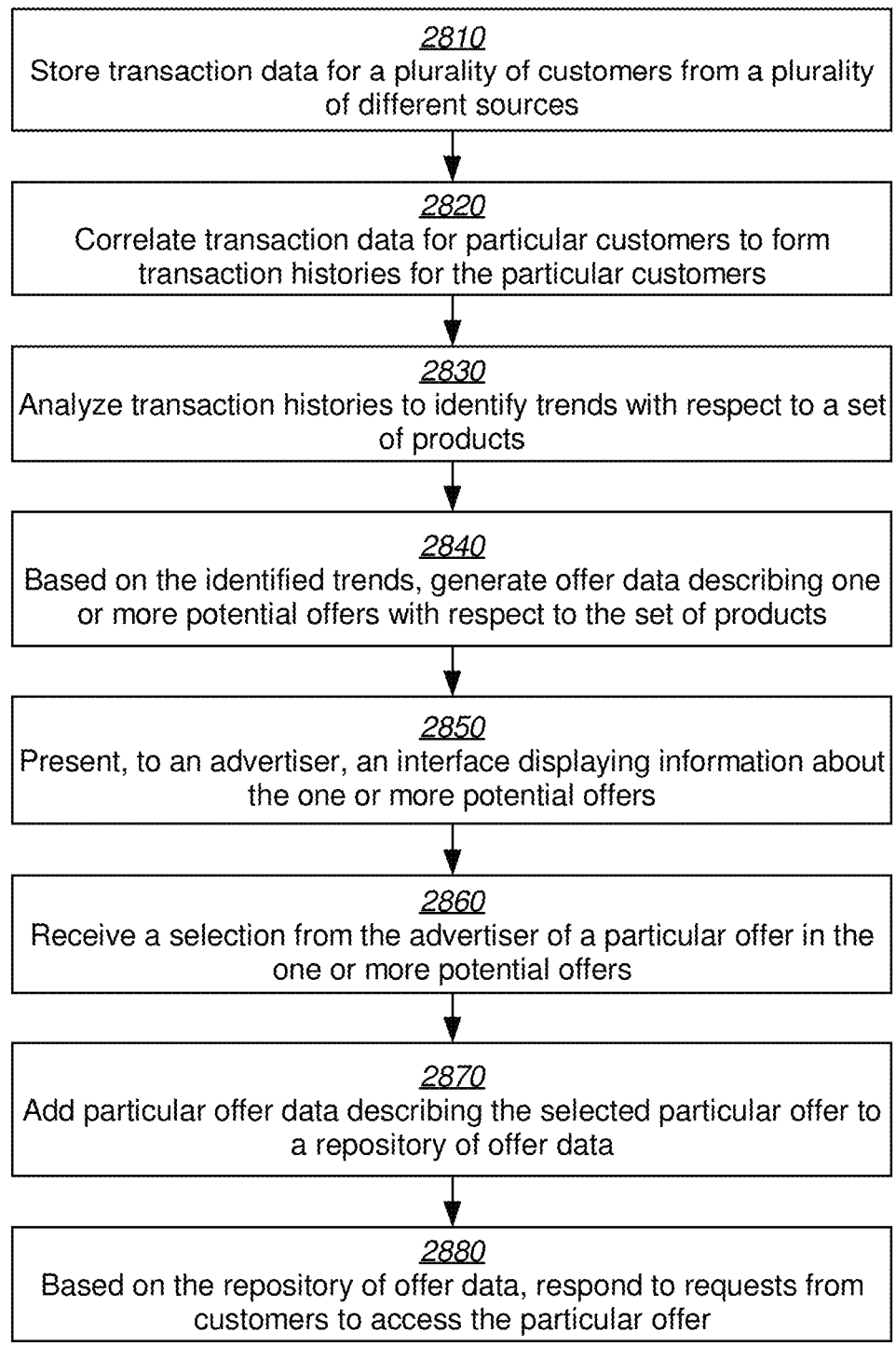
FIG. 28 illustrates a flow for proposing offers, terms, targets, and/or campaign parameters to a provider, in accordance with an embodiment.

FIG. 28 illustrates a flow 2800 for proposing offers, terms, targets, and/or campaign parameters to a provider, according to an embodiment. Block 2810 comprises storing transaction data for a plurality of consumers from a plurality of different sources, as described in other sections. Block 2820 comprises correlating transaction data for particular consumers to form transaction histories specific to each of the particular consumers, as also described in other sections.

In various embodiments, proposing offers, terms, targets, and/or campaign parameters to a provider may be based on historical transaction records, contextual transaction data and/or offer data retrieved from a memory or received from a remote retailer or other entity, such as the historical transaction records, contextual transaction data 1345 and/or offer data discussed in connection with the embodiments of FIG. 13A or FIG. 15. In one embodiment, a data processing system, possibly operated by an offer distributor, is adapted to evaluate, rank and propose selected offers, terms, targets, and/or campaign parameters by processing various historical transaction records, evaluating various offer data associated with the one or more offer providers, and/or taking into consideration contextual transaction data received from consumer transactions that are taking place simultaneously, that are taking place substantially simultaneously, or that took place recently.

Block 2830 comprises analyzing transaction histories and other historical transaction records, contextual transaction data and/or offer data to identify trends with respect to a set of products in the transaction histories. A variety of trends may be identifiable from the transaction data. For example, one type of trend indicates that during a certain time period, such as a day of the week, week of a year, or season of the year, sales of a particular product occur more or less frequently. Another type of trend may involve correlating high sales volumes for a particular product to external events, such as weather events or sporting events. Another type of trend may involve correlating sales volumes to certain pre-defined target contexts, such as a target demographic living in a target location. Another type of trend may involve correlating sales volumes to particular price points at which the product was sold at each of a plurality of different retailers. The price points may or may not consider whether any discount were applied to the transactions.

Another trend type may involve identifying time periods in which a provider has previously defined an offer for a product, and determining a pattern that the retailer appears to be following in making particular offers available. Another trend type may involve analyzing the transaction data in view of previous offers for a particular product to quantify a percentage change in the sales volume during previous offer periods. The trend may further compare the cost of the previous offers, with respect to retailers, offer distributors and/or offer providers, to the increase in sales volumes to arrive at a metric for how effective a previous offer was. Another type of trend involves determining how many consumers use or redeem previous offers (e.g., activation or redemption rates). Another trend type involves determining how successful previous offers were in persuading particular consumers who have not previously bought a product into purchasing the product. Another trend type may involve determining how successful previous offers were in convincing particular consumers to continue purchasing a product after the previous offer is concluded. Another type of trend may involve correlating sales of one product to offers available for another product.

Trends may be global, or confined to pre-defined geographical areas. Trends may further or instead be specific to consumers whose profiles fit certain demographics. In an embodiment, trends may be identified using a variety of types of analyses. For example, trends may discovered using certain machine learning techniques trained to identify various combinations of factors that produce results that are out of the ordinary. As another example, characteristics of each of a plurality of trend types may be enumerated in advance. Characteristics of a trend may include, without limitation, particular groups of consumers, particular regions, particular lengths of time, correlations in time to certain events, a particular volume of sales relative to average sales volumes, the existence of certain types of offers or marketing campaigns, and so forth. Various combinations of the characteristics may be analyzed to see if trends develop. In an embodiment, various pre-defined trend types are established. Transaction histories are analyzed to see if any pre-defined trend type does in fact exist. In an embodiment, each trend may further include one or more metrics that quantify the strength of the trend. In an embodiment, a provider may in fact define certain trends that the provider is looking for.

In an embodiment, trends are computed in advance of the following steps, and data describing the trends is stored so as to be readily available in the following steps. In other embodiments, trends may be computed dynamically as a consumer selects a product for which to create an offer.

Block 2840 comprises, based on the identified trends, generating offer data describing a set of potential offers with respect to the set of products. Identifying the potential offers may involve any variety of considerations. For example, one offer may be proposed simply because the trends show that the provider frequently creates a certain type of offer at the beginning of each month. Another offer may be proposed because trend data shows that a related product performed well when a similar offer was available, and/or at a similar price point. For example, a product database may associate products with similar products using categorical and/or other data. Offers for one product may be used to gauge the effectiveness of offers for similar products, whether or not the products are manufactured by the same entity.

Another offer may be proposed because trend data shows that an offer is highly successful with respect to a category of products. The trend data might also show the offer as highly successful for a certain context, such as for consumers who have purchased a product X within a timeframe T, or for consumers fitting a particular demographic who access a coupon application at a certain time of day. The proposed offer may be thus targeted to the certain context. Examples of other target contexts are discussed in connection with the embodiments of FIGS. 15 and 16. Another offer may be proposed because transaction data shows that purchase of a product in one category of products is highly correlated with purchases in another category of products. Thus, the provider may wish to offer a discount on one product conditioned upon the purchase of another product.

Generating the offer data comprises determining terms and campaign parameters of the potential offer, such as the length of the offer, the discount for an offer, the product(s) for which an offer should be eligible, the stores at which an offer may be used, the context(s) to which an offer should be targeted, the number of offers to distribute, the number of offers to distribute per geographic area, and "bid" amount(s) that the provider is to pay for each offer distributed to certain context(s). In an embodiment, the determination simply comprises identifying terms and parameters that a provider has previously used. In an embodiment, the determination comprises predicting which terms and/or parameters will be best for a provider and proposing those terms and/or parameters. For example, based on frequency of purchase data, it may be predicted that a particular combination of an offer start and offer end date will be best for the provider, to the offer distributor, or to a retailer. Predictions are made based on trends identified for the same terms/parameters in previous offers for the same or similar products. Predictions may furthermore be adjusted for trends identified with respect to purchase histories for the same or similar products.

In an embodiment, each potential offer may be associated with one or more metrics. For example, a potential offer may be associated with a predicted change in the volume of sales of one or more products in response to the potential offer. Or a potential offer may be associated with an overall offer effectiveness metric that predicts a bottom-line impact on revenue for the provider based on making the potential offer. For example, based on previous trends with respect to similar offers and/or similar products, an offer definition system may execute an algorithm to predict factors such as total expense to the provider and the expected increase in sales over a certain time period. The certain time period may include both during the offer and after the offer, depending on the embodiment. A predicted offer effectiveness metric may be a function of these factors.

In an embodiment, because of the vast amount of transaction data available to the transaction aggregation system, the offer distributor may be in a much better position to gauge the effectiveness of an offer than the provider. For example, a predicted offer effectiveness metric may take into consideration the impact of an offer on other products sold by the provider. The predicted offer effectiveness metric may also take into consideration consumer transaction histories to determine how likely it is that an offer will actually make a difference in whether a consumer buys a product. For example, the offer effectiveness metric should take into consideration whether a consumer frequently buys a product even when no offer is available. In various embodiments, some or all of the determinations and/or actions involved in identifying and proposing an offer may be automatically performed by a data processing system associated with the offer distributor, without the direct involvement of the offer provider. For example, an offer provider may or may not know the criteria and algorithms used by an offer distributor to identify, select and/or produce a recommended offer.

In an embodiment, predicted offer effectiveness metrics may be utilized in determining whether to actually propose an offer to a provider. For example, only high scoring offers may be proposed, and/or offers may be sorted by offer effectiveness metrics. In an embodiment, an offer definition system may create hundreds or thousands of potential offers based on permutations of various offer terms and campaign parameters. The offer definition system may then test each potential offer against the offer effectiveness metric, to determine which potential offers score highest. The offer definition system may then propose the highest scoring offer. Or, in an embodiment, the offer definition system may only propose an offer if the offer's effectiveness score is above a threshold value. The threshold value may, in an embodiment, be configured by the provider. In some embodiments, the offer definition system need not necessarily create and test thousands of potential offers. Rather, various learning functions and models optimized for a predicted offer effectiveness metric may identify desirable offer terms and campaign parameters.

In an embodiment, the potential offers may be ranked and/or selected based on any or all of a predicted revenue per impression metric, predicted key performance index, or predicted retailer profit index.

Block 2850 comprises presenting, to an advertiser, an interface displaying information about the set of potential offers. The advertiser may be the provider of the offer. In an embodiment, block 2850 is performed in response to identifying potential offers in block 2840. For example, block 2850 may involve emailing proposed offers to a provider periodically, or whenever high-scoring potential offers are identified. As another example, block 2840 and 2850 may be performed when a consumer initially logs into an offer definition interface. The offer definition interface may feature a start screen or sidebar with proposed offers. In an embodiment, the offer definition interface may further allow a consumer to click on a proposed offer to modify terms or parameters of the proposed offer.

In an embodiment, blocks 2840 and 2850 are performed concurrently in an interactive offer definition interface. A provider may log into the offer definition interface and indicate that the provider wishes to define an offer. The provider may enter one or more initial offer terms and/or campaign parameters, such as product(s) to which an offer will apply. Based on these offer terms and/or campaign parameters, the offer definition interface may display proposed terms and parameters for a complete offer. The provider may accept the proposed offer, or may tweak proposed offer terms and parameters. In an embodiment, the offer definition interface is displayed alongside one or more various metrics of predicted effectiveness, which change as the provider tweaks terms and/or parameters. In an embodiment, the offer definition interface features interactive components allowing a consumer to drill-down into transaction histories and offer histories, and/or to define their own metrics of predicted effectiveness.

Block 2860 comprises, responsive to displaying the interface, receiving a selection from the advertiser of one or more particular offers in the set of potential offers. For example, the provider may click on an "Add now" link within an email to confirm that the provider wishes to create a proposed offer that was described in that email. Or, once a provider has finished reviewing and/or modifying offer terms and campaign parameters for a proposed offer in an offer definition interface, the provider may click on an interface control within offer definition interface to create the offer.

Block 2870 comprises adding particular offer data describing the selected one or more particular offers to a repository of offer data. That is, once a provider has selected to create a proposed offer, per block 2860, the offer is added to an offer distributor's inventory of available offers. Based on the repository of offer data, per block 2880, the offer distributor may then respond to requests from consumers to access the one or more particular offers, as described in other sections.

Flow 2800 is but one example flow for proposing offers to offer providers. Other flows may comprise fewer or additional elements in varying arrangements. For example, in an embodiment, the method further comprises correlating purchases of different products, identifying price points based on information about the price at which a product was purchased, identifying terms of offers based on transaction frequency data, and/or allowing an advertiser to modify a proposed offer.

3.8. Dynamic Offers

In an embodiment, an offer definition interface may allow a provider to define a dynamic offer comprising one or more terms that vary according to the consumer who activated the offer. For example, a dynamic offer may allow a provider to dynamically adjust the price point that a consumer effectively pays for an item based on the consumer's previous transaction history.

Figure 29:
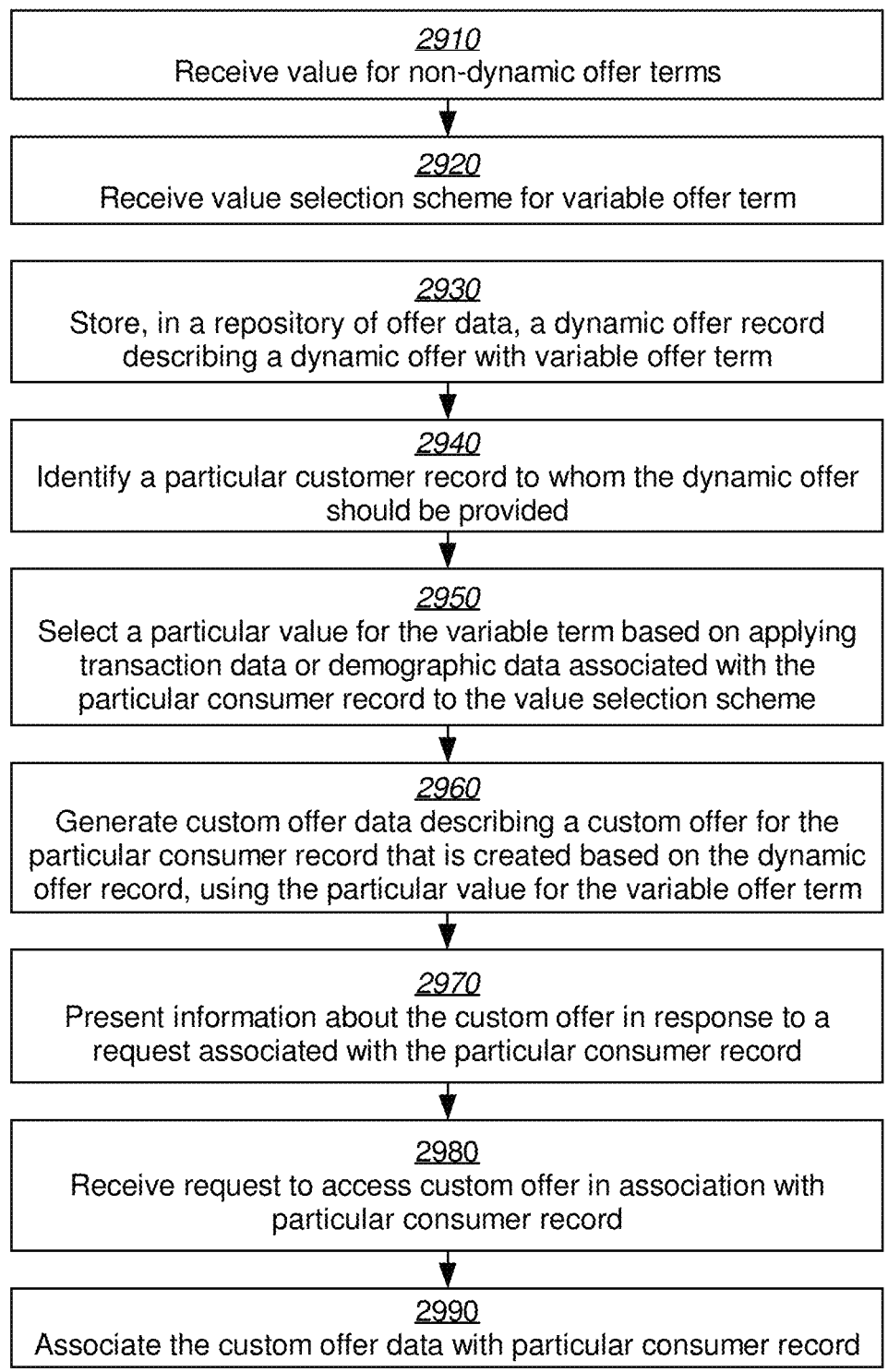
FIG. 29 illustrates a flow for utilizing dynamic offers, in accordance with an embodiment.

FIG. 29 illustrates a flow 2900 for generating and/or utilizing dynamic offers, according to an embodiment. Block 2910 comprises receiving values for non-dynamic terms of a dynamic offer. For example, a provider may intend for certain offer terms such as the start date, end date, and eligible products, to remain the same for all consumers. The provider may thus define static values for these terms. The attributes may be received via, for instance, an offer definition interface as described herein.

Block 2920 comprises receiving a value selection scheme for a variable offer attribute (e.g., a variable term) of a dynamic offer. For example, instead of entering a specific value for a particular term, the provider may select a control indicating that the value of the term should be variable. Or, based on trend data, the offer definition interface may propose that a value be made variable. The provider may define a value selection scheme for the discount amount term of an offer, or any other suitable term. In various embodiments, a value selection scheme may help define a parameter or a range of parameters for one or more offer attributes. For instance, the provider may define different target contexts to which different values should apply. Or the provider may propose a function of various consumer attributes, such as metrics related to purchasing or offer redemption histories, for calculating a value. In an embodiment, a variable value is a function of the likelihood that a consumer will purchase an item without an offer and/or a likelihood that a consumer will continue to purchase an item after the offer expires. To simplify defining the value selection scheme, the offer definition interface may propose one or more value selection schemes. The offer definition interface may furthermore show the impact of the value selection scheme on different consumers and/or various predicted offer effectiveness metrics.

Block 2930 comprises generating a dynamic offer record including one or more attributes corresponding to terms of the dynamic offer, the attributes including at least one variable offer attribute associated with the value selection scheme. Block 2940 comprises storing the dynamic offer record in a repository of offer data, such as described herein. In one embodiment, a dynamic offer record is predefined and is retrieved from a memory or is received from a remote data processing system or logic module.

In various embodiments, attributes included in a dynamic offer record may include any aspect or characteristic of an offer, such as a discount amount, a duration for which the offer is valid, a set of products to which the offer may apply, restrictions on impressions, activations or redemptions, restrictions on geographic applicability, appearance or content of the offer, and virtually any other offer attribute or parameter discussed in connection with various embodiments or otherwise applicable to electronic offers.

Block 2940 comprises identifying a particular consumer record in association with which the dynamic offer is to be distributed. Block 2940 may occur as part of distributing an offer using any suitable distribution technique described herein, including distributing an offer specifically requested by a consumer, recommending an offer to a consumer, and targeting an offer to a consumer.

In various embodiments, the consumer record may be, may include, or may be included in a set of historical transaction records. Various examples of historical transaction records that may relate to consumer records are discussed in connection with various embodiments, including the embodiments of FIGS. 13, 21, 30 and 34.

Some examples of historical transaction records that may relate to consumers and that may be suitable for consideration in connection with dynamic offers include records obtained from consumer behavioral logs (e.g., transaction logs, event logs, offer tracking logs, location tracking logs, shopping list logs).

Other examples of historical transaction records that may relate to consumers and that may be suitable for consideration in connection with dynamic offers include, with respect to one or more electronic transactions that were conducted in the past by one or more consumers, information regarding a universal product code, a quantity of product purchased, a number of items purchased, a transaction amount, at least a portion of a credit card number used, a payment identifier used, a secure payment hash key, a data processing system, a merchant or retailer facility, time or date when a transaction took place, one or more offers activated or redeemed, customer name, phone number, pin number, password, code, loyalty card number, RFID data, a device identifier, one or more items that were purchased in a previous or concurrent transaction, or a transaction number.

Block 2950 comprises selecting a particular value for the variable attribute based on applying transaction data or demographic data associated with the particular consumer record to the value selection scheme, thereby dynamically selecting at least one term of a custom offer for the particular consumer. For example, if the value selection scheme defines different values for different categories of consumers, block 2950 comprises determining the category of the particular consumer. Or, if the value selection scheme is a function of various aggregated transaction data for the particular consumer, block 2950 comprises computing the aggregated transaction data and then computing the particular value based on the function of the aggregated transaction data.

Block 2960 comprises, generating custom offer data describing a custom offer for the particular customer record that is created based on the dynamic offer record, using the selected value for the variable offer term. The custom offer data may be a non-dynamic offer record, stored in the same manner as any other offer in the offer repository. Or, the custom offer data may be a temporary structure that is deleted after a period of time or if the consumer offer is ever redeemed. If multiple consumers are provided the same custom offer, a single offer record may exist for the multiple consumers.

In one embodiment, a data processing system is adapted to generate one or more dynamic offers by processing a set of historical transaction records and a dynamic offer record that comprises a set of offer attributes corresponding to terms of the dynamic offer. One or more of the offer attributes may be modified based on at least a subset of the historical transaction records. In one embodiment, the data processing system modifies one or more such offer attributes based on a set of historical transaction records, therefore producing a dynamic offer. Such a dynamic offer could also be construed as a customized offer in the sense that the offer was customized based on a particular input. Examples of other inputs that could be used to customize an offer, therefore producing dynamic offers, include contextual transaction data, offer data, and target contexts. Examples and types of contextual transaction data, offer data and target contexts are discussed herein in connection with various figure embodiments.

In various embodiments, electronic dynamic offers may be generated in response to similar types of requests that are discussed herein in connection with non-dynamic electronic offers. In various embodiments, electronic dynamic offers may be analyzed, ranked, recommended, distributed or otherwise processed and managed in ways similar to those discussed herein in connection with non-dynamic electronic offers.

Block 2940 comprises storing the dynamic offer record in a repository of offer data, such as described herein.

Block 2970 comprises presenting information about the custom offer, including the at least one dynamically selected term, in response to a request associated with the particular consumer record. For example, the dynamic offer (which can be considered to be a customized offer) may be recommended to the consumer in a receipt, returned to the consumer in a list of offers that are responsive to a search, described in a notification message to the user that the dynamic offer has been auto-activated for the consumer, or provided in any other distribution channel described herein.

Block 2980 comprises receiving a request to access the custom offer in association with the particular consumer record. Block 2990 comprises associating the custom offer data with the particular consumer record. For example, blocks 2980 and 2990 may comprise activating the custom offer for the particular consumer using any activation technique described herein. Once the custom offer has been activated, the custom offer data becomes a permanent offer record, linked to the dynamic offer. The custom offer is treated much like any other offer in the offer repository, except that it cannot be activated by consumers other than those for whom the value selection scheme selects the same value for the variable term. Also, any applicable distribution limits are counted against the dynamic offer record instead of the custom offer record. If the customer offer is auto-activated for the consumer, blocks 2980-2990 may be optional.

Flow 2900 is but one example of techniques for utilizing custom offers. Other flows may include additional or fewer elements in potentially varying arrangements. For example, in an embodiment, the custom offer record may be sent to a retailer and/or a clearinghouse to ensure that the dynamic offer is correctly applied to the consumer. In an embodiment, the method comprises varying a price depending on the consumer, varying tied products depending on the consumer, or varying the length of an offer depending on the consumer.

In an embodiment, a dynamic offer includes an offer image that is customized or otherwise modified depending on a consumer. That is, the image shown to entice a consumer to investigate an offer may be variable. For example, both a product A and a product B may be eligible for an offer. Conventionally, a retailer must choose a single product image to show to a consumer. Since a consumer often uses the image associated with an offer to identify which offers may be of interest to the consumer, a consumer who may be interested in product A might not notice the offer if the image shows product B. A dynamic offer record, by contrast, allows a provider to specify that the distributor should show a picture of product A to a consumer who meets certain criteria, such as having purchased product A recently or having relatively expensive tastes, but show a picture of product B to another consumer. In other embodiments, a similar effect is achieved without a dynamic offer record, as the retailer or distributor may dynamically select which product image(s), from a database of images, to show for an offer based on consumer data and other criteria.

3.9. Conducting a Transaction with Electronic Receipts

FIG. 3 illustrates a method flow 300 for conducting a transaction in which an electronic receipt, also referred to herein as a digital receipt, may be provided, according to an embodiment.

Block 310 comprises receiving input specifying one or more items for purchase by a consumer and, optionally, one or more payment mechanisms. For example, the input may be received by a cash register or other terminal at a checkout stand in a brick-and-mortar store, and/or a retail server, payment server, or other server to which such input has been relayed. The input specifying the one or more items may involve, for instance, scanning Universal Product Code ("UPC") symbols, detecting RFID or Near-Field Communication ("NFC") tags, weighing products, entering item identifiers via a keyboard, selecting items via a touchpad, and so on. The input specifying the one or more payment mechanisms may include, for instance, swiping a credit card through a magnetic reader, detecting an RFID or NFC tag, the tendering of cash or a credit card, a transfer of funds via a mobile payment application on a mobile device, and so on.

Block 320 comprises performing, or causing the performance of, a transaction in which the specified one or more items are purchased, optionally using the one or more provided payment mechanisms. For instance, the entity receiving the input of block 310 may calculate a total price for the transaction based on the one or more items, and then send a request to one or more payment providers to transfer the relevant funds to the retailer. Once the one or more payment providers have responded with an acknowledgment that the transfer has been approved, the entity may consider the transaction complete. As another example, the terminal may await confirmation from a cashier that appropriate payment has been received, such as the cashier entering a sum of money or other tender that the consumer has provided the cashier. Once the transaction is considered complete, the entity performing block 320 may proceed, or instruct the terminal to proceed, with any of blocks 330-380, depending on whether any of blocks 330-380 were performed prior to the completion of the transaction.

Block 330 comprises providing an interface configured to accept input indicating a consumer identifier associated with the transaction. For instance, the interface may be a magnetic card scanner, an RFID or NFC reader, a touchscreen, a biometric scanner, a keypad, facial recognition software, and so forth. Depending on the environment, the consumer identifier may comprise any of, for instance, a store loyalty card number, a credit card number, an NFC or RFID tag, a hardware identifier, a phone number, a license number, biometric data, a consumer name, and so forth. In an embodiment, multiple interfaces capable of receiving input identifying multiple types of identifiers may be provided.

The interface may be configured to accept the input indicating the consumer identifier at different specific times relative to blocks 310-320. For example, the interface may be configured to accept the input immediately before payment, immediately before scanning items for purchase, or upon completion of the transaction. The interface may instead be configured to accept the input at any range of times relative to blocks 310-320, such as at any time before the consumer provides payment, or at any time up until a paper copy of a receipt is printed. In an embodiment, the input is received at any time during a window in time that can be uniquely tied to the transaction.

In an embodiment, the cashier and/or terminal prompt the consumer to provide the input via the interface. In an embodiment, the cashier enters the input on behalf of the consumer. For example, the cashier may invite the consumer to provide an identifier such a store loyalty card prior to receiving payment or even scanning items for purchase. Or, the cashier may invite the consumer to provide a user name, email address, or phone number at the end of the transaction, if the consumer would prefer to receive an electronic receipt.

The interface may be configured to serve multiple purposes. For example, the interface may be a magnetic scanner capable of reading magnetic stripes of both payment mechanisms, such as credit cards, and consumer identification mechanisms such as loyalty cards. The interface may include prompts that indicate to the consumer when to provide the consumer identifier, as opposed to when to provide other input. Or, the differences between the types of input received by the interface may be sufficient enough that the entity processing the input can easily distinguish between a consumer identifier and other input. The consumer identifier may likewise serve multiple purposes. The terminal or retail server may, for example, also use the consumer identifier to locate information such as digital coupons that are available to the consumer, a rewards account for the consumer, or a payment account for the consumer. In an embodiment, an email address or store loyalty card number may also be utilized to provide a consumer with benefits such as offer redemption or membership discounts, or even to identify a suitable payment mechanism.

The receipt of input via the provided interface of block 330 is optional. In an embodiment, failure to receive input via the interface of block 330 before the expiration of a certain amount of time, or before certain terminal events such as the completion of the transaction or the pressing of a "Print Receipt" button, may be interpreted as the consumer's implicit refusal of the option to receive an electronic receipt for the transaction, per block 340.

Block 340 comprises receiving input indicating whether the consumer prefers to receive an electronic receipt for the transaction. In an embodiment, block 340 occurs in response to a prompt from the cashier or terminal, such as "Do you want a paper or electronic receipt?" or "May I email you your receipt?" The input may be received in a variety of manners, including the pressing of a key on a keypad or button on a touchpad. In an embodiment, the input of block 340 is the same as that of block 330. That is, the consumer provides input indicating the consumer identifier in response to being prompted to indicate whether the consumer would prefer an electronic receipt.

In an embodiment, the input of block 340 is received immediately prior to the provision of the interface for inputting the consumer identifier. For example, the cashier may ask the consumer if the consumer would like an electronic receipt. If the consumer responds affirmatively, the cashier may then prompt the consumer to swipe a consumer loyalty card or provide a phone number.

In an embodiment, the input of block 340 may be implicit from the consumer having provided a consumer identifier in block 330. In an embodiment, if the consumer identifier serves multiple purposes, the consumer may be prompted to indicate whether the consumer prefers to receive an electronic receipt even though the consumer has provided a suitable consumer identifier.

In an embodiment, the input of block 340 is received before the transaction, in the form of a consumer preference for all transactions between the consumer and retailer, or even between the consumer and multiple retailers. The consumer may have previously expressed a preference to always receive electronic receipts, for example, during a registration process, account management operation, or previous transaction. Data indicating this preference may be stored in association with the consumer identifier or a corresponding consumer account. The transacting terminal or server may look to see if the preference has been stored in association with the consumer identifier or the corresponding account prior to prompting the consumer for the input of block 340. Or, the preference may be communicated along with the consumer identifier when the consumer provides the consumer identifier via a mobile device.

In an embodiment, the transacting terminal may send a request to a consumer resolution component (e.g. provided by an offer distributor, cached locally, etc.) that includes information gathered from the consumer. If the consumer resolution component can resolve the information to a consumer entity, the consumer resolution component may return information about the consumer entity and/or digital receipt preferences.

In an embodiment, the input of block 340 is optional. For example, a retailer may assume that a consumer prefers a paper receipt unless the consumer proactively states otherwise. Or the retailer may assume that the consumer prefers an electronic receipt whenever possible.

If input indicating a consumer identifier has been received via the interface of block 330 in association with the transaction, and if the consumer indicated (or was assumed to have) a preference for an electronic receipt per block 340, then at block 350 it is determined whether the consumer identifier is associated with a suitable electronic address to which an electronic receipt may be provided. Depending on the embodiment, the electronic address may take any of a variety of forms, including an email address, text messaging number, social messaging user name, URL, website user account, and so on.

The determination may be accomplished using a variety of techniques. For example, a terminal may query a retail server using the consumer identifier to determine whether consumer identifier is mapped in a database table to a suitable electronic address. As another example, a retail server may query a database server of store loyalty accounts to determine whether the consumer identifier is associated with any of the store loyalty accounts. If necessary, the retail server may then make an additional query to the database server to see if an electronic address has been registered with the corresponding store loyalty account. As another example, a retail server may query a server hosted by an offer provider or shopping incentive provider to determine whether the consumer identifier is registered to a consumer account.

In an embodiment, the determination of whether a consumer identifier is associated with a suitable electronic address is accomplished implicitly. For example, a retail server or offer server may store information identifying a number of known consumer identities. Each consumer identity is assumed to be associated with a suitable electronic address either because of procedures followed when registering the consumer identities, or because the server features logic for providing electronic addresses such as personalized web pages for each consumer identity. The determination of block 340 may thus be accomplished by determining whether the consumer identifier is associated with a known consumer identity.

Optionally, at block 360, if the consumer had indicated a preference to receive an electronic receipt, but had not provided a consumer identifier that was associated with a suitable electronic address, the consumer may be prompted to provide a suitable electronic address for one-time use and/or for storage for future transactions.

If the consumer indicated (or was assumed to have) a preference for an electronic receipt per block 340, and if a suitable electronic address has been located per block 350 or 360, flow proceeds to block 370. Block 370 comprises causing provision of an electronic receipt, such as depicted in FIG. 1, via an electronic address associated with the account. The electronic receipt optionally includes offer information, such as a link to a website comprising offers distributed by the retailer and/or the offer distributor, or data identifying one or more specific offers for which the consumer is eligible. The identification and provision of such offer information is described in subsequent sections.

Block 370 may be performed, for instance, by the terminal and/or the retail server directly providing the electronic receipt to an electronic address. The terminal and/or the retail server may or may not work in coordination with an offer server to identify relevant offer information to include in the electronic receipt. In an embodiment, block 370 comprises the terminal and/or the retail server sending transaction data and either the electronic address or account identifying information for locating the electronic address to a coordinating server. The coordinating server may be operated by any entity capable of providing electronic receipts to the electronic address, including a server operated by an offer provider, payment provider, shopping incentive provider, or dedicated receipt provider. The coordinating server may work with an offer server or retail server to identify relevant offer information, if necessary.

If the consumer indicated (or was assumed to have) a preference for a printed receipt per block 340, or if a suitable electronic address is not located per block 350 or 360, flow proceeds to block 380. Block 380 comprises the terminal printing a receipt for the transaction. The receipt may optionally include offer information identified using any suitable technique.

Flow 300 is one example of the variety of possible techniques for conducting a transaction in which an electronic receipt is provided. Other embodiments may include additional or fewer elements in varying orders. For example, while flow 300 depicts an embodiment in which a consumer is provided an electronic receipt instead of a printed receipt, other techniques may allow a consumer to select both a printed receipt and an electronic receipt. In yet other embodiments, a terminal never provides printed receipts. Rather, a consumer only has the option of receiving an electronic receipt.

In embodiments, the electronic receipt is provided directly to a mobile device operated by the consumer. In embodiments, the terminal may send the electronic receipt via a wireless link to an electronic address that is either already known to belong to the consumer as a result of blocks 310-330, or to a proximity-based communication interface presumed to belong to the consumer. For example, the consumer may obtain the receipt by placing a mobile device near an NFC-capable terminal, and then either receive the electronic receipt directly via NFC or indirectly via back-end communications that were initiated using information transmitted via NFC. As another example, the consumer may use a mobile application on the mobile device to pay for the transaction, and then receive the electronic receipt via the mobile application upon completion of the transaction. The explicit identification of an electronic address in block 350 may not be necessary in such embodiments.

Figure 4:
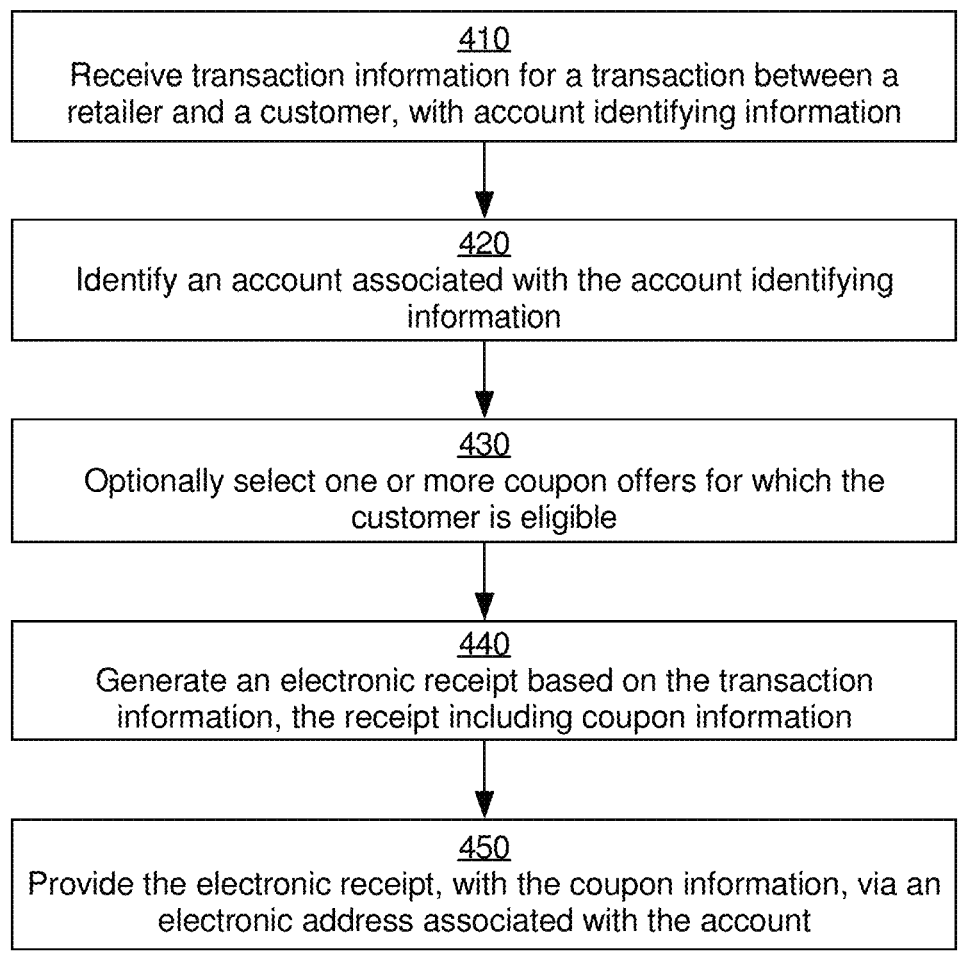
FIG. 4 illustrates a method flow for electronically providing offer information in association with a receipt for a transaction conducted at a brick-or-mortar store, in accordance with an embodiment.

4.0. Example Functional Details 4.1. Electronically Providing Offer Information in Association with a Receipt FIG. 4 illustrates a method flow 400 for electronically providing offer information in association with a receipt for a transaction conducted at a brick-or-mortar store, according to an embodiment. Flow 400 may be performed by a variety of entities, depending on the embodiment, including the retailer, a retail server, a payment server, an offer server, and/or any other suitable computing device.

Block 410 comprises receiving transaction information for a transaction between a retailer and a consumer, such as a transaction completed per block 320 of FIG. 3. The transaction information includes account identifying information. The transaction information may also include various transaction details, such as a total price, a list of items purchased, information about offers or other discounts applied to the transaction, and so forth. Depending on the embodiment, the transaction information may be received from any of the terminal, retail server, payment provider, or even the offer server.

The granularity of the transaction information may vary from retailer to retailer. For example, some retailers may provide only a total price, while others may provide detailed line-item descriptions of each item purchased. In an embodiment, the transaction information may include pre-formatted receipt data or templates, to which offer information may be added. In an embodiment, the transaction information contains no such formatting. The account identifying information may be, for instance, a consumer identifier received per block 330 of FIG. 3, or an account number retrieved using the consumer identifier.

Block 420 comprises identifying an account associated with the account identifying information. Block 420 may involve querying one or more databases of account information held locally with the performing entity and/or at an offer server. Block 420 further comprises identifying an electronic address associated with the account.

Block 430, which is optional, comprises selecting one or more offers for which the consumer is eligible. Block 430 may involve querying an offer database, either directly or via an offer server, to retrieve offers. In an embodiment, a variety of non-behavioral targeting mechanisms may be used to select the one or more offers, such as random algorithms, timestamps, campaign targets, and so forth. In an embodiment, the criteria used to select offers may be associated with various aspects of the transaction information, such as keywords selected from item descriptions and item identifiers. In an embodiment, the one or more offers may be selected based upon one or more of: the one or more items involved in the transaction, transaction date and/or time, amount spent, consumer preferences, retailer preferences, consumer purchase history, retailer identity, store location, or consumer offer redemption history. In an embodiment, only a certain number of offers may be selected. To this end, block 430 may comprise ranking offers or requesting that an offer server rank offers according to criteria such as described above. In an embodiment, the selected offers may be limited to those having a certain score in a ranking function. Any suitable techniques for selecting and ranking offers may be utilized.

Block 440 comprises generating an electronic receipt based on the transaction information, such as depicted in FIG. 1. Block 440 may therefore entail formatting both the transaction information and offer information as an electronic receipt. The formatting may be done in conformance with template data and/or logic for structuring an electronic receipt based on the transaction information. In an embodiment, the electronic receipt may include logos, slogans, text, and links uploaded or otherwise provided by the retailer for use in all of the retailer's electronic receipts. In an embodiment, the offer information included in the generated electronic receipt may include one or more links to a website or other resource at which detailed information about offers may be obtained, specific information about offers selected per block 430, and/or links for obtaining coupons for specific offers.

Block 450 comprises providing the electronic receipt, with the offer information, via an electronic address associated with the account. Block 450 may involve, for example, sending an email with the offer information to an email address that is stored in association with the account. Block 450 may alternatively involve receiving a client request directed a particular URL, and responding to the request with an electronic receipt. The particular URL may be, without limitation, a URL that was emailed or texted to the consumer, the URL of a page displayed by a coupon web application upon the consumer logging into the web application, a URL corresponding to the transaction in a transaction history for the consumer, or a URL corresponding to XML-based data that is fed to a mobile application operated by the consumer. The electronic receipt may have been generated prior to receiving the request from the client. Alternatively, the transaction data may be stored in a database. In response to the consumer requesting the particular URL from the server, the server dynamically generates the electronic receipt per block 440, using the stored transaction data. Block 430 may also be performed prior to or in response to the request for the particular URL.

In an embodiment, the offer information includes or links to other information that includes an identification of one or more mechanisms by which the consumer may cause one or both of printing one or more coupons for the one or more offers or saving one or more digital coupons for the one or more offers to the account associated with the consumer identifier. The mechanisms may involve, for instance, one or more URLs that request that an offer server generate a coupon for the selected offer. In an embodiment, the offer information includes printable copies of the one or more offers. In an embodiment, one or more digital coupons are generated in block 430 and saved to the consumer's account.

Block 450, then, comprises informing the consumer of the existence of the digital coupons in the consumer's account.

Flow 400 one example of the variety of possible techniques for electronically providing offer information in association with a receipt for a transaction. Other techniques may involve additional or fewer elements, in varying orders. For example, in an embodiment, the electronic address is received directly from the terminal or retail server. The account identifying information and the account itself may therefore be unnecessary.

4.2. Example Offer Activation Interface Components

In an embodiment, an offer distributor provides a portal application or website comprising a receipt component, offer component, and shopping list component. A consumer may access the portal directly through a server hosted by the offer distributor, such as a website hosted on the offer server and/or receipt server. The consumer may also or instead access the portal via a retailer, payment provider, or other third-party entity website, in which the portal has been embedded as a microsite. The microsite may be tailor to the website in which it has been embedded through the use of third party entity-provided templates that are processed by the distributor and/or entity-based post-processing of the portal. In other embodiments, an entity may offer equivalent and/or other interfaces by retrieving data via a suitable API from a transaction aggregation and/or offer distribution system, and processing that data to form its own portal. In an embodiment, the portal is formatted differently for different contexts, such as viewing from a traditional web browser as opposed to viewing from a mobile device.

With the receipt component, various interfaces are provided for displaying lists of available digital receipts, displaying detailed individual digital receipt, displaying sales histories and aggregated transaction data, and/or displaying product details. With the offer component, various interfaces are provided for searching offers, displaying lists of available offers, displaying information about offers, activating offers, and/or displaying lists of offers that will expire shortly. With the shopping list component, various interfaces are provided for adding items to a shopping list, displaying shopping list(s), and managing a shopping list. The components are not necessarily distinct from each other. For example, interfaces for the offer component may be embedded within or displayed adjacent to interfaces for the receipt component or the shopping list component.

Simple Offer Activation Interface

FIG. 2 depicts an example graphical user interface ("GUI") 200 with which a consumer may view and select offers. GUI 200 may be displayed, for example, by a dedicated coupon client or a web browser executing instructions from an offer server. The consumer may arrive at GUI 200, for example, by selecting links 151-154 in email 100, or by launching a general purpose offer interface and then navigating to a section at which offers selected for the consumer are presented. For example, selecting links 151-154 may launch a web browser to a Uniform Resource Locator ("URL") at a retail server or offer server. The consumer may or may not be required to first log in to his or her account. In an embodiment, the URL may be a general purpose URL, and the offers displayed in GUI 200 may have been selected without regard to any transaction. In an embodiment, the URL, or accompanying data, may identify to the server the specific offers displayed in GUI 200. In an embodiment, the URL, or accompanying data, may instruct the server to locate offers that were identified for the consumer in response to recent transactions or a specific transaction.

As another example, selecting links 151-154 may launch a dedicated coupon client that interfaces with an offer server. Selecting links 151-154 may launch the dedicated coupon client with input such as an account identifier, offer identifiers, and/or transaction identifiers. The dedicated coupon client may then use the inputted information to request that the offer server provide data such as depicted in GUI 200. The dedicated client may then generate GUI 200.

As another example, the consumer may launch a mobile coupon client on a smartphone, without having selected a link in an electronic receipt. The consumer may then navigate to a screen entitled "Special Offers," which displays offers downloaded by the client from an electronic address based on credentials entered by the consumer. In an embodiment, the mobile client may have notified the consumer that new offers are available prior to the consumer having launched the coupon client.

In an embodiment, GUI 200 displays information about offers 211-214. The displayed information includes controls 221-222 for printing offers 211-212 respectively. The displayed information further includes controls 231-232 for saving offers 211-212, respectively, to a consumer's account. There are no controls for selecting offer 213, but rather an indicator 243 that the offer 213 has already been saved to the consumer's account. Likewise, there are no controls for selecting offer 214, but rather an indicator 244 that the offer 214 has already reached a distribution limit.

Selection of the controls 221-222 or 231-232 may result in the issuance of a request to an offer server to generate a coupon for the corresponding offer. Selection of one of print controls 221-222 may more specifically result in the client downloading a printable coupon for the corresponding offer and outputting the downloaded coupon to a printer. Selection of one of controls 231-232 may more specifically result in the client sending a user identifier or session identifier to an offer server, along with a request to store a digital coupon for the corresponding offer in an account associated with the user identifier or session identifier.

GUI 200 may optionally include fields that explain why some or all of the offers are being presented to the consumer. For example, a note next to one of the offers may explain to the consumer that the offer was selected for the consumer because of an item purchased in a specific transaction. The field may even include a link to another interface, such as another web page, from which the consumer may review details for the specific transaction, such as receipt data 130. In an embodiment, the field may further include a control by which the consumer may express a preference to not receive future offers related to the purchased items.

GUI 200 is one example of an interface that may be displayed for selecting offers. Other interfaces may include additional or less information in varying arrangements. For example, an interface may only include offers related to a single link 151-154 of email 100. As another example, an interface may only allow a consumer to print coupons, or only allow the consumer to save digital coupons.

4.3. Electronic Receipts

Various embodiments involve providing consumers at brick-and-mortar stores with electronic receipts instead of, or in addition to, printed receipts. The electronic receipts may be provided to the consumers in a variety of ways. For example, the electronic receipt may be included in or attached to an email. Or, the electronic receipt may be provided in a web page on a website hosted by the retailer or a third-party, such as an account history page or "digital locker" of receipt data. In an embodiment, the consumer may access the web page at any time after the transaction by logging into the website using credentials that authenticate the consumer. In an embodiment, the consumer receives a link to the web page via email, a text message, or any other electronic address, including private messaging addresses on social networks. The consumer provides a suitable address for the receipt during the transaction. Or, the consumer provides an identifier, such a store loyalty card or RFID tag, to the retailer so that a suitable electronic address to which to provide the electronic receipt may be located.

As yet another example, the consumer may obtain an electronic receipt using a dedicated transaction management application. The dedicated transaction management application, which may also double as a payment application and/or coupon application, may communicate with a server to obtain receipt data that has been uploaded by retailers in association with an account belonging to the consumer. The application may then organize that receipt data for presentation to the consumer. In an embodiment, the transaction management application may monitor the account for new receipts periodically, or receive push-notifications of receipts from the server. The receipt management application may then notify the consumer when a new receipt is available.

Various embodiments may also or instead involve providing consumers with offer information via an electronic address in response to the completion of a transaction. The offer information may include digital coupons themselves, and/or links to locations at which the consumer may print or otherwise obtain coupons. In an embodiment, offer information is embedded in an electronic receipt.

In an embodiment, an electronic/digital receipt interface includes a control for printing a return receipt. In response to a consumer clicking on the control, a return receipt, including a transaction identifier barcode, is printed.

In an embodiment, a retailer or payment provider creates electronic receipts by requesting receipt data structures from a receipt server such as receipt server 1370 and then formatting the receipt data structures in accordance with retailer-customized templates. In an embodiment, the retailer instead provides suitable template(s) to the retail server 1370. Different templates may be used for different contexts, such as email as opposed to web page as opposed to SMS.

In an embodiment, an example template for a digital receipt divides a receipt into five sections, including: a header information section comprising store information and branding, general transaction information, and a receipt barcode; an item details section that lists the products purchased, including information such as UPCs, SKUs, descriptions, prices, price modifiers, quantities, and/or other suitable line item details; a totals area, including sub totals, tax totals, balance due, and total savings; a tender area comprising information about the form(s) of payment, and amount(s) of payment, and a trailer area allowing for terms of sale, branding, and loyalty greeting(s). In an embodiment, APIs allow a retailer or other entity to retrieve data structures corresponding to each of the above.

Example Electronic Receipts

FIG. 1 depicts a display of an email 100 comprising an electronic receipt 130 with offer information 151-154 that has been provided to an electronic address 111 of a consumer. Email 100 may be displayed in the depicted manner by, for example, a client-based or web-based email application that interprets various fields, metadata, and or markup language included in email 100. Email 100 comprises a variety of header metadata 110, some or all of which may be displayed at the top of the email. Header metadata 110 may include, for example, an electronic address 111 of a consumer. Email 100 may further include a message 120.

Electronic receipt 130 of email 100 is depicted in FIG. 1 as one or more hyper-text markup language ("HTML") tables, but in other embodiments the electronic receipt may take any suitable form. Electronic receipt 130 comprises transaction details 135, such as a transaction number, a time or date of the transaction, a store location at which the transaction took place, an identifier for a terminal at which the transaction took place, the name of a sales representative that assisted in conducting the transaction, the name of the consumer, and so forth. Electronic receipt 130 further comprises an item list 140 of items 141-145 that were purchased in the transaction, a transaction total 180, and payment data 190.

Item list 140 may include, in association with items 141-145, basket-level details such as the quantities of each item purchased, a price for each item, offer redemption data 170 for offers applied to the transaction, tax data, SKU numbers, and so forth. Payment data 190 may contain a list of each payment mechanism applied to the transaction, along with any balance remaining.

Offer information 151-152 is intermingled within item list 140. Specifically, offer link 151 is displayed after item 142 and offer link 152 is displayed after item 145. As depicted, the offer(s) associated with links 151 and 152 are selected at random. However, in other embodiments the offers associated with offer information 151-152 may have been selected for inclusion in email 100 based on items 142 and 145, respectively. Offer information 153 is displayed in association with payment information 190, and the offer associated therewith may have been selected for inclusion in all receipts provided via email. Alternatively, in an embodiment, offer information 153 may have been selected for inclusion in email 100 because of the payment method chosen by the consumer. Offer information 154 is displayed at the end of the email, and the corresponding offer may have been selected for any of a number of reasons as discussed herein. In other embodiments, offer information 151-154 may be entirely intermingled with the electronic receipt 130, or displayed entirely separate from the electronic receipt 130.

As depicted, offer information 151-154 includes a link to the location(s) of one or more offers, along with short description(s) of the offer(s) available on those pages, designed to encourage the consumer to click on the links. Each offer link 151-154 may link to a same or different location. For example, each link may take the consumer to a different offer page on the website of an offer provider. Each offer page may comprise one or more offers relevant to the selected link. Or each link may take the consumer to a same page containing all of the indicated offers.

In other embodiments, offer information 151-154 may include additional information about the available offers, such as a list of eligible products and store locations, expiration dates, discount amounts, and other terms. In an embodiment, offer information 151-154 may include controls associated with each indicated offer, such as a "Print now" button or "Save to Card" button, by which the consumer may immediately download, print, and/or save a coupon for the indicated offer. In an embodiment, offer information 151-154 may be part of a form comprising a checklist or pull-down menu of offers and controls for printing, saving, or otherwise accessing coupons for any offer that the consumer selects via the form. In an embodiment, offer information 151-154 may indicate to the consumer offers that have automatically been added to the consumers' account in response to the transaction.

Email 100 may optionally include relevant advertisement data, such as advertisement 180, that is not an offer. For example, as depicted, advertisement 180 is a special promotion that provides the consumer with access to a multimedia item related to the purchased item 143.

Email 100 is one example of a technique for providing a consumer with an electronic receipt. In other embodiments, the electronic receipt may be embedded in differently formatted emails, other types of messages, web pages, and/or documents. Furthermore, electronic receipt 130 may include more or less transaction data, in varying arrangements. In an embodiment, email 100 comprises only electronic receipt 130 or only offer information 151-154. In an embodiment, the information in email 100 may be divided amongst multiple electronic addresses. For example, the offer information 151-154 may be in a different email or on a web page. In an embodiment, the offer information 151-154 is substituted in email 100 with single link having a label such as "Access Your Coupons."

Figure 35:
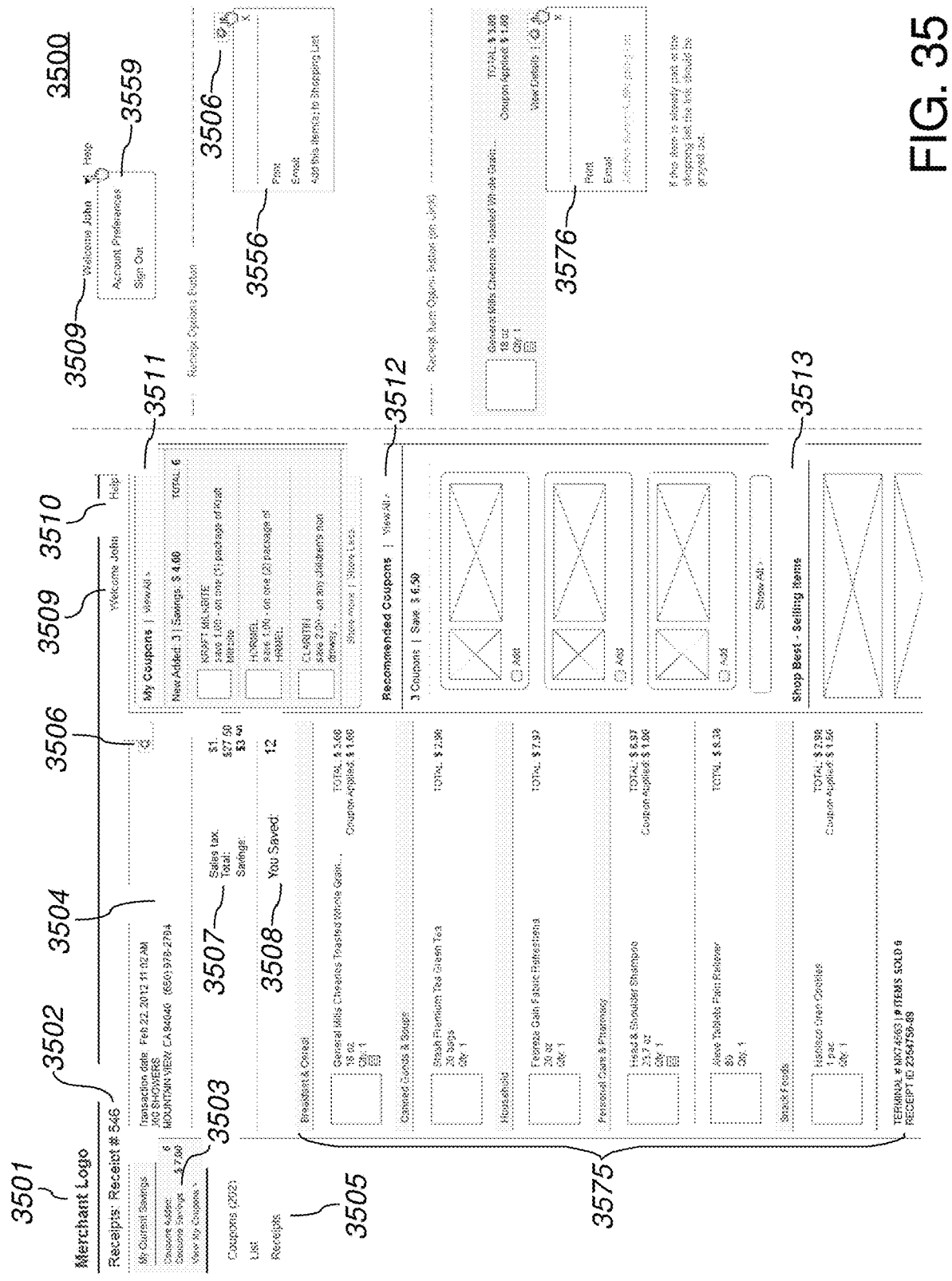
FIG. 35 illustrates an example webpage comprising an electronic receipt with embedded offer information, in accordance with an embodiment.

FIG. 35 illustrates an example webpage 3500 comprising an electronic receipt 3550 with embedded offer information, according to an embodiment. Web page 3500 comprises a merchant logo 3501, receipt number 3502, current savings area 3503, transaction information area 3504, main navigation menu 3505, option popup menu 3506, transaction summary area 3507, percentage savings area 3508, greeting area 3509, help area 3510, pre-activated coupon area 3511, recommended coupon area 3512, and best-selling item area 3513.

Merchant logo 3501 allows a retailer to display their logo from a branding perspective. The logo may be text or image. Current savings area 3503 displays a consumer's total number of activated offers (clipped coupons). This section provides information on the number of coupons added and the coupon savings in dollar amount. Coupons added and coupon savings will display 0 and $0.00 when there are no activated offers. Transaction information area 3504 captures information from the transaction log pertaining to the retailer, such as: date and time of purchase, store address, store phone number.

Main navigation menu 3505 displays, after clicking the links in a public receipt, a prompt to sign in. After "signing in" the consumer will be able to navigate within the portal. This section has multiple tabs that enable to consumer to be able to view various interface elements such as a Coupons Tab that allows the consumer to view a coupon gallery where consumer can activate coupons, a Lists Tab that shows pre-activated and activated coupon lists, and a Receipts Tab that will allow the user to view all the receipts. The consumer is able to toggle between these various tab views by clicking on the tabs of the module.

Option popup menu 3506 gives the consumer options such as option to print this receipt, email it, delete it, or add all the receipt's items to a shopping list. A mockup overlay 3556 for popup menu 3506 appears to the right of web page 3500. Hovering the mouse on the icon for popup menu 3506 opens up the overlay 3556, with the controls for print, email, delete, or add items to shopping list options.

Transaction summary area 3507 displays information such as sales tax, transaction total, and savings amount. Percentage savings area 3508 indicates the amount saved in the transaction. Transaction details area 3575 shows the line item, basket level details for the transaction. Each item may be broken down into an item category. An indication of the item amount and any discount applied are given. Clicking on the item may, for example, bring up an item detail sidebar or popup overlay with nutritional data, ingredients, specifications, product images, item descriptions, offers related to the item, and/or other information. Or, such information may be displayed in a separate item detail page. Or, as another example, clicking on an item in area 3575 may bring up a pop-up menu 3576 with selectable controls to perform actions such as printing or emailing information about the selected item, adding the selected item to a shopping list if the item is not already in a shopping list, and so forth.

Welcome area 3509 allows a consumer to, by clicking on the down arrow, can edit account preferences and/or sign out. Clicking on the down arrow opens the overlay 3559. Help area 3510 comprises a link to a Frequently Asked Question page and other support features.

Pre-activated coupons area 3511 displays the consumer's latest pre-activated offer. The consumer has the option to expand the container by clicking on the "Show more" link to view any more activated coupons. This section provides the information on the number of coupons added and the coupon savings in dollar amount. Recommended coupons area 3512 contains a list of additional coupons for user to activate. A consumer may activate a coupon by clicking on the add control associated with each coupon. Best-selling items area 3513 is a list of items that are selling well, and may be of interest to the consumer.

Example Receipt List Interface

Figure 36:
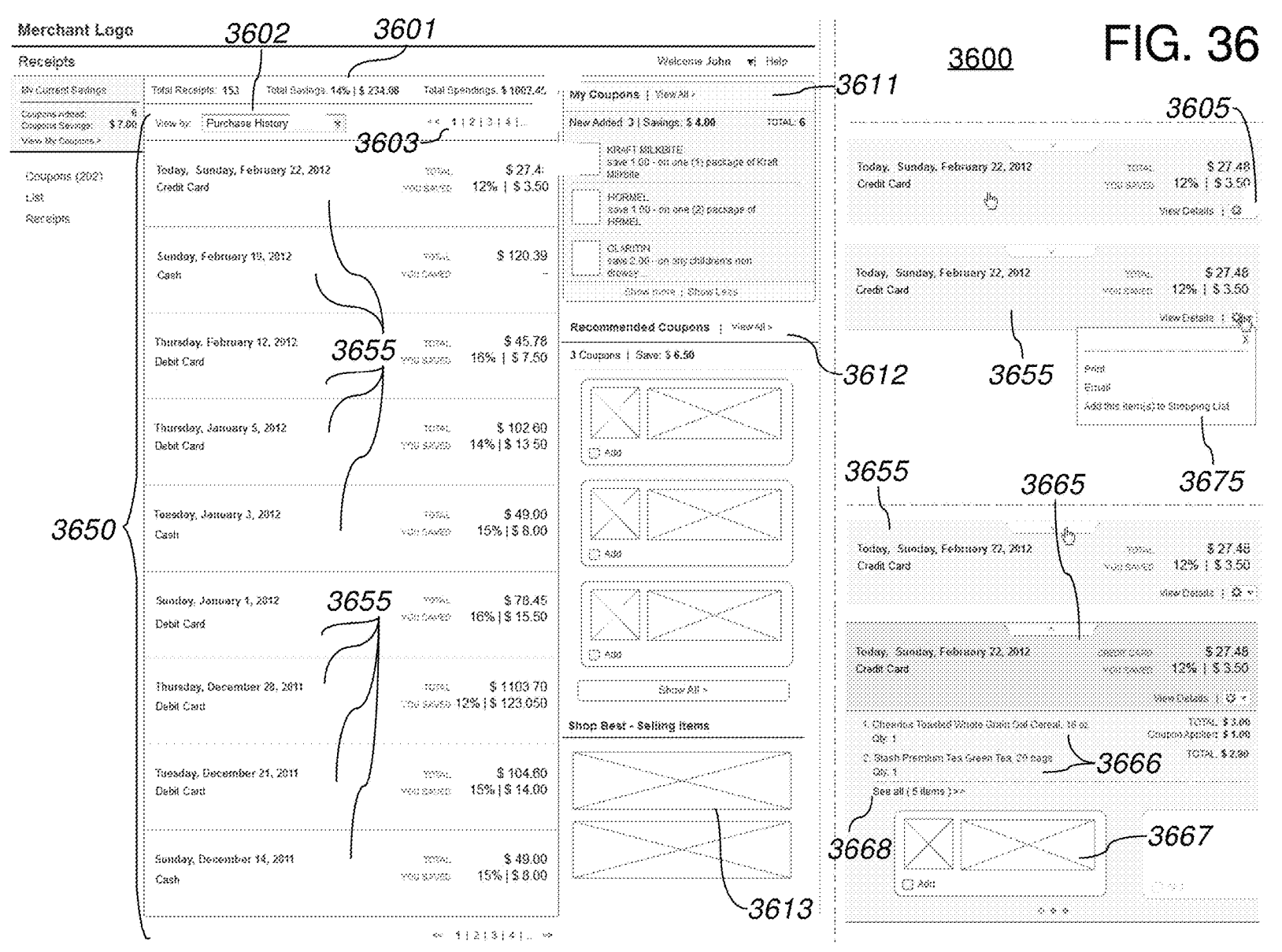

FIG. 36 illustrates a webpage 3600 comprising an interactive list 3650 of a consumer's receipts, according to an embodiment. A transaction aggregation area 3601 displays the total number of receipts, total savings, and total spending for the consumer, as aggregated from all transactions mapped to the consumer. List 3650 comprises a number of different receipt summaries 3655, which may display different information depending on the view. For example, as depicted, the receipt summaries 3655 depict a date, day of week, transaction total, payment type, and total savings. Clicking on a receipt summary 3655 may take the consumer to a receipt web page such as web page 3500 above. Or, clicking on or hovering over a receipt summary 3655 may cause the summary to be transformed into an expanded receipt summary. Or, clicking on or hovering over a receipt summary may cause the expanded receipt summary to display in a popup overlay. Examples of expanded receipt summaries are depicted in overlay 3665, which lists a few selected items 3666 of the total number of items involved in the transaction, along with a couple of related offers 3667. A separate, full receipt detail page may be launched using control 3668.

Sort/filtering controls 3602 allow a user to enable various views of the listed receipts, including views by various key features such as Purchase History, Payment Type, Last 7 days, and/or Last 30 days. Navigation controls 3603 permit navigation of list 3650. Receipt action control 3605 gives the customer a pop-up menu interface 3675 having controls with the options to print, email or add receipt items to shopping list(s).

Webpage 3600 further includes pre-activated coupon area 3611, recommended coupon area 3612, and best-selling item area 3613, similar to those found in web page 3500.

4.4. Example User Interaction Data Flow

As an example, a consumer's experience with an embodiment of certain systems and techniques described herein is as follows. The consumer completes shopping and identifies themselves using a retailer's pin-pad by entering a phone number or email identifier and/or swiping a loyalty card or a credit card. The consumer makes a payment for items in his or her basket at the point-of-sale. The consumer specifies a choice for whether to receive a digital receipt, and his or her preferences for delivery of that receipt. Or, the choice is identified based on previously collected consumer preferences. The consumer receives a digital receipt either through email or text. The consumer views offers presented in the receipt and may activate offers for future use.

The flow of data between various system components that enable this consumer experience is, according to an embodiment, as follows. The pin-pad will interact with a local server, deployed by the offer distributor within the retailer's data center, to resolve the consumer's identity and, if available, retrieve their digital receipt preferences. The pin-pad will interact with the local server located within retailer environment to identify a consumer and retrieve their digital receipt preferences. The pin-pad will send the consumer's information, like their loyalty identifier, phone number, email identifier, or a token based on the Payment Card Number (PAN) to the local server. The local server will try to identify the consumer and send their digital preference back to the pin pad. The local server is synchronized with the offer distributor's central consumer database periodically.

The point-of-sale utilizes a trickle upload server to send transaction logs, possibly in near-time, from the store to a central sales hub in a retail data center. The transaction log (Tlog) is then sent via a flat file, possibly on a real time basis, to a transaction aggregation gateway for presentation of digital receipts. The data from sales hub is distributed to various other systems within the retailer environment. Through a fork the same transaction log may be sent to the gateway for presentation of digital receipts. A flat file may be sent for each Tlog transaction that includes transaction information. Three example formats for sales transactions from retailers are IBM Tlog, POS Log—ARTS standard, and a transaction-aggregation system canonical format that is non-binary.

Real time Tlogs from retailers enter through the gateway. The gateway supports multiple interface protocols, such as web services and message queues. The Tlog is processed in the gateway using the following three processes: 1) Security: the Tlog is received as a message and validated against defined message and channel level security policy; 2) Transformation: the Tlog message is transformed from retailer specific format to the canonical format using accelerators for fast transformation; 3) Queues: the transformed Tlog messages are queued for further processing by the event processing engine.

The Tlog is then processed by an event processing engine. The event processing engine contains three components: producers, processing engine, and consumers. Event producers manage real time sale transaction messages, offer activations, and/or the various other events described herein. Event processors route the events based on attributes based on rules such as, if a consumer chooses SMS as a choice, then the event is routed to an SMS adaptor. Example event consumers include SMS adapter—to send SMS using notification services; Email adapter—to send Email using notification services; Store in database—to store sale transaction in database; Preloading offers—to preload recommended offers to a customer in the event the customer requests digital receipt.

The consumer data from the Tlog data is loaded into consumer tables in the operational data store (ODS) after validating it using the business logic. The business logic is based on the business rules established by the offer distributor. The following information from the Tlog will be stored in the consumer database in ODS: Loyalty Id, PAN number, Email Id, and/or Mobile phone number.

Data from the ODS is moved to a data warehouse for analytics purposes using ETL tools in a batch mode. Consumer data such as consumer names, address, demographics, email ids, PAN, Phone numbers, social media, device, loyalty, and other information, is loaded in to consumer tables in warehouse. These ETL processes are also used to load bulk data from partners in to the ODS. The ETL processes run in batch mode to move data from ODS to Data warehouse.

Any offers activated by the consumer are sent to each retailer's offer management system in the central sales hub, so as to allow them to be redeemed. The offer information will be sent real time to the retailer. Optionally, the offers can also be stored in offer distributor's local server and made available through it. The central sales hub sends this information, along with item information and pricing information to the point-of-sales.

Information about offers that are actually redeemed by the consumers is sent back to the offer distribution server on a near time basis. This information is stored in the ODS and fed back to the data warehouse for further analytics and reporting purposes.

The offer server receives certain consumer master data from retailers and other partners on an ongoing basis, and from third party companies on an ad hoc basis. This data is loaded into the ODS along with the offer distributor's own consumer information, and subsequently moved to data warehouse to create digital profiles for the consumers.

The retailer's local server synchronizes with the offer distributor's central server on an ongoing basis. Reporting programs pull consumer information from the data warehouse to generate reports.

4.5. Example Offer Data Flow

An example offer data flow is as follows. Manufacturers, advertisers, retailers, and others work with the offer distributor to develop content to be marketed within the offer distributor's network. Offers are created in the distributor's offer management system. Certain offers have a print-at-home designation and are loaded into a separate distribution system for printable coupons. Other offers are digital offers, which are processed by offer business logic and loaded into offer tables in the ODS. These offers are pushed from ODS to the data warehouse on a regular basis.

In one embodiment, on a periodic basis, such as daily or every 15 minutes, the recommendation engine may read TLog data, redemption data, and offer data from the ODS. The engine runs the recommendation algorithm, processes business rules, performs post-processing, and ranks offers in the ODS. Meanwhile, a targeting engine retrieves targeting information and offers from the data warehouse. The targeting engine matches the offers to targeted consumers in the data warehouse. Any matched manually targeted offers are then send from the data warehouse to the ODS. On a periodic basis, all of the offers (including the recommended and manually targeted offers) for a consumer are pooled in the ODS.

A consumer requests a digital receipt at the point-of-sale using, for example, a pin-pad or other interface. The retailer sends the consumer's Tlog data on a real time basis to the gateway. The Tlog data is processed by the gateway, event processing engine, and then by business logic, and is loaded into a sales tables in the ODS, as described in other sections.

A digital receipt service, or other requestor of offer recommendations, calls a recommendation engine for the most appropriate offers based on a consumers' Tlog (basket) data and/or other factors such as a consumer name, address, demographics, email identifier, PAN, phone number, social media data, device identifier, loyalty data, and so forth. On the request, the recommendation engine will read the pooled offers from the ODS, optimize the recommendations based on the basket data, and create an new offer list that's most relevant to the consumer in the ODS. In various embodiments, a recommendation engine may use contextual transaction data and/or historical transaction records to identify and/or rank recommended offers.

The final offers list is sent to the digital receipt, or to an offer distributor consumer interface via business services, based on the call and context. In the case of the digital receipt service, the digital receipt and the offer are sent to the consumer via the consumer's preferred delivery method. The finally recommended offers may be logged in an offer status table that indicates impressions.

The consumer activates offers, and the list of activated offers is sent to ODS. Activated offers are sent from ODS to an offer database in the data warehouse. The inventory for these activated offers is reduced in the offer management system. A consumer subsequently redeems offers at the point-of-sale. Partners, such as retailers or clearinghouses, send offer redemption information to the ODS via bulk data exchange. A consumer offer table is updated with this information.

4.6. Example Notifications and Other Messages

In an embodiment, in addition or instead of providing consumers with individual receipts, a receipt server may provide consumers with periodic aggregated reports of their transaction activities. For example, a receipt server may email a monthly report of a consumer's aggregated purchases at a certain store. The report may emphasize how much money a consumer saved by accepting various offers, and/or show the consumers how much money they could have saved had they used certain offers. Consumers may then activate or reactivate these offers, or similar offers.

In an embodiment, a portal for viewing offers and/or receipts features a message preference area, by which a consumer may elect to receive certain types of email, SMS, and/or web-based notifications, including notifications of new receipts and account changes, as well periodic notifications, such as weekly notifications of offers not yet redeemed, offers expiring within a consumer-specified upcoming time frame, shopping list items, and/or upcoming sales events.

In an embodiment, an offer distribution system sends regular messages and notifications for coupons that are expiring, new deals, and so forth. In an embodiment, an offer distribution system provides consumer frequency data to retailers, thus allowing retailers to send an automated email to inactive consumers. For example, after 45 days, the retailer may send an inactive consumer the message: "It's been a while since we've seen you," along with offer(s) recommended for the consumer.

4.7. Example Recommendation Engines

Figure 32:
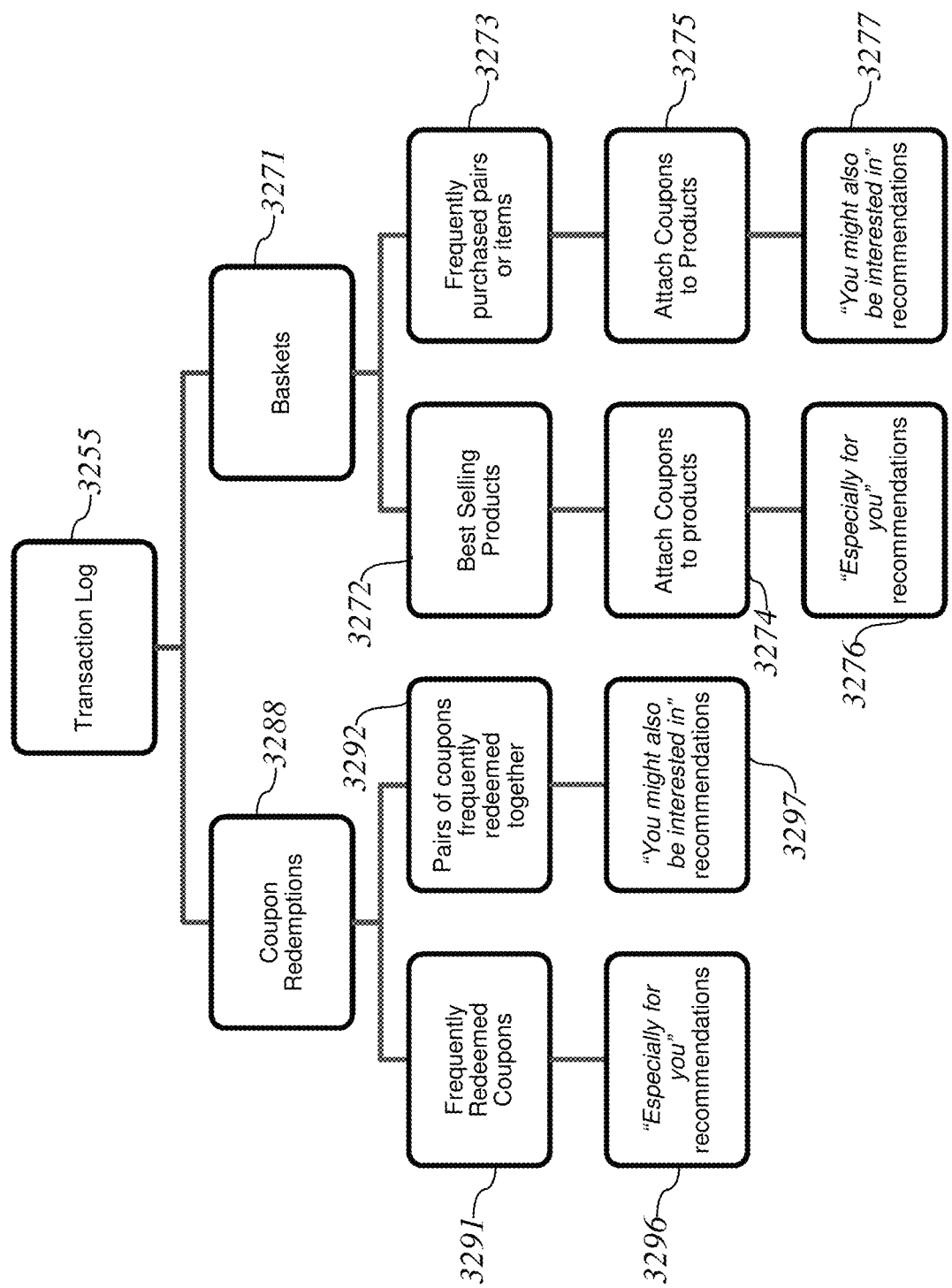
FIG. 32 illustrates a process flow for an example recommendation engine, in accordance with an embodiment.

FIG. 32 illustrates a process flow 3200 for an example recommendation engine, according to an embodiment. Transaction logs 3255 are mined for offer redemption data 3288 and basket data 3271. Recommendations are generated from transactions 3255 directly by identifying best-selling products 3272 in basket data 3271 and frequently redeemed offers 3291 in offer redemption data 3288. The frequently redeemed offers 3291 are recommended as personalized recommendations 3296. Offers 3274 are identified for the best-selling products 3272, and then used as personalized recommendations 3276.

Recommendations are generated from transactions 3255 indirectly by identifying associative pairs 3292 of offers frequently redeemed together in offer redemption data 3288, and associative pairs 3273 of items frequently purchased together. The associative pairs 3292 are used to identify related recommendations 3297. Offers 3275 are identified for the items in associative pairs 3273, and then used as related recommendations 3277.

Figure 33:
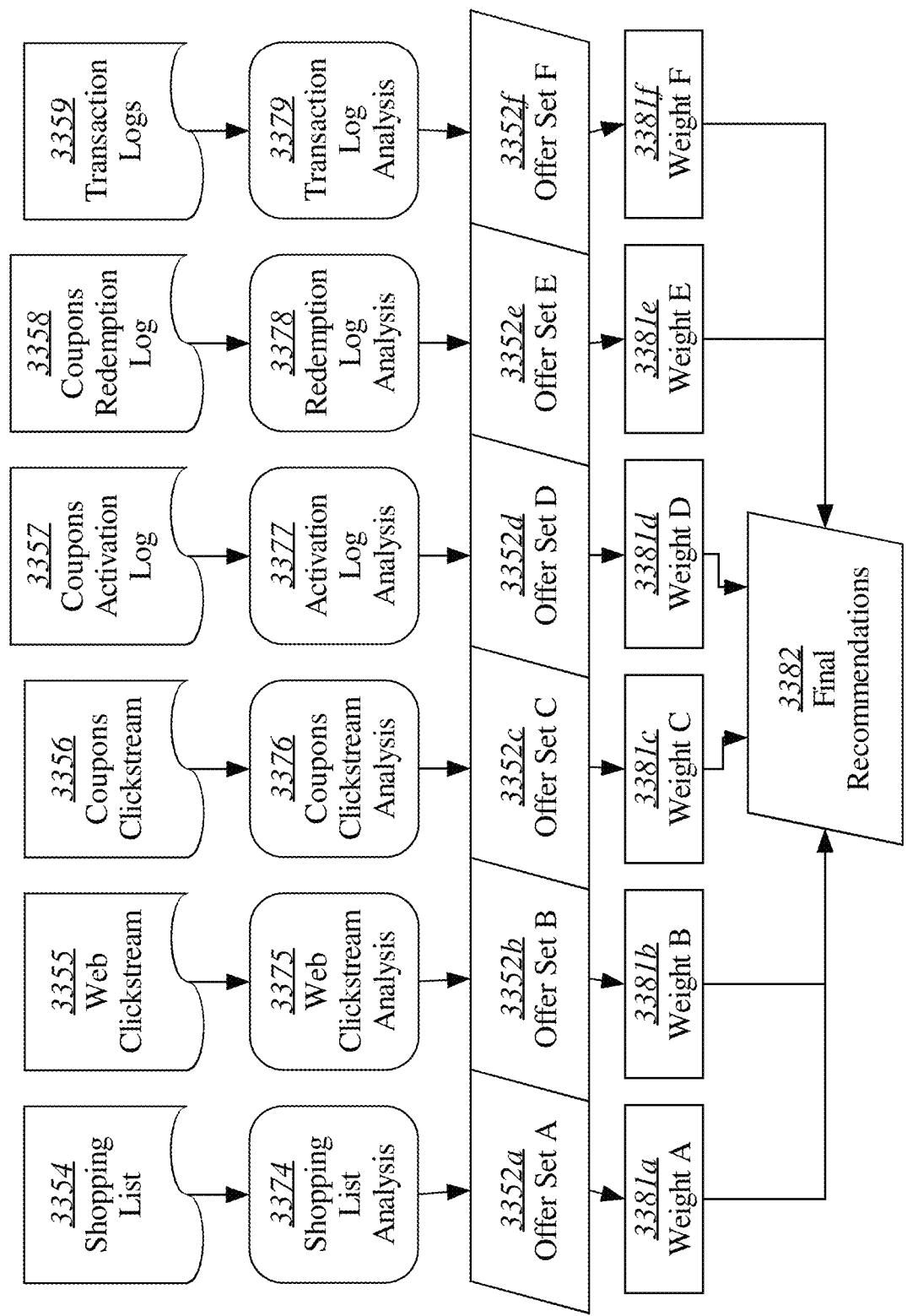
FIG. 33 illustrates another example recommendation engine based on six different scoring functions, each of which is specific to a certain category of signals, in accordance with an embodiment.

FIG. 33 illustrates another example recommendation engine based on six different scoring functions 3374-3379, each of which is a specific to a certain category of signals, according to an embodiment. These categories include shopping lists 3354, web clickstream 3355, offers clickstream 3356, coupons activation log 3357, offers redemption log 3358, and transaction logs 3359.

Each data source 3354-3359 will provide a separate recommendation set 3352a-3352f, having its own distinct scoring. The recommendations sets 3352a-3352f are merged by assigning a different weight 3381a-3381f to every recommendation set 3352a-3352f. Initial weights can all be set to the same value, or learned by experience. In an embodiment, weights 3381a-3381f grow from left to right, indicating that the data sources 3354-3359 increase in relevance in that same order. However, other weightings are also possible. Alternatively, only some or even none of the recommendation sets 3352a-3352f are merged. Rather, different recommendation sets 3352a-3352f are used for different situations.

In an embodiment, weights 3381a-3381f are continuously updated to reflect the dynamic nature of data sources, the information richness of each source, and/or to compensate for malicious data sources. In an embodiment, tentative weight values are as follows: Weight 3381a: 20-40%, Weight 3381b: 40-50%, Weight 3381c: 40-50%, Weight 3381d: 60-80%, Weight 3381e: 90-100%, Weight 3381f: 90-100%.

Distributed Algorithm Implementation

In an embodiment, mapper and reducer programs enable generating recommendations in parallel. These programs rely on the computational power on clusters of machines as well as network bandwidth on the connections linking the clusters together.

In a basic parallel association analysis, the input type is the same as the output item types, and the algorithm effectively reduces to a variation of a self-join operation. Individual transactional orders are separately processed in association-pair mapper tasks that output primary items as keys, and secondary/recommended items and their weights as values. The Map-Reduce framework will shuffle and re-arrange the outputs by their keys (primary items) for feeding into reducer tasks. The reducers then calculate and sort the final pairwise associations in the form of an item-item association or similarity matrix. Each row of the item-item similarity matrix is then sorted to rank the recommendations by a pre-specified metric.

4.8. Example Signals/KPIS

In an embodiment, in addition to the other categories of data sources described herein, signals for scoring functions may be derived from offer validity data, inventory data, revenue data, and/or transaction data.

In an embodiment, a scoring function that has been developed takes into account several signals including how frequently a pair is purchased, by how many different consumers, when they are purchased, and where they are purchased. The signals include: number of unique purchasers of pair $\{i_k, i_m\}$, total appearances of pair $\{i_k, i_m\}$, time of purchase, relative price of items purchased together, and/or location of purchase.

In an embodiment, signals derived from transaction data may include metrics based on: departments in which consumers cross-shop, private label products that certain consumers prefer, frequency with which a consumer responds to offers, percentage of a consumer's baskets that contain an selected product, which items are actually in their market basket, projections of whether a particular consumer will actually respond to a particular offer, whether the consumer tends to only buy products on sale, and whether the consumer tends to buy advertised items (as may be indicated by correlations between purchases and separate advertising data).

In an embodiment, these and other metrics may be utilized for the purpose of dynamic offer valuation and/or price discrimination. For example, based on the above metrics, an offer distribution system may be able to estimate exactly how big of a discount amount is needed to entice a consumer to accept an offer. This dynamically computed amount is shown to the consumer when recommending an offer, and may even change if the consumer fails to activate or use the offer within a certain time. The dynamically computed amount is then stored in the offer activations records, so that it may be applied correctly.

Example KPIS

Example metrics to be used in generating recommendations include, without limitation, those in the following table. These KPIs may be used in a number of functions, including, without limitation: assessing the performance of coupons, and identify the best-selling ones or the coupons with the estimate the benefits for the distributor and other stakeholders, identify the best customers, estimate the revenue for the distributor and other stakeholders (manufacturers, retailers) that each offer generates, post filter the generated recommendations by applying specific thresholds, either hard or soft, that one, several or a function of these KPIs need to satisfy, assess the performance of recommendations by estimating the lift that the provided recommendations generate in each of the monitoring KPIs, training the recommendation engine, calculating a universal score for an offer, scoring potential offers to propose that a provider create, estimating a potential offer's effectiveness, and so forth.

| KPI | Description |
| --- | --- |
| Number of coupons per basket | The number of coupons per basket for the customers of the distributor is a measure of the penetration of coupons in the basket of a customer. For example, on an average, a coupon customer uses X coupons per basket during a certain period. |

| KPI | Description |
|---|---|
| Number of coupons per customer | For every customer calculate AVG number of coupons redeemed per Basket over a time period, then calculate the average of the above calculated figure across all customers. The number of coupons that every customer uses over a specific period is an indication of his utilization of coupons.com offers. For example, on an average, a coupon customer uses X coupons during a certain period. For every customer calculate the total number of coupons redeemed over a time period, then calculate the average of the above calculated figure across all customers |
| Number of Coupons per items purchased within each basket | By looking at this ratio the distributor can have an idea of the contribution of coupons in the revenue from a specific customer. For example, on an average, a coupon customer's shopping basket has 60% items purchased with coupons during a certain period. For every customer calculate the average of (number of coupons/number of items) per basket over a time period, then calculate the average of the above calculated figure across all customers |
| Number of Coupons Per retailer | Identify those retailers that generate the higher revenues for the distributor. For example, during a certain period: X coupons were redeemed from Retailer A; Y coupons were redeemed from Retailer B. For every customer calculate the total number of coupons redeemed per retailer over a time period, then calculate the SUM of the above calculated figure across all customers per retailer |
| Number of Impressions per Coupon | Quantifies the number of times each coupons has been shown. This can be broken down to customer level. For example, during a certain period, AVG Figure: Coupon A was displayed X number of times per customer; Total Figure: Coupon A was displayed Y number of times in total to all customers. For every coupon, calculate the total number of times it is displayed to customers during a certain time period, then divide the above calculated figure with number of customers the coupon is displayed to |
| Number of Customer Activations per coupon | The number of Customer activations per coupon is a metric of the popularity of each coupon. For example, Coupon A was activated X number of times during a certain time period |
| Number of Customer Activations per coupon by context (e.g. print, digital) | The number of Customer activations per coupon is a metric of the popularity of each coupon via Save to Card. For example, Coupon A was activated X number of times during a certain time period in a certain context. |
| Number of Auto - Activations per coupon | The number of auto - activations per coupon during a certain time period is a metric of the popularity of each coupon. |
| Number of Total Activations per coupon (auto - activated and customer - activated coupons) | The number of total activations (including auto - activated and customer activated) per coupon during a certain time period is a metric of the popularity of each coupon. |
| Number of redemptions per coupon for Customer - activated coupons | The number of redemptions per coupon during a certain time period is an indication of purchases a coupon might have triggered. |
| Number of redemptions per coupon for Auto - Activated | The number of redemptions per coupon during a certain time period is an indication of purchases a coupon might have triggered. |
| Number of redemptions per coupon for Total Activated | The number of redemptions per coupon during a certain time period is an indication of purchases a coupon might have triggered. |
| Number of redemptions per coupon for Customer Activations by context (e.g. print/digital) | The number of redemptions per coupon during a certain time period in a certain context is an indication of purchases a coupon might have triggered. |
| Offer distributor Revenue per Coupon | Identify the most profitable coupons. The average revenue per coupon is an indication of the average performance of all coupons. For every coupon, calculate revenue over a period through activation at coupon.com and affiliated websites, then average the above figure across all coupons will give average revenue per coupon |
| Retailers Revenue per Coupon | Identify the coupons that generate the higher revenue for Retailers/manufacturers. Sum of sales for every type of coupon that was used. |
| Offer distributor Revenue Per Impression | Aids in determining the effectiveness of each coupon for the distributor, since it compares the revenues that each coupon generates for the distributor to the number of times this has been presented to customers. |

| KPI | Description |
|---|---|
| Retailer Revenue Per Impression | For every coupon, calculate revenue over a period through activation divided by number of times it is presented to customers during the same period<br>Aids in determining the effectiveness of each coupon for retailers and manufacturer.<br>Sum of sales for every type of coupon divided by the impressions of this coupon |
| Offer distributor Revenue Per Customer Activation | Determines the revenue generated per Customer activations for each coupon. |
| Distributor Revenue Per Auto - Activation | Determines the revenue generated per auto - activations for each coupon. |
| Distributor Revenue Per total Activation (auto - activated and customer activated coupons) | Determines the revenue generated per total activations (including auto - activated and customer activated) for each coupon. |
| Distributor Revenue Per Customer Activation by context | Determines the revenue generated per Customer activations by Save to Card for each coupon. |
| Retailer Revenue Per Customer Activation | Determines the retailers' revenue per activation for each coupon.<br>Sum of sales of items for which a specific coupon was used divided by the number of activations of this coupon |
| Retailer Revenue Per Auto - Activation | Determines the retailers' revenue per auto - activation for each coupon.<br>Sum of sales of items for which a specific coupon was used divided by the number of activations of this coupon |
| Retailer Revenue Per total Activation (auto - activated and customer activated coupons) | Determines the retailers' revenue per total activations (including auto - activated and customer activated) for each coupon.<br>Sum of sales of items for which a specific coupon was used divided by the number of activations of this coupon |
| Retailer Revenue Per Customer Activation by context | Determines the retailers' revenue per activation by Save to Card for each coupon.<br>Sum of sales of items for which a specific coupon was used divided by the number of save to card activations of this coupon |
| Revenue per Redemption for Customer Activated coupons | For every coupon, calculate revenue over a period through activation divided by number of times it is redeemed during the same period |
| Distributor Revenue per Redemption for Auto - Activated | For every coupon, calculate revenue over a period through activation divided by number of times it is redeemed during the same period |
| Distributor Revenue per Redemption for Total Activated | For every coupon, calculate revenue over a period through activation divided by number of times it is redeemed during the same period |
| Distributor Revenue per Redemption for Customer Activated by context | For every coupon, calculate revenue over a period through activation divided by number of times it is redeemed during the same period for coupons activated in the context |
| Retailer Revenue per Redemption for Customer Activated coupons | Sum of sales of items for which a specific coupon was used divided by the number of redemptions of this coupon |
| Retailer Revenue per Redemption for Auto - Activated | Sum of sales of items for which a specific coupon was used divided by the number of redemptions of this coupon |
| Retailer Revenue per Redemption for Total Activated | Sum of sales of items for which a specific coupon was used divided by the number of redemptions of this coupon |
| Retailer Revenue per Redemption for Customer Activated by Save to Card coupons | Sum of sales of items for which a specific coupon was used divided by the number of redemptions of this coupon for activated by print coupons |
| Retailer Revenue per Redemption for Customer Activated by Print coupons | Sum of sales of items for which a specific coupon was used divided by the number of redemptions of this coupon for save to card activated coupons |
| Clip rate per Impression (i.e. strip out price weighting, effectively giving lower priced items equal weight) | This is the number of activated coupons per impression.<br>Number of Impressions per coupon/Number of Activations per coupon |
| Redemption rate of coupons after clipping | Number of redeemed/number of activated coupons |
| Customer: return trips to website | Number of visits of every customer to the website (Distributor/Retail). This can also be expressed as frequency, that is the number of visits per week<br>For every customer, calculate the number of times he/she visited the Coupon.com website during a certain period |

| KPI | Description |
| --- | --- |
| Customer: return trips to retail stores | Number of visits of every customer to the retail stores. This can be also broken down by retailer so as to have an indication of the loyalty of customers to specific retailers<br>For every customer, calculate the number of times he/she visited a certain store over a certain period<br>Averaging the above calculated figure across all customers per store will give Average number of visits per customer per store |
| Customer: number/rate of coupon redemptions (if most coupons expire or sit unused) | Similar to the ratio of redeemed to activated coupons<br>The number of coupons redeemed by a specific customer/number of activations of this customer |
| Customer: $ amount of coupon redemptions | Savings per customer. Along with the number of coupons per customer this is an indication of the value of each customer to the distributor<br>The sum of all the discounts due to the coupons that a customer used |
| Customer basket metrics | Mentioned Above - inclusive of $, #items, categories etc., number of baskets, trips etc. |
| Number of unique retailers visited by a customer | Mentioned Above (return trips to retail stores)<br>For every customer, calculate the number of unique retailers visited over a certain period |
| Number of unique customers redeeming a coupon | The number of unique customers per coupon is a measure of the popularity of each coupon.<br>For every coupon, Calculate the number of unique customers redeemed it over a certain time period |

4.9. Example Associative Analysis/Association Scoring

The examples below illustrate just some of the wide variety of association analysis and scoring functions and that may be utilized to practice the techniques described herein. Many variations on these functions and alternative functions are possible. Many embodiments of the described techniques do not require any specific scoring function(s), but instead may utilize any suitable scoring function(s).

Association Analysis (or Item-to-Item Collaborative Filtering)

In an embodiment, a recommendation system uses the transaction data to identify baskets and recognized item groups that are frequently purchased together. Using this information, the recommendation system may then generate item to item (product) recommendations. For every product within a basket the recommendation system can recommend products that are usually purchased together with that one. Thus, the recommendation system may generate a set of recommendations for every product and every basket.

In an embodiment, the recommendation system employs an association analysis that focuses on the identification of pairs or even sets of products that are purchased together. Its main objective is to identify hidden associations between products that cannot be traced with bare eye. To do so, customer baskets are analyzed and the significance of each item set is estimated using an appropriately chosen scoring function. Typical scoring functions in traditional association analysis are support count, support, confidence, and cosine metric. In an embodiment, all these metrics are computed and their performance is evaluated. Other metrics are also estimated including Mutual Information and Pearson Correlation.

In the functions described herein, the operator |•| denotes the number of elements in a set, $t_i$ is a transaction that consists of several items $i_k$, $T=\{t_1, t_2, \ldots, t_N\}$ is the set of all transactions and $I=\{i_1, i_2, \ldots, i_d\}$ is the set of all available items.

In an embodiment, one scoring function is the geometric mean of the unique users that have purchased a specific set of items, weighted by a recency factor that aims to boost recent over outdated recommendations.

$$\text{scoring}(i_k, i_m) = \left(\frac{t_{av} - t_0}{t_1 - t_0}\right)^n \times \sqrt{uniqueUsers(i_k, i_m) \times \sigma(i_k, i_m)}$$

In the above equation, the variable $t_{av}$ is the weighted average of the times that this specific pair of items has been purchased, or:

$$t_{av} = \sum_{m=0}^{M} w_m \times t_m$$

The variable $t_0$ is the time of the first purchase in the data set. $n \geq 2$ indicates the nonlinear effect on the weighting. Weighting can be performed taking into account the number or the dollar value of these purchases.

A variation of this metric is the following $$\text{scoring}(i_k, i_m) = \sqrt{UniqueUser(i_k, i_m) \times \sum_{m=0}^{M} \left(\frac{t_m - t_0}{t_1 - t_0}\right)^n}$$

In the above equation, the time effect of recommendations is accounted by replacing the support count term in the square root with the sum of all the recency factors.

Finally extensions of this scoring function may include price weighting and geographical weighting:

$$\text{scoring}(i_k \rightarrow i\_m) = w_{price} \sqrt{w_{geo} \times UniqueUser(i_k, i_m) \times \sum_{m=0}^{M} \left(\frac{t_m - t_0}{t_1 - t_0}\right)^n}$$

In the above, equation, $w_{price}$ and $w_{geo}$ are nonlinear weighting factors that take into account the relative price of items $i_k$ and $i_m$ and also the relative distance between the place where the place where the purchase of the pair takes place and the location where the recommendations are going to be provided.

In another embodiment, an association score may be calculated as follows:

$$scoring\ (i_k, i_m) = w_{price} \times \left(\frac{Price_k}{Price_m}\right)^l \times \sqrt{w_{geo} \times UniqueUser(i_k, i_m) \times \sum_{m=0}^{M} \left(\frac{t_m - t_0}{t_1 - t_0}\right)^n}$$

In yet another embodiment, an association score may be calculated as follows:

$$scoring\ (i_k, i_m) = \left(\frac{t_{av} - t_0}{t_1 - t_0}\right)^n \times \left(\frac{Price_k}{Price_m}\right)^l \times \sqrt{uniqueUsers(i_k, i_m) \times \sigma(i_k, i_m)}$$

In yet another embodiment, an association score may be calculated as follows:

$$scoring\ (i_k, i_m) = \left(\frac{t_{av} - t_0}{t_1 - t_0}\right)^n \times \left(\frac{Price_k}{Price_m}\right)^l \times \sqrt{uniqueUsers(i_k, i_m) \times \sigma(i_k, i_m)}$$

In this embodiment, the recency effect is controlled by factor n and the price effect is controlled by factor l.

Collaborative Filtering (Customer-to-Item Collaborative Filtering)

The full transaction history of every customer can be extracted from transaction data. This can then be used for the application of collaborative filtering techniques. These techniques attempt to find for every customer, customers with similar purchasing behavior, characteristics and purchasing patterns, and preferences. Then recommendations for a customer are generated by identifying the most frequent purchases of similar customers.

The similarity among customers can be defined in several fashions. One approach is to compare the record of every customer to the records of the other customers in the CAR and to generate a similarity index. This index should be frequently updated as customers are dynamic entities that continuously purchase new items and thus continuously alter their preferences and behavior as this is recorded in the CAR. This process is very accurate but also very computationally intense, since it requires N by N comparisons, where N the number of customers. Another approach is to apply micro-clustering techniques to group customers into segments of users with like behavior and to generate recommendations for a customer using the purchases of his peers within the same group. This approach is less computation intense but less accurate than the former one.

Other Examples

In an embodiment, a recursive computation of association scores is performed to reduce computational complexity. In the below equation, "week" may be generalized to any arbitrary time period, depending on the embodiment.

$$TotalScore(i_k, i_m, week_l) = \alpha \times TotalScore(i_k, i_m, week_{l-1}) + (1-\alpha) \times Score(i_k, i_m, week_l)$$

4.10. Example Universal Scoring Functions

Figure 26:
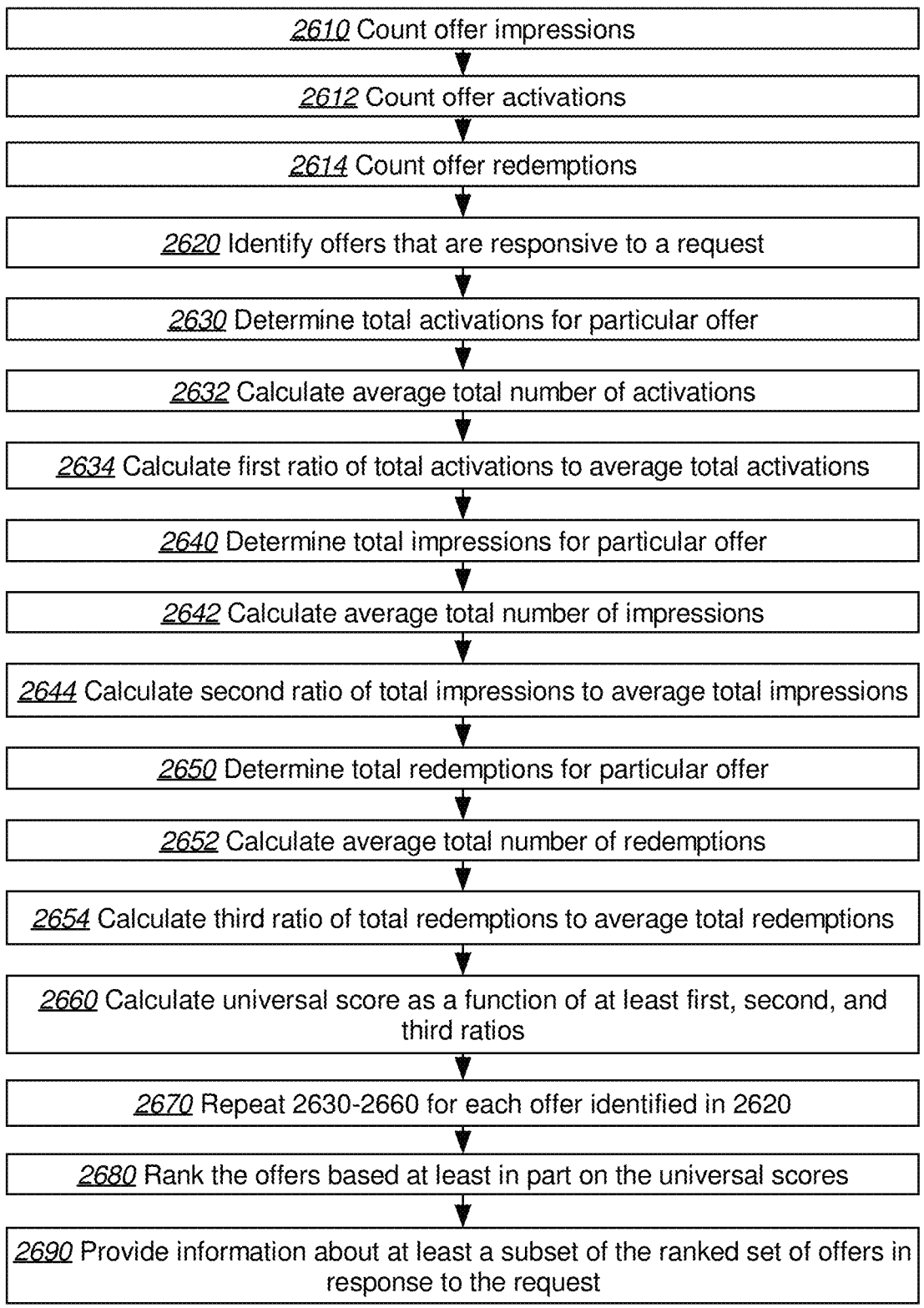
FIG. 26 depicts an example flow for calculating a universal score, in accordance with an embodiment.

FIG. 26 depicts an example flow 2600 for calculating a universal score, according to an embodiment.

Block 2610 comprises counting impressions of offers provided by an offer server. Block 2612 comprises counting activations of offers provided by an offer server. Block 2614 comprises counting redemptions of offers provided by an offer server. For example, blocks 2610-2614 may involve analyzing logs of the various offer-related activities conducted by an offer server and various transaction logs, as described in other sections. Or, blocks 2610-2614 may simply comprise maintaining running counters of impressions and activations for each offer.

Block 2620 comprises identifying a set of offers responsive to a request. The request may be any request that is responded to at least partly with one or more offers. The request may or may not include context data. The offers may be identified using any suitable search, matching, and/or filtering techniques including those described elsewhere in this application. In an embodiment, all available offers are in the set of offers.

Block 2630 comprises determining the total number of activations for a particular offer. Block 2632 comprises calculating the average total number of activations for a plurality of offers. The plurality of offers may be all offers distributed by an offer server, all offers identified in response to the request, or all offers in a category of offers indicated by the request. Block 2634 comprises calculating a first ratio of the total number of activations for the particular offer to the average total number of activations for the plurality of offers.

Block 2640 comprises determining the total number of impressions for the particular offer. Block 2642 comprises calculating the average total number of impressions for the plurality of offers. Block 2644 comprises calculating a second ratio of the total number of impressions for the offer to average total number of impressions for the plurality of offers.

Block 2650 comprises determining the total number of redemptions for the particular offer. Block 2652 comprises calculating the average total number of redemptions for the plurality of offers. Block 2654 comprises calculating a third ratio of the total number of impressions for the offer to average total number of redemptions for the plurality of offers.

Block 2660 comprises calculating the universal score for the particular offer as a function of the first ratio, second ratio, and third ratio. Various example functions are described subsequently.

Block 2670 comprises repeating blocks 2630-2660 for each offer in the set of offers.

Block 2680 comprises ranking the set of offers based at least in part on the universal scores.

Block 2690 comprises providing information about at least a subset of the ranked set of offers in response to the request, using any of the various techniques described herein. For example, the information may be embedded in a web page or receipt. Or, as another example, the information may be formatted as XML or JSON data for a coupon-viewing smartphone or browser application.

Blocks 2630-2670 may be relative to a particular consumer to whom the request is resolved, a group of consumers identified by the request or of whom such a particular consumer is a member, or all consumers that access the offer server.

Flow 2600 is but one example technique for calculating a universal score. Other techniques may comprise fewer or additional elements, in potentially varying orders. For example, the calculating of block 2660 may be based further on a burn rate which considers the start date of an offer, the end date of the offer, and the inventory of activations or redemptions remaining for that offer. As another example, in an embodiment, some or all of the first, second, and third rations are assigned weights. In an embodiment, these weights may be learned based on feedback mechanisms, such as actual revenues over a certain period for a retailer, provider, or offer distributor, as calculated from the various transaction and/or offer logs. In an embodiment, the weights may vary depending on the context of the request. For example, the weights may be different for requests from desktop applications as opposed to mobile applications. Or the weights may be different for different consumers.

It is possible that newer offers may lack meaningful data concerning activations, redemptions, and impressions. In an embodiment, any or all of the first ratio, second ratio, and third ratio for newer offers may be replaced with statistics from similar offers or with categorical averages until meaningful data is available for the newer offers.

In an embodiment, a universal scoring function is as follows:

$$UniSc = \left(w_A \times \frac{activations}{average\ Activations\ per\ Coupon} + w_B \times \frac{impressions}{average\ Impressions\ per\ Coupon} + w_C \times \frac{redemptions}{average\ Redeptions\ per\ Coupon}\right) \times$$

$$\frac{(InitialInventory - Activations)}{InitialInventory} \times \frac{(ExpiryDate - CurrentDate)}{CurrentDate - StartDate}$$

In this function, the historical performance of every offer is compared to the average offer performance in three dimensions: activations, redemptions and impressions. Each dimension is weighted differently so as to reflect its importance and match the score to strategic objectives. This weighted comparative score is weighted with the percentage of the inventory that is still unused and the offer remaining active days. This metric is relative since it compares the performance of each offer to the average offer performance. Offers with performance better that the mean performance are preferred. Offers with larger inventory and/or more active days are promoted more.

This function may be useful in contexts where it is important to carefully manage activation, impression, and redemption velocity and popularity, inventory levels (more inventory, the higher the value), and offer runaway (the more available time the more value). Potential challenges in using this function include the fact that the function does not focus on close out of existing non-performing offers, and places less explicit emphasis on pricing model.

In another embodiment, a universal scoring function is as follows:

$$UniSc_{alt} = \frac{Revenues}{(CurrentDate - StartDate) \times Impressions} \times$$

$$(EndDate - StartDate) \times (InitialInventory - NumberOfActivations)$$

This function may be useful in contexts where it is important to carefully manage activation and impression velocity and popularity, inventory levels, offer runaway, explicit revenue generated to the offer distributor for the offer, and future weighting of that value. Potential challenges in using this function include the fact that the function does not focus on close out of existing non-performing offers, does not separate manual activation and auto activation, and that handling of zero-economic-events require surrogate revenue value.

In another embodiment, a universal scoring function is as follows:

$$UniSc_{alt} = \frac{ManualActivations \times RPA}{(CurrentDate - StartDate) \times Impressions} \times$$

$$(EndDate - StartDate) \times (InitialInventory - NumberOfActivations)$$

RPA stands for the revenue per activation. This function may be useful in contexts where it is important to carefully manage impression and manual activation velocity and popularity, inventory levels, offer runaway, explicit revenue generated to the offer distributor for the offer, and future weighting of that value. Potential challenges in using this function include the fact that the function does not focus on close out of existing non-performing offers or auto activation, and that handling of zero-economic-events require surrogate revenue value.

In another embodiment, a universal scoring function is as follows:

$$UniSc_{alt} = \frac{ManualActivations \times RPA}{(CurrentDate - StartDate) \times Impressions} \times$$

$$(EndDate - StartDate) \times (InitialInventory - NumberOfActivations)$$

or $$UniSc_{alt} = \frac{ManualActivations \times RPMA + AutoActivations \times RPAA}{(CurrentDate - StartDate) \times Impressions} \times$$

$$(EndDate - StartDate) \times (InitialInventory - NumberOfActivations)$$

RPAA and RPMA stand for revenues for auto-activations and manual activations, respectively. This function may be useful in contexts where it is important to carefully manage impression, manual Activation, and/or auto activation velocity and popularity, inventory levels, offer runaway, explicit revenue generated to the offer distributor for the offer, and future weighting of that value. Potential challenges in using this function include the fact that the function does not focus on close out of existing non-performing offers, has high computational overhead, and that handling of zero-economic-events require surrogate revenue value.

In another embodiment, a universal scoring function is as follows:

$$UniSc_{alt} = \frac{TotalRevenue}{(CurrentDate - StartDate) \times \text{Impressions}} \times$$

$$(EndDate - StartDate) \times (InitialInventory - NumberOfActivations)$$

Where $$TotalRevenue = \sum_{ManualAct} RPMA_i + \sum_{AutoAct} RPAA_i + \text{Sponsorship}$$

The historical performance of every offer is assessed by considering the revenue an offer has generated over all consumers, the period that the offer is active, and the number of impressions that were incurred. These number yield an "adjusted burn rate." The adjusted burn rate is multiplied with remaining period and remaining inventory to get an estimate of the additional revenue this offer can generate. Offers that have generated high revenues are preferred. All others being equal offers that achieve high revenues in short times are preferred along with offers that perform high performance with less impressions revealing a momentum. This approach allows for complicated pricing models and accounts for offer sponsoring too. However, this approach also has a feedback issue: sponsoring an offer will increase its impressions. However, if the offer revenues will not increase, its universal score will drop again.

This function may be useful in contexts where it is important to carefully manage impression, manual Activation, and/or auto activation velocity and popularity, inventory levels, offer runaway, explicit revenue generated to the offer distributor for the offer, and future weighting of that value, while also providing a sponsorship boost capability. Potential challenges in using this function include the fact that the function does not focus on close out of existing non-performing offers, has high computational overhead, associates revenue with sponsorship, and that handling of zero-economic-events require surrogate revenue value.

In another embodiment, a universal scoring function is as follows:

$$\text{scoring}(i_k, i_m) = \left(\frac{t_{av} - t_0}{t_1 - t_0}\right)^n \times \log$$

$$\frac{TotalActiveConsumers}{ConsumersPurchased(i_k, i_m)} \sqrt{uniqueUsers(i_k, i_m) \times \sigma(i_k, i_m)}$$

This function may be useful in contexts where it is important to, among other aspects, avoid best-sellers being over-recommended.

In an embodiment, a recommendation may integrate association scores with universal scores when ranking offers. A new, financially weighted score is produced:

$$AREScore_{new} = \text{Score}(Item_i, item_j) \times UniSc_{alt}(item_j)^n,$$

with Score($item_i, item_j$) the scoring of the ($item_i, item_j$) association and $UniSc_{alt}(item_j)^n$ the Universal Score (the projected financial value) of $item_j$. The power n is used as a switch: when n=0 then the universal score is not taken into account, which with n>0 it is taken into account and the greater n becomes, the more important the contribution of universal scoring is. Having a provider sponsoring a coupon with a lump sum would result in an increase in its Universal Score since the revenue term in the numerator will increase. Subsequently this will result in the coupon being recommended more often and in higher ranks.

4.11. Example Filtering of Offers

In order to render derived recommendations more effective, more targeted and also to cater for existing limitations and business requirement, the generated recommendations may optionally be post-processed using pre-defined business rules. Examples of business rules are: promote specific items by increasing their ranking in the recommendations rule set; avoid specific items completely; target specific customers with one off promotions; constrain recommendations to avoid overlap with other concurrently running promotions; limit recommendations to certain categories, or spread recommendations to cover a more diverse range of categories.

In an embodiment, a filter checks that a shopper has not already activated an offer, which may otherwise have been recommended in a digital receipt, online gallery, and so forth based on the algorithm's scoring. The filter prevents double-dipping of the offer. In an embodiment, the offer server is configured to not offer or auto-activate offers for items that are currently out of stock. In an embodiment, the offer server is configured to not offer or auto-activate offers that have reached their activation (distribution) limit. In an embodiment, the offer server is configured to not offer or auto-activate offers that are past the offer shutoff period.

In an embodiment, non-auto-activated offers on digital receipts will be placed on hold for a certain period of time to guarantee that they are available for the targeted consumer for activation. However, if the non-auto-activated offer hold has expired on the digital receipt, then the consumer will be notified that the offer is no longer available.

One example business rule concerns a manually-targeted offer for which a provider has "purchased a spot" on the digital receipt. The recommendation engine may rank the offer above the auto-targeted offers, even if the auto-targeted offers have a better fit for the consumer. Another example business rule concerns a consumer who fits criteria for two or more manually-targeted offers. The recommendation engine may take the average or weighted average of RPI and RPR for the offers and rank the offers based on the results.

4.12. Auto-Activation Rules

In an embodiment, various rules established by the offer distributor or offer provider may allow for offers to become auto-activated. When an offer is auto-activated for the consumer, the consumer may redeem the offer without ever affirmatively requesting access to the offer. However, the consumer may still be notified that the offer has been activated for the consumer. In an embodiment, a certain number of targeted or recommended offers are automatically activated for each receipt presented to a consumer and/or each request for offer recommendations. However, since an activated offer counts as a distributed offer, offer distributors and offer providers may wish to be conservative with auto-activation rules, to avoid running out of offers too quickly and/or diluting the effectiveness of activations in general. Other example auto-activation rules are as follows.

Global rules may include rules for adjust the count of auto-activated offers on individual digital receipts (e.g. from 0 to 5), both globally and for only a subset of consumers based on predefined conditions. Consumer-specific rules may include rules for turning on or off the auto-activation capability for only a subset of consumers based on pre-defined conditions, rules to prevent auto-activations for consumers who have not looked at any requested digital receipts in a previous period of time (e.g. the past 60 days), and rules to prevent auto-activations for consumers who have had more than a certain number of offers (e.g. 20) auto-activated in a previous period of time (e.g. 30 days) without any redemptions. Offer-specific rules include rules for specifically auto-activating offers with a high propensity for redemption (i.e. offer that have an above average redemption rate), rules to over-ride a "best for consumer" ranking with a "best for redemption" ranking, and rules to only auto-active offers for products the consumer has been shown to regularly purchase.

One example auto-activation rule concerns a manually-targeted offer that fits better than any of the auto-targeted offers. The recommendation engine determines that the manually-targeted offer fits the consumer better and placed the manually-targeted offer above the auto-targeted offers. If the manually-targeted offer is within the top three, it could be auto-activated.

4.13. Events and Triggers

In an embodiment, example elements of target contexts to which offers may be targeted include some or all of: "best customers," specific demographic groups, item(s) just purchased, item(s) in a shopping list, item(s) in a purchase history, offer(s) is an offer history, revenue-per-impression based score(s), revenue-per-activation based score(s), revenue-per-redemption based scores(s), customer requests to compare items, frequency of purchase based score(s), propensity-to-buy based score(s), shopping location(s), basket value, basket breadth, specific brand(s) purchased, specific search term(s), retail occasion(s), best-fit score(s), specific web page visits, scanned item(s) using a smartphone, scanned item(s) while in a store, time and/or date, current location(s), predefined consumer profiles, and so forth.

In an embodiment, a workflow for a provider creating a target context comprises selecting a target type, such as customer, selecting a name and/or privacy level for the target, and selecting target criteria. A criteria workflow construction component lists available criteria in a number of categories, and the provider is allowed to select one or more of these criteria for the context. Subsequent to creating targets, the provider may access a list of targets, edit those targets, and review reporting analytics such as graphs and charts.

4.14. Target Treatment Groups

In an embodiment, a provider may create target treatment groups, in which different types of visuals or monetary discounts are given to a same target group. For example, the provider has the ability to select a target from a list of defined targets, such as "Frequent Frozen Pizza Buyers," "Frozen Foods—High," or "Top 50% Baby Care Customers." The provider is then given the ability to select from a list of offers to associate with the target. If the target does not include multiple treatments, then there will be a 1:1 offer to target match. If the user desires to create multiple treatments for a manual target, they can select the ability to apply treatments and enter in the treatment for each of treatment groups. A target treatment group will be created by either allocating a certain percentage or a defined number of customers. This allocation will randomly assign a customer to a treatment group based on the criteria.

Another group may be created which will represent a control group. This group will not have offers associated with it. Each target treatment group can have a unique offer associated with it. Once a target or target treatment group is associated with an offer, this can then be saved and results are saved into a database table. A provider can set a Universal Score to an offer/target association which will determine how a manual target is treated when integrated with automated targets.

The table below illustrates an example target treatment group.

|         | %  | Size    | Offer            | Score |
|---------|----|---------|------------------|-------|
| Group A | 33 | 165,000 | $1.50 off Product | 98    |
| Group B | 33 | 165,000 | $2.00 off Product | 98    |
| Group 3 | 33 | 165,000 | Control          | 98    |

4.15. Customer Value

In an embodiment, a customer value score may be used for a variety of purposes, including, without limitation, ranking customers, creating customer segments for reporting and offer targeting, and/or dynamically adjusting the price of an item or amount of an offer based on user credentials. For example, a store may use the customer value score to identify a group of high value customers to whom to target an offer. As another example, in an embodiment, an offer amount is a function of the customer value score of the customer who activates it.

In an embodiment, the score comprises a sales component, activation component, frequency component, recency component, and/or average categories shopped component. The score is a function of a numerator based on the individual user and denominator is based on the average of all users. In other embodiments, the CVI calculation may be modified to take the following into consideration other factors such as redemptions, impressions, dollar amount per basket, and number of offers per basket.

In an embodiment, each component is weighted. For example, the sales component may be weighted at 25%, the activation component at 35%, the frequency component at 15%, the recency component at 15%, and the average categories shopped component at 10%.

In an embodiment, the customer value score is comprised on multiple performance measures that are weighted to a single performance metric. The result is a weighted sales dollar value that incorporates all performance measures. Weightings of the measures can be adjusted to reflect the values of the retailer.

In an embodiment, a customer value score is calculated for each customer over a twelve month period. All components are calculated over the entire time period available in the database (up to a full 12 month period) except for Recency, which is calculated over a smaller time period, last 4 weeks.

Example calculations for the various components may be as follows:

$$\text{Sales} = \text{Sales Weight} \times \$ \text{ Sales}$$

$$\text{Activitations} = \text{Activations Weight} \times \frac{\text{Number of Activations}}{Avg \text{ Number of Activations for all Shoppers}} \times \$ \text{ Sales}$$

$$\text{Frequency} = \text{Frequency Weight} \times \frac{\text{Basket Count}}{Avg \text{ Basket Count for all Shoppers}} \times \$ \text{ Sales}$$

$$\text{Recency} = \text{Recency Weight} \times \frac{\text{Basket Count(last 4 weeks)}}{Avg \text{ Basket Count(last 4 weeks) for all Shoppers}} \times \$ \text{ Sales}$$

-continued $$\text{Average Categories Shopped} = Avg \text{ Categories Shopped Weight} \times \frac{Avg \text{ Categories Shopped}}{Avg \text{ Categories Shopped across all Shoppers}} \times \$ \text{ Sales}$$

For reports that require metrics to be defined as indexes, a customer value index may be used.

$$\frac{CV}{Avg\ CV\ \text{for all Customers}}$$

In an embodiment, the customer value is updated periodically, such as weekly. In an embodiment, customers are sorted by value into groups, such as deciles, by which they may be referenced in other contexts described herein, such as targeting or reporting.

4.16. Example Recommendation API

An example API for interfacing with a recommendation engine, according to an embodiment, exposes recommendation methods using the SOAP protocol. Other protocols may be used for other APIs, including without limitation JSON, XML, and so forth.

An example API call is getRecommendations(String accountName, String customerKey, Item[ ] items, RecommendationContext context), which returns Item[ ] recommendationItems. This call returns recommendations generated for a customer for the specified recommendation context. For unknown customers, the customerKey should be set to " ". If the customer is not known, or if the recommendation engine has yet to generate recommendations for a newly registered user, the service will still make a best attempt at providing a recommendation, for example by providing non-personalized recommendations. items should be a list of products or services relevant to the RecommendationContext specified by context. Similarly, when an unknown item is provided in the list of items, that item is silently ignored.

In an example environment, the accountName is synonymous with the Partner.partnerId, while the customerKey is synonymous with the User.userId, the unique identifying key of a customer completing the transaction. The number of items returned may be dependent on the context as they reflect different recommendation algorithms on the backend. The recommendation context is a hash or record that specifies various attributes that represent the recommendation context. A recommendation context may include a string or other identifier specifying the context. Some examples of recommendation contexts are: digital receipts, digital receipt histories, various sections of online webpages, footers at the bottom of customer emails, shopping cart checkout pages, shopping lists, kiosks, SMS messages, coupon gallery, item detail page, and so forth. The context indicates the meaning of the Items array (e.g. a shopping list, a currently viewed item, an item history, etc.). Other attributes may include, without limitation, a number of recommendations expected for the context, a number of offers to auto-activate, geolocation, time zone, screen size, ip address, store id, checkout counter, and so forth.

Another example of a suitable API call is an explainRecommendations call, which is similar to getRecommendations except an explanation of reason(s) why the recommendations were made is also provided.

4.17. Example Identification of Consumers

In an embodiment, at a retailer where loyalty system is in place, a consumer is identified using a loyalty card identifier. A new user record will be created if the loyalty card identifier is not found in the existing database. Any provided mobile number or email for a digital receipt may be tied to the loyalty card identifier in the database. A credit/debit card hashed value may be tied to the loyalty card identifier if a credit/debit card is used. In an embodiment, at a retailer without a loyalty system, a consumer is identified through a PAN, phone number, or email address. Other retailers may have other identification mechanisms.

A new consumer record is created if a user requests a digital receipt without using, for example, a loyalty card identifier or account number. The record is created using a combination of an email or mobile number with a PAN, if used. In an embodiment, the consumer specifically opts-in to the digital receipt system before a new consumer record is created. If the consumer has not opted-in, or does not provide identifiers such as listed above, the transaction log may be discarded, or at least ignored for algorithms and analytics that would require resolution of the consumer entity.

Consumer Resolution Interface

An offer distributor or other entity may provide a consumer-resolution service to assist in the identification of a consumer at a retailer system for digital receipt and other purposes. The retailer can use these services to also identify a consumer in the absence of a loyalty program. The search for a consumer is a real-time request against a consumer resolution server process that communicates with a consumer data store. There may be multiple options for accessing the consumer resolution service. The service may be externally hosted by the offer distributor, or hosted at the retailer's data center based on cached consumer data, or directly integrated into the retailer's CRM system.

For example, a standalone instance of the consumer resolution service can be deployed into the retailer's data center through a local service to be directly accessed by the store. This Local service is automatically synchronized with the central consumer data store. This approach can be used when changes to the retailer's CRM solution are not possible, or security or operational polices prefer internally hosted systems.

As another example, a retailer system can access a consumer resolution services API hosted by the offer distribution system, directly in real time. With this option there is only one source of consumer data. Thus data synchronization is not necessary.

As another example, integration of consumer preferences and other consumer data directly into the retailer's existing CRM solution allows for reuse of existing interfaces. However it requires customization of the retailer CRM for storage and modification of interfaces. A batch process would be responsible for the synchronization of consumer preferences between the retailer CRM against the consumer data store. A limitation of this approach is possibility of inconsistent information for short periods of time while synchronization is in progress. When such customization to the retailer's CRM solution is not possible or practical, the retailer may choose to call externally to the offer distributor's hosted consumer resolution service, or deploy an instance within their data center.

4.18. Example Consumer Record Correlation Rules

In an embodiment, master records are generating during the initial loading and/or batch updates of customer records from retailers and/or other partners based on the following correlation rules, which are processed in sequential steps. Each sequential step is performed only for records that the previous step fails to match.

First, if records contain the same email address, and the email has not been blacklisted, the records are correlated together as one master customer record. Second, if records contain the same mobile or other phone number, and the same last name, the records are correlated together as one master customer record. Third, if records contain the same first name, last name, and PAN, the records are correlated. Fourth, if records contain the same loyalty number for a same retailer, the records are correlated. Fifth, if records match on a phone number and a hashed credit/debit card value, the records are correlated.

In all of the above, one of the sources of the matched records should be a source that has been designated as a "primary" or highly trustworthy source. Also, when merging records to form a master record, contradicting field values are both stored in the database, and a "primary" flag is set for the fields based on a source hierarchy established based on trustworthiness.

Example default trust scores for establishing a source hierarchy with respect to the fields of the sources are illustrated in the following table. Each column represents a different source of customer records, such as periodically uploaded retailer customer records from a loyalty program, raw customer records built from unique combinations of credentials in transaction data, and so forth. A lower score is better.

|  | Credit Card Data | Digital Receipt Transaction Data | Distributor Registration Data | Retailer Loyalty Card Data | Third Party Data |
|---|---|---|---|---|---|
| First Name | 1 | N/A | 2 | 3 | 4 |
| Last Name | 1 | N/A | 2 | 3 | 4 |
| Email | 2 | 1 | 3 | 4 | 5 |
| Mobile Number | 2 | 1 | 3 | 4 | 5 |
| Billing Address | 1 | N/A | 2 | 3 | 4 |
| Mailing Address | 2 | N/A | 1 | 3 | 4 |
| Birth date | 1 | N/A | 2 | 3 | 4 |
| PAN | 1 | 2 | N/A | N/A | 3 |
| Loyalty Number | N/A | 2 | 1 | 2 | N/A |

Similar rules may be used for correlating transactions both to each other and to existing customer records, since transactions also include the fields listed above. In an embodiment, the above rules constitute but a first phase of correlation. Additional phases may rely on other correlation rules or mechanisms.

4.19. Example Reports

In an embodiment, a provider may access the following example reports.

| | |
|---|---|
| Distributor Metrics | Key performance metrics for coupons, revenue, customers and redemptions |
| Retailer Metrics | Retailer specific key performance metrics specific for coupons, revenue, and customers |
| CPG/Client Metrics | Shows CPG/Client specific key performance metrics specific for coupons, revenue, and customers |
| Customer Metrics | Shows Customer key performance metrics |
| Marketing Effectiveness (Promotion Types) | Shows Client coupon statistics, inventory and redemptions Compares the effectiveness of promotion types (advertisements, offers). |
| Coupon Performance | Interactive dashboard on coupon performance, as well as understanding what is driving these results for the various activation method by category, channel, provider (CPG), and retailer |
| Retailer Coupon Performance | Similar interactive dashboard, specific to retailers |
| CPG/Client Coupon Performance | Similar interactive dashboard, specific to providers |
| Customers | Interactive dashboard on customers that facilitates an understanding of the customer behavior for specific offers, categories, retailers, and so forth. |
| Customer Targeting | Interactive dashboard on customer targeting for identifying and targeting a specific group of customers for an offer. This targeting process can also be enhanced by applying a specific strategy to the targeting approach. |
| Sales Targeting | Interactive Dashboard on Sales Targeting |
| Cross Purchase - Retailer | Interactive Dashboard on cross purchase between items to view offer impact |
| Cross Purchase - CPG | Interactive Dashboard on cross purchase among retailers to view offer impact |
| Forecasting | Interactive Dashboard on Forecasting |
| Customer Decile Bubble Chart | Compares performance of customers in 10 equal segments by three selected metrics. |
| Customer Decile by Category | Shows performance of customers by category in 10 equal segments by customer value for selected time. |
| Customer Decile Performance | Shows performance of customers in 10 equal segments by customer value index over time. |
| Customer Purchase Index | Shows comparison to average (index) of product performance for selected customer(s) to all customers. (Interactive: can select departments and change metrics) |
| Customer Segment Bubble Chart | Compares performance of customers in selected segments by three selected metrics. |

-continued

| | |
|---|---|
| Customer Segment Comparison | Compares customers segments for selected metrics. |
| New vs. Repeat Customers by Product | Identifies new and repeat customers count for selected product, location and time. |
| Customer Attributes | Compares attributes of customers for selected product with all products, for selected location and time. |
| Customer Overview | Shows an overview of demographic and performance for a selected customer segment. (may limit by location for retailers and limit for category for clients) |
| Attribute Profile Analysis | Show prevalence of unique attributes by SKU for selected product. (may limit by location for retailers and limit for category for clients) |
| Cumulative Product Performance Curves | Shows cumulative product performance for selected product, time, location, and metric. (may limit by location for retailers and limit for category for clients) |
| Customer Importance, by Product | Shows importance of products to customers (loyalty, exclusivity, repeat, purchase prevalence) and volume metrics for selected product group, customer, location and time. |
| Promotion Performance by Product | Shows product performance for a selected promotion and selected customer(s). (Interactive: can select categories and change metrics) (may limit by location for retailers and limit for category for clients) |
| Promotion Performance by Segment | Shows pre, during, and post period product performance for a selected promotion and customer(s). (Interactive: can select categories and change metrics) |
| Customer Lists | Measures the number of identifiable customers by state |
| Promotion Percentage Analysis | Breaks down customer count into 5 groups (0-20%, 20-40%, 40-60%, 60-80%, 80-100%) based on percentage of promotional spend, for selected customer, product, location and time. |
| Cross Product Attachment Analysis | Shows the pre-, during and post-event customer count and attachment index for customers who bought from two product groups (primary and comparison), for selected customer, product, location and time. |
| Marketing Impact, by Customer | Compares product performance by customer segment before, during, and after a selected promotional period, for selected customer, product, location and time |
| Marketing Impact, by Customer Segment, by Offer | Compares sales volume for selected customer segments for offers during selected customer, product, location and time. |
| Marketing Response Index, by Customer | Compares the relative (index) performance of marketing events by customer segment. |
| Basket Quantity | Shows the number of baskets purchased (1, 2, 3-5, 6-9, 10+) for selected customer, product, location, and time. (may limit by location for retailers and limit for category for clients) |
| Basket Size, Sales and Price, by Product | Shows basket, total sales and average price impacts by product subcategory, for a selected event, customer, product and location. (limit by location for retailers and limit for category for clients) |
| Sales, Price and Customer Penetration, by Week | Shows regular and promotional unit count, average price, sales per customer and average penetration by week for selected product, customer, location and time. |
| Top 10 Cherry Picked, Basket Building | Shows top 10 items from a selected marketing event that are being bought only on promotion (cherry picked) or that are driving basket size (basket building) for selected event. |
| Basket Metrics, for Two Periods | Compares basket metrics, for two time periods, for selected customer, product and location. |
| SKU Exception Chart | Shows selected comparative metrics by SKU. |
| Basket Analysis, Attachment Rank Order | Shows the relative importance of products groups (comparison) to a selected product group (primary) based on rank order of cross-product attachment index. This includes customer count, units, and sales. |
| Basket Analysis, Customer Count Rank Order | Shows the relative importance of products groups (comparison) to a selected product group (primary) based on rank order of cross-product customer count. Includes attachment index, units, and sales. |
| Cross Product Lift Analysis | Shows the pre-, during and post-event customer count and sales for customers who bought from two product groups (primary and comparison) for selected customer, product, location and time. |
| Customer and Basket Scorecard, by Customer Segment and Product | Shows sales volume, gross margin, unit count, basket count, and customer count for selected product group, customer, location and time. |
| Customer and Basket Volume, by Product | Shows sales volume, customer count, basket count, basket size index, and basket promotion index for selected product group, customer, location and time. |
| Product Purchase Overlap, 2 Groups | Displays counts of customers that purchased any combination of products for two selected product groups, for a selected time. |
| Performance Index Chart | Shows comparison to average (index) of product categories for |

| | |
|---|---|
| Customer Segments | selected customer segments. (Interactive: can select categories) |
| Performance Index Chart | Shows comparison to average (index) of product categories for |
| Store Segments | selected store segments. (Interactive: can select categories) |
| Price and Volume Analysis, by Week | Shows the average price, volume and % of category sales, by week for selected product, customer, location and time. |
| Customer Marketability | Measures the number of identifiable customers who are mailable, e-mailable, or phoneable. |
| Marketing Effectiveness (Campaigns) | Shows customer and basket metrics and lifts for a selected campaign, and selected customer, product, location and time. |
| Unit Quantity | Shows the number of unit purchased (1, 2, 3, 5, 6, 9, 10+) for selected customer, product, location, and time. |
| Basket Metrics (Promotion vs. Non), by Week | Compares the product's performance by shopper segment before, during, and after a promotional period. |
| Basket Metrics by Day and Time | Compares basket metrics, by day and time of week, for selected customers, product, location, and time vs. totals. |
| Marketing Performance, over Time | Shows comparison of the performance of marketing events by time period. |
| Unit Quantity and Price, by Week | Shows the number of unit purchased (1, 2, 3, 4, 5+), customer count and average price by week for selected customers, products, locations and time. |
| Marketing Basket Metrics, by Decile | Compares total and promotional basket metrics for 10 same size segments. |
| Marketing Performance | Shows comparison of the performance of marketing events on three selected metrics. |
| Marketing Performance, by Event | Shows comparison of the performance of marketing events. |
| Store Volume by Week | Shows basket count and sales, this year and last year, by week for selected customer, location and time. |

4.20. Distributing Promotional Information with Receipts

In an embodiment, various techniques described herein may be used to distribute information about promotional offers in addition to or instead of offer information. For example, a digital receipt may include or link to promotional videos, images, or other media. The promotions offered may be targeted based on any of the factors described herein, or selected at random. A data repository of promotional offers may be maintained and utilized in a manner similar to that described of the data repository of offers. Promotional offers may or may not be mapped to specific item identifiers.

According to one embodiment, input is received specifying one or more items for purchase by a consumer. Based on the input, a transaction is completed in which the one or more items are purchased. An interface configured to accept input indicating a consumer identifier associated with the transaction is provided. When input indicating a consumer identifier has been received via the interface in association with the transaction, it is determined whether the consumer identifier is associated with any electronic address of the consumer. When the consumer identifier has been received and the consumer identifier is associated with an electronic address, promotional information is provided via the electronic address. In an embodiment, some or all of these elements are performed by a retail terminal at a physical store, with possible assistance from a retailer-based server. In an embodiment, servers operated by other entities, including a promotion distributor, may assist in the determining and providing.

In an embodiment, when the consumer identifier has been received and the consumer identifier is associated with the electronic address, an electronic receipt for the transaction is provided to the consumer via the electronic address instead a printed receipt. The electronic receipt includes the promotional information. When no consumer identifier has been received, or when a received consumer identifier is not associated with any electronic address, a printed receipt is provided for the transaction.

In an embodiment, provision of the promotional information comprises sending an email to the consumer with a link to a web site at which information for one or more promotional offers may be obtained. In an embodiment, the promotional information includes data describing one or more promotional offers and one or more links by which the consumer may use or find further information about the one or more promotions.

In an embodiment, provision of the promotional information comprises a retailer sending transaction information and an account identifier associated with the consumer identifier to a promotion distributor, and the promotion distributor providing the promotional information via the electronic address. In an embodiment, provision of the promotional information comprises the retailer sending account identifying information associated with the consumer identifier to a promotion distributor. In response to sending the account identifying information, the retailer receives the promotional information from the promotion provider. The retailer then provides the promotional information with an electronic receipt via the electronic address. In an embodiment, providing the promotional information with the electronic receipt comprises sending the promotional information with the electronic receipt to a mobile device operated by the consumer.

In an embodiment, a coordinating computer is queried to determine whether the consumer identifier is associated with a known consumer identity. The determining of whether the consumer identifier is associated with a known consumer identity implicitly determines whether the consumer identifier is associated with any electronic address of the consumer.

In an embodiment, transaction information is received for a transaction between a retailer and a consumer, the transaction information including account identifying information. An account associated with the account identifying information is identified. An electronic receipt is generated based on the transaction information. The electronic receipt is provided with promotional information via an electronic address associated with the account. In an embodiment, the promotional information and electronic receipt are provided by a retail server, with possible assistance from a promotions server in identifying the one or more promotional offers. In an embodiment, the promotional information and electronic receipt are provided by a promotions distributor or other entity that is separate from the retailer.

In an embodiment, providing the electronic receipt with the promotional information via the electronic address comprises: sending an email to the electronic address, the email including a link configured to send a login request to a server; receiving, at the server, the login request from a client; receiving, at the server, in association with the login request, credentials corresponding to the account; and in response to the server receiving the login request and the credentials, sending the electronic receipt and promotional information to the client.

In an embodiment, the electronic address is one of an email address, a phone number, a social networking address, or a uniform resource locator. In an embodiment, selection of the one or more promotional offers is based on factors that do not target the behavior of the consumer. In an embodiment, selection of the one or more promotional offers is based upon one or more of: the one or more items involved in the transaction, transaction information, consumer preferences, retailer preferences, consumer purchase history, or consumer promotion redemption history. In an embodiment, upon selecting the one or more promotional offers, one or more digital coupons for the one or more promotional offers are automatically saved to the consumer's account. In an embodiment, the consumer identifier is one of a consumer loyalty card number, credit card number, radio-frequency identifier ("RFID"), hardware address, or phone number.

In an embodiment, the method is performed by an entity other than the retailer. Second transaction information is received for a second transaction between a second retailer and the consumer, the second transaction information including second account identifying information. The account is identified as being associated with the second account identifying information. Second promotional information is provided via the electronic address associated with the account. The second promotional information may be the same as, or different from, the original promotional information. In an embodiment, the second promotional information is provided with a second and different electronic receipt generated based on the second transaction information.

4.21. Providing Offers at ATMs and Other Devices

In an embodiment, an offer provider or distributor may contract with an ATM owner or provider to provide offers at the ATM. The ATM is connected to an offer server. While interacting with a consumer, the ATM transmits information about the consumer, including one or more of debit card data, biometric data, a phone number, email address, or device identifier for a smartphone. The consumer information provided by the ATM may be collected explicitly from consumer input, derived from consumer input based on bank records, or collected without the consumer's explicit input from various sensors. Based thereon, and based further on information such as the location of the ATM and the time of day, the offer server resolves the consumer to a consumer entity that is most likely to be the consumer.

The offer server may then perform one of several acts. The offer server may, for example, automatically activate an offer for the resolved consumer entity. The offer server may also or instead send offer data to the ATM, which the ATM then displays within the main ATM interface, or in a separate window or screen. The ATM may optionally wait to display the offer data during a time when it is processing the transaction, particularly if the offer data is displayed within the main ATM interface.

If the offer server is not configured to automatically activate the offer, the ATM may optionally display an interface asking the consumer to indicate whether the consumer would like to receive a coupon for the offer. The interface may be configured to wait for consumer input. In some embodiments, the consumer's failure to respond during a certain time may be taken as an indication that the consumer is interested in an offer. In other embodiments, the consumer's failure to respond during a certain time may be taken as an indication that the consumer is not interested in an offer. In an embodiment, the timeout period expires at a time relative to when the ATM finishes processing the transaction.

In an embodiment, if the consumer indicates that the consumer is interested in receiving a coupon for the offer, the ATM may either print a coupon for the consumer. The coupon may or may not be on a receipt for the transaction. Alternatively, the ATM may instruct the offer server to generate a digital coupon for the resolved consumer entity. In yet another embodiment, the coupon is printed automatically for the consumer, without asking the consumer if the consumer wishes to receive a coupon. In other embodiments, a link to a coupon provision mechanism for the offer may be emailed to the consumer, texted to the consumer, posted on a social network, or included in a bank statement in association with the transaction.

In an embodiment, similar techniques may be applied to a variety of other devices, including in-store kiosks, gas pumps, public interactive displays, airport boarding pass kiosks, ticket booths, prescription printers (e.g. to provide coupons for local pharmacies), and so forth.

4.22. Retailer Data Upload

In an embodiment, retailers and other partners periodically send non critical bulk data through a bulk data exchange interface. Data exchange is provided through FTP and/or web services interfaces. The data submitted is decompressed (if necessary), processed, and loaded into the transaction aggregation system and/or the offer distribution system. For example, partners may upload the following data to a bulk data module: product data such as mappings of SKU codes to UPCs and product hierarchies, consumer data such as retailer-specific consumer-records, sale transactions, offer redemption data, offer partner data, transaction type data enumerating possible transaction type codes, store data describing each of the retailer's stores, tender data enumerating the possible types of tender accepted at each store's point-of-sales, and terminal data enumerating and defining receipt-processing policies for the retailers' possible terminals including physical terminals such as self-checkout terminals or fuel-pumps and virtual terminals such as online store fronts. In an embodiment, transaction data for transactions requiring digital receipts are sent in real-time or near real-time to the transaction aggregation server, while transaction data for all other transactions is batched for bulk data exchange.

4.23. Example Use of Coordinating Computer

Figure 6:
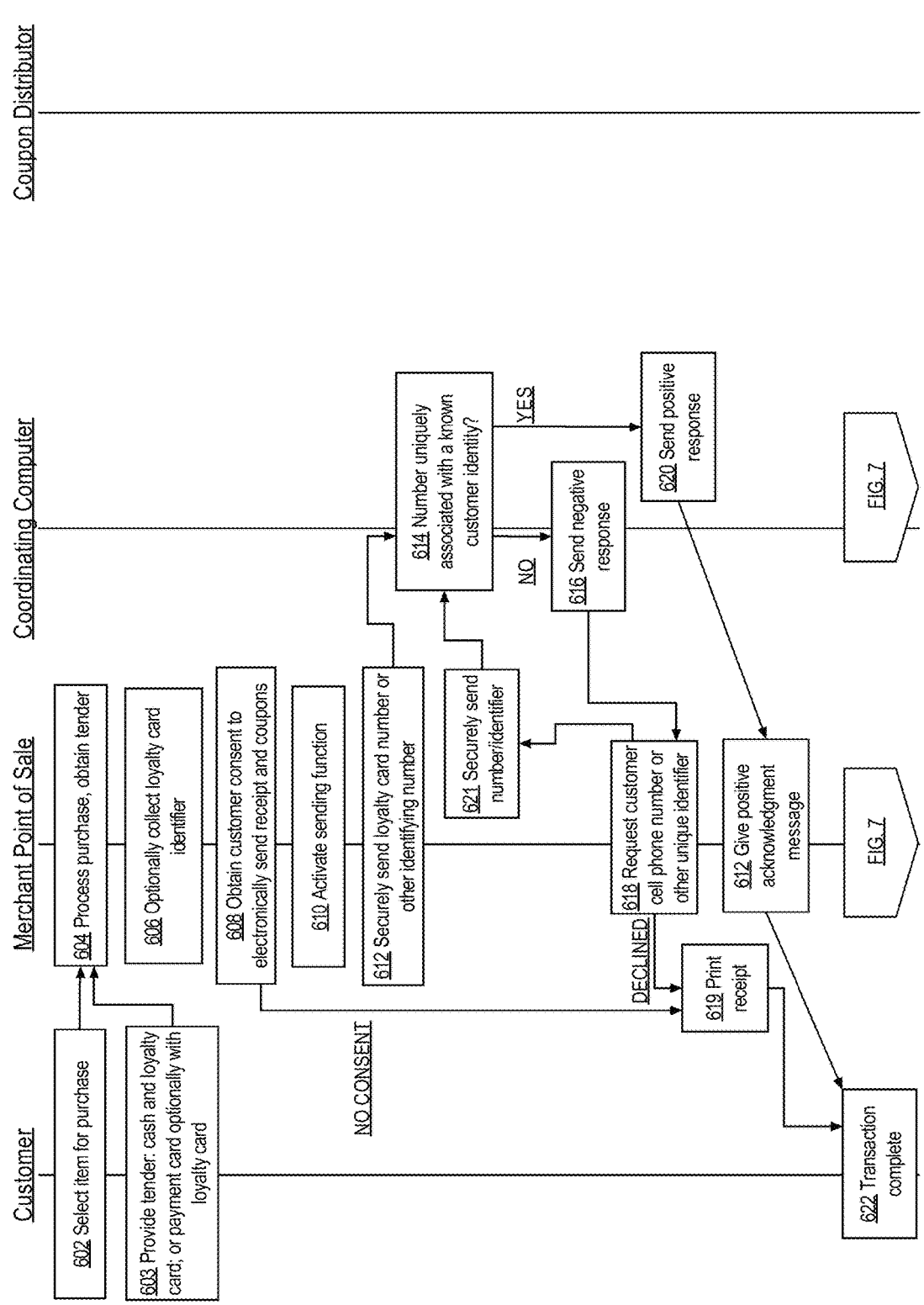
FIG. 6 and FIG. 7 illustrate flows for providing an electronic receipt with offer information, in accordance with embodiments.
Figure 7:
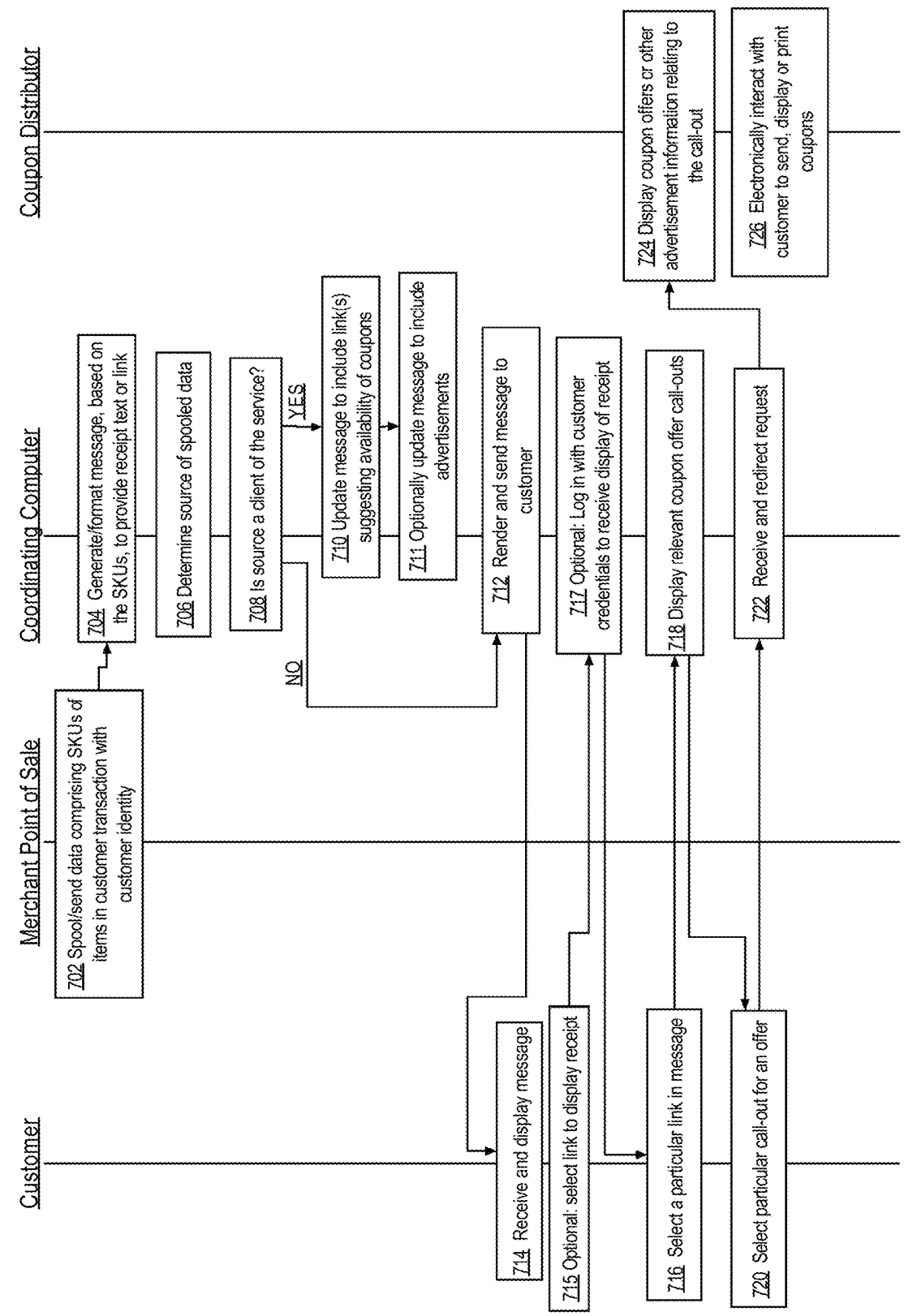

FIG. 6 and FIG. 7 illustrate flows 600 and 700 for providing an electronic receipt with offer information, according to an embodiment. Flows 600 and 700 are performed by a number of different components of a system, including a consumer, merchant point of sale, coordinating computer, and offer server. The consumer may correspond to, for example, consumer 535. The merchant point of sale may correspond to, for example, terminal 542. Depending upon the embodiment, the coordinating computer may correspond to retail server 540 and/or offer server 510. The coordinating computer may also or instead correspond to a server operated by yet another party for distribution of electronic receipts on behalf of one or more retailers. The offer server may correspond, for example, to offer server 510 or to retail server 540 operating in conjunction with offer server 510.

Flow 600 begins with block 602, at which the consumer selects one or more items for purchase. At block 603, the consumer provides tender for the purchase, which may include, for example, cash or credit card(s). The consumer also optionally provides a loyalty card. At block 604, the merchant point-of-sale processes the purchase and obtains the tender provided in block 603.

At block 606, the merchant point-of-sale optionally collects an identifier for the loyalty card, if provided. The merchant point-of-sale may do so by, for instance, reading a magnetic strip or RFID tag embedded in the card. At block 608, the merchant point-of-sale obtains consumer consent to deliver the consumer's receipt and offers electronically. If no consent is given, then at block 619 a receipt is printed. Otherwise, at block 610 the merchant point-of-sale activates a sending function.

At block 612, the sending function commences with the merchant point-of-sale securely sending a loyalty card number or other identifying number to the coordinating computer. At block 614, the coordinating computer determines whether the number is uniquely associated with a known consumer identity. If so, then at block 620 a positive response is returned to the merchant point-of-sale. Otherwise, at block 616, the coordinating computer returns a negative response to the merchant point-of-sale.

Upon receiving a negative response per block 616, the merchant point-of-sale may optionally request the consumer's cell phone or another identifier, at block 618. If, at block 618, the consumer declines to provide a cell phone number or other identifier, flow proceeds to block 619, where the merchant point-of-sale prints a receipt. However, if the consumer provides a number or identifier, then at block 621 the merchant point-of-sale may then securely send the number or identifier to the coordinating computer. The coordinating computer may then repeat block 614 with the new number or identifier.

Upon receiving the positive response of block 620, then at block 612 the merchant point-of-sale generates a positive acknowledgment message, such as a message displayed on a screen of the checkout terminal. Once block 619 or 612 is completed, then at block 622 the transaction is considered to be complete. In an embodiment, the transaction is considered complete even if block 619 is not performed (i.e. even if a receipt is not printed), as long as the coordinating computer located a known consumer identity in block 614.

Flow 700 is performed upon occurrence of blocks 620/612. Flow 700 begins with block 702, at which the merchant point-of-sale spools data comprising SKUs or other identifiers of items purchased in the consumer transaction and sends the data along with the consumer identity (or session data that may be used to tie the spooled data to the previously determined consumer identity) to the coordinating computer. At block 704, the coordinating computer generates and formats a message, based on the SKUs. The message provides receipt data to the consumer and/or a link to a URL that may be used to obtain receipt data.

Blocks 706-708 may optionally be performed in embodiments where the coordinating computer provides receipt data to multiple retailers, including retailers that are not subscribed to offer information services. At block 706, the coordinating computer determines the source of the spooled data. At block 708, the coordinating computer determines whether the source point-of-sale is subscribed to offer information services. If not, flow proceeds to block 712. Otherwise, flow proceeds to block 710.

At block 710, the coordinating computer updates the message to include link(s) or other data suggesting the availability of offers. In this particular embodiment, the link(s) simply provide the consumer with knowledge of the existence of a website on the coordinating computer at which the consumer may obtain offers. At block 711, the coordinating computer optionally updates the message to include advertisements. Advertisements may be identified based on the merchant, consumer, or items purchased using any suitable techniques.

At block 712, the coordinating computer renders and sends the message to the consumer at an electronic address associated with the consumer's identity. At block 714, the consumer receives the message and views it. If the receipt data is not embedded directly in the message, then the consumer may optionally at block 715 click on a link in the message to display the receipt data. In response, at block 717 the coordinating computer optionally interacts with the consumer to obtain consumer credentials, and then displays the receipt data upon the consumer providing the credentials.

At block 716, the consumer selects a particular link in the message or receipt data. In response, at block 718 the coordinating computer displays information about relevant offer(s) associated with the link, including call-out(s) for selecting the relevant offer(s). In response to this display, the consumer selects a particular call-out. In response, at block 722 the coordinating computer receives and redirects the selection to the website of the offer distributor. At block 724, the offer distributor displays offer(s) or other advertisement information related to the call-out. At block 726, the offer distributor electronically interacts with the consumer to send, display, save, and/or print coupon(s) for the relevant offer(s).

Flows 600 and 700 illustrate a specific example implementation of the techniques already described herein. Other embodiments may include additional or fewer steps performed by potentially different entities in potentially different orders.

4.24. Example Use of Consumer Identifier for Both Redemption and Distribution of Offers In an embodiment, offer information is provided electronically in association with receipts for transactions at physical stores and/or online stores. A retailer causes performance of a transaction in which one or more items are purchased. An interface configured to accept input indicating a consumer identifier associated with the transaction, such as an email address or other consumer identifier as described in previous sections, is provided. When input has been received via the interface, it is determined whether the identifier is associated with a known consumer identity. If the consumer identifier is associated with a known identity, digital coupons associated with that identity are applied against the transaction. An electronic receipt is further provided for the transaction via, for instance, the provided email address or a web-based application in which a session has been established in connection with the identity. Otherwise, a printed receipt may be provided.

Figure 10:
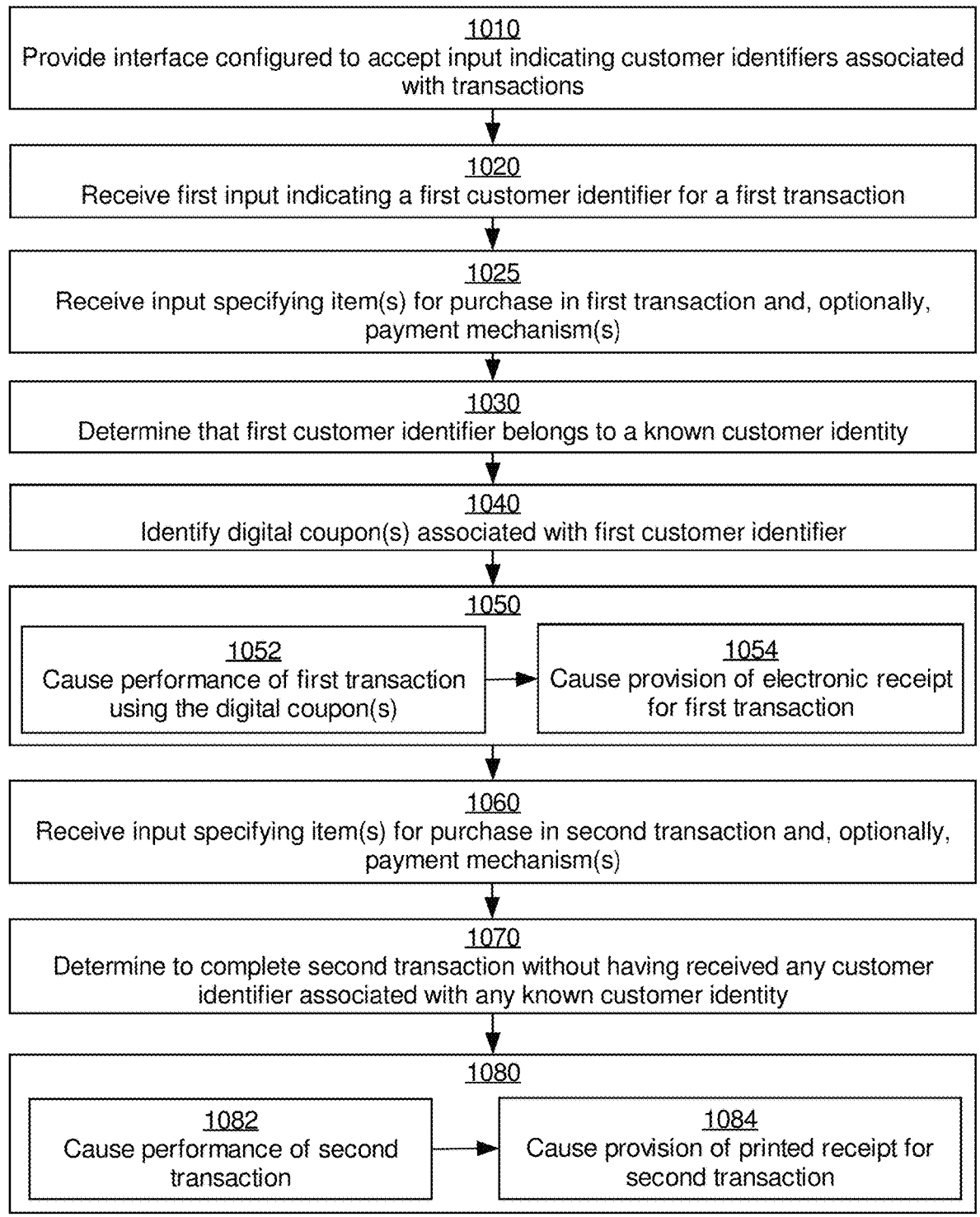
FIG. 10 illustrates a retailer-centric flow for using a single consumer identifier to locate digital offers for redemption in a transaction, and to identify an electronic address at which to provide a digital receipt, in accordance with an embodiment.

FIG. 10 illustrates a retailer-centric flow 1000 for using a single consumer identifier to locate digital coupons for redemption in a transaction, and to identify an electronic address at which to provide a digital receipt, according to an embodiment.

Block 1010 comprises providing an interface configured to accept input indicating consumer identifiers associated with transactions. The interface may be provided, for example, in the same manner as the interface of block 330. As with the interface of block 330, the interface need not be furnished by the retailer, as long as the interface is made available for use in transactions with the retailer's consumers.

Block 1020 comprises receiving first input via the interface indicating a first consumer identifier associated with a first transaction. In the context of this disclosure, "first" is merely a label for purposes of clarity to distinguish one thing from another, and is not intended to imply something that is first in order or first to occur. In an embodiment, the first input specifies an email address or other suitable consumer identifier. For example, prior to the completion of the first transaction, a sales clerk may prompt the first consumer to input an email address via a keypad interface, or the sales clerk may input the email address as the consumer provides the address orally. As another example, the email address may be transferred electronically via a wireless signal, such as in contact information embedded in a NFC transmission. As another example, the email address may be determined at the point of sale by analyzing images or sounds recorded by a sensor. For example, the first consumer may present a card or mobile device display screen showing a QR code, bar code, other symbolic representation, or textual representation of the email address and an image of the code or representation may be captured by a scanning interface. Or, the consumer may generate an audio signal that may be captured by a microphone interface. The terminal or an interface component may then analyze the captured information through various techniques, such as pattern recognition, signal processing, and/or optical character recognition, to decode and/or recognize the email address. Other types of consumer identifiers and interfaces may also be utilized, as described elsewhere in this disclosure.

Block 1025 comprises receiving input specifying a first set of one or more items for purchase in the first transaction and, optionally, one or more payment mechanisms. The input may be received in the same manner as the input of block 310. Block 1025 may occur at any time relative to block 1020.

At block 1030, at least partially responsive to receiving the first input via the interface, the flow determines whether the first consumer identifier is associated with a known consumer identity. For example, upon receiving the first consumer identifier, the terminal may query another computer such as a retail server or offer server using the first consumer identifier. The computer may respond with an indication that the first consumer identifier corresponds to a known consumer identity. As another example, the retail server may query another computer using the first consumer identifier.

In either case, the query may take a number of forms. For example, the query may simply request that the other computer respond with a positive or negative indication. Or, the query may request that the other computer respond with an account identifier for the known consumer identity. In an embodiment, the query requests information such as a list of digital coupons or payment mechanisms corresponding to the first consumer identifier. The other computer may be configured to respond with the requested information if the first consumer identifier corresponds to the known consumer identity, and to otherwise respond with an indication that the first consumer identifier does not correspond to any known consumer identity. In an embodiment, the terminal or retail server may itself comprise a database or cache of consumer identifiers and known consumer identities, which may then be searched using the first consumer identifier.

Block 1040 comprises identifying digital coupons, including a first set of one or more digital coupons, associated with the first consumer identifier. In an embodiment, the first set of one or more digital coupons are digital coupons that were generated in response to the consumer previously selecting offers to save to an account that is mapped to the first consumer identifier. However, in other embodiments, the first set of one or more digital coupons is a set of digital coupons that has become associated with the first consumer identifier by other mechanisms, such as digital coupons that were generated automatically for the consumer in response to previous transactions or retailer-initiated events. The availability of digital coupons for the first consumer may be identified by analyzing coupon availability data mapped to the first consumer identifier or an account associated with the first consumer identifier. For example, a terminal may query an offer server or retail server for a list of digital coupons that have been saved to an account associated with the first consumer identifier. Various techniques for identifying digital coupons associated with an account are described elsewhere in this disclosure, as well as in U.S. application Ser. No. 12/878,231, already incorporated by reference.

In an embodiment, block 1040 and block 1030 are the same, in that the identification of one or more digital coupons associated with the first consumer identifier implies that the first consumer identifier is associated with a known consumer identity. In other embodiments, block 1040 may be performed before or after block 1030.

Block 1050 is performed at least partially responsive to receiving the first input and determining that the first consumer identifier is associated with a known consumer identity. Block 1050 comprises block 1052 and block 1054. Block 1052 comprises causing performance of the first transaction, in which a first set of one or more items are purchased, at least in part, using the first set of one or more of the digital coupons associated with the particular consumer identifier.

In an embodiment, the terms of each of the digital coupons are compared to various properties of the first set of one or more items in the transaction, and it is determined that the first set of one or more coupons are eligible for use in the transaction. In an embodiment, the eligibility of the first set of one or more digital coupons may have been determined in the identification process of block 1040. For example, when querying a retail server or offer server, a terminal may include transaction details such as a description of the first set of one or more items. When returning the digital coupons in block 1040, an offer server or retail server may limit the returned digital coupons to only those that are eligible for use in the transaction, based on these transaction details.

Any suitable technique may be used for calculating a total for the first transaction and securing payment, including, without limitation, those described in Section 4 and elsewhere in this disclosure.

Block 1054 comprises causing communicating an electronic receipt for the first transaction via at least one of an email message or a web-based application. The email address for the email message, or the electronic address through which web-based application retrieves the electronic receipt, is determined based on the first consumer identifier. For example, if necessary, various lookup operations may be utilized to locate an email address associated with the first consumer identifier, or an electronic address and corresponding database record in association with which to save the electronic receipt for later retrieval via a web-based application. Block 1054 may be performed using a variety of techniques described herein, including, without limitation, those described with respect to block 370 of FIG. 3 or block 702 of FIG. 7.

Block 1060 comprises receiving input specifying a second set of one or more items for purchase in a second transaction and, optionally, one or more payment mechanisms. "Second" merely refers to another thing that is different from the first, and does not imply a particular ordinal position or occurrence. The input may be received in the same manner as the input of block 310. Block 1060 may occur at any time relative to blocks 1020-1050.

At block 1070, the flow proceeds to complete the second transaction without having received any consumer identifier associated with any known consumer identity via the interface(s) of block 1010. For example, the terminal may be configured to proceed with the transaction without a consumer identifier if no input has been received after a predetermined time, or if the consumer or cashier declines to provide a consumer identifier. Such a determination may also occur in response to conditions such as those in block 616, 618, where a provided consumer identifier is determined not to be associated with a known consumer identity. In an embodiment, the consumer may be given an opportunity to establish a known consumer identity; however performance of block 1070 would occur if the consumer declined to do so.

Block 1080 is performed at least partially responsive to not receiving, via the interface, in association with the second transaction, any input that indicates any consumer identifier associated with any known consumer identity. Block 1080 comprises block 1082, 1084. Block 1082 comprises causing performing the second transaction, in which a second set of one or more items are purchased. The second transaction is performed in a manner similar to that of the first transaction. However, the second transaction may be performed with or without applying digital or printed coupons. In an embodiment, the second transaction is performed without applying any digital coupons that originated from the same distributor as the digital coupons of block 1040, since the second consumer cannot be resolved to a known consumer identity at the distributor.

Block 1084 comprises causing communicating a printed receipt for the second transaction. Block 1084 may performed in a manner similar to block 380 of FIG. 3.

Flow 1000 is one example of the variety of possible techniques for conducting a transaction in which an electronic receipt is communicated. Other embodiments may include additional or fewer elements in varying orders. For example, while flow 1000 depicts an embodiment in which the first consumer that provides the first consumer identifier is always provided with an electronic receipt instead of a printed receipt, other techniques may allow the first consumer to select a printed receipt instead of or in addition to an electronic receipt. Similarly, in yet other embodiments, no eligible digital coupons may be returned in block 1040. However, the first consumer may obtain an electronic receipt without any digital coupons being applied to the first transaction.

Although flow 1000 is from a retailer-centric perspective, it is not necessary for all of flow 1000 to occur at computing devices operated by the retailer. However, in an embodiment, the entire flow 1000 is performed collectively by a terminal and/or retail server, based on communications with an offer server or other computer associated with a service provider.

Figure 11:
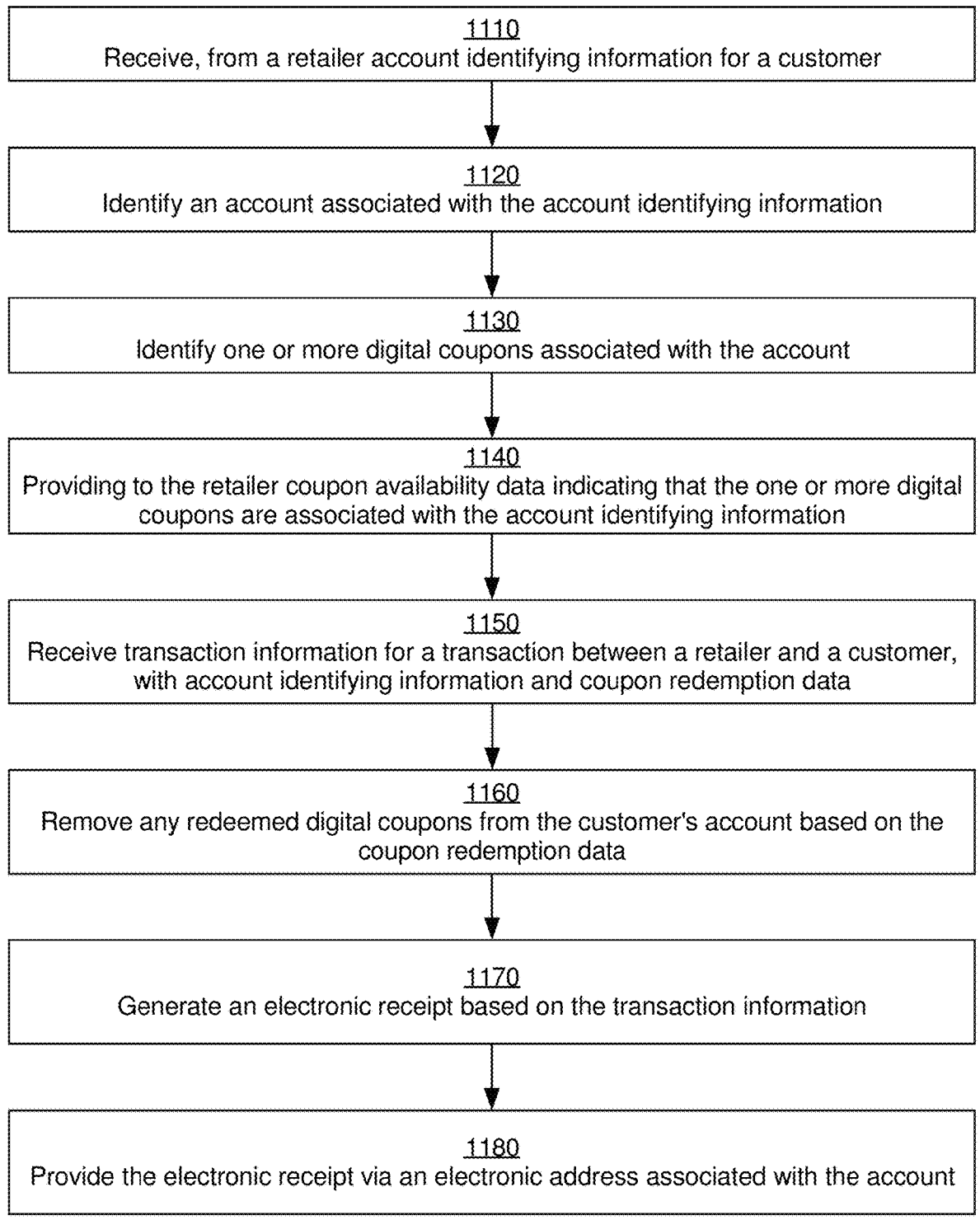
FIG. 11 illustrates a distributor-centric flow for using a single consumer identifier to locate digital offers for redemption in a transaction, and to identify an electronic address at which to provide a digital receipt, in accordance with an embodiment.

FIG. 11 illustrates an offer distributor-centric flow 1100 for using a single consumer identifier to locate digital coupons for redemption in a transaction, and to identify an electronic address at which to provide a digital receipt, according to an embodiment.

Block 1110 comprises receiving, from a retailer, account identifying information for a consumer. The account identifying information may be any type of consumer identifier, including without limitation an email address. The account identifying information may be received in any suitable manner, including the manners described with respect to block 410 and elsewhere in this disclosure. Block 1120 comprises identifying an account associated with the account identifying information, such as described in block 420.

Block 1130 comprises identifying one or more digital coupons, which may or may not be associated with the account. The one or more digital coupons may be identified, for instance, by querying a data repository for digital coupon identifiers associated with the account. Block 1140 comprises providing to the retailer coupon availability data indicating that the one or more digital coupons are associated with the account identifying information. The provision of coupon availability data is described elsewhere in this disclosure.

Block 1150 comprises receiving, from the retailer, transaction information for a transaction between the retailer and the consumer. The transaction information may comprise transaction data such as described in block 410 and elsewhere in this disclosure, including the account identifying information for the consumer.

In an embodiment, the transaction information includes offer redemption data indicating that the one or more digital coupons were applied to the transaction. Optionally, at block 1160, an offer server may remove any redeemed digital coupons from the consumer's account based on the offer redemption data. The offer server may further notify other retailers who may have cached copies of previous coupon availability data for the consumer that the redeemed digital coupons are no longer available for the consumer. In other embodiments, updating of coupon availability data is instead achieved through various asynchronous backend processes.

Block 1170 comprises generating an electronic receipt based on the transaction information, as described in block 440. The electronic receipt may optionally include offer information, as described elsewhere in this disclosure, by which the consumer may add new digital coupons to the consumer's account. Block 1180 comprises providing the electronic receipt via an electronic address associated with the account, as described in block 450. In an embodiment where the account identifying information is an email address, the electronic receipt, or a notification of the electronic address via which the electronic receipt is available, is delivered to the email address.

Flow 1100 is one example of the variety of possible techniques for providing digital offer information and an electronic receipt. Other embodiments may include additional or fewer elements in varying orders. For example, in an embodiment, blocks 1130-1140 are performed asynchronously to at least blocks 1110, 1150, 1170. Rather than wait for a retailer to request coupon availability data for a consumer, the offer server proactively identifies digital coupons associated with each of multiple consumer accounts and pushes the coupon availability data to the retailer in, for example, periodic batches. The coupon availability data is then cached by the retailer. In such an embodiment, block 1110 is an element of block 1150, in that the retailer only needs to communicate with the offer server once, upon completion of the transaction.

In an embodiment, some of the transaction information of block 1150, including at least the list of item(s) involved in the transaction, is received before the transaction is conducted. The coupon availability data is compared to the list of items and filtered so as to provide the retailer with only a set of those digital coupons that are eligible for use in the transaction. The remainder of the transaction information of block 1150 is transmitted, or the entire transaction information is retransmitted, upon completion of the transaction. Furthermore, because each provided coupon is known to be eligible for the transaction, in an embodiment block 1160 may be performed even without coupon redemption data being included in the transaction information.

4.25. Other

In an embodiment, rather than requiring a retailer to deploy its own solution for sending data to a transaction aggregation system, an offer distributer provides retailers with a local service that synchronizes with the offer distributor's central server on an ongoing basis.

In an embodiment, a consumer can access various platform features described herein (digital receipts, coupons, lists, etc.) through various means based on retail entity preferences. Three primary experiences based on retailer entity preference include: White Label UX—Interface features are hosted by the offer distribution system, but embedded in a transparent fashion in to a partner's websites (either through proxy or IFrame); Partners Website—Retail partners build their own interface for platform features using APIs provided by the offer distributor; Distributor UX—Distributor-branded interface where a consumer directly logs in to and interacts with offer servers, receipt servers, and so forth.

In an embodiment, each of the above interfaces is built to support multiple resolutions and devices. For white labeling purposes, the interface supports CSS-based templates to drive the look and feel. Partners can easily apply their style sets. For white label and third party entity websites, user authentication is handled by partners. Requests are sent to the offer distribution system after authentication. Retailers who opt in for White Label option use a dedicated URL within the retailer domain (e.g., receipts.retailer.com) name for receipt features. That URL is pointed to a distributor-based URL using CNAME capabilities. This allows the receipt server to access any cookies against that URL. The retailer, after authenticating the user, creates a user cookie against that URL. This cookie is used by the distributor to provide customized experience for that user.

In an embodiment, various pricing constructs may be utilized for targeted offers. In an embodiment, a variable targeting fee is added to a standard unit rate. For example, an offer provider may bid $X,000 to target upper-income males in Georgia, plus 14 cents per activation. In an embodiment, only a variable unit rate is used. For example, an offer provider may bid X cents per activation to target upper-income males in Georgia.

5.0. Example Data Architecture

Various embodiments described herein reference "data stores." A "data store" is an collection of structured data, including databases, file systems, and so forth.

While in some embodiments, each of the data stores described herein are physically separated from each other data store, in other embodiments the separation between some or all of the data stores described herein is a logical abstraction. For instance, offer data 1385 and offer activation data 1388 may be occupy overlapping databases or even tables and records within those databases. Various data architectures are described in subsequent sections.

5.1. Data Sources

Example data sources include transactional data, customer preferences, product taxonomy, and product attributes. From transaction files the purchase history of every user is also identified and recorded. Coupon specific metrics should also be extracted to generate a customer analytic record for customer segmentation, in order to generate more personalized recommendations. Examples of useful features are the times of day at which a customer activates coupons, the time of day at which he/she visits the retailers' stores and redeems coupons, the days of week coupons are redeemed, the average number of trips to the retailers, the number of coupons redeemed the product categories purchased, the preferred payment method and so on.

Apart from the above, retailer-related data sources, the following distributor-related data sources may also be useful. A coupon to product mapping, that relates every coupon to the product(s) that it is related to, is useful when generating recommendations. A coupon activations file that registers the time a specific customer activated a specific coupon allows identifying patterns in coupon activations, to extract the preferences of customers, and to estimate important KPIs related to coupon activations. This file can contain both automatically activated and customer activated coupons so as to estimate the related KPIs for both. Coupon redemption information, that records who has redeem a coupon, what coupon was that, to which product and offer is this associated, at which retailer was this coupon redeemed what time of day, can be extracted through the retailer transactional data if properly recorded. Coupon impression records enable an assessment the effect of coupons on their revenues. These impressions may optionally have a time dimension, that is the exact time an impression was recorded, and also a customer dimension, that is the identity of the individual who watched a specific coupon.

Also, in order to be able to combine data from various sources, the following sources of information may be useful. A customer mapping includes, for each specific customer, one or more customer identifiers and/or loyal card numbers that he or she have in the records of every associated retailer. A product mapping table connects the product identifiers (e.g. SKUs) of every retailer to those of distributor and to the corresponding UPC. A global product taxonomy is connected the taxonomy of every associated retailer and may be applied to deliver association analysis results at various levels if requested. These and various other data sources, such as product descriptions, store and terminal location data, and so forth may be used by the receipt server to translate terse transaction logs into detailed, human-readable receipts.

Rating files, when available can be processed to generate useful recommendations as well. Advanced algorithms generate ratings for all products for every user, based on the ratings that users have already provided. Then, products that are estimated to be rated high from a user can be recommended to this user.

Product taxonomy is useful because it provides the various levels of the product hierarchy. Specifically, for retailers with a large product range with a "long tailed" purchasing pattern or where the user to item association matrix is too sparse, product taxonomy can be used to apply association analysis at various levels of the product hierarchy and thus enrich the recommended items list. Notice that this method can be also used to tackle the "cold start" problem that is the situation where we need to generate recommendations for items that have not been sold yet.

Product attributes are useful to identify similarities among products within a specific product category. This type of information can contribute toward the development of algorithms that assess the similarity of products within the same category. Product attributes along with ratings (if available) or sales can be used to perform attribute weight analysis and estimate the importance of every attribute to the revenue of the retailer. This is a tedious process though that requires a significant amount of work for the attribution of products. Product descriptions are used, when product attributes are unavailable, in order to identify the similarity of products, by applying appropriate text similarity algorithms.

Customer demographics are, along with other data like user preferences, used in identifying the similarity between customers, a significant component of several collaborative filtering algorithms. Customer demographics can be used also to post process the derived recommendation, by applying for instance gender, age and marital status information.

Store characteristics are significant in order to account for the location where a purchase is placed in the generated recommendations and for the store size and specific characteristics.

The same input data can also be used to generate the customer analytic record (CAR) that provides all the information related to the behavior and the characteristics of a customer. The CAR includes customer related KPIs like the number of purchases by a customer, his/her average basket size, the time (the days of week, time of day) and locations at which his/her purchases were made, the average number of trips to the store, the product categories purchased, the preferred payment method and so on. This CAR can be used later on to perform micro- or macro-segmentation and to assist the personalization of recommendations.

5.2. Transaction Logs/Tables

In an embodiment, transaction data is stored as a table of transaction logs. A transaction log is a unique record of the information captured at a store during a transaction. Besides recording items sold, promotions, and method of tender, transaction logs may include returns of goods, 'no sale' actions such as cash in/out, and associate clocking in/out. Generically known as Tlog, the actual content will vary between retailers. Common formats include IBM's GSA Tlog and Nation Retail Federations ARTS standard POSLog (XML).

For example, in an embodiment, a transaction log may include some or all of the following fields: transaction identifier, transaction duration, transaction date/time, master customer identifier, store identifier, retailer customer identifier, tender type(s), tender amount(s), register identifier, cashier name, transaction type, line item count, lane number, total purchase amount, percent savings, total amount saved, tax amount(s), currency code, currency conversion rate, store detail(s), discount amount, return by date, thank you message, loyalty points earned, current loyalty points, email address or mobile phone number for digital receipt, receipt delivery preference, payment identifier(s) such as credit card numbers and other PANs, and transaction line items. The transaction line items may, in turn, be stored in a separate table comprising fields such as transaction identifier, UPC, SKU, EAN/IAN, line item type, quantity, weight, unit price, item discount, associated offer identifier, item description, and so forth. In an embodiment, tender information for each type of payment tendered in a transaction may also be stored in a separate table, including fields such as tender number, tender identifier, tender type, tender amount, customer name, payment card token, method of entry (swiped, keyed, etc.), authorization code, tender amount, currency identifier, balance amount, cashback, voucher number, coupon number, and so forth.

In some embodiments, additional tables may exist, for example, to record information about applied coupons, aggregate various sales data, maintain original transaction logs from retailers in non-canonical form, and so forth.

5.3. Offer Tables

In an embodiment, example offer data may include a campaign table at the highest level, with a one-to-many relationship with offer records in offer table. The offer table contains an entry for each offer, each linked to various tables to provide further definition. Each entry may include, without limitation, one or more product identifiers, an offer code, a start date, an end date, a unit cost, an offer status, offer description(s), an offer type code, a campaign code, a promotion code, an offer sub type code, an offer intent, an offer family code, an offer restriction code, an offer geographic area, a clearinghouse, distribution limit(s), and so forth. The linked tables may include an offer type table to distinguish the different types of offer, such as Display ad, CPC, CC offer, E-Circ, and so forth. The offer sub type table provides descriptions for the offer type and sub type, such as print, digital, and so forth. An offer property table provides attributes specific to the type of offer. An offer channel table identifies the various channels by which the user accesses the offers. An offer delivery table identifies the various ways to deliver the offers, such as QR codes, SMS, e-mails, video, Facebook, Twitter, and so forth.

Offer data may further include offer activation table(s) and offer redemption table(s) mapping consumer entities to offers they have activated or redeemed, along with timestamps for the activations/redemptions.

5.4. Consumer Tables

In an embodiment, consumer data may include a master customer account table comprising a record for each customer entity/identity. The consumer data may further include third party entity customer account detail table(s), in which each retailer's raw customer records are stored along with timestamps reflecting when they are created or modified. Each raw record indicates a set of credentials that were presented during one or more transactions. The raw records may be correlated together using correlation techniques as described herein to form an entity customer account master table in which each entity has a customer record, aggregated and/or consolidated from the raw records, for each of its customers. Each of the above tables may include fields such as, without limitations, a master customer identifier to which the record has been correlated, an entity identifier (for the entity tables), first name, last name, middle name or initial, one or more loyalty identifiers, one or more mobile phone numbers, one or more email addresses, one or more PAN numbers, one or more addresses, a household identifier, and so forth.

In an embodiment, customer data may further include one or more household tables, comprising household records in which data from multiple customer entities belonging to the same household are consolidated. For example, retailer data may link multiple loyalty cards to a same household. Or, customers with a same credit card, same address, but different name may be linked to a same household record. Or, customers with a same address may be linked to a same household.

In an embodiment, the targeting techniques described herein may target records from any one of the above described tables. In an embodiment, consumer data may further include detail tables or demographics table(s) that are linked to any of the above, such as tables with a consumer's age, location, gender, digital receipt and other contact preferences, and so forth.

5.5. Product Tables

In an embodiment, item data comprises a master product table, comprising records for each unique item. The master product table may comprise fields such as, without limitation, product identifier, UPC, department, category, subcategory, segment, and line. Separate tables may also exist for some or all retailers, including similar fields and/or SKU numbers. Additional tables may exist for information such as item descriptions, attributes, ratings, historical prices, product images, and/or inventory.

5.6. Other Tables

In an embodiment, a variety of other tables may also exist, including without limitation a retailer table, stores table, consumer action tracking table(s), a consumer offer recommendation table, various lookup tables such as an offer by geography table, language tables, and so forth.

6.0. Example System Architectures

Figure 5:
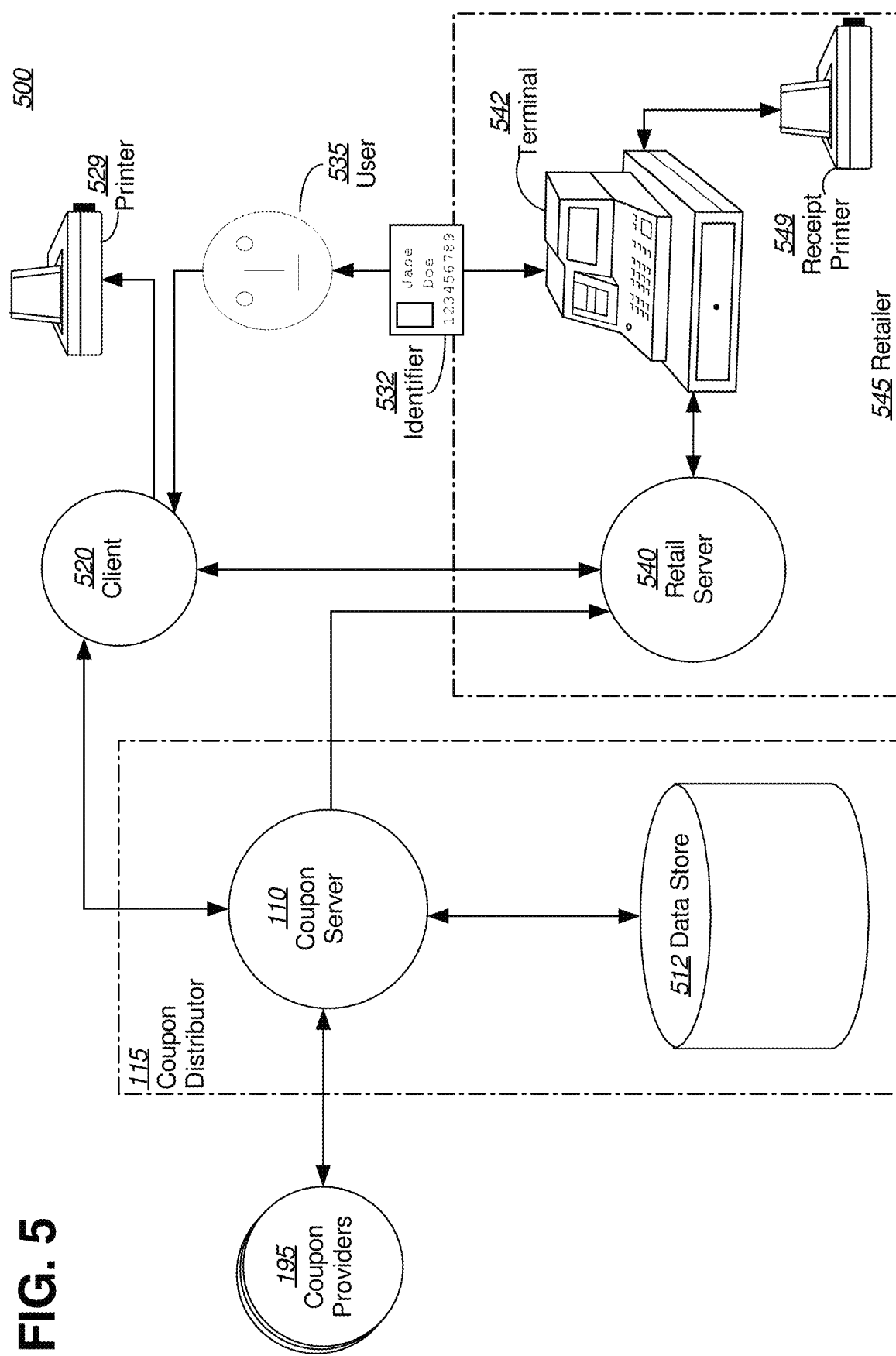
FIG. 5 illustrates an example system in which the techniques described herein may be practiced, in accordance with an embodiment.

FIG. 5 is a block diagram illustrating an example system 500 in which the techniques described herein may be practiced, according to an embodiment. System 500 comprises an offer server 510 operated by an offer distributor 515, a client 520 operated by a consumer 535, and a retail server 540 and terminal 542 operated by a retailer 545.

6.1. Retailer

Retailer 545 is any entity that conducts transactions in which consumers, such as consumer 535, redeem offers via the coupons distributed by offer server 510. Retailer 545 may be a single store, or a corporation that operates a group of stores. Consumer 535 may engage in transactions with retailer 545 at, for example, a brick-and-mortar store operated by retailer 545. Consumer 535 may also engage in transactions with retailer 545 via a website operated by or on behalf of retailer 545.

A transaction as used herein refers to the act of a retailer such as retailer 545 obtaining payment for the provision of, or the formation of a contract to provide, certain product(s) and/or service(s). Obtaining payment may include receiving a physical or electronic transfer of payment, debiting an account, obtaining a hold on funds, securing funds in escrow, obtaining points or other non-monetary value from an account or escrow or other transfer, or obtaining any form of value from an electronic wallet. A transaction is initiated by a consumer's selection of products or services to purchase. Products and purchases are collectively referred to herein as "items." The consumer may signal this selection by initiating a checkout process by, for example, bringing selected products to terminal 542. The checkout process may involve the consumer providing retailer 545 with any information necessary to complete the transaction, such as account or wallet information, billing particulars and/or delivery instructions.

In an embodiment, retailer 545 is capable of distributing and accepting digital coupons from a provider 595 even though retailer 545 is a separate and distinct entity from the provider 595 and offer distributor 515. However, in other embodiments, retailer 545 may be the same as one or both of provider 595 and offer distributor 515.

6.2. Terminal

Terminal 542 is a data processing system operated by a retailer for conducting in-store (i.e. "point of sale" or "brick and mortar") transactions. Terminal 542 may be, for example, a register operated by a sales clerk or a "self-checkout" stand operated by consumer 535. Terminal 542 comprises input mechanisms by which a clerk and/or the consumer may input information for conducting a transaction, including item identifiers and item quantities. The input mechanisms may include, without limitation, keyboards, pointing devices, touch screens, bar-code readers, cameras, scales, and radio frequency identification ("RFID") readers. Terminal 542 is coupled to a database of item identifiers, in which each item identifier is mapped to one or more prices. Terminal 542 may further comprise or be coupled to one or more payment mechanisms, such as a cash register, check verification system, or credit card reader.

Terminal 542 is coupled to a printing component 549 by which terminal 542 may print receipts of transaction data for transactions, once completed. In an embodiment, a printed receipt may include one or more coupons printed therein. Terminal 542 also or instead includes execution logic for causing electronic transaction receipts to be provided to consumer 535 via an electronic address, such as an email address, text messaging address, social messaging address, or URL. For example, terminal 542 may utilize a consumer identifier 532 of consumer 535 to locate account information that includes the electronic address. Such an account may be stored at, for example, retail server 540 or offer sever 510. Or, consumer 535 may provide the electronic address directly to terminal 542. Terminal 542 may then send the receipt to the electronic address, or provide the transaction details to a server, such as retail server 540 or offer server 510, that is configured to send the receipt or otherwise make the receipt available to consumer 532 at the electronic address. Terminal 542 may cause the digital transaction receipt to include offer information, such as general links to an offer distribution website or more specific links from which consumer 535 may obtain coupons for specific offer(s) displayed in association with the electronic receipt.

As used herein, "causing" performance of an action may be interpreted as sending, transmitting, or saving data that, when processed by an entity or any combination of entities at least partially triggers functionality at the processing entity or combination of entities that either performs the act or causes performance of the act.

Regardless of the type of receipt generated for transactions at terminal 542, the one or more coupons or offers associated with the receipt may be selected using a variety of techniques, including random selection, selection based on items in the transaction, selection based on the time or date of the transaction, and/or selection based on store location at which the transaction occurs. In an embodiment, terminal 542 requests that another server, such as a retail server 540 or offer server 510, identify the one or more offers based upon transaction information furnished by terminal 542.

In an embodiment, retailer 545 allows consumer 535 to redeem an offer by presenting a printed or digital coupon at terminal 542 while engaging in an applicable transaction. In an embodiment, retailer 545 allows consumer 535 to redeem an offer by presenting an identifier while engaging in a transaction. Terminal 542 uses the identifier to locate applicable coupon(s) that have been saved to the consumer's account. In an embodiment, terminal 542 communicates with offer server 510 to locate applicable coupon(s) that have been saved to the consumer's account. In an embodiment, terminal 542 instead relies upon offer server 510 to push coupon availability data for various account identifiers to retail server 540. For example, offer server 510 may periodically provide retail server 540 with a table of account identifiers and newly associated or disassociated digital coupon identifiers. Retail server 540 may then update a local database based on the coupon availability data. Suitable techniques are described, for instance, in U.S. application Ser. No. 12/878,231, filed Sep. 9, 2010, the entire contents of which are hereby incorporated by reference for all purposes as if fully set forth herein.

Terminal 542 periodically, or in response to a transaction, reports coupon usage data to offer server 510. Coupon usage data indicates the redemption of one or more offers, along with unique identifiers associated with the redemptions, so that coupons may be removed from the redeeming consumer's account(s). In an embodiment, terminal 542 is further configured to periodically send transaction data to offer server 510. The data may include one or more of sales price(s), transaction date(s) and time(s), and identifiers of product(s) or service(s) included in each transaction. The periodic requests may occur hourly, daily, or upon a certain number of transactions, for example.

6.3. Retail Server

In an embodiment, terminal 542 is coupled to retail server 540 via a network, such as a company intranet. In an embodiment, a server may refer to one or more components executing on one or more computers or devices that interact with counterpart client applications executing on other computers or devices. Thus, retail server 540 may refer to one or more server components executed at one or more computing devices under the control of retailer 545. Retail server 540 may coordinate transactions amongst a plurality of terminals 542. Retail server 540 is an optional component of system 500. However, in an embodiment, some or all of the communications to and from terminal 542 pass through retail server 540. In various embodiments, any number of functions described herein as being performed by a terminal such as terminal 542 may in fact be performed, at least in part, by retail server 540. Likewise, any number of functions described herein as being performed by a retail server such as retail server 540 may in fact be performed, at least in part, by terminal 542. In an embodiment, terminal 542 is a "thin client," and all functions other than input and output are shifted to retail server 540.

In an embodiment, retailer 545 host a website via retail server 540, at which consumer 535 may access electronic receipts and associated offer information via one or more web addresses. The website may be provided as a "digital locker" of receipts for transactions in which any of the consumer's identifiers have been provided. For example, a consumer 535 may login to a website hosted by retail server 540. Once logged in, consumer 535 may access a list of recent receipts by visiting a specific web address. The list of receipts may further contain links to web addresses hosted by the retail server 540 or an offer server 510 at which the consumer may obtain coupons for one or more offers. The offers may be non-targeted and/or targeted. In an embodiment, the one or more offers may be selected specifically for the consumer in association with the receipt. In an embodiment, such a website may also or instead be hosted by another entity such as offer server 510. The website may be accessed in response to a notification of the availability of a digital receipt, such as an email, text message, or operating system alert. The website may also or instead be accessed proactively by the consumer without having received a notification.

In an embodiment, retail server 540, offer server 510, or any other server described herein may include or be coupled to a variety of different components for implementing the techniques described herein, including database server(s), email or text messaging server components such as an SMTP server component, and web/application server components for responding to requests addressed to various addresses and ports with web pages and/or other data. Web/application server components may rely upon any suitable protocol or application language, including HTTP, HTTPS, SSL, HTML, XML, PHP, Java, JavaScript, SOAP, and so forth.

In an embodiment, retail server 540 comprises executable logic similar to that of the offer server for generating coupons. For example, offer distributor 515 may provide one or more libraries of offer distribution code for retailer 545 to utilize in retail server 540. As a condition of executing such logic, retail server 540 is configured to communicate periodically via an application program interface with offer server 510, via which offer server 510 provides retail server 540 with the coupon data necessary for retail server 540 to generate coupons. For example, offer server 510 may provide retail server 540 with terms of offers for which consumers of retail server 540 are currently eligible, instructions for generating a unique coupon identifier for each offer, and/or applicable distribution limits and parameters. Retail server 540 is further configured to report distributions to offer server 510 on a periodic basis.

In an embodiment, retail server 540 and terminal 542 are special-purpose computers configured with logic that can perform the operations described herein during operation. In an embodiment, client 520 is a general-purpose computer that comprises one or more processors, and memory, mass storage device, or other non-transitory computer-readable storage media storing instructions which, when loaded and executed, cause the one or more processors to perform the operations that are further described herein.

6.4. Offer Provider/Distributor

In an embodiment, offer distributor 515 is any entity capable of distributing offers on behalf of an offer provider 595, such as a manufacturer, retailer, or advertiser. For the purposes of this disclosure, distributing an offer may refer to either or both of generating a coupon and saving an offer to a consumer account in association with one or more account identifiers. In this context, generating a coupon may include printing a coupon or creating and storing digital data representing a digital coupon.

An offer provider 595 may contract with offer distributor 515 to distribute offers as part of an offer campaign. The offer provider 595 supplies offer distributor 515 with offer distribution data describing the offer(s), as well as parameters for each offer campaign, such as a target number of offers to distribute in aggregate, how many offers may be supplied to each individual end user or device, regional distribution limits, a clearinghouse to use for the campaign, and/or start and end dates for distribution. In an embodiment, offer distributor 515 makes offers available on behalf of multiple offer providers 595.

Offer providers 595 may transmit offer distribution data to offer distributor 515 electronically via a network connecting offer provider 595 to offer server 510. For example, offer server 510 may feature a web application, file sharing, or database access component by which providers 595 may upload offer distribution data directly to offer server 510 or offer data store 512. Additionally or alternatively, offer providers 595 may transmit offer distribution data to offer distributor 515 by any other suitable means, including orally over a telephone or via an email.

6.5. Offer Server

Offer server 510 is operated by an offer distributor 515 for, among other purposes, making offers available to consumers such as consumer 535. Offer server 510 may be one or more server applications, executing at one or more computing devices operated by offer distributor 515. In an embodiment, offer server 510 is a special-purpose computer configured with logic that can perform the operations described herein during operation. In an embodiment, offer server 510 is a general-purpose computer that comprises one or more processors, and memory, mass storage device, or other non-transitory computer-readable storage media storing instructions which, when loaded and executed, cause the one or more processors to perform the operations that are further described herein.

Offer server 510 makes offers available to consumers, such as consumer 535, on behalf of one or more offer providers 595. In an embodiment, offer server 510 distributes printable coupons for various offers directly to consumer 535 via client 520, which is in turn coupled to a printer 529 at which the printable coupons may be printed. Offer server 510 also makes digital coupons for various offers available to the consumer 535 by means of saving information identifying digital coupons requested by consumer 535 to one or more accounts associated with consumer 535. The consumer 535 may then provide a retailer 545 with an identifier for the account, such as a store loyalty account number or consumer name, so that retailer 545 may retrieve any applicable digital coupons during a transaction. Offer server 510 also makes digital coupons available to the consumer 535 indirectly, via retailer 545. For example, in response to a retail server 540, operated by retailer 545, requesting a digital coupon on behalf of consumer 535, offer server 510 may generate a digital coupon and provide retail server 540 with information about the generated coupon. In other embodiments, offer server 510 need not necessarily be capable of distributing offers via any particular technique described herein.

Offer server 510 receives and responds to offer-related requests from client 520 and retail server 545 over one or more networks, such as the Internet. Offer server 510 retrieves offer data from data store 512 to respond to various requests from client 520 and retail server 545. For example, client 520 may request offer server 510 to provide a listing of available offers, search for an offer based on keywords, save a specified digital coupon to a consumer account for consumer 535, or print a specified coupon. In response, offer server 510 may retrieve any relevant offer data from data store 512, process the offer data as appropriate, and, based on that processing, formulate a response to the client. In an embodiment, offer server 510 hosts one or more web sites for such interactions with client 520. The offer server 510 sends web pages to a web browser executing at client 520 with instructions for causing the web browser to display various graphical interfaces related to viewing, selecting, printing, and/or saving coupons. In an embodiment, offer server 520 features an application programming interface ("API") by which a dedicated application at client 520, having its own graphical interfaces, may communicate with offer server 520.

As another example, offer server 510 may provide retail server 540 with information about offer terms, digital coupon availability, and consumer accounts, via a suitable API. Retail server 540 may, in turn, provide offer server 510 with data indicating consumer coupon redemptions and/or transaction data.

Offer server 510 may be configured to control coupon distribution in a number of ways. For example, offer server 510 may be configured to deny a client permission to print the coupon, in accordance with device-based, client-based, or aggregate distribution limits. As another example, offer server 510 may be configured to deny a request to generate a coupon for a consumer if an equivalent coupon has already been generated from client 520. Offer server 510 may further be configured to deny a client permission to print a coupon based on geographic information associated with the client.

Offer server 510 may use distribution logs for sending distribution reports to offer providers 595. The form of a distribution report may vary, and may include at least data indicating either a total number of offers that have been distributed for a particular campaign or a total number of offers that have been distributed for the particular campaign since the last distribution report. Distribution reports may be sent at varying frequencies, and in some embodiments a report may be sent each time a particular coupon is printed. Distribution reports may further include information harvested from device data made known to offer server, such as geographic information or client types of the devices to which offers have been distributed.

Figure 8:
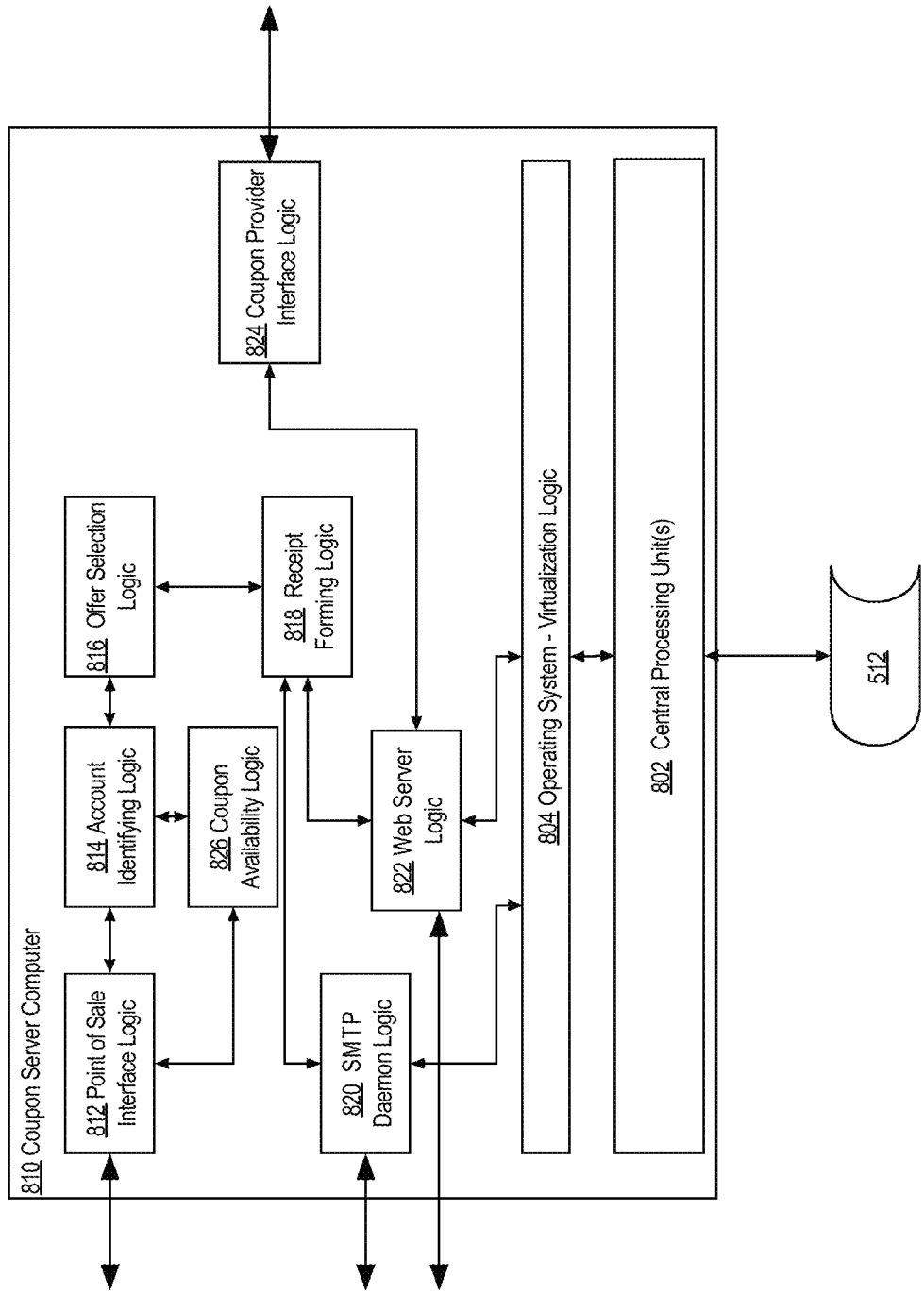
FIG. 8 illustrates a computer configured to implement certain embodiments, in accordance with an embodiment.

FIG. 8 illustrates a computer configured to implement certain embodiments. In particular, FIG. 8 illustrates an example of offer server 510 implemented as a special-purpose computer, denoted offer server computer 810, and comprising one or more central processing units 802, operating system or virtualization logic 804, point of sale interface logic 812, account identifying logic 814, offer selection logic 816, receipt forming logic 818, SMTP daemon logic 820, web server logic 822, offer availability logic 826, and offer provider interface logic 824.

In an embodiment, the one or more central processing units 802 comprise CPUs, processor cores, or other instruction processing elements that are capable of interacting with input-output resources such as data store 512. In an embodiment, operating system or virtualization logic 804 comprises any of a server computer operating system, virtualization system such as a hypervisor, or a hardware-based hypervisor such as Intel Xen coupled to a compatible operating system. The point of sale interface logic 812 is configured to communicate with point of sale elements such as retail server 540 (FIG. 5) to receive transaction information including account identifying information and provide digital offer information as further described for FIG. 4 and in other sections herein. The point of sale interface logic 812 may, in some embodiments, interact with web server logic 822 to post or get requests or responses using HTTP; alternatively, retail-specific communication protocols may be used.

The account identifying logic 814 is coupled to the point of sale interface logic 812 to receive the account identifying information, and has an implicit indirect connection to the OS 804, CPU 802, and data store 512 for the purpose of issuing one or more database queries or other requests to determine if the account identifying information is in the data store. The account identifying logic 814 is further coupled to offer selection logic 816 for providing a request to form and send one or more receipts or offers. The account identifying logic 814 may also couple to the SMTP daemon logic 820, POS logic 812 and/or web server logic 822 for the purpose of forming and sending an email, POS protocol communication, or HTTP post or response to the retail server 540 or client 520 indicating that the account identifying information was recognized.

The offer availability logic 826 is coupled to the point of sale interface logic 812 to receive the account identifying information, and has an implicit indirect connection to the OS 804, CPU 802, and data store 512 for the purpose of issuing one or more database queries or other requests to determine if the account identifying information is associated with one or more digital coupons saved to an account in the data store. The account identifying logic 814 may also couple to the SMTP daemon logic 820, POS logic 812 and/or web server logic 822 for the purpose of forming and sending an email, POS protocol communication, or HTTP post or response to the retail server 540 or client 520 indicating that the account identifying information is associated with one or more digital coupons saved to an account in the data store.

The offer selection logic 816 is configured to select one or more offers based on a positive recognition of the account identifying information and to signal the receipt forming logic 818 to form an electronic receipt that contains the offers, links to the offers, call-outs for the offers or other indications about how to obtain offers. The SMTP daemon logic 820 is configured to implement an electronic mail protocol such as simple mail transport protocol (SMTP) and exposes an application programming interface (API) with which other elements of the system may request sending emails and may receive, parse, and use the parts of inbound received emails. The web server logic 822 is configured to implement an HTTP server and to serve one or more stored HTML pages, or form and send one or more dynamically generated HTML pages, to the client 520, offer providers 195, and/or retail server 540. The offer provider interface logic 824 is configured to couple to offer providers 195 and to interface with the web server logic 822 and suitable other offer provider application logic to enable offer providers to define and store offers in data store 512, and to receive metrics about the use of offers in the described system.

Each element of logic of offer server computer 810 described above for FIG. 8 may comprise customized hard-wired logic, one or more ASICs or FPGAs, firmware and/or program logic which in combination with the data processing system causes or programs computer 810 to be a special-purpose machine. According to one embodiment, the techniques herein are performed by computer 810 in response to CPU 802 executing one or more sequences of one or more instructions contained in main memory. Such instructions may be read into main memory from another storage medium, such as data store 512. Execution of the sequences of instructions contained in main memory causes CPU 802 to perform the process steps described herein. In alternative embodiments, hard-wired circuitry may be used in place of or in combination with software instructions.

6.6. Data Store

Offer distributor 515 maintains the data supplied by offer providers 595 as offer data in data store 512, which is coupled to offer server 510. Data store 512 may comprise one or more databases and/or file repositories. The offer data may take a variety of forms, including database records and/or one or more files. Among other aspects, offer data may comprise, for each offer, data such as the name of the offer provider 595 making the offer, distribution parameters, terms of the offer, print layout information and graphics, one or more internal or provider identification numbers, bar code generation information, one or more relevant uniform resource locators (URLs), one or more offer names or titles, one or more related search terms, clearinghouse information, and one or more related categories. Distribution parameters may include aggregate distribution limit values, per device distribution limit values, per region distribution limit values, and/or per client distribution limit values.

Data store 512 further stores consumer account data. The consumer account data includes data for one or more different consumer accounts, each of which may or may not be mapped to a unique consumer. Some or all of the consumer accounts may have been established during a registration process with offer distributor 510. Some or all of the consumer accounts may instead have been established with a retailer 545, e.g., during an online or in-store registration process, and the details thereof may have been subsequently communicated by the retailer 545 to offer distributor 510.

Regardless of how the consumer accounts came into existence, the consumer account data specifies one or more account identifiers for each consumer account. The consumer account data may also specify or otherwise indicate one or more electronic addresses tied to each account. Each account identifier may in turn be associated with data identifying one or more digital coupons that are available to a consumer. Some or all of the one or more digital coupons may also be associated with other account identifiers associated with the consumer account. In an embodiment, the digital coupons with which the account identifiers are associated are unique instances of corresponding offers, wherein each unique instance has a unique coupon identifier. For example, just as each coupon that may be printed by offer server 510 may have a unique coupon number, a unique coupon number may also be generated each time a consumer saves a digital coupon to the consumer's account. However, in other embodiments, the digital coupons do not require unique coupon identifiers.

Data store 512 may also store other information related to offer distribution, including device data and distribution logs. The device data describes a plurality of devices that execute clients for accessing offer data, such as client 520. Each device may be described by a device identifier. Device data may include information such as hardware identifiers, client identifiers, geographic information, and permissions data. In an embodiment, each device identifier is assigned based on a variety of characteristics of the device, in such a manner as to produce device identifiers that are virtually guaranteed to be unique. In an embodiment, the characteristics from which the device identifier are derived include data that cannot easily be changed, so as to ensure that no single device may print more than its allotted share of coupons simply by changing a network address, data file, computer name, or operating system. In an embodiment, the characteristics from which the device identifiers are derived include hardware identifiers such as serial numbers. Techniques for assigning identifiers are described in, for example, U.S. Patent Publication Number 2010/0124235A1, published May 20, 2010, the contents of which are hereby incorporated by reference for all purposes as if fully set forth herein. In other embodiments, however, a device identifier may in fact be a network address, a Mac address, a computer name, or a unique client identifier that is generated at the time the client is installed.

Distribution logs track the number of coupons that have been distributed for each offer described in the offer data, including the number of times coupons have been printed and/or the number of times offers have been saved to a consumer account. Distribution logs may further track how many times each device described in the device data and/or how many times each consumer described in the consumer account data has printed coupons for, viewed, and/or saved each offer described in offer data.

Data store 512 may also store a variety of compensation data. For example, data store 512 may store data indicating, for each offer, the number of times a retailer 545 has reported the offer as redeemed. As another example, data store 512 may store balances and account numbers of accounts established by providers 595 from which funds for compensating retailer 545 are to be drawn. Data store 512 may further store account numbers that should be credited in order to provide compensation to retailer 545. Data store 512 may further store a variety of other accounting data.

6.7. Client

Client 520 may be any of a variety of devices, including a personal computer, printer, phone, or portable computing device. In an embodiment, client 520 comprises one or more application components that provide consumer 535 with an interface to offer server 510. Client 520 may be, for example, a standalone software application, a web browser, or a plug-in to a web browser. Client 520 need not necessarily be executed by a device that is owned or even exclusively operated by consumer 535. For example, client 520 may be executed by an in-store kiosk provided to consumers by retailer 545.

In an embodiment, client 520 is a special-purpose computer configured with logic that can perform the operations described herein during operation. In an embodiment, client 520 is a general-purpose computer that comprises one or more processors, and memory, mass storage device, or other non-transitory computer-readable storage media storing instructions which, when loaded and executed, cause the one or more processors to perform the operations that are further described herein.

Client 520 communicates with offer server 510 over a network such as the Internet to receive offer data. The offer data sent to client 520 may include, for instance, a listing of information about offers available to consumer 535, including offer terms and values, as well as data describing a specific offer in sufficient detail to allow client 520 to print a coupon for the offer at printer 529. Printer 529 is any printing device capable of printing a coupon. Printer 529 may be connected to client 520 via any communication mechanism, or client 520 may be integrated into printer 529.

Client 520 may, using various input or output mechanisms, allow consumer 535 to view a list of available offers, select a particular offer from that list, and choose whether to print a coupon for the offer, or to save the offer to consumer 535's account. In response to consumer 535 selecting the latter option, client 520 may send a request to offer server 510 to save the selected offer to consumer 535's account.

In an embodiment, multiple clients 520 may be available to a consumer, with each client 520 potentially supporting different mechanisms by which the consumer may access an offer. For example, one client 520 may only allow a consumer to print coupons via printer 529, another client 520 may only allow a consumer to save digital coupons to an account, and another client 520 may allow a consumer to access offers in both ways.

In an embodiment, offer data and instructions are sent to client 520 from a server at an external website, such as a retail website, instead of offer server 510. In such an embodiment, client-initiated requests to offer server 510 may or may not be relayed through such an external website.

In an embodiment, client 520 includes logic for generating a device identifier, as described in the previous section. Client 520 may report this device identifier to offer server 510 or retail server 540 upon request. Among other purposes, the device identifier may be used by the offer server 510 for the purpose of enforcing per-device offer distribution limits.

In an embodiment, client 520 is a wireless, portable, and/or battery powered computing device that the consumer commonly keeps with him or her while traveling, such as a phone, tablet, personal digital assistant, watch, and so forth. Client 520 is configured to execute instructions for a graphical coupon client interface by which the consumer communicates with offer server 510. The coupon client interface may be provided by, for instance, a mobile application or a web application.

In an embodiment, client 520 is further configured to execute instructions for a graphical mobile payment interface by which the consumer communicates with a payment server during transactions with terminal 542. The mobile payment interface and coupon client interface may be integrated or separate. The interfaces may be activated by consumer input such as launching an application or selecting a link in an email, in response to unsolicited communications from offer server 510, the payment server, and/or in response to signals received from terminal 530. Client 520 may include communication interfaces by which client 520 is capable of communicating with terminal 542 during the transaction to effect payment, receive receipt data, and receive offer information about available offers upon completion of the transaction. Any suitable communication interface or combination of communication interfaces may be used, including Wi-Fi, cellular data, Bluetooth, Near-Field Communication, and so forth.

In an embodiment, client 520 is further configured to execute instructions for a receipt viewing and management interface by which the consumer views receipts for transactions between the consumer and one or more retailers. The receipt viewing and management interface may be integrated with or separate from any mobile payment interface and coupon client interface.

6.8. Account Identifiers

Account identifier 532 is a series of characters and/or symbols that uniquely identifies consumer 535 or a consumer account associated with consumer 535. For example, account identifier 532 may identify a retailer's loyalty account, a consumer account with offer distributor 515, or both. In the latter case, for instance, account identifier 532 may have been created to identify the retailer's loyalty account, but then subsequently registered with the offer distributor account, along with potentially other identifiers. Account identifier 532 may or may not also identify or be identified from a physical item, such as a card or personal computing device. In an embodiment, the physical item is any portable item that has an account identifier that can be readily accessed during a transaction.

In an embodiment, account identifier 532 is a number for a card account, such as a credit card account or consumer loyalty card account. Consumer 535 may provide identifier 532 during a transaction by, for example, scanning the card at a card reader, typing or stating the numbers on the card, or providing personal information by which the card number may be located, such as a telephone number.

In an embodiment, account identifier 532 is a unique device identifier belonging to a portable computing device. Examples include a mobile phone, laptop or netbook computer, tablet computer, personal digital assistant, flash drive, music player, or camera. For example, the device identifier may be a MAC address, Bluetooth address, serial number, randomly assigned number, and so forth. Consumer 535 may provide identifier 532 during a transaction by, for example, allowing the portable device to broadcast identifier 532 wirelessly to the retailer's checkout system, allowing the retailer to scan the device, or allowing the retailer to see or scan information displayed by the device. In an embodiment, identifier 532 does not necessarily correspond to device hardware, but may rather be provided by a software application executing on the device.

In an embodiment, account identifier 532 is emitted wirelessly by a radio-frequency identifying (RFID) chip or any other mechanism capable of transmitting signals that may be detected during a transaction with retailer 545. For example, the RFID chip may be embedded within a card, device, or other item carried by consumer 535. The RFID chip may be, for example, a passive NFC tag or active NFC reader.

In an embodiment, offer distributor 510 allows consumer 535 to print account identifier 532, or a barcode representation thereof, on a sheet of paper. The paper may then be presented to the retailer 545 during a transaction. Using this approach, consumer 535 can take advantage of the techniques described herein without having to remember account identifier 532 and without having to present to the retailer 545 an identifying card or device. The paper may or may not be reusable in different transactions at the same or at a different retailer.

In an embodiment, account identifier 532 may be associated with biometric data that uniquely identifies consumer 535, such as a fingerprint or a retinal scan. Thus, the consumer may provide the identifier in an embodiment by allowing a retailer to scan consumer 535 for the biometric data.

6.9. Variations and Alternatives

System 500 as shown in FIG. 5 presents only one embodiment in which the techniques described herein may be practiced. Other embodiments may include additional and/or fewer elements, in potentially different arrangements. As an example, any of offer provider 595, offer distributor 515, or retailer 545, may be the same entity, and various other components may therefore be omitted. Furthermore, various processes, such as generating and sending electronic receipts or locating consumer account information, may be performed by a server provided by yet a different entity, such as a payment provider or shopping incentive provider, that is not depicted in FIG. 5. Moreover, neither printer 529 nor printing component 549 is necessary to practice many of the techniques described herein, as some embodiments do not include capabilities for printing receipts and/or printing coupons.

7.0. Implementation Mechanism—Hardware Overview

According to one embodiment, the techniques described herein are implemented by one or more data processing systems, including general-purpose computing devices or special-purpose computing devices.

In general, data processing systems that may be used in connection with various embodiments include a desktop computer, laptop computer, netbook, electronic notebook, ultra mobile personal computer (UMPC), electronic tablet or similar device (including any tablet using an iOS™ operating system released by Apple Computer™, Android™ operating system released by Google Inc.™ or Windows™ operating system released by Microsoft Corporation™), client computing device, client terminal, client console, server computer, server system, server terminal, cloud computing system, parallel processing or other distributed computing system, virtual machine, remote computer, mobile telephone, smartphone or similar device (including any smartphone using an iOS™ operating system released by Apple Computer™, Android™ operating system released by Google Inc.™ or Windows™ operating system released by Microsoft Corporation™), wearable computer, head mounted computer or display, personal digital assistant, personal digital organizer, handheld device, networking device, or any other device, component, module, subsystem or system capable of processing electronic data, or any combination of the foregoing.

Data processing systems that may be used in connection with various embodiments may be hard-wired to perform the techniques, or may include digital electronic devices such as one or more application-specific integrated circuits (ASICs) or field programmable gate arrays (FPGAs) that are persistently programmed to perform the techniques, or may include one or more general purpose data processors programmed to run software, including program instructions in firmware, memory, other storage, or a combination. Such data processing systems may also combine custom hard-wired logic, ASICs, or FPGAs with custom programming to perform their functions.

In various embodiments, a data processing system may include one or more logic modules, sometimes also denoted data processing modules or modules. In various embodiments, a logic module may consist of (a) any software application, (b) any portion of any software application, where such portion can process data, (c) any data processing system, (d) any component or portion of any data processing system, where such component or portion can process data, and (e) any combination of the foregoing. In general, a logic module may be configured to perform instructions and to carry out the functionality of one or more embodiments, whether alone or in combination with other data processing modules or with other devices or applications. In general, a data processing system may include one or more logic modules. Depending on the implementation, a logic module may be construed itself to be a data processing system in terms of architecture, configuration, functionality, performance and/or other attributes.

As an example of a logic module comprising software, a logic module may consist of, or may include a software application, and the software application may itself consist of one or more software programs and/or software modules. A logic module consisting of software may perform one or more functions if loaded on a data processing system that comprises a processor or on a logic module that comprises a data processor.

As an example of a logic module comprising hardware, a data processor, a dynamic memory and a storage memory may be included in a logic module to provide a hardware execution platform for software. Examples of data processing systems that may incorporate both logic modules comprising software and logic modules comprising hardware include a desktop computer, a mobile computer, a handheld device, or a server computer, each being capable of running software to perform one or more functions defined in the respective software.

In various embodiments, functionality of logic modules may be consolidated in fewer logic modules (e.g., in a single logic module), or may be distributed among a larger set of logic modules. For example, separate logic modules performing a specific set of functions may be equivalent with fewer or a single logic module performing the same set of functions. Conversely, a single logic module performing a set of functions may be equivalent with a plurality of logic modules that together perform the same set of functions. In various embodiments, two or more logic modules may be independent modules and may perform specific functions independent of each other, or may be combined in whole or in part in a single module that singularly performs their combined functionality.

In one embodiment, the functionality of one more logic modules may be distributed among any number of logic modules. One way to distribute functionality of one or more original logic modules among substitute logic modules is to reconfigure the software and/or hardware components of the original logic modules. Another way to distribute functionality of one or more original logic modules among different substitute logic modules is to reconfigure software executing on the original logic modules so that it executes in a different configuration on the substitute logic modules while still achieving substantially the same functionality. Examples of logic modules that may incorporate the functionality of multiple logic modules and therefore can be construed themselves as logic modules include a system-on-a-chip (SoC) device and a package-on-package (PoP) device, where the integration of logic modules may be achieved in a planar direction (e.g., a processor and a storage memory disposed in the same general layer of a packaged device) and/or in a vertical direction (e.g. using two or more stacked layers).

Figure 9:
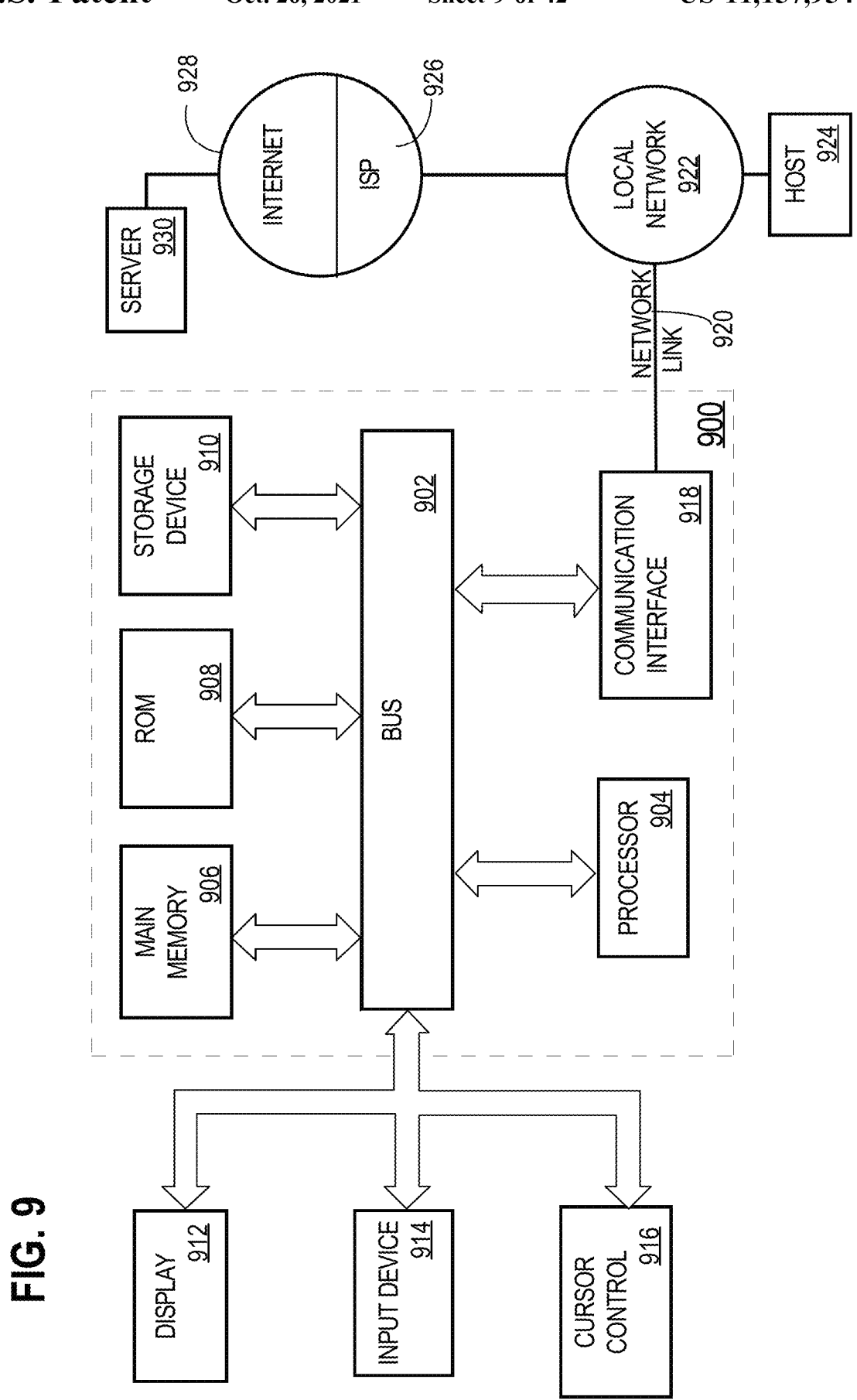
FIG. 9 is block diagram of a data processing system upon which embodiments of the invention may be implemented, in accordance with an embodiment.

For example, FIG. 9 is a block diagram that illustrates a data processing system 900 that may be used in connection with various embodiments. Data processing system 900 includes a bus 902 or other communication mechanism for communicating information, and a data processor 904 coupled with bus 902 for processing information.

A data processor, such as the data processor 904 from FIG. 9, sometimes denoted processor, represents one or more general-purpose data processing devices such as a microprocessor or other central processing unit. A data processor may be a complex instruction set computing (CISC) microprocessor, a reduced instruction set computing (RISC) microprocessor, a very long instruction word (VLIW) microprocessor, a processor implementing other instruction sets, or a processor implementing a combination of instruction sets, whether in a single core or in a multiple core architecture. Data processor 904 may also be or include one or more special-purpose processing devices such as an application specific integrated circuit (ASIC), a field programmable gate array (FPGA), a digital signal processor (DSP), network processor, any other embedded processor, or the like. The data processor 904 may execute instructions for performing operations and steps in connection with various embodiments.

Data processing system 900 may also include a main memory 906, such as a dynamic memory designed to provide higher data access speeds, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render data processing system 900 into a special-purpose machine that is customized to perform the operations specified in the instructions. Examples of main memory 906 include dynamic random access memory (DRAM), synchronous DRAM (SDRAM) memory, read-only memory (ROM) and flash memory. The main memory 906 may be adapted to store all or part of the instructions of a software application, as these instructions are being executed or may be scheduled for execution by data processor 904. In some implementations, the main memory 906 may include one or more cache memory systems that are designed to facilitate lower latency data access by the data processor 904.

Data processing system 900 may further include a read only memory (ROM) 908 and/or a storage device 910 coupled to bus 902.

In general, the storage device 910, also sometimes denoted a storage memory, may be designed to store larger amounts of data. Examples of such storage memories include a magnetic hard disk and a flash memory module. In various implementations, a data processing system may also include, or may otherwise be configured to access one or more external storage memories, such as an external memory database or other memory data bank, which may either be accessible via a local connection (e.g., a wired or wireless USB, Bluetooth, or WiFi interface), or via a network (e.g., a remote cloud-based memory volume).

In general, the terms "memory," "memory medium," or "memory device" could be used to refer to any computer readable storage medium, storage memory, dynamic or static memory, or other memory device, including the main memory 906, the ROM memory 908 and the storage device 910 shown in FIG. 9. A memory may include any chip, disk, device, combination of chips and/or devices, or other structure capable of storing electronic information, whether temporarily, permanently or quasi-permanently. A memory could be based on any magnetic, optical, electrical, mechanical, electromechanical, MEMS, quantum, or chemical technology, or any other technology or combination of the foregoing that is capable of storing electronic information. Examples of memory include a magnetic hard disk, a random access memory (RAM) module, an optical disk (e.g., DVD, CD), a flash memory card, stick, disk or module, or any combination of one or more of the foregoing. A memory could be centralized, distributed, local, remote, portable, or any combination of the foregoing. A memory could consist of a stand-alone or discrete memory storage device, or could be an array of distributed storage devices.

A software application or module, and any other computer executable instructions, may be stored on any such memory, whether permanently or temporarily, including on any type of disk (e.g., a floppy disk, optical disk, CD-ROM, and other magnetic-optical disks), read-only memory (ROM), random access memory (RAM), EPROM, EEPROM, magnetic or optical card, or any other type of media suitable for storing electronic instructions.

In general, a memory could host a database, or a part of a database. Conversely, in general, a database could be stored completely on a particular memory, could be distributed across a plurality of memories, or could be stored on one particular memory and backed up or otherwise replicated over a set of other memories. Examples of databases include operational databases, analytical databases, data warehouses, distributed databases, end-user databases, external databases, hypermedia databases, navigational databases, in-memory databases, document-oriented databases, real-time databases and relational databases. One or more databases could be stored in a data farm or in cloud memory system.

A memory may store one or more software applications, in whole or in part. In general, a software application, also denoted a data processing application or an application, may include any software application, software module, function, procedure, method, class, process, or any other set of software instructions, whether implemented in programming code, firmware, or any combination of the foregoing. A software application may be in source code, assembly code, object code, or any other format. In various implementations, an application may run on more than one data processing system (e.g., using a distributed data processing model or operating in a computing cloud), or may run on a particular data processing system or logic module and may output data through one or more other data processing systems or logic modules.

Data processing system 900 may be coupled to a display 912, possibly via bus 902. Display 912 enables a user to visualize data output by the data processing system 900 and/or to interact with the data processing system 900. The display 912 may directly or indirectly provide a graphical user interface (GUI) adapted to facilitate presentation of data to a user and/or to accept input from a user. The display 912 may represent one or more stand-alone, integrated, external or remote displays, including any LCD, LED or CRT display, optical projection device, holographic displays, wearable personal display (e.g. an electronic eye wear display), or of a combination of the foregoing.

A visual display may also be denoted a graphic display, computer display, display, computer screen, screen, computer panel, or panel. Other examples of displays include a computer monitor, an integrated computer display, electronic paper, a flexible display, a touch panel, a transparent display, and a three dimensional (3D) display that may or may not require a user to wear assistive 3D glasses.

A data processing system may incorporate a graphic display. Examples of such data processing systems include a laptop, a computer pad or notepad, a tablet computer, a smartphone, an electronic reader (also denoted an e-reader or ereader), or a personal data assistant (PDA).

A data processing system may be connected to an external graphic display. Examples of such data processing systems include a desktop computer, a server, an embedded data processing system, or any other data processing system that does not itself include a display but which produces data that may be shown to a user. A data processing system that incorporates a graphic display may also be connected to an external display. A data processing system may directly display data on an external display, or may transmit data to other data processing systems or logic modules that will eventually display data on an external display.

Graphic displays may include an active display, passive display, LCD display, LED display, OLED display, plasma display, and any other type of visual display that is capable of displaying electronic information to a user. Such graphic displays may permit direct interaction with a user, either through direct touch by the user (e.g. a touch-screen display that can sense a user's finger touching a particular area of the display), through proximity interaction with a user (e.g., sensing a user's finger being in proximity to a particular area of the display), or through a stylus or other input device. In one implementation, the display 912 is a touch-screen display that displays a human GUI interface to a user, with the user being able to control the data processing system 900 through the human GUI interface, or to otherwise interact with, or input data into the data processing system 900 through the human GUI interface.

An input device 914, which may include a physical or virtual keyboard or other device for entering information, may also be coupled to bus 902 for entering information and command into data processing system 900. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Data processing system 900 may perform functionality in connection with various embodiments using customized hard-wired logic, one or more ASICs or FPGAs, firmware and/or software which help data processing system 900 function as a special-purpose machine. According to one embodiment, data processing system 900 achieves desired functionality in response to processor 904 executing one or more sequences of one or more instructions contained in a memory, such as main memory 906, ROM 908 and/or storage device 910. Such instructions may be read into main memory 906 from another storage medium, such as storage device 910. Execution of the sequences of instructions contained in a memory may cause processor 904 to perform the process steps described herein. In alternative embodiments, hard-wired circuitry may be used in place of or in combination with software instructions.

Other examples of a memory that may be used in connection with various embodiments to store information and/or software include non-transitory media that store data and/or instructions that cause a machine to operate in a specific fashion. Storage media that may be used as memory in connection with various embodiments may comprise non-volatile media and/or volatile media. Non-volatile media may include, for example, optical or magnetic disks. Volatile media may include dynamic memory. Common forms of computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics. Transmission media can also take the form of acoustic or light waves, such as those generated during radio-wave and infra-red data communications.

In various implementations, bus 902 may be implemented using a variety of transmission media, including metallic wires, optic connections, or wireless connections. In some implementations, there may be one or more data buses in addition to the data bus 902 that connect some or all of the components of data processing system 900, including possibly dedicated data buses that connect only a subset of such components. Each such data bus may implement open industry protocols (e.g., a PCI or PCI-Express data bus), or may implement proprietary protocols.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to data processing system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

The data processing system 900 may further include an audio interface, which provides the ability for the data processing system 900 to output sound (e.g., a speaker), to input sound (e.g., a microphone), or any combination of the foregoing. In some implementations, an audio port may be used to transmit data to and from the data processing system 900, either through sound wave modulation (e.g., emulating the operation of a microphone, although possibly in different frequency ranges and with different data encoding protocols), or through modulation of the electrical signals otherwise transmitted through the audio port (e.g., by using an input microphone port or headset connector port to transmit electrical signals that are properly encoded and/or modulated).

The data processing system 900 may further include any other components that may be advantageously used in connection with receiving, processing and/or transmitting information.

Data processing system 900 also includes a communication interface 918 coupled to bus 902. Communication interface 918 may provide a two-way data communication coupling to a network link 920 that is connected to a local network 922. For example, communication interface 918 may be an integrated services digital network (ISDN) card, cable modem, wireless modem, satellite modem, or a modem to provide a data communication connection to a corresponding type of telephone line. As another example, communication interface 918 may be a local area network (LAN) card to provide a data communication connection to a compatible LAN. Wireless links may also be implemented. In such an implementation, communication interface 918 may send and/or receive electrical, electromagnetic and/or optical signals that carry analog or digital data streams representing various types of information.

Network link 920 may provide data communication through one or more networks to other data devices. For example, network link 920 may provide a connection through local network 922 to a host computer 924 or to data equipment operated by an Internet Service Provider (ISP) 926. ISP 926 in turn may provide data communication services through the world wide packet data communication network commonly referred to as the Internet 928. Local network 922 and Internet 928 may use electrical, electromagnetic and/or optical signals that carry digital data streams. The signals through the various networks and the signals on network link 920 and through communication interface 918, which carry the digital data to and from data processing system 900, are example forms of transmission media.

Data processing system 900 may send messages and/or receive data, including program code, through the network(s), network link 920 and communication interface 918. In the Internet example, a server 930 might transmit a requested code for an application program interface through Internet 928, ISP 926, local network 922 and communication interface 918. The received code may be executed by processor 904 as it is received, and/or stored in storage device 910, or other non-volatile storage for later execution.

In various embodiments, a data processing system, such as the data processing system 900, may communicate, via one or more communication channels and/or one or more communication networks, with local or remote peripherals, logic modules and/or data processing systems. For example, with reference to the data processing system illustrated in FIG. 9. such communications could be carried out through the communication interface 918, in which case the communication interface 918 and/or other logic modules could be configured to include the appropriate communication hardware and software logic to implement the appropriate data encoding, decoding, encryption, decryption, and/or other communication functionality.

In various embodiments, a data processing system may communicate directly with other data processing systems (e.g., a retail terminal communicating with a remote server) or with logic modules (e.g., a local credit card reader, a bar scanner, other point of sale peripherals, etc.) via one or more communication channels and/or via one or more networks.

In various embodiments, a communication channel may include any direct or indirect data connection path, including any connection using a wireless technology (e.g., Bluetooth, infrared, WiFi, WiMAX, cellular, 3G, 4G, EDGE, CDMA and DECT), any connection using wired technology (including via any serial, parallel, wired packet-based communication protocol (e.g., Ethernet, USB, FireWire, etc.), or other wireline connection), any optical channel (e.g., via a fiber optic connection or via a line-of-sight laser or LED connection), and any other point-to-point connection capable of transmitting data.

In various embodiments, a network may include one or more communication channels. In general, a network, or data network, consists of one or more communication channels. Examples of networks include LANs, MANs, WANs, cellular and mobile telephony networks, the Internet, the World Wide Web, and any other information transmission network. In various implementations, a data processing system may include multiple interfaces and communication ports capable of connecting to multiple communication channels and/or networks.

In various embodiments, a data processing system may transmit information and/or receive information via one or more networks that facilitate communications at longer distances. In various embodiments, each network that facilitates data communications for data processing systems and logic modules may be, or may include, a 3G network, a 4G network, an EDGE network, a CDMA network, a GSM network, a 3GSM network, a GPRS network, an EV-DO network, a TDMA network, an iDEN network, a DECT network, a UMTS network, a WiMAX network, a cellular network, any type of wireless network that uses a TCP/IP protocol or other type of data packet or routing protocol, any other type of wireless wide area network (WAN) or wireless metropolitan area network (MAN), or a satellite communication channel or network. Each of the foregoing types of networks that could be used to transmit or receive information from data processing systems and logic modules utilizes various communication protocols, including protocols for establishing connections, transmitting and receiving data, handling various types of data communications (e.g., voice, data files, HTTP data, images, binary data, encrypted data, etc.), and otherwise managing data communications. In various embodiments, a data processing system may be configured to be compliant with one or more protocols used in a network, such that the respective data processing system can successfully connect to the network and communicate via the network with other data processing systems or logic modules.

In various embodiments, a data processing system may transmit information and/or receive information via one or more local networks that facilitate communications at shorter distances. For example, a data processing system (e.g., a point of sale checkout terminal) located in a retailer or other commercial facility may communicate with another data processing system (e.g., a customer's smartphone) and/or with a logic module (e.g., a point of sale peripheral) via a local area network (a LAN). In various embodiments, a local area network may be, or may include, a wired LAN (e.g., an Ethernet network, an optical network, etc.), or a local wireless network (e.g., a WiFi network).

In one embodiment, a data processing system may communicate with another data processing system or logic module that is located in physical proximity through a personal area network. For example, a point of sale terminal may communicate with a loyalty card reader via a Bluetooth connection to receive information relating to the loyalty card, or may communicate with a customer's smartphone via a near field communication channel to transmit or receive a digital coupon or offer or customer identification data.

In one embodiment, a personal area network is implemented so that it has a limited distance range. An advantage of using a limited-range connection between one or more data processing systems and/or one or more logic modules is that two devices would have to be located in close proximity to be able to connect, which means that the security of communications can be correspondingly increased. It would be less likely that a hostile device could be brought on the premises and placed in close physical proximity of a data processing system used in connection with various embodiments to attempt to compromise the security of the data processing system.

In one embodiment, the personal area network has a high security level. In one embodiment, a high security level for the connection between a data processing system (e.g., a point of sale checkout terminal) and another data processing system (e.g., a customer's smartphone) or logic module (e.g., a point of sale peripheral) can be achieved by implementing a pairing mechanism before the two devices acknowledge each other and initiate trusted data communications. In one embodiment, a high security level for a personal area connection can be achieved by encrypting communications before the respective data processing systems and/or logic modules.

In various embodiments, examples of logic modules and/or data processing systems that may be in communication with a data processing system deployed in a retailer or other commercial facility include a peripheral device, such as a cash register, a coin dispenser, a credit card reader, a barcode scanner, a printer, a document scanner, an RFID receiver configured to receive payment-related information from an RFID-enabled device, an image recognition device capable of identifying an object, a photo camera, or a video camera. In various embodiments, there may be two or more peripheral devices, directly or indirectly communicated to a data processing system deployed in a retailer or other commercial facility.

In one embodiment, the personal area network used to transmit or receive information from a data processing system and/or logic module (e.g., a peripheral device) is a Bluetooth communication network. Bluetooth is a proprietary open wireless technology standard for exchanging data over short distances. The Bluetooth standard is managed by the Bluetooth Special Interest Group. Current Bluetooth specifications use frequency-hopping spread spectrum in the range 2,400-2,483.5 MHz. Other frequency use protocols and/or frequency bands may be used in alternative or future implementations.

In one implementation, more than one simultaneous connection is established between a data processing system and one or more other data processing systems or logic modules via a personal area network, which may increase the reliability and/or speed of the communications between the respective devices. In one embodiment, a single Bluetooth connection is established between two devices. In other embodiments, two or three simultaneous Bluetooth connection are established between two devices.

In various embodiments, a personal area network and/or a connection established between a data processing system and one or more logic modules is, or includes, one of the following: a piconet (e.g., an ad-hoc network linking two or more wireless devices over a short distance radius), a scatternet (e.g., an ad-hoc network consisting of two or more piconets), a wireless USB network or connection, a Z-Wave network or connection, a ZigBee network or connection, an infrared network or connection, a near field communication (NFC) network or connection, a radio-frequency identification (RFID) network or connection, an optical signal carrier network or connection (e.g., a connection using modulation of a light carrier (e.g., by an LED, diode or laser) as the basis for data transmission, or any other wireless network or connection that can transmit data with sufficient reliability, speed and security over a short distance.

In general, unless otherwise stated or required by the context, when used in connection with a method or process, data processing system, or logic module, the words "adapted" and "configured" are intended to describe that the respective method, data processing system or logic module is capable of performing the respective functions by being appropriately adapted or configured (e.g., via programming, via the addition of relevant components or interfaces, etc.), but are not intended to suggest that the respective method, data processing system or logic module is not capable of performing other functions. For example, unless otherwise expressly stated, a logic module that is described as being adapted to process a specific class of information will not be construed to be exclusively adapted to process only that specific class of information, but may in fact, depending on the circumstances, be able to process other classes of information and to perform additional functions (e.g., receiving, transmitting, converting, or otherwise processing or manipulating information).

Some of the embodiments described in this specification may be presented in terms of algorithms and symbolic representations of operations on data bits within a computer memory. In general, an algorithm represents a sequence of steps leading to a desired result. Such steps generally require physical manipulations of physical quantities. Usually, although not necessarily, these quantities take the form of electrical or magnetic signals capable of being stored, transferred, combined, compared, and otherwise manipulated using appropriate electronic devices. Such signals may be denoted as bits, values, elements, symbols, characters, terms, numbers, or using other similar terminology.

When used in connection with the manipulation of electronic data, terms such as processing, computing, calculating, determining, displaying, or the like, generally refer to the action and processes of a data processing system or logic module that manipulates and transforms data represented as physical (electronic) quantities within the registers and memory of such system or module, into other data similarly represented as physical quantities within the registers or memory of that system or module, or within the registers or memory of other data processing systems or logic modules.

Various embodiments may be implemented using an apparatus or machine that executes programming instructions. Such an apparatus or machine may be specially constructed for the required purposes, or may comprise a general purpose computer selectively activated or reconfigured by a software application.

Algorithms discussed in connection with various embodiments of the present invention are not inherently related to any particular computer or other apparatus. Various general purpose systems may be used with programs in accordance with various embodiments, or it may prove convenient to construct more specialized apparatus to perform the required method steps. The required structure for a variety of these systems will appear from the description provided in connection with the various embodiments discussed herein. In addition, unless otherwise expressly stated, embodiments are generally not described with reference to any particular programming language, data transmission protocol, or data storage protocol, and a variety of programming languages, transmission or storage protocols may be used if appropriate under the circumstances.

As used in this specification, a set means any group of one, two or more items. Analogously, a subset means, with respect to a set of N items (where N is at least 2), any group of such items consisting of N-1 or less of the respective N items.

As used in this specification, the terms "include," "including," "for example," "exemplary," "e.g.," and variations thereof, are not intended to be terms of limitation, but rather are intended to be followed by the words "without limitation" or by words with a similar meaning. Definitions in this specification, and all headers, titles and subtitles, are intended to be descriptive and illustrative with the goal of facilitating comprehension, but are not intended to be limiting with respect to the scope of the inventions as recited in the claims. Each such definition is intended to also capture additional equivalent items, technologies or terms that would be known or would become known to a person of average skill in this art as equivalent or otherwise interchangeable with the respective item, technology or term so defined.

Unless otherwise required by the context, the verb "may" or "could" indicates a possibility that the respective action, step or implementation may or could be achieved, but is not intended to establish a requirement that such action, step or implementation must occur, or that the respective action, step or implementation must be achieved in the exact manner described.

8.0. Extensions and Alternatives

In the foregoing specification, embodiments of the invention have been described with reference to numerous specific details that may vary from embodiment to embodiment, and from implementation to implementation. The scope of the invention is described in the claims that issue from this disclosure, in the specific form in which such claims issue, including any subsequent correction, and is not intended to be limited to any particular embodiment or implementation beyond any limitations expressly defined in such claims. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

8.1. Selecting Offers Based on Collected Transaction Logs

According to an embodiment, a method comprises: storing offer data describing a plurality of offers for a plurality of different items; providing, over a first network, to each retailer of a plurality of retailers, a transaction interface; receiving transaction details for a plurality of transactions from the plurality of retailers via the transaction interface, the transaction details including, for each transaction of the plurality of transactions, line item details for each item of a plurality of items purchased in the transaction; storing the transaction details; providing, over a second network, to at least a first retailer of the plurality of retailers, an offer recommendation interface; receiving via the offer recommendation interface, from the first retailer, a request for offer recommendations, the request including contextual data; matching the contextual data to a set of transactions described in the transaction details for the plurality of transactions; based on line item details from the matched set of transactions, selecting one or more offers from the plurality of offers in response to the request; and responsive to the request, providing the first retailer with offer data describing the selected one or more offers. In various embodiments, one or more data processing systems and/or one or more logic modules may perform all or a subset of the foregoing steps.

In an embodiment, the selection includes identifying, based on the line item details for one or more transactions, one or more items associated with the contextual data; and selecting offers based on those items. In an embodiment, the selection includes selecting one or more consumers based on information in contextual data; identifying transaction details for one or more transactions associated with the one or more consumers; and selecting the one or more offers based on the transaction details for the one or more transactions associated with the one or more consumers. In an embodiment, the contextual data includes consumer identifiers, location data, basket items, a transaction number, and/or other contextual data described herein. In an embodiment, the first network is the second network.

In an embodiment, the retailer requests a consumer entity identifier or other information from the offer server via a consumer resolution interface. In an embodiment, the request is for a receipt, and responding to the request includes returning the offer data within receipt data. In an embodiment, the receipt is formatted according to template indicated or provided by the first retailer. In an embodiment, the transaction details include redeemed offers. In an embodiment, the first retailer delivers the provided offers to a consumer via a website belonging to the first retailer. In an embodiment, the one or more offers include targeted offers targeted to a specific context. In an embodiment, the one or more offers include recommended offers ranked based on signals derived from a specific context. In an embodiment, the method further comprises the offer server subsequently receiving and responding to requests to activate the one or more offers. In an embodiment, the offer server responds to the requests with activation data to facilitate redemption at any of the plurality of retailers.

In an embodiment, the method further comprises, identifying a particular offer based on the transaction details, calculating an estimated retailer profit metric for showing the particular offer within a context described by the contextual data, and selecting the particular offer based thereon. In an embodiment, the estimated retailer profit metric is a score from a scoring function optimized for maximizing estimated retailer profit. In an embodiment, the selecting comprises, based on the transaction details, calculating an estimated revenue per impression or revenue per activation metric for showing a particular offer within a context described by the contextual data, and selecting the one or more offers based thereon. In an embodiment, the estimated revenue per impression or revenue per activation is a score from a scoring function optimized for maximizing revenue per impression or revenue per activation.

8.2. Consumer Identification

According to an embodiment, a method comprises: receiving multiple source collections of consumer records from multiple sources, wherein the multiple sources include a first entity and a second entity that is different from the first entity, wherein the multiple source collections include a first collection from the first entity and a second collection from the second entity; wherein each particular collection of the multiple source collections has a corresponding particular consumer record structure, each particular consumer record structure having particular fields for which one or more of the consumer records in the particular collection have values; for each particular collection of the multiple source collections, assigning trust scores to the particular fields of the particular collection, wherein at least a first field of the first collection has a different trust score than a similar second field of the second collection; based at least in part on the trust scores, establishing correlations between different consumer records in different collections of the multiple source collections by correlating consumer records that have similar values for one or more similar fields; generating a master collection of consumer records by generating master consumer records based on the correlations, wherein each of a plurality of master consumer records is linked to at least two different correlated consumer records from at least two different sources; receiving a message comprising consumer context data; selecting a particular master consumer record to associate with the message, based on comparing the consumer context data in the message to the master consumer records; and providing offer data in response to the message, based on consumer logs associated with the particular master consumer record. In various embodiments, one or more data processing systems and/or one or more logic modules may perform all or a subset of the foregoing steps.

In an embodiment, providing the offer data comprises providing recommended offers selected based on one or more activities associated with the particular master consumer record. In an embodiment, the offer data is included with receipt data that the message requests. In an embodiment, providing the offer data comprises identifying offers targeted to the particular master consumer record based on one or more of: one or more activities associated with the particular master consumer record, or consumer attributes associated with the particular master consumer record. In an embodiment, providing offer data comprises determining whether an offer has previously been activated in association with the particular master consumer record. In an embodiment, providing offer data comprises providing a list of offers that have been activated for the consumer. The request is from a retailer, and the consumer context data is credentials supplied by consumer during a transaction. In an embodiment, the message is transaction log.

In an embodiment, the selecting comprises selecting multiple master records and scoring the likelihood that the context data belongs to a particular record. In an embodiment, the selecting is further based on confidence scores that indicate the frequency with which a particular value occurs in a particular field of a consumer's correlated consumer records. In an embodiment, the trust scores evolve over time based on one or more of: updates from the multiple sources, new transaction data, or confidence scores that indicate the frequency with which a particular value occurs in a particular field of a consumer's correlated consumer records.

In an embodiment, the method further comprises correlating transactions from a plurality of different stores with the particular master consumer record. In an embodiment, the method further comprises receiving updates to the multiple source collections from retailers over time, and revising the correlations based thereon. In an embodiment, each value of each of the master consumer records is linked to a particular source of the multiple source collections from which the value originated. In an embodiment, the particular fields include aggregated transaction data.

In an embodiment, the selecting comprises identifying one or more values for a particular field of the particular master consumer record based at least on: a first value for the first field in a first consumer record of the first collection, a second value for the second field in a second consumer record of the second collection, and the different trust scores assigned to the first field and the second field. In an embodiment, identifying the one or more values comprises, in response to a query that requests the one or more values for the particular field, querying the first consumer record for the first value, querying the second consumer record for the second value, and deciding which one or more values of the first value and the second value to return based at least on the different trust scores. In an embodiment, identifying the one or more values comprises, deciding which one or more values of the first value and the second value to store in the master consumer record based at least on the different trust scores.

In an embodiment, the first collection has a first consumer record structure and the second collection has a second consumer record structure, wherein the first consumer record structure has first fields that differ from second fields of the second consumer record structure. In an embodiment, the first value is assigned to the particular field for a plurality of master consumer records; the message is a query that selects for the first value; and the method further comprises identifying one or more master consumer records to return based on trust scores assigned to different fields of different source collections from which the plurality of master consumer records were generated. In an embodiment, the first entity is a first retailer and the second entity is a second retailer.

According to an embodiment, a method comprises storing consumer records comprising data collected from different sources, wherein each of the consumer records includes a plurality of values for a plurality of attributes, including one or more consumer credentials; storing logs of previous actions taken by consumers in association with the different sources, wherein the logs include credentials that map the logs to the consumer records; receiving a request to provide access to particular content, wherein the request includes one or more particular credentials and metadata associated with the request; determining that a first consumer record and a second consumer record share the same one or more particular credentials; selecting a particular consumer record, of the first consumer record and the second consumer record, based on comparing the metadata associated with the request to information stored in or derived from the logs of previous actions taken by consumers; and responding to the request based on consumer access data associated with the selected particular consumer record.

In an embodiment, the first consumer record and the second consumer record include, in addition to the one or more particular credentials, one or more other credentials that are not equivalent, wherein the one or more other credentials were not included in the request. In an embodiment, the method further comprises matching ambiguous logs to records based on comparing transaction metadata data of ambiguous log to logs that present unambiguous credentials. In an embodiment, the metadata includes at least one of: location data, basket data, or time or day of the week. In an embodiment, access is provided to an offer. In an embodiment, the method further comprises determining that the offer was previously marked as redeemed in response to a request that presented other credentials associated with particular consumer record. Responding to the request comprises declining the request.

8.3. Targeting

According to an embodiment, a method comprises storing event data describing a plurality of events that comprise a plurality of transactions and a plurality of web requests. The method further comprises storing target definition data describing a plurality of target contexts. The method further comprises storing targeted offer data describing a plurality of offers. Each particular offer of the plurality of offers associated with one or more particular target contexts, of the plurality of target contexts, to which the particular offer is targeted. The method further comprises, based on the event data, correlating particular events of the plurality of events to particular consumer records. The method further comprises receiving, over a network, a request indicating a first event. The method further comprises correlating the first event to at least a first consumer record. The method further comprises, based at least on one or more events, other than the first event, that have been correlated to the first consumer record, identifying a context for the first event. The method further comprises, matching the identified context to a first target context of the plurality of target contexts. The method further comprises selecting one or more offers, of the plurality of offers, that are associated with the first target context. The method further comprises providing data describing the one or more offers to one or more devices in response to the request. In various embodiments, one or more data processing systems and/or one or more logic modules may perform all or a subset of the foregoing steps.

In an embodiment, the method further comprises presenting information about the one or more offers to a device associated with the first consumer record. The device may or may not have sent the request. In an embodiment, identifying the context is further based on one or more of: information associated with the first consumer record, such as demographic data or historical transaction data, or the first event itself. In an embodiment, the method further comprises automatically activating the one or more offers for use in association with the first consumer record. In an embodiment, the events further include a plurality of location events. In an embodiment, the one or more events other than the first event include one or more location events. The identified context is a trip by a consumer associated with the first consumer record to a particular location, such as from home to a grocery store. In an embodiment, the identified context is the opening of a certain application, such as a retailer-provided application, shopping list management application, or coupon application, on a consumer device at a particular location. In an embodiment, the target definition data comprises describes two particular contexts that differ only in the type of device, such as a mobile device as opposed to a desktop device, from which one or more events associated with the two particular contexts are received.

In an embodiment, the identified context is the purchase of a particular item by a consumer within a particular period of time. The one or more events, other than the first event, include a transaction event from a first retailer indicating that the particular item was purchased by a consumer linked to the first consumer record. The request is from a second retailer. The method further comprises sending information about the one or more selected offers to the second retailer, in response to the request.

In an embodiment, the request is for a receipt for a particular transaction, and the first event is the particular transaction. In an embodiment, at least a subset of the plurality of events are detected in logs stored on a server. In an embodiment, at least a subset of the plurality of events are generated in response to messages from a plurality of different endpoints, including one or more of a retailer terminal, retailer website, consumer device, social networking server, or payment server. In an embodiment, the event data is aggregated in a data store. In an embodiment, correlating the first event to the first consumer record comprises determining probabilities that the first event reflects activity by each of a plurality of consumers, and selecting the first consumer record because the first consumer record describes a first consumer that is associated with a highest probability of the probabilities. In an embodiment, the method further comprises automatically defining new target contexts based on historical event data.

According to an embodiment, a method comprises receiving, via an offer creation interface at an offer distribution server computer, offer definition data describing a plurality of offers, each offer of the plurality of offers comprising a plurality of offer terms. The method further comprises storing target definition data describing a plurality of contexts under which requests to the offer distribution server may occur. The method further comprises receiving, via the offer creation interface, target association data that associates each particular targeted offer, of a plurality of targeted offers in the plurality of offers, with particular target definition data in the target definition data. The particular target definition data describes one or more particular contexts to which the particular targeted offer is targeted. The particular target definition data is separate from the plurality of offer terms. The method further comprises receiving, at the offer definition server computer, from a requestor, a request associated with a request context. The method further comprises matching the request context to a particular context described in the target definition data. The method further comprises based on the target association data, selecting, for inclusion in a response to the request, a targeted set of one or more offers, from the plurality of targeted offers, that the target association data associates with the particular context. The method further comprises, without taking into account the target association data, selecting, for inclusion in the response to the request, a recommended set of one or more offers, from the plurality of offers, that are ranked highly with respect to the request context. The method further comprises sending the response to the requestor, including information about both the targeted set of one or more offers and the recommended set of one or more offers.

In an embodiment, a recommendation engine performs the selection of a recommended set of offers. In an embodiment, the target association data includes bid amounts to compensate an offer distributor for selecting particular targeted offers for particular contexts. In an embodiment, an offer distributor is compensated differently for selecting offers in the targeted set of offers than for selecting offers in the recommended set of offers. In an embodiment, the method further comprises presenting information about the targeted set of offers in a separate section of the response than information about the recommended set of offers. In an embodiment, the method further comprises merging information about the targeted set of offers and information about the recommended set of offers in a single list within the response. In an embodiment, the method further comprises automatically activating an offer for use by a consumer associated with the request based on the offer being in the targeted set of one or more offers, wherein offers in the recommended set of one or more offers are not automatically activated.

In an embodiment, the method further comprises determining the request context based on external data, including one or more events and/or information associated with a particular consumer record that is associated with the request. In an embodiment, the particular consumer record does not necessarily describe the requestor, but rather the requestor may be a retailer or web service provider. In an embodiment, selecting the targeted set of offers comprises ranking offers associated with the particular context by a universal scoring mechanism and filtering low-scoring offers to identify the targeted set of offers. In an embodiment, the request context includes a certain combination of one or more events that occur in a timespan. Matching the request contest to the particular context involves finding which one or more contexts include the certain combination of one or more events. By contrast, selecting the recommended set of one or more offers involves generating signals based on the certain combination of one or more events and inputting the signals into one or more scoring functions. In an embodiment, the request context is specified by requestor.

8.4. Recommendations

According to an embodiment, a method comprises storing offer data describing a plurality of offers. The method further comprises identifying a plurality of collections of itemsets. The collections include at least a first collection of itemsets derived from transaction logs and a second collection of itemsets derived from logs in one or more of: offer activation logs, offer redemption logs, or offer impression logs. Each itemset in the first collection comprises items indicated by the transaction logs as having been purchased together. Each itemset in the second collection comprising items that appear together within a same log of the logs. The method further comprises, for each different collection, generating associations between pairs of items that co-occur within the itemsets. The method further comprises, for each different collection, calculating association scores for one or more of the associations. The association scores reflect an actual or estimated frequency of co-occurrence of the items corresponding to the association within itemsets belonging to the collection. The method further comprises receiving a request for offer recommendations. The request is associated with one or more items. The method further comprises for each different collection, matching the one or more items associated with the request to particular associations within the collection. The method further comprises, for each different collection, identifying a set of related items based on the matched particular associations. The method further comprises merging the sets of related items. The method further comprises ranking the items in the merged set based at least in part on the association scores. The method further comprises selecting a set of offers to recommend based on the ranked items in the merged set.

In an embodiment, selecting the set of offers comprises selecting offers associated with any items in the set of related items. In an embodiment, the items in at least one itemset include products and offers, wherein selecting the set of offers comprises selecting offers associated with any products in the set of related items. In an embodiment, the method further comprises identifying the plurality of collections based at least on a context associated with the request. In an embodiment, the plurality of collections are part of a superset of collections comprising different collections of the same type for different users or groups of users. In an embodiment, only collections of itemsets collected for web-based events are utilized when the request is associated with a web-based event. In an embodiment, items include events. At least some of the associations are between offers and certain user actions described in a behavioral log.

In an embodiment, the scores from each different function are assigned different weights. In an embodiment the weights vary depending on a context associated with the request. In an embodiment, the merged set includes one or more items found in different sets of related items from different collections. The ranking function is a function of the association scores from each collection in the plurality of collections. In an embodiment, association scores are estimated scores computed from one or more scoring functions that were learned from one or more training subsets of itemsets from the one or more collections. In an embodiment, association scores are based actual frequencies of co-occurrence within the itemsets of each collection. In an embodiment, different scoring functions are applied to a single collection, depending on the context of the request. In an embodiment, different scoring functions may be optimized for different objective functions, including one or more of revenue per impression, revenue per activation, or revenue per redemption. Objective functions may be optimized relative to different requestors or consumers associated with a request, including different objective functions for different consumers, groups of consumers, providers, or retailers.

In an embodiment, the itemset collections include collections for each of: shopping lists, web clickstreams, offers clickstream, offer activation logs, offer redemption logs, and transaction logs. In an embodiment, association scores are further based on other signals derived from event data or other information associated with the request, such as location events or demographic data. In an embodiment, selecting the set of offers comprises multiplying association scores for particular items by universal scores for particular offers pertaining to the particular items.

According to an embodiment, a method similar to that described above involves only a collection of itemsets describing offers that are redeemed together in transactions, or offers that are redeemed by a same consumer. Hence, association scores would describe offers that are frequently redeemed together, or are likely to redeemed together. Recommendations are generated based thereon.

According to an embodiment, a method comprises storing offer data describing a plurality of offers. The method further comprises identifying a collection of itemsets, each itemset of the itemsets being a set of items that appear together in a particular context. The method further comprises receiving a request for offer recommendations. The request is associated with one or more items. The method further comprises generating associations between pairs of items that co-occur within the itemsets. The method further comprises calculating association scores for one or more of the associations. The association scores reflect an actual or estimated frequency of co-occurrence of the items corresponding to the association within itemsets belonging to the collection. The method further comprises matching the one or more items associated with the request to particular associations within the collection. The method further comprises identifying a set of related items based on the matched particular associations. The method further comprises identifying offers associated with items in the set of related items. The method further comprises calculating universal scores for the identified offers, the universal score for each offer being based at least in part on a measure of revenue associated with activation or recommendation of the offer. The method further comprises ranking the identified offers based at least in part on the universal scores and the association scores. The method further comprises selecting a set of offers to recommend based on the ranked offers. In an embodiment, wherein the measure of revenue is relative to one or more of: an offer distributor or a retailer associated with the request. Techniques for calculating universal scores are described subsequently.

According to an embodiment, a method comprises identifying a set of offers responsive to a request. The method further comprises calculating universal scores for the set of offers. The calculating comprising, for each offer in the set of offers, calculating a function of: a first ratio of total activations for the offer to average total activations for all offers in a plurality of offers, a second ratio of total impressions for the offer to average total impressions for all offers in the plurality of offers, and a third ratio of total redemptions for the offer to average total redemptions for all offers in the plurality of offers. The method further comprises ranking the set of offers based at least in part on the universal scores. The method further comprises providing information about at least a subset of the ranked set of offers in response to the request.

In an embodiment, calculating a universal score comprises comparing historical performance of the offer to average offer performance for multiple offers in a group of offers. In an embodiment, calculating the universal score for comprises calculating a function of at least activations, redemptions, and impressions for the offer. In an embodiment, calculating the universal score comprises calculating a function of at least offer inventory and offer end date. In an embodiment, calculating the universal scores comprises calculating predetermined universal scores based on a set of signals in advance of receiving the request. In an embodiment, calculating the universal scores comprises calculating delta changes to the predetermined universal scores based on changes in the signals between the time that the predetermined universal scores were originally calculated and the time that the request was received. In an embodiment, calculating the universal score for a particular item is based on a manually specified sponsorship score for the particular item.

In an embodiment, the first ratio, second ratio, and third ratio are weighted. In an embodiment, different weights are learned for different contexts. In an embodiment, the first ratio, second ratio, and third ratio are weighted based on data that is specific to certain groups of users. In an embodiment, the plurality of offers is the identified set responsive to the request. In an embodiment, the plurality of offers is a set of all available offers, including offers not in the set responsive to the request. In an embodiment, a universal score is determined for a new offer, or an offer for which there is not yet a threshold amount of data, as a ratio average totals from a group of offers to average totals of the plurality of offers. The group of offers is a subset of the plurality of offers, of which the new offer is part.

8.5. Offer Creation

According to an embodiment, a method comprises storing transaction data for a plurality of customers from a plurality of different sources. The method further comprises correlating transaction data for particular customers to form transaction histories specific to each of the particular customers. The method further comprises identifying, in the transaction histories, trends with respect to a set of products in the transaction histories. The method further comprises based on the trends, generating offer data describing one or more potential offers with respect to the set of products. The method further comprises presenting, to an advertiser, an interface displaying information about the one or more potential offers. The method further comprises receiving a selection from the advertiser of a particular offer in the one or more potential offers. The method further comprises adding particular offer data describing the selected particular offer to a repository of offer data. The method further comprises based on the repository of offer data, responding to requests from customers to access the particular offer.

In an embodiment, generating the offer data describing the one or more potential offers occurs interactively as user defines one or more initial parameters. In an embodiment, generating the offer data occurs in response to user input identifying one or more products, or categories of products, for an offer, or in response to a specification of a start date and an end date for an offer. In an embodiment, generating the offer data occurs periodically. In an embodiment, presenting the interface displaying the information about the one or more potential offers comprises sending the advertiser a weekly email. In an embodiment, presenting the interface displaying the information about the one or more potential offers comprises presenting the information when the provider first accesses an offer creation interface at the beginnings of particular time periods. In an embodiment, the method further comprises ranking the one or more potential offers by a predicted measure of revenue to the advertiser. In an embodiment, the method further comprises ranking the one or more potential offers by a predicted increase in sales volume. In an embodiment, generating the offer data is based partly on a history of what offers the advertiser has created before.

In an embodiment, presenting the interface displaying the information about the one or more potential offers comprises showing an estimated key performance indicator for each proposed offer. In an embodiment, the method further comprises receiving, via the interface, input that modifies a potential offer. In an embodiment, the method further comprises presenting a recalculated key performance indicator based on one or more changes made by the advertiser to a potential offer. In an embodiment, the method further comprises identifying price points for a potential offer based on information about prices at which an item was previously purchased. In an embodiment, the method further comprises identifying one or more proposed terms of a potential offer based on frequency-of-purchase transaction data. In an embodiment, the one or more proposed terms include at least one of an offer start and an offer expiration date. In an embodiment, the method further comprises identifying one or more proposed terms of a potential offer based on volume-of-purchase data. In an embodiment, the one or more proposed terms include at least an offer distribution limit.

In an embodiment, the method further comprises optimizing offer terms to yield a highest estimated profit for retailer. In an embodiment, the estimated profit is determined based on one or more of: redemption patterns for previous similar offers, or correlations between purchase histories for items and redemption patterns for previous similar offers related to those items. In an embodiment, the method further comprises identifying a proposed targeting context in which to distribute a potential offer based on one or more of offer redemption histories and item purchase histories. In an embodiment, the method further comprises identifying a proposed bid amount to compensate an offer distributor for distributing the potential offer within the targeting context. In an embodiment, the method further comprises receiving input that modifies the proposed bid and presenting one or more estimated metrics showing an estimated effect of the modified proposed bid. In an embodiment, the method further comprises proposing an offer whose terms require multiple transactions for redemption, in that they can only be redeemed after detecting two or more different transactions collectively meeting certain criteria.

In an embodiment, a method comprises storing, in a repository of offer data, a dynamic offer record describing a dynamic offer. The dynamic offer record includes one or more attributes corresponding to terms of the dynamic offer. The attributes include at least one variable attribute associated with a value selection scheme. The method further comprises identifying a particular customer record in association with which the dynamic offer is to be distributed. The method further comprises based on the dynamic offer record and transaction data associated with the particular customer record, generating custom offer data describing a custom offer. The generating includes selecting a particular value for the variable attribute based on applying the transaction data associated with the particular customer record to the value selection scheme. The method further comprises storing activation data that associates the custom offer data with the particular customer record. The method further comprises providing information about the custom offer, including the at least one dynamically selected term, in response to a request associated with the particular customer record. The method further comprises sending information about the customer offer, including the at least one dynamically selected term, to a retailer for redemption in a transaction associated with the particular customer record.

In an embodiment, the method further comprises, based on the value selection scheme, varying one or more of: a promotional image shown with dynamic offer; a discount amount of the dynamic offer, products tied to the dynamic offer, an expiration date of the dynamic offer, or a start date of the dynamic offer. In an embodiment, the value selection scheme is based on one or more metrics that indicate an estimated value to a provider for providing the dynamic offer to a particular consumer. The one or more metrics are based on previous transaction data and/or previous offer redemption data associated with the particular consumer. In an embodiment, the method further comprises sending information indicating terms of the customer offer to a clearinghouse.

What is claimed is:

1. A computer-implemented data processing method comprising:
    using an offer server computing device, obtaining a first consumer record associated with a first computer source and a second consumer record associated with a second computer source, each consumer record comprising key information, source collection data and contextual transaction data, the first computer source comprising a merchant point-of-sale terminal or card reader or a digital receipt source, the second computer source comprising a service provider website or loyalty data source; the first consumer record and second consumer record having been obtained by a retail computer system accessing an API hosted by the offer server computing device directly in real time as transactions occur at the retailer system;
    using the offer server computing device, normalizing the key information;
    using the offer server computing device, in response to determining that the first consumer record has been obtained from a primary source, determining that at least a first set of key information in the first consumer record matches a second set of key information in the second consumer record, and in response thereto:
    using the offer server computing device, identifying a first set of key information in the first consumer record that matches a second set of key information in the second consumer record and separating noncontradictory key information, the noncontradictory key information being the first set of key information from the first consumer record that matches the second set of key information from the second consumer record;
    using the offer server computing device, creating and storing a master record in a database, the master record comprising a union of the noncontradictory key information and a plurality of master record key values;
    using the offer server computing device, storing a third and fourth set of key data in a database, the third set of key data comprising key data in the first consumer record that does not match the noncontradictory key information and the fourth set of key data comprising key data in the second consumer record that does not match the noncontradictory key information;
    using the offer server computing device, creating and storing a score value for the master record based upon a plurality of score values that are assigned to each of the master record key values, the score value indicating a level of confidence that the first set of key information and the second set of key information refer to a same particular consumer and including generating the score value by calculating a proportion of the key information in the first and second consumer records that comprises the first set of key data and the second set of key data, the noncontradictory key information that consists of exclusive values being weighted higher and the noncontradictory key information that consists of demographic values being weighted lower;
    using the offer server computing device, increasing or decreasing the score value based on machine learning techniques and either or both of: a determination that the noncontradictory information from the first consumer record and the second consumer record also is in a third consumer record, or a user validating the noncontradictory information;
    using the offer server computing device, ranking a plurality of the master records based on trustworthiness of the score values assigned to each of the master record key values and assigning the value of the highest-ranking score to the particular master record key;
    using the offer server computing device, sending historical or projected data to an offer provider, the historical or projected data being any of: an impact of the offer on sales of an item, an offer redemption rate, a profit per offer impression, a profit margin, an offer volume, an offer yield, an impact of the offer on other offers, and an impact of the offer on consumer behavior;
    using the offer server computing device, receiving a specified goal based on an interaction of the offer provider;
    using the offer server computing device, using a target optimizer and the goal to generate a recommendation for which electronic offers to present to the user, computing device, or account associated with the master record;

using the offer server computing device, using the master record and the generated recommendation to determine one or more electronic offers to present to any of a user, a computing device, or an account that is associated with the master record, the determining the one or more electronic offers being based on at least one of: an activity associated with a particular master record or a consumer attribute associated with a particular master record;

using the offer server computing device, generating a webpage comprising an electronic receipt with embedded offer information formatted using one or more of XML, SOAP, or JSON and at least one uniform resource locator (URL);

causing presenting the one or more electronic offers that were determined.

2. The method of claim 1, further comprising:
obtaining the third consumer record from any of the first computer source, the second computer source, or a third computer source.

3. The method of claim 1, wherein the first set of key information comprises a first identifier that matches a second identifier in the second set of key information, and further comprising increasing the score value of the master record based upon determining that both the first identifier and the second identifier are in the third consumer record.

4. The method of claim 1, further comprising increasing the score value of the master record in response to receiving a validation signal indicating that a consumer has validated the first key information or the second key information.

5. The method of claim 1, wherein the first set of key information comprises a first identifier that matches a second identifier in the second set of key information, and further comprising:
receiving a validation signal indicating that a consumer has validated the first identifier or the second identifier;
increasing the score value of the master record based upon determining that both the first identifier and the second identifier are in the third consumer record.

6. The method of claim 1 further comprising increasing the score value by a greater amount in response to obtaining an explicit user validation of the master record key information.

7. The method of claim 1 wherein the first computer source is associated with a first retailer and the second computer source is associated with a second retailer that is different than the first retailer.

8. The method of claim 1 wherein the key information comprises at least one of: credit card number; one or more payment network credentials; phone number; address; one or more login credentials; home address; driver's license number or other personally identifying information; store membership number.

9. The method of claim 1 further comprising updating the master record in response to obtaining an updated first consumer record, and in response to determining that the first set of key information in the updated first consumer record is similar to the second set of key information.

10. The method of claim 1 further comprising obtaining the third consumer record; determining that the third consumer record comprises a fifth set of key information that is noncontradictory to at least some of the first set of key information and the second set of key information; updating the master record by merging the third consumer record into the master record.

11. The method of claim 1, further comprising determining that the third consumer record and a fourth consumer record are associated with different users of the same loyalty card of the same household when a fifth set of key information and a sixth set of key information, from the third consumer record and the fourth consumer record respectively, both include the same loyalty card number and the same address, and in response thereto, assigning a household identifier to both the third record and the fourth record, and storing the third record and the fourth record without creating a second master record.

12. The method of claim 1 wherein the first consumer record is a first master record of a first entity and the second consumer record is a second master record of a second entity.

13. The method of claim 1 wherein the second set of key information indicates that a first user printed, activated or downloaded an offer, and that a second user redeemed the offer.

14. The method of claim 1 further comprising refraining from repeating one or more offers that have been previously offered in connection with either the first consumer record or the second consumer record.

15. The method of claim 1, wherein determining the one or more electronic offers is based on determining whether an offer has previously been activated in connection with a particular master record.

16. The method of claim 1, further comprising: in response to a request from a retailer, transmitting a list of offers that have been activated for a particular master record, based upon present contextual transaction data that includes a credential supplied by a consumer during a transaction.

17. The method of claim 1, further comprising: modifying at least one confidence level associated with the master record based on at least one of: an update from at least one of two sources from which the first consumer record and the second consumer record were obtained, new transaction data, or a field score that indicates a frequency with which a particular value occurs in a data field of the first consumer record and the second consumer record.

18. The method of claim 1, further comprising:
using the offer server computing device, presenting the generated recommendation to the offer provider;
using the offer server computing device, receiving a confirmation from the offer provider specifying which offers to make in response to at least one of: an activity associated with a particular master record or a consumer attribute associated with a particular master record.

* * * * *